United States Patent [19]

Ikeda et al.

[11] Patent Number: 5,703,694
[45] Date of Patent: Dec. 30, 1997

[54] IMAGE PROCESSING APPARATUS AND METHOD IN WHICH A DISCRIMINATION STANDARD IS SET AND DISPLAYED

[75] Inventors: Yoshinori Ikeda, Tokyo; Hiroyuki Ichikawa, Kawasaki; Mitsuru Kurita, Tokyo; Kimiyoshi Hayashi, Soka; Toshio Honma, Kawasaki; Yoshiko Horie, Tokyo, all of Japan

[73] Assignee: Canon Kabushiki Kaisha, Tokyo, Japan

[21] Appl. No.: 600,361

[22] Filed: Feb. 13, 1996

Related U.S. Application Data

[62] Division of Ser. No. 481,825, Jun. 7, 1995, Pat. No. 5,550, 638, which is a continuation of Ser. No. 21,853, Feb. 24, 1993, abandoned, which is a division of Ser. No. 519,448, May 4, 1990, Pat. No. 5,239,383.

[30] Foreign Application Priority Data

| May 10, 1989 | [JP] | Japan | 1-117004 |
| May 10, 1989 | [JP] | Japan | 1-117017 |
| May 10, 1989 | [JP] | Japan | 1-117023 |

[51] Int. Cl.⁶ .............. H04N 1/00; H04N 1/40; H04N 1/46; G03F 3/08
[52] U.S. Cl. .............. 358/296; 358/462; 358/529; 358/538
[58] Field of Search .............. 358/296, 298, 358/300, 406, 448, 453, 462, 500, 501, 504, 518, 529, 538, 540, 530–532; 382/162, 164, 167; 355/202, 204, 208, 326 FR, 327

[56] References Cited

U.S. PATENT DOCUMENTS

| 4,595,956 | 6/1986 | Kawamura et al. | 358/283 |
| 4,723,129 | 2/1988 | Endo et al. | 346/1.1 |
| 4,740,796 | 4/1988 | Endo et al. | 346/1.1 |
| 4,899,225 | 2/1990 | Sasuga et al. | 358/448 |
| 4,918,543 | 4/1990 | Petilli | 358/465 |
| 4,953,013 | 8/1990 | Tsuji et al. | 358/75 |
| 4,958,238 | 9/1990 | Katayama et al. | 358/456 |
| 4,980,760 | 12/1990 | Hiratsuka et al. | 358/538 X |
| 4,987,496 | 1/1991 | Greivenkamp, Jr. | 358/448 |
| 4,989,079 | 1/1991 | Ito | 358/529 X |
| 5,014,124 | 5/1991 | Fujisawa | 358/75 |
| 5,016,118 | 5/1991 | Nannichi | 358/462 |
| 5,032,903 | 7/1991 | Suzuki et al. | 358/75 |
| 5,134,667 | 7/1992 | Suzuki | 382/22 |
| 5,166,810 | 11/1992 | Sorimachi et al. | 358/462 |
| 5,206,719 | 4/1993 | Ikeda et al. | 358/80 |
| 5,231,677 | 7/1993 | Mita et al. | 382/22 |
| 5,287,204 | 2/1994 | Koizumi et al. | 358/538 |
| 5,371,610 | 12/1994 | Sugawa | 358/538 X |
| 5,381,248 | 1/1995 | Ikeda et al. | 358/538 |

*Primary Examiner*—Eric Frahm
*Attorney, Agent, or Firm*—Fitzpatrick, Cella, Harper & Scinto

[57] ABSTRACT

An image processing apparatus includes an input device for image data, a discriminating device for discriminating a type of an image represented by the image data, a setting device for setting a discrimination standard of the discriminating device, and a display for displaying a condition of the setting device.

18 Claims, 113 Drawing Sheets

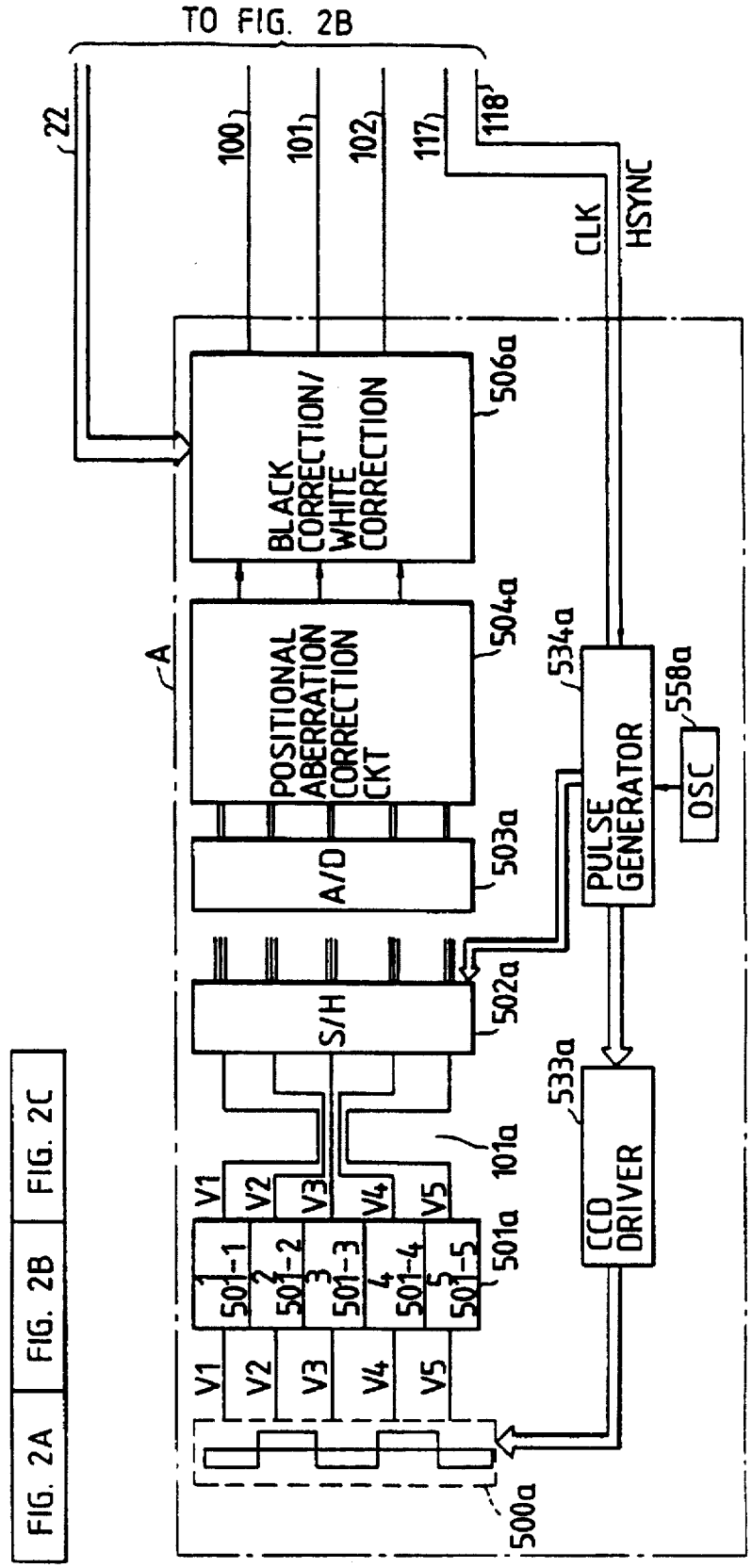

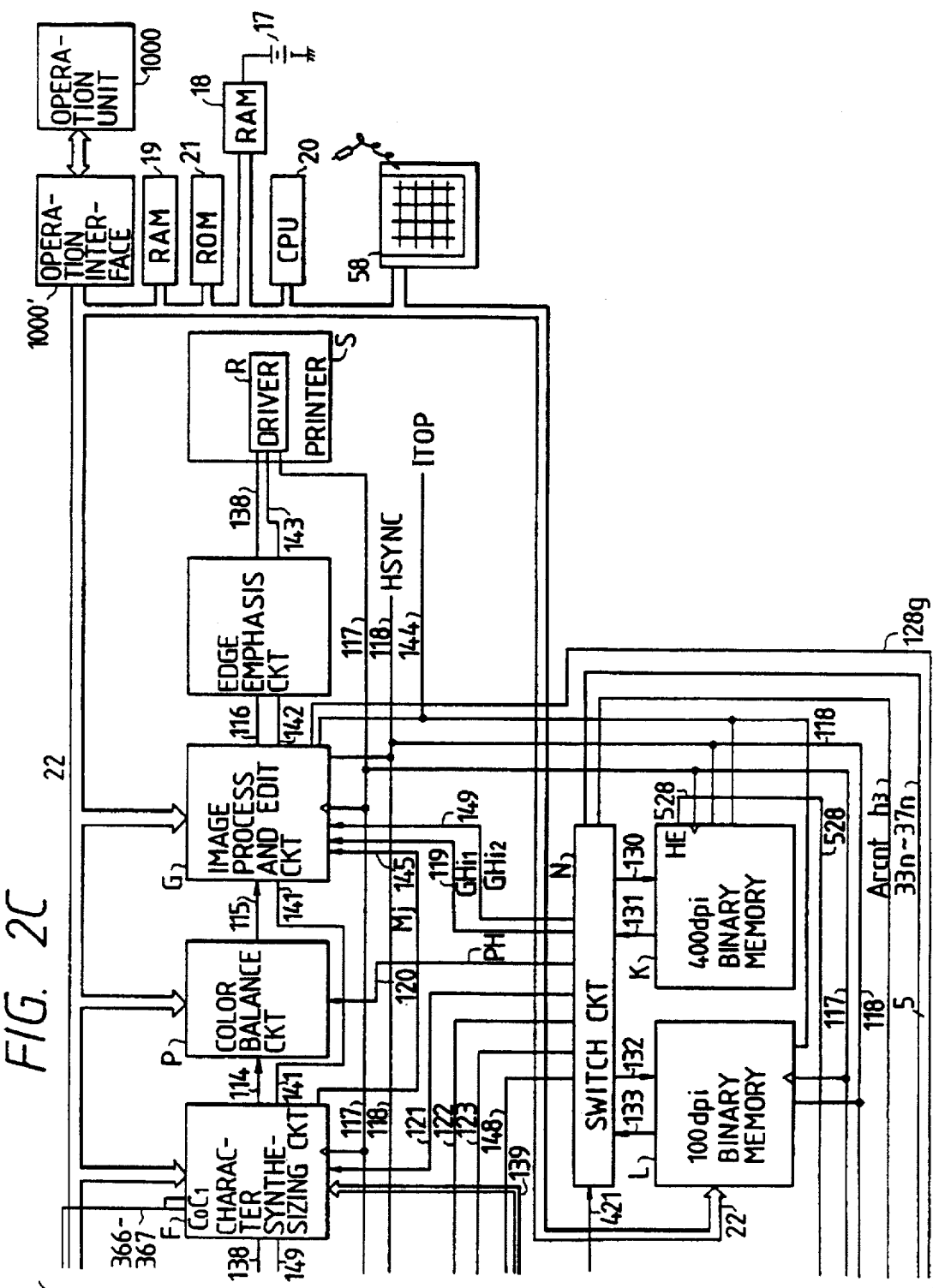

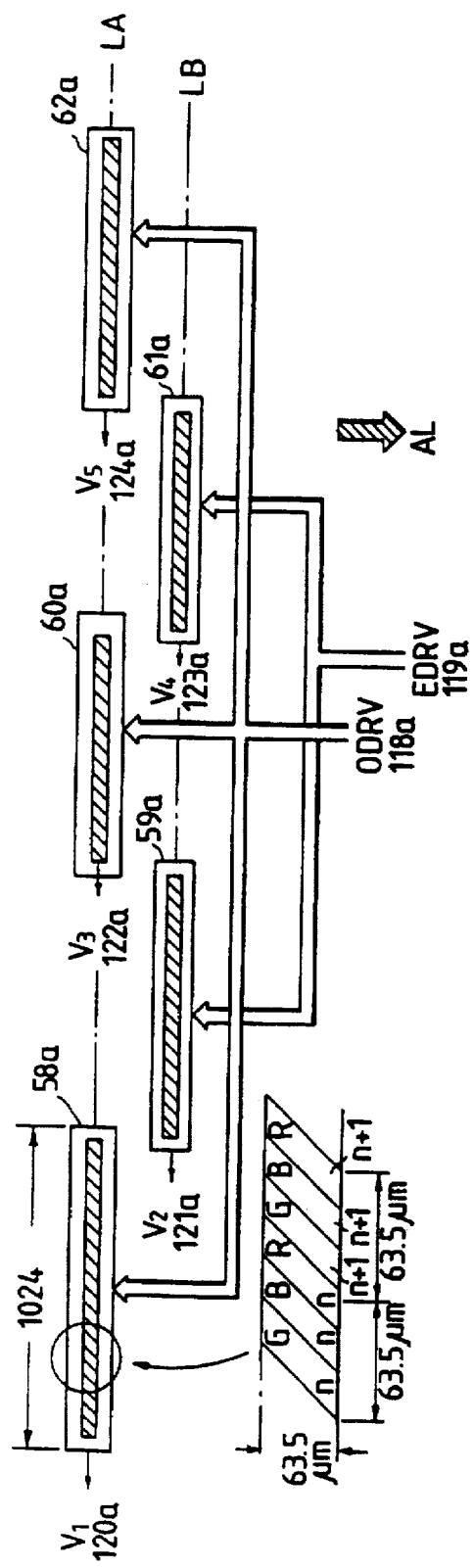
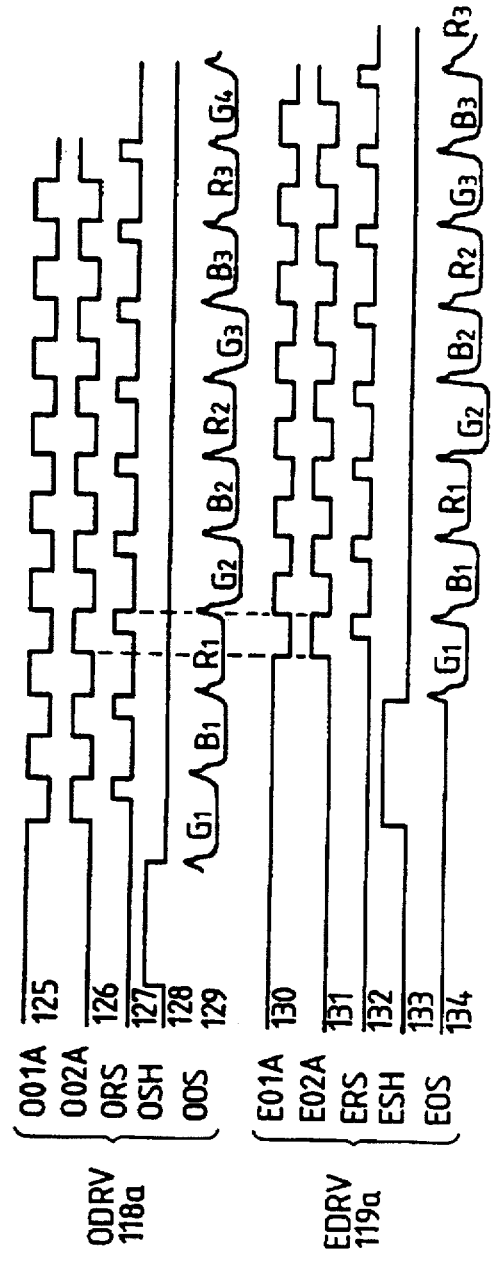
FIG. 3A
FIG. 3B

| FIG. 8A | FIG. 8B |

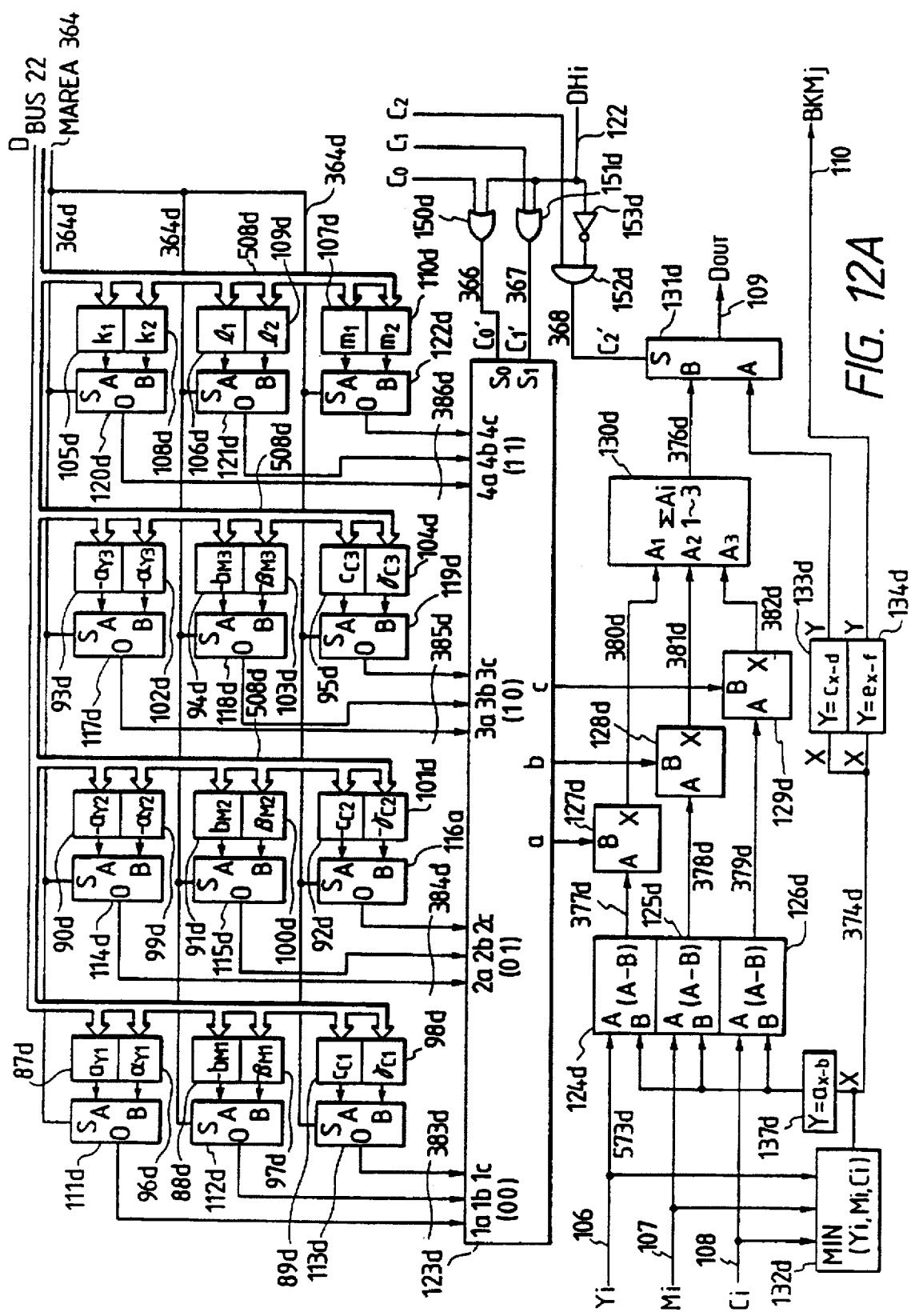

FIG. 12B
| $C_2$ | $C_1$ | $C_0$ | a | b | c | | |
|---|---|---|---|---|---|---|---|
| 0 | 0 | 0 | 1a | 1b | 1c | Y | ① |
| 0 | 0 | 1 | 2a | 2b | 2c | M | ② |
| 0 | 1 | 0 | 3a | 3b | 3c | C | ③ |
| 0 | 1 | 1 | 4a | 4b | 4c | MONO | ④ |
| 1 | X | X | X | X | X | BK | ⑤ |
FIG. 13
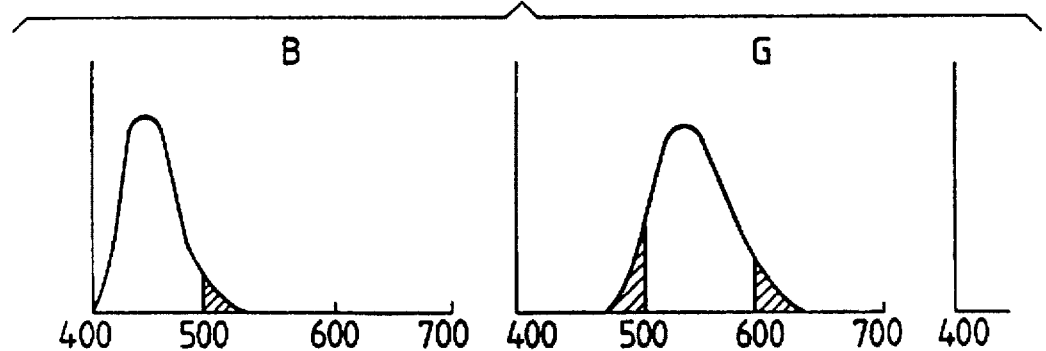
FIG. 14
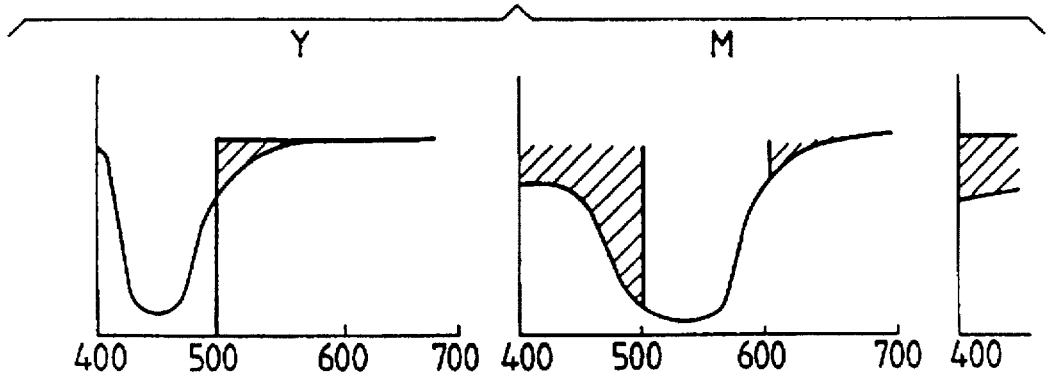

FIG. 16A
THICK CHARACTER

FIG. 16B

FIG. 16C
THIN CHARACTER
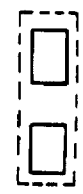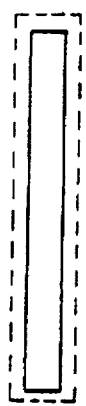
FIG. 16D

FIG. 16E

* OBJECTIVE PIXEL

FIG. 17I
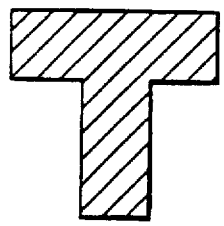
FIG. 17J
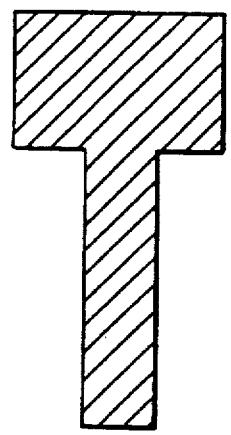
*OBJECTIVE PIXEL
SUB SCAN
MAIN SCAN
FIG. 17K
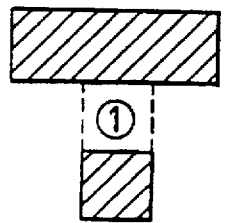
FIG. 17L
FIG. 17M
FIG. 17N
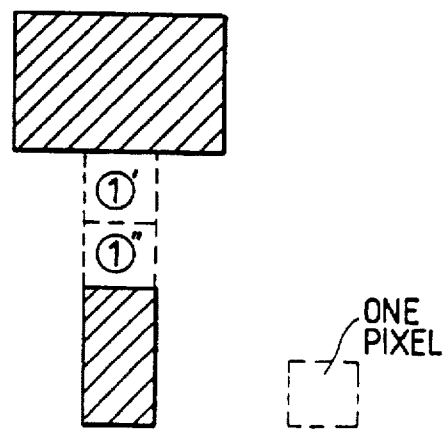
ONE PIXEL

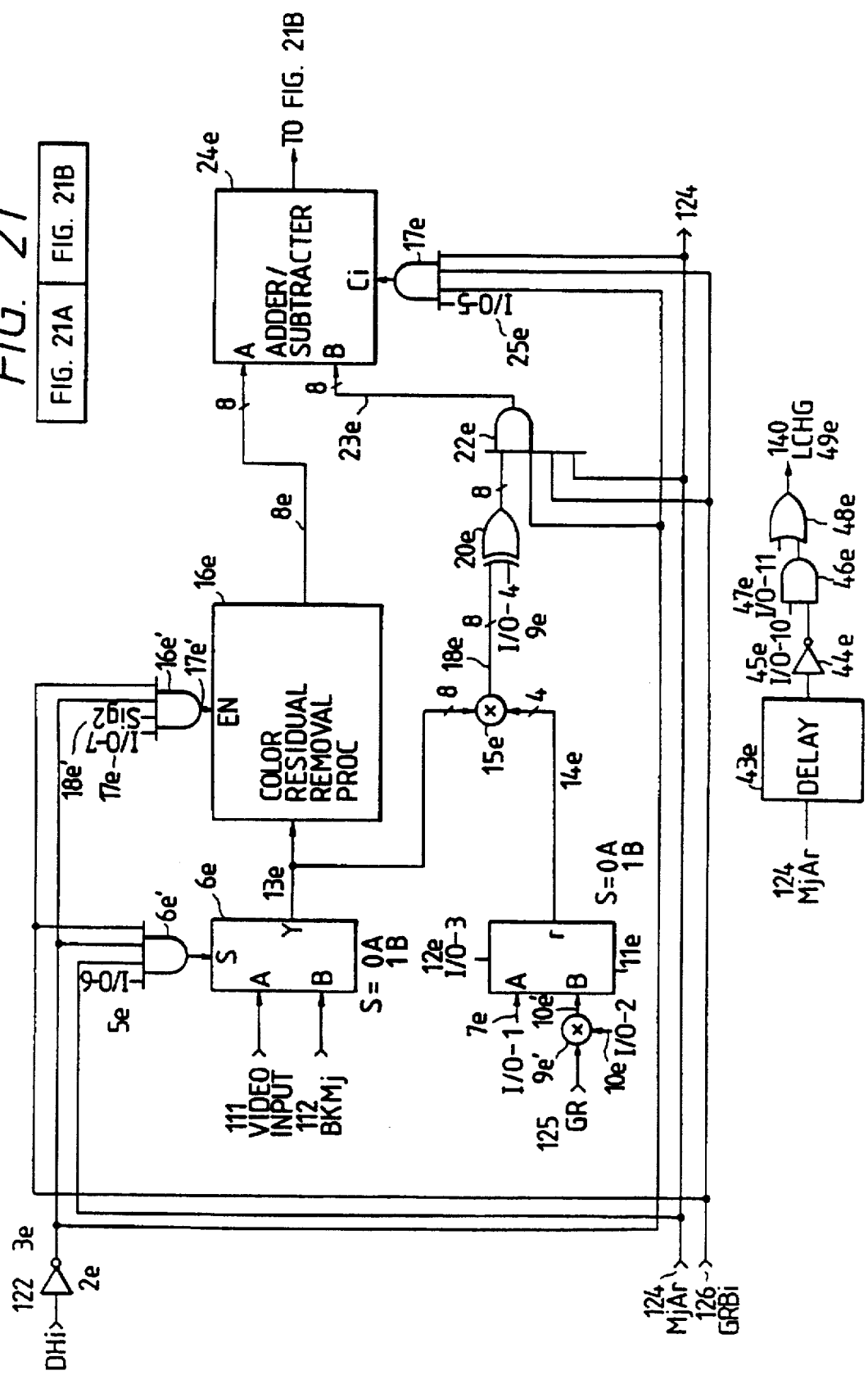

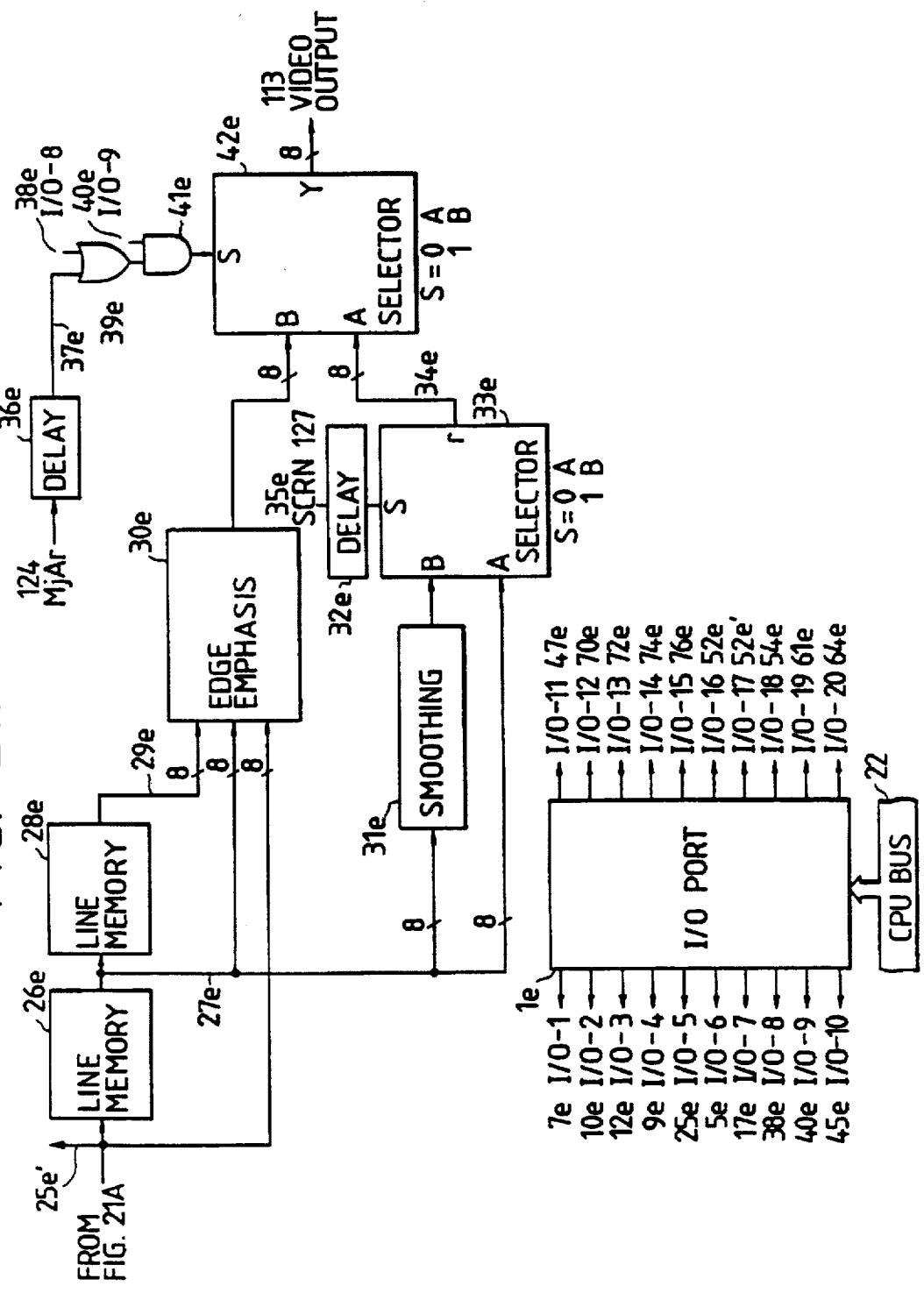

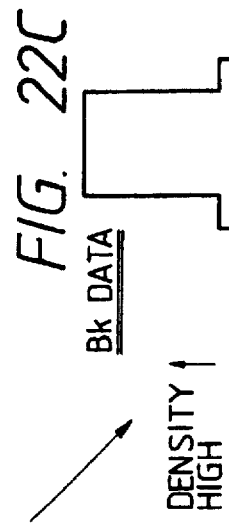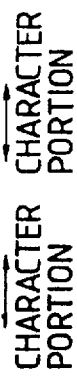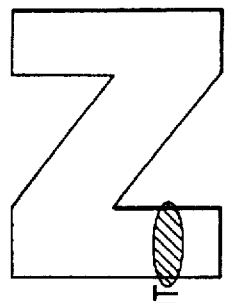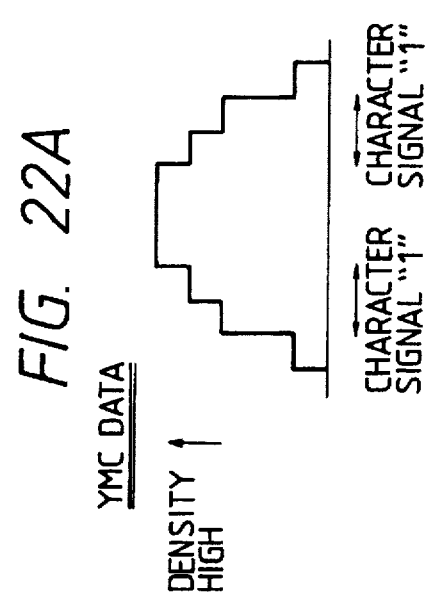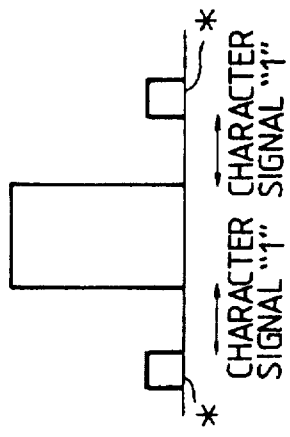

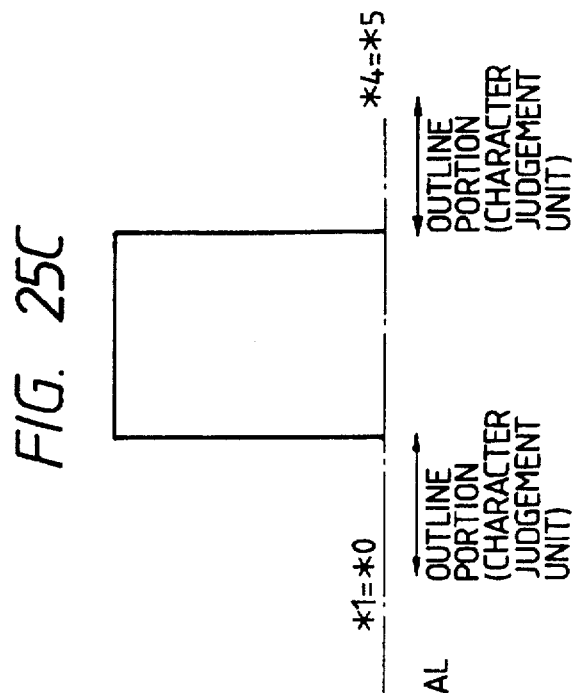
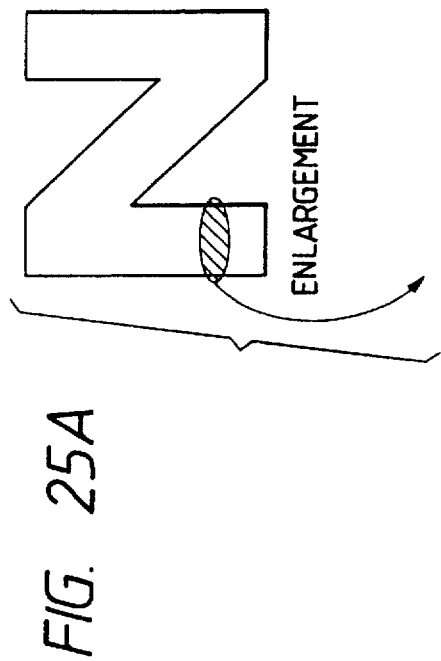
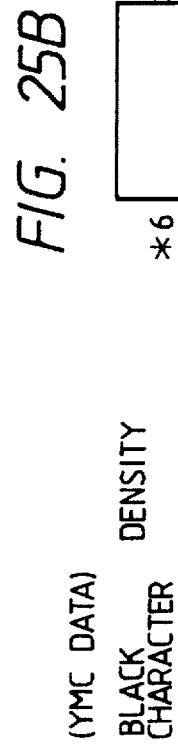
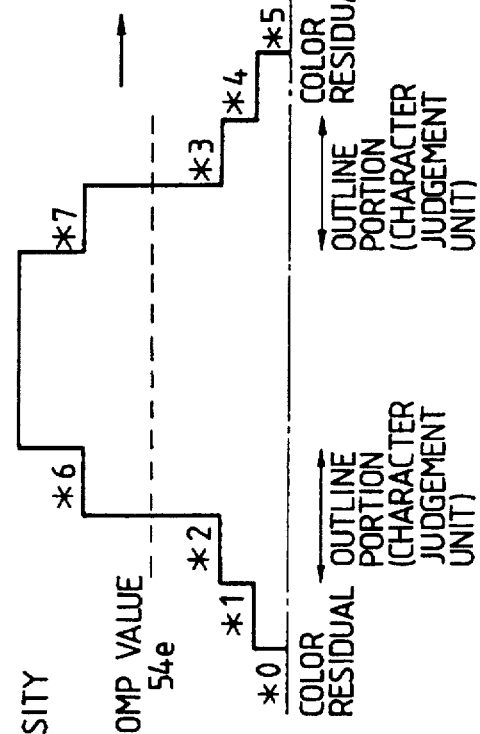
FIG. 25A
FIG. 25B
FIG. 25C

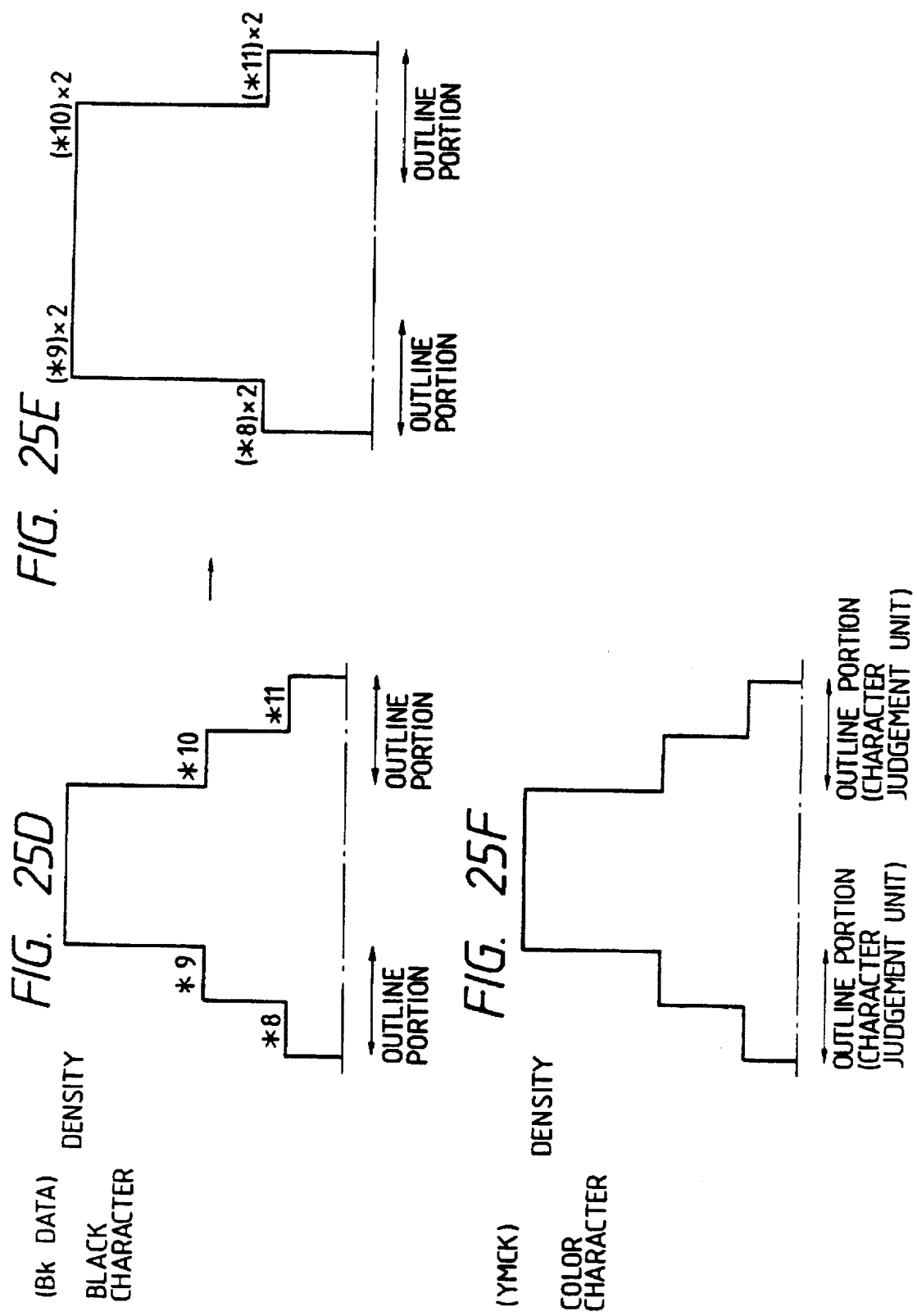

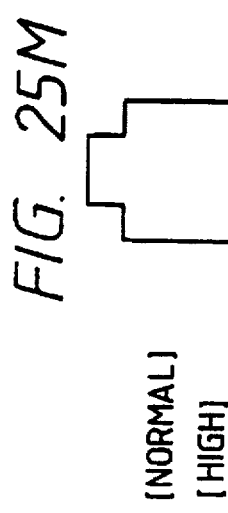
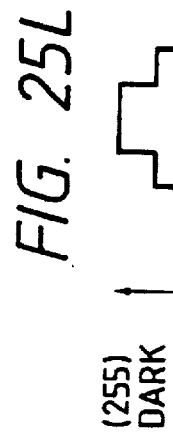
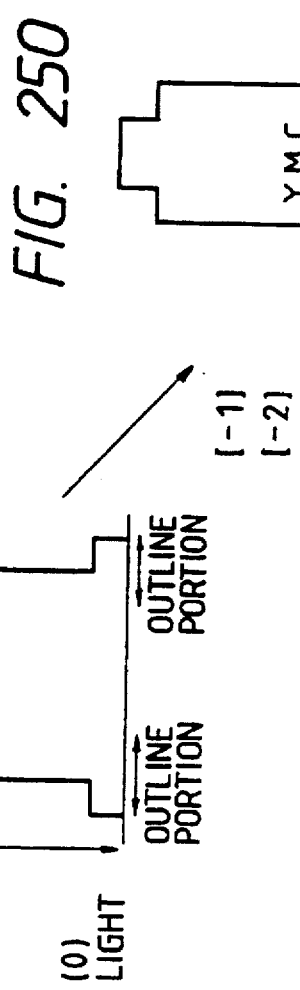
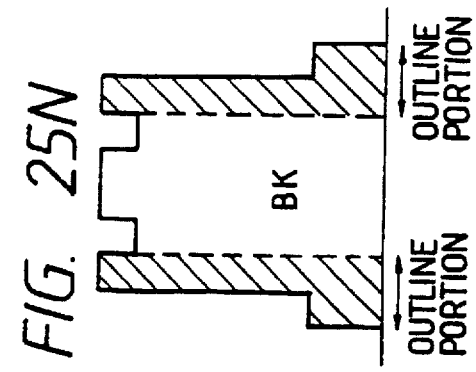
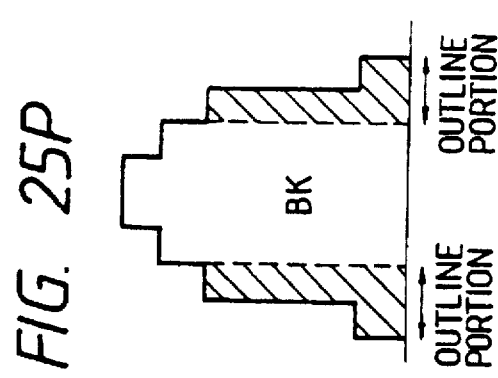

$\alpha \rightarrow \frac{1}{8}$ STEP 0~1

$$A + \alpha \{4A - (B+C+D+E)\}$$

OBJECTIVE LINE $V_{N-1}$  $V_N$  $V_{N+1}$ ---

$$V_N = \frac{V_N + V_{N-1}}{2}$$

| X1 | X0 | J1 | J2 | i | Y | FIG. 29 |
|---|---|---|---|---|---|---|
| 0 | 0 | X | X | i | V | FIG. 29A |
| 0 | 1 | 0 | X | i | V | FIG. 29B |
| | | 0 | X | i | V | |
| | | 1 | X | 0 | A | |
| | | 1 | X | 0 | A | |
| 1 | 0 | 0 | 0 | i | V | FIG. 29C |
| | | 0 | 1 | 0 | B | |
| | | 1 | 0 | 0 | A | |
| | | 1 | 1 | 0 | B | |
| 1 | 1 | 0 | X | 0 | A | FIG. 29D |
| | | 0 | X | 0 | A | |
| | | 1 | X | 0 | B | |
| | | 1 | X | 0 | B | |

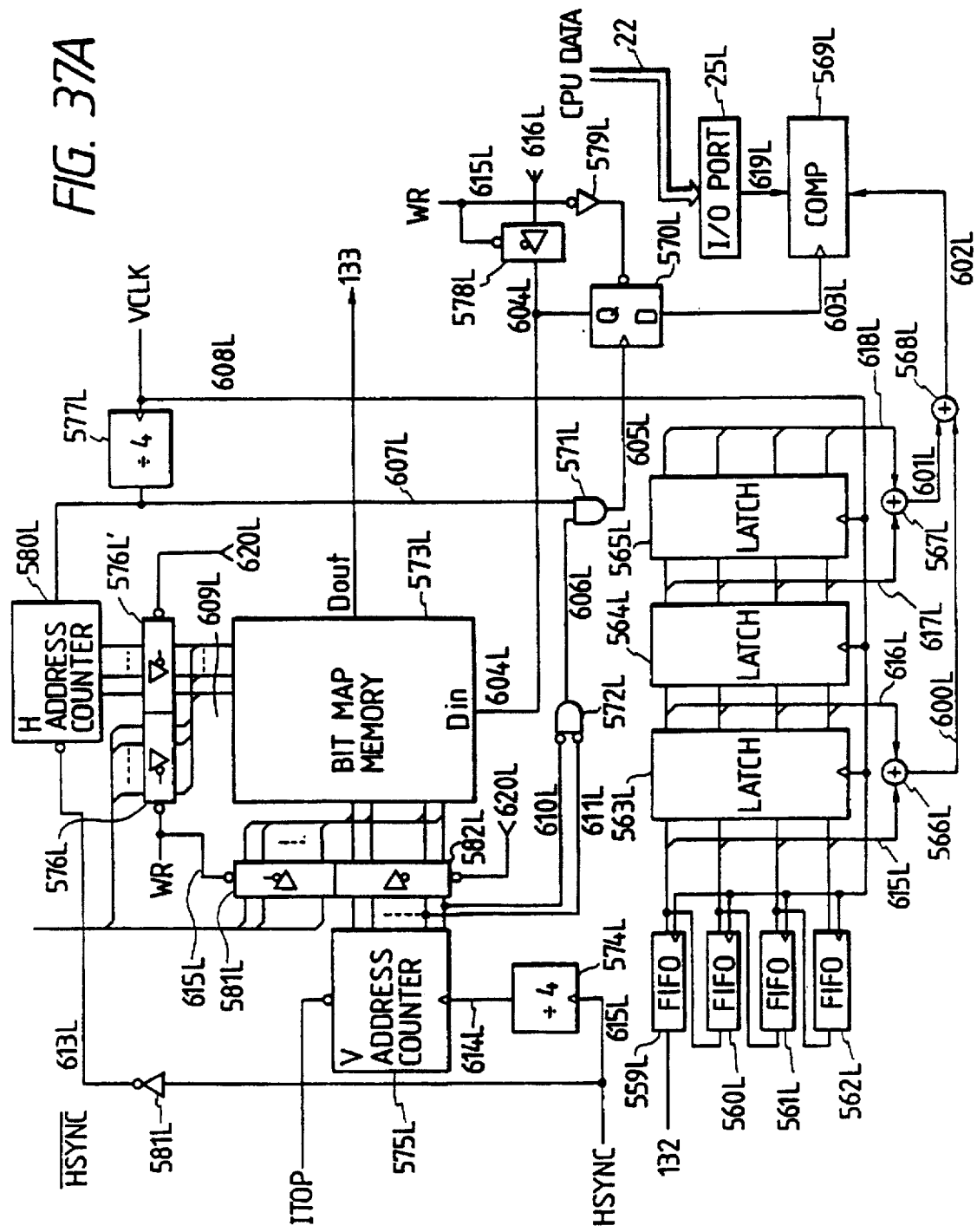

sgℓ1～sgℓn

FIG. 40
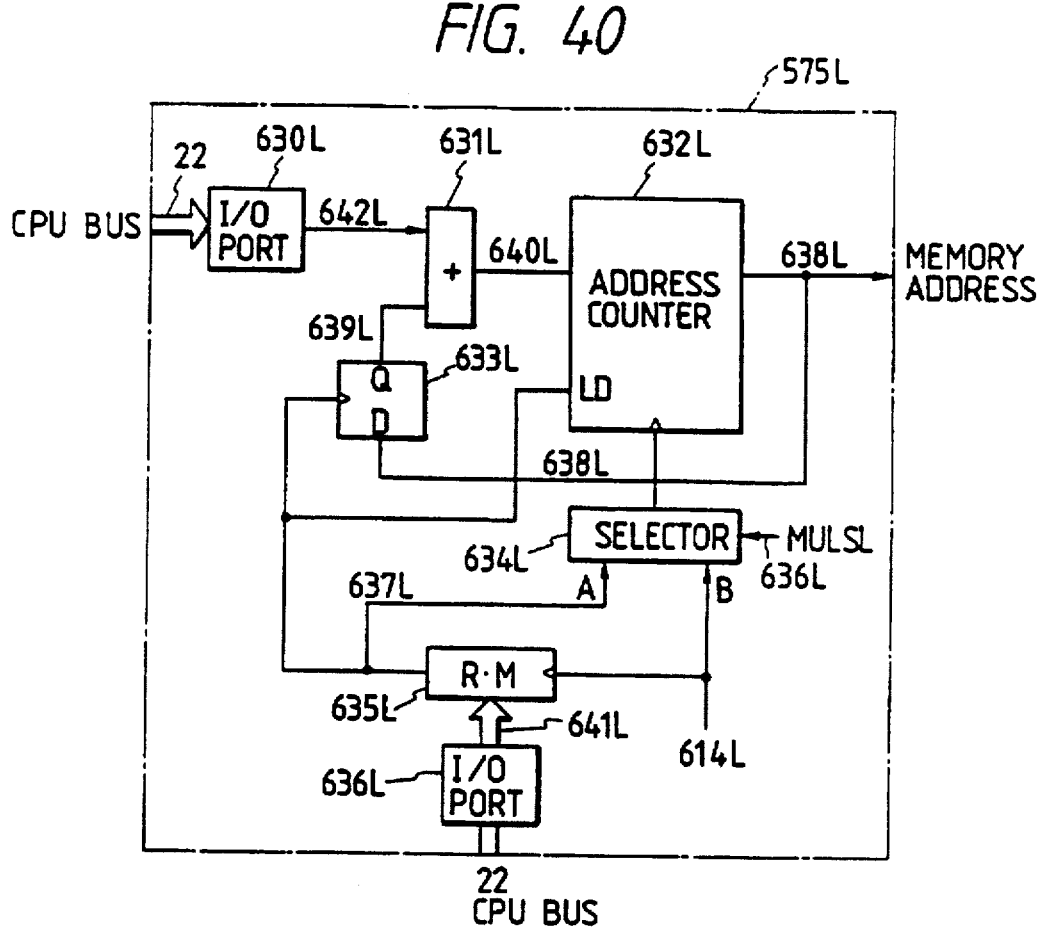
FIG. 41
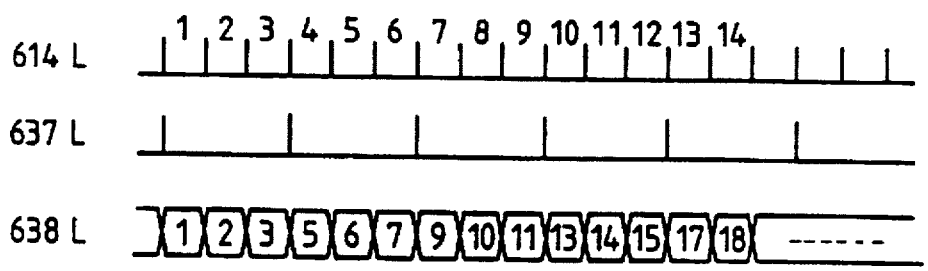
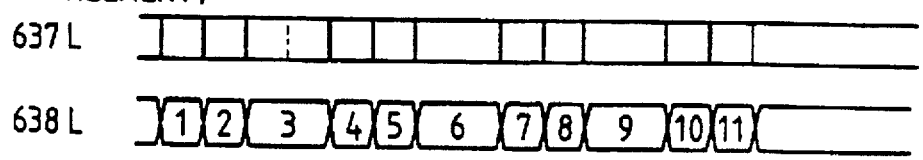

ENLARGEMENT

REDUCTION

ORIGINAL IMAGE

A COLOR

B COLOR

BINARY MASK

FIG. 52
|  | 5m | 8m | 9m |
|---|---|---|---|
| (A0,B0,C0)<br>1← (A1,B1,C1) | 1 | 1 | 0 |
| (A1,B1,C1)<br>2← D | 0 | 0 | 1 |
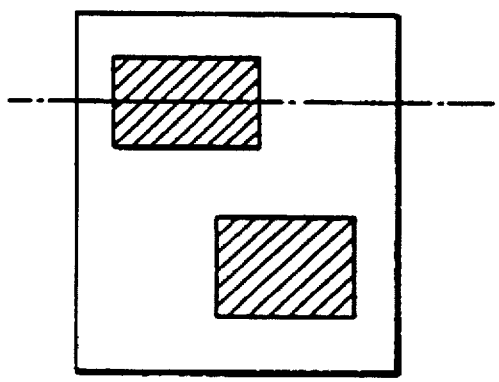
FIG. 53A
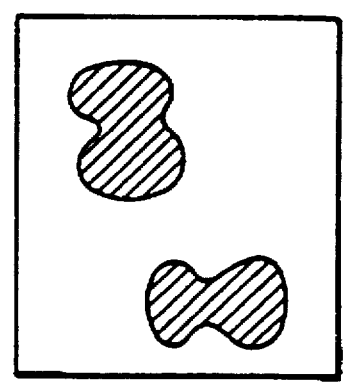
FIG. 53B

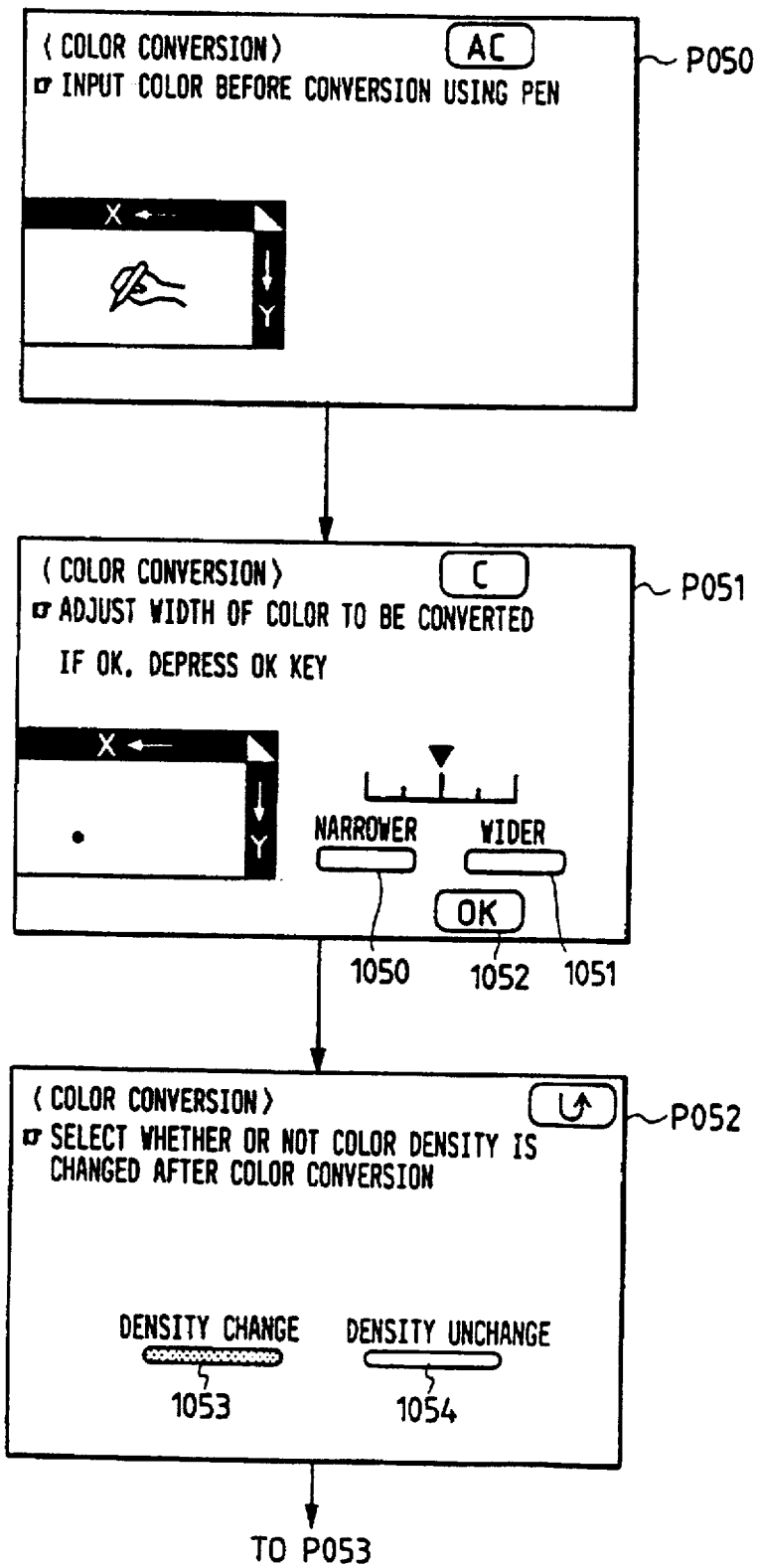

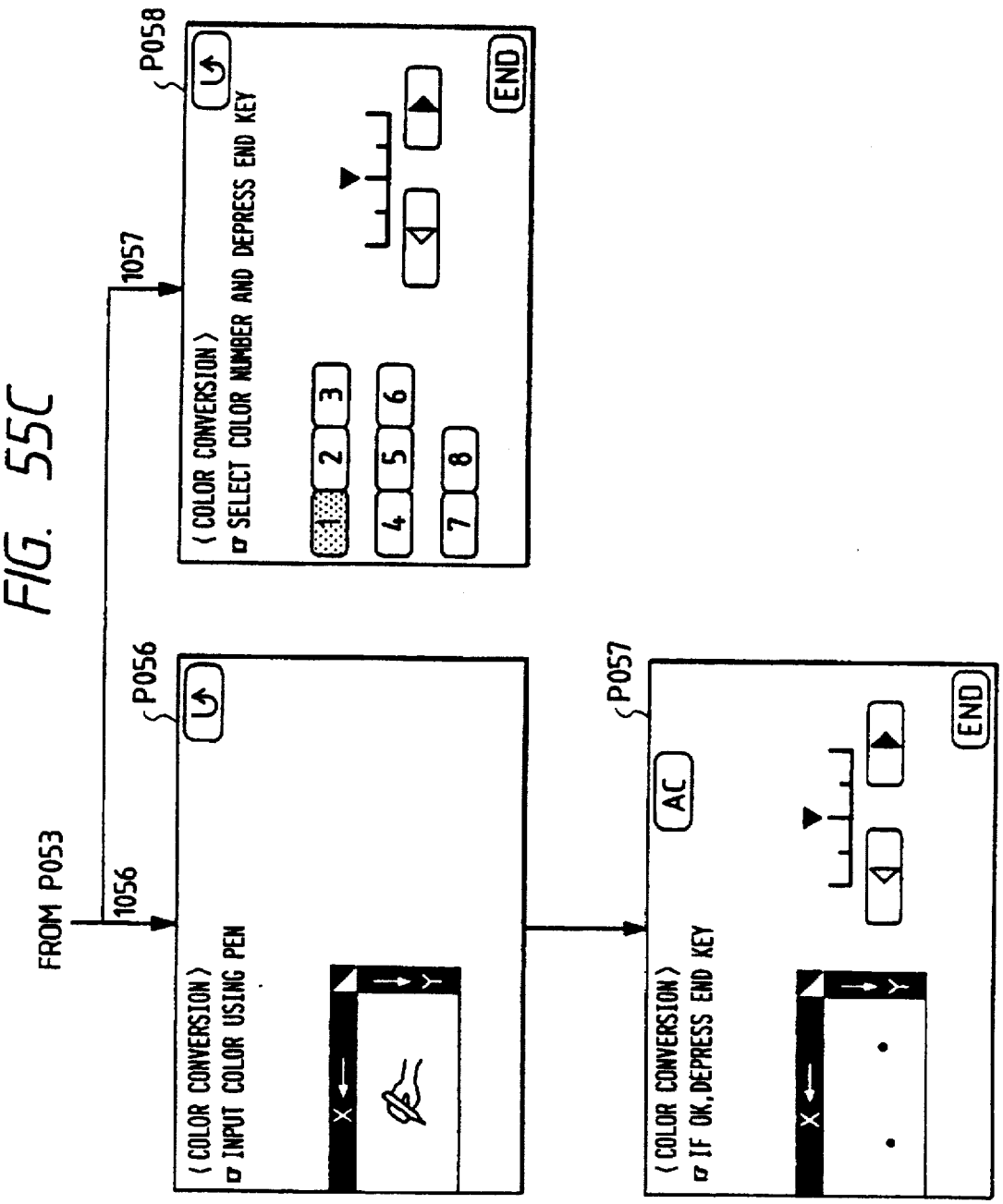

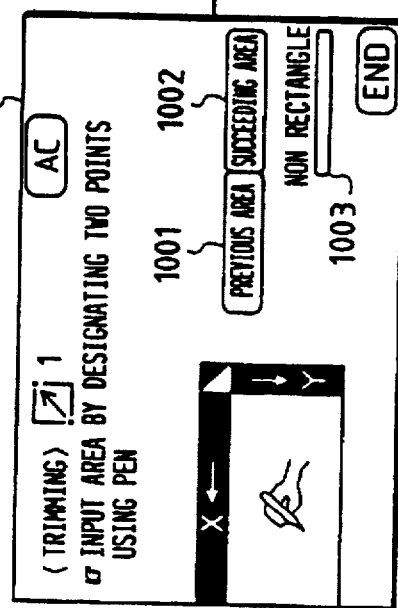

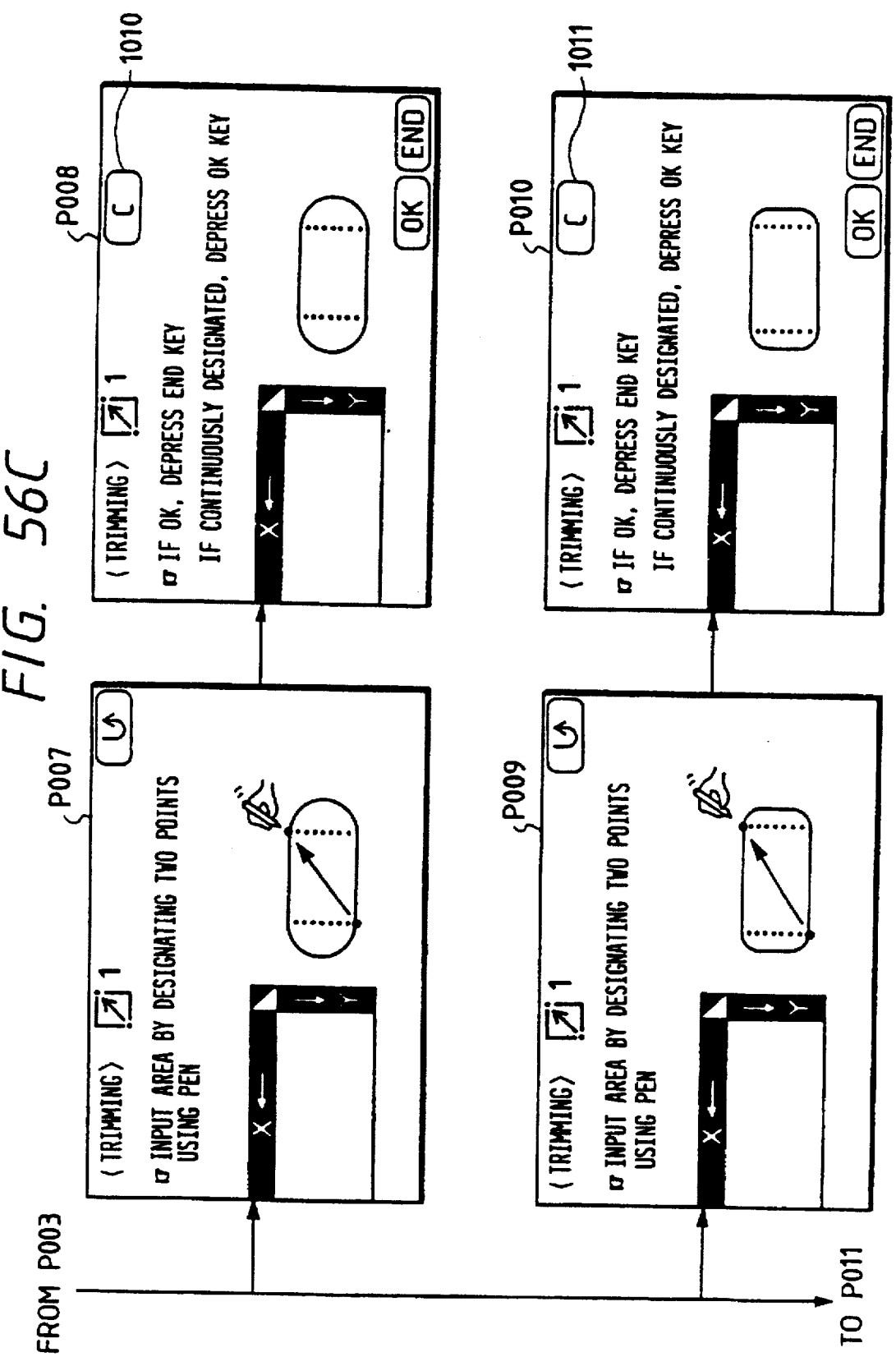

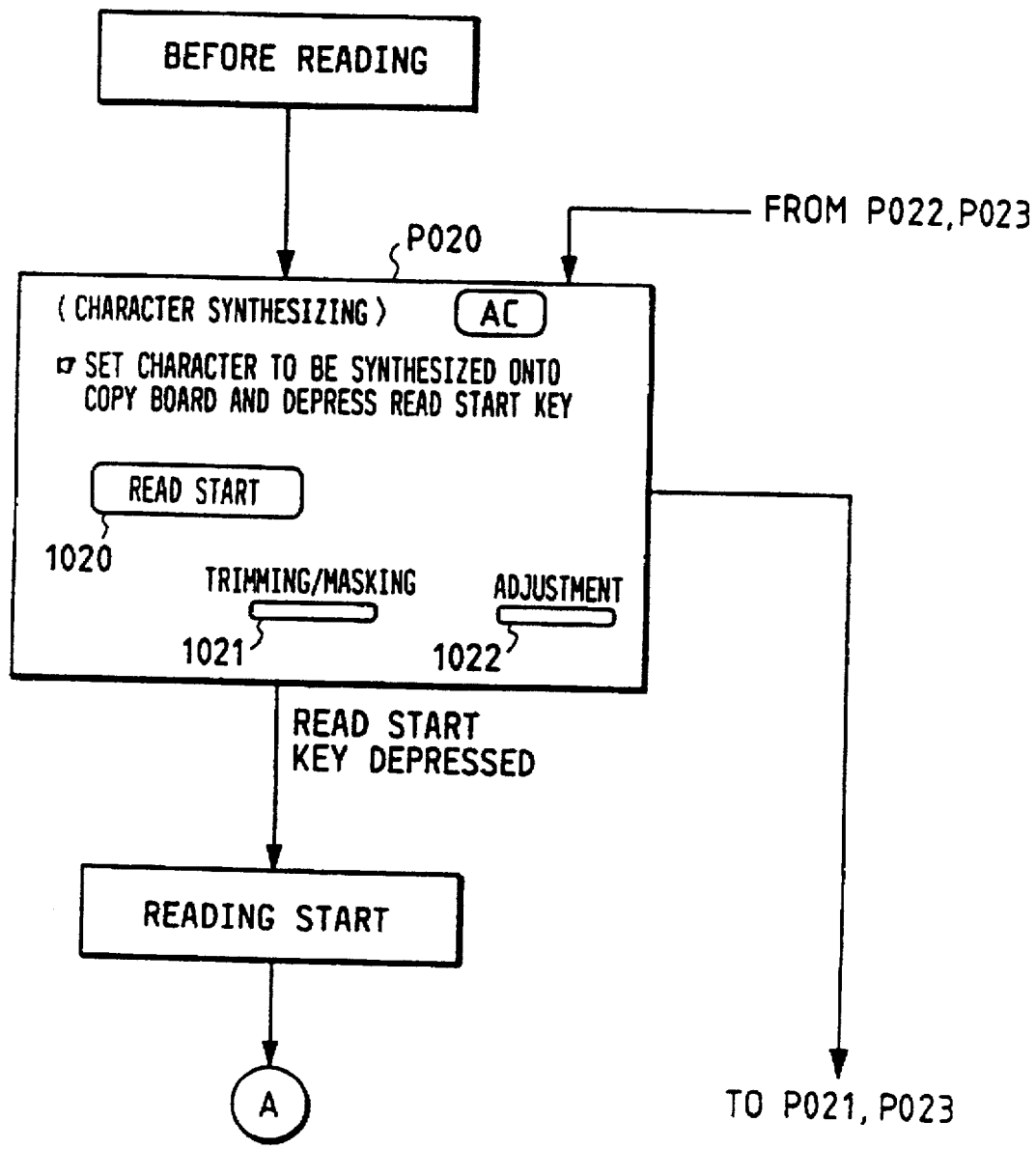

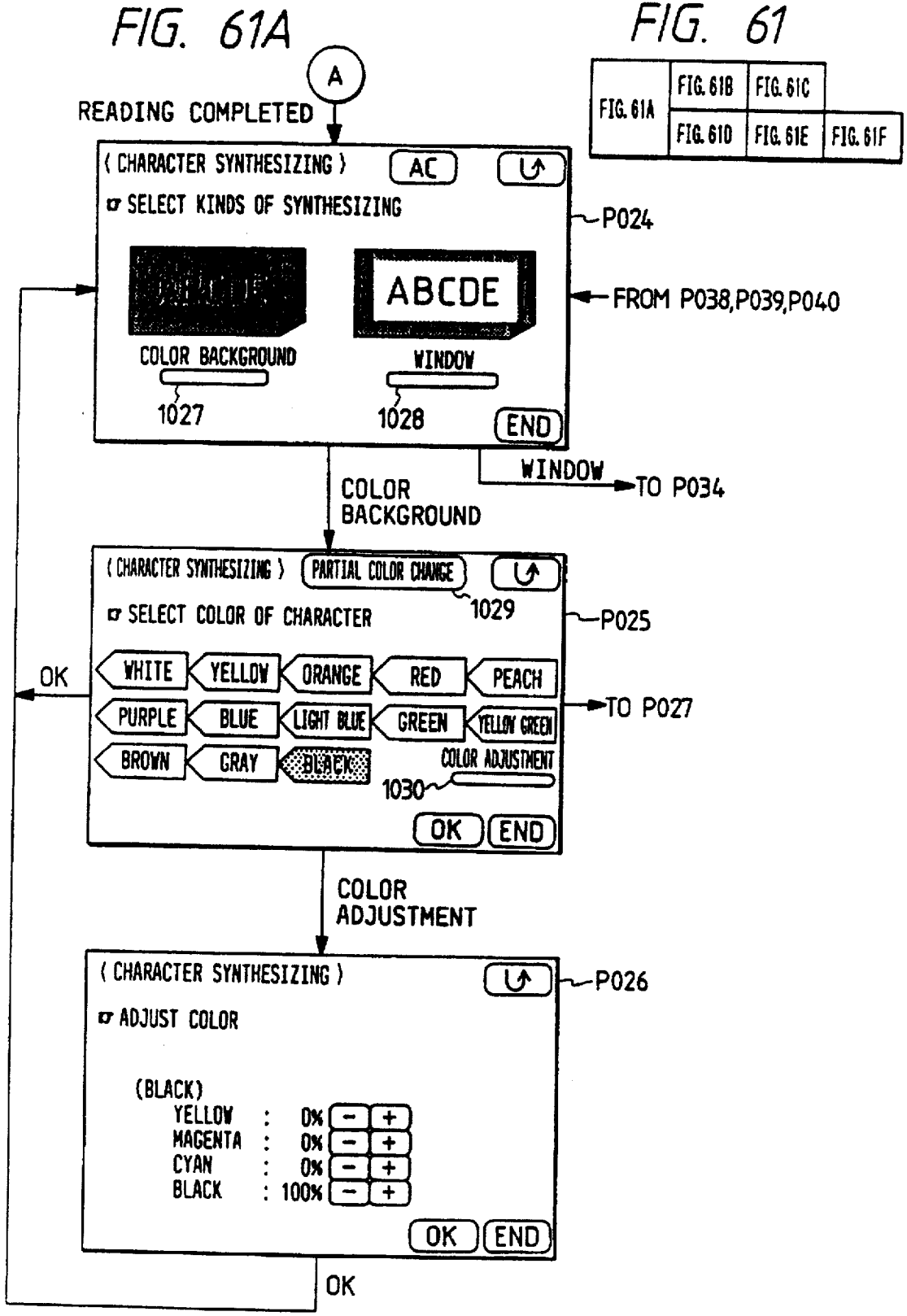

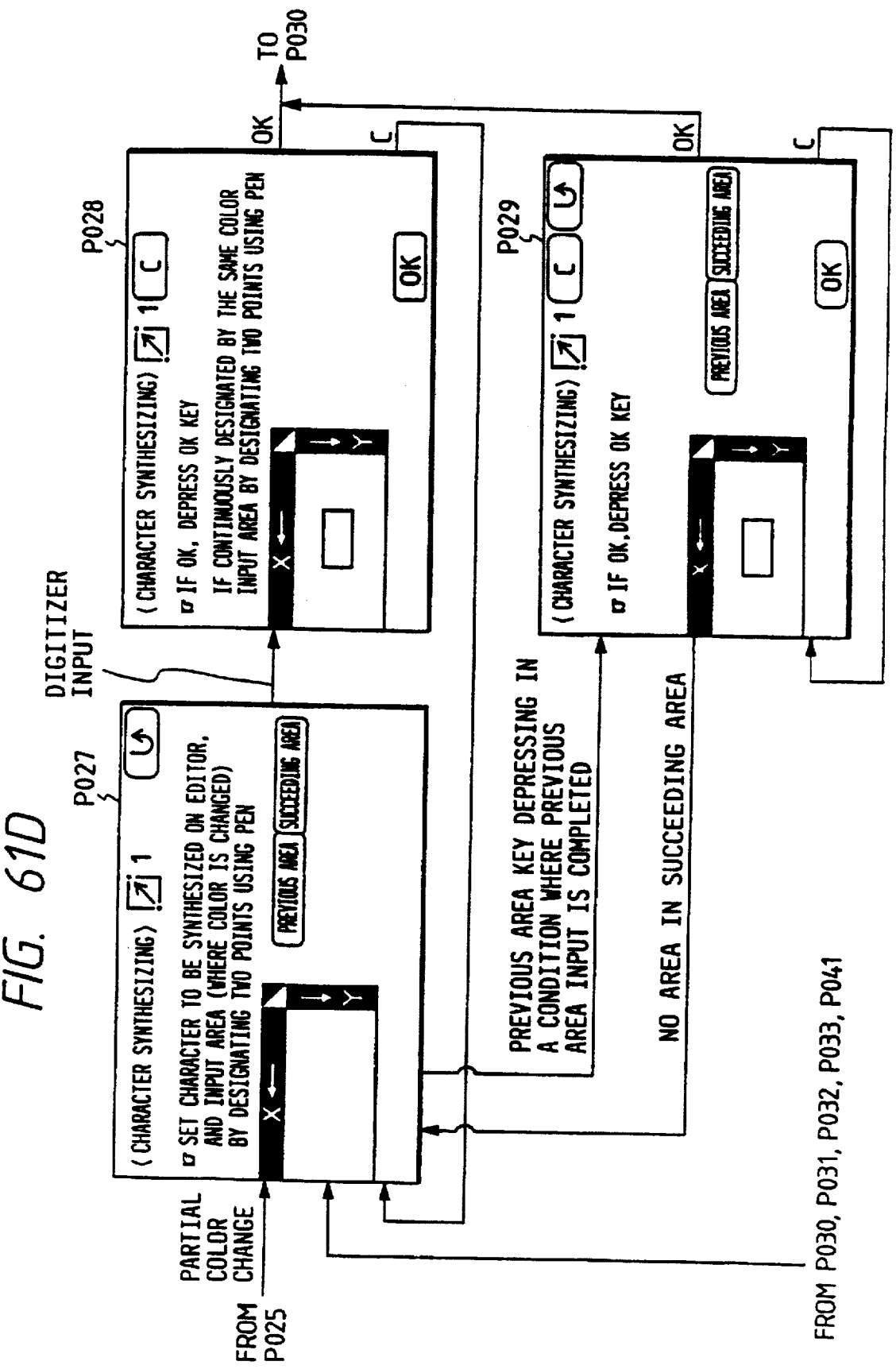

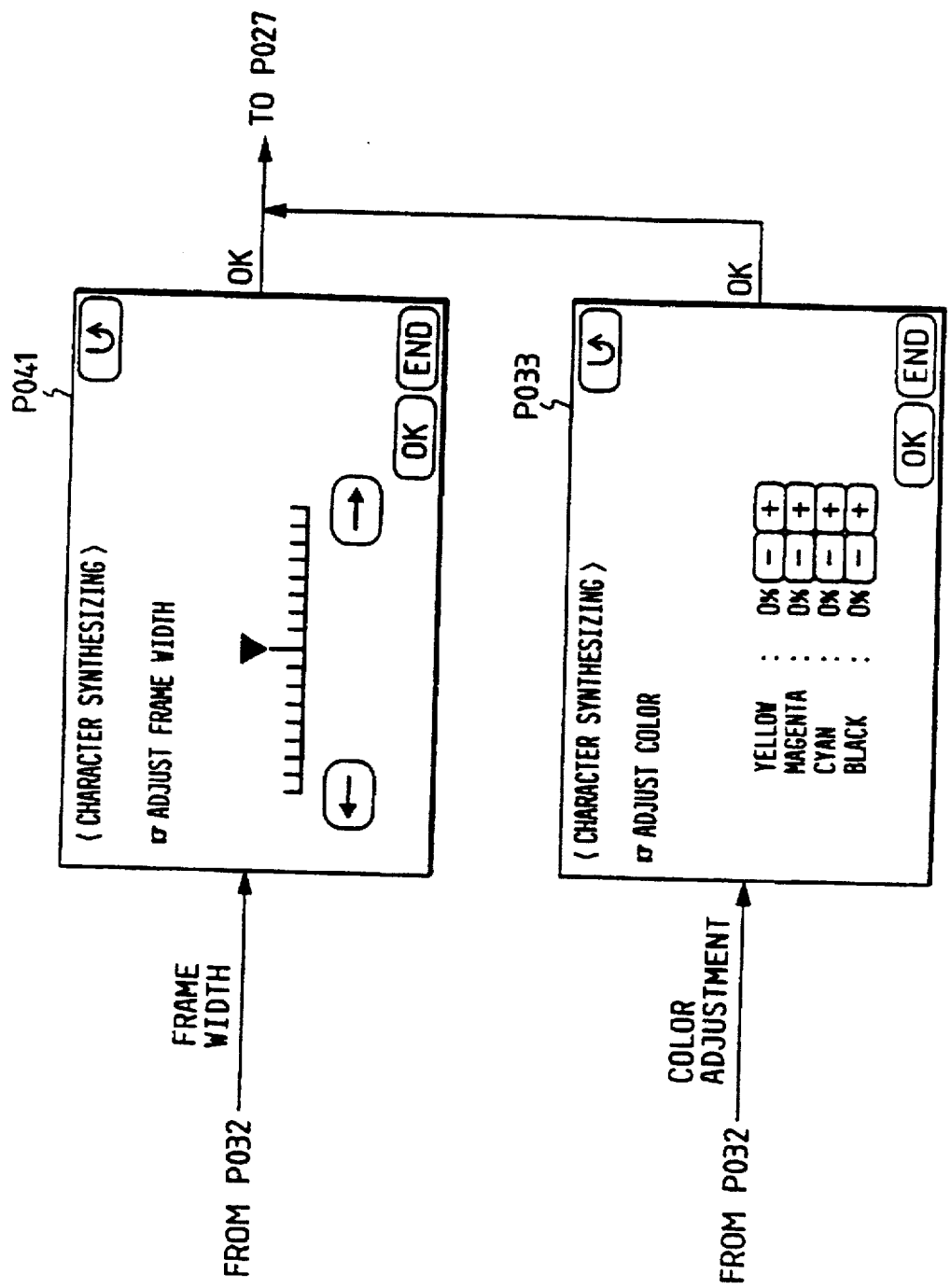

FIG. 62

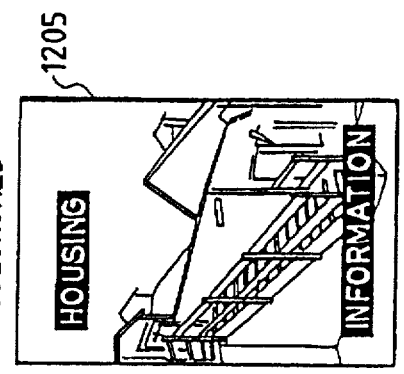
CHARACTER SYNTHESIZING COPY
[PARTIAL COLOR CHANGE]
CHARACTER COLOR: BROWN
FRAME COLOR: YELLOW
1203

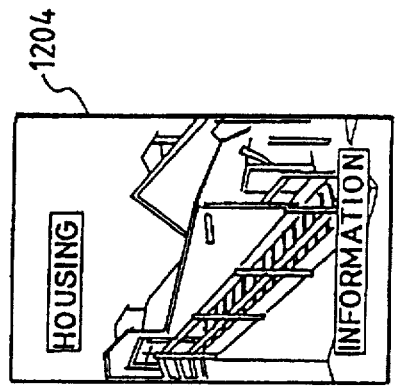
CHARACTER SYNTHESIZING COPY
CHARACTER COLOR: NO COLOR
WINDOW COLOR: RED
1205

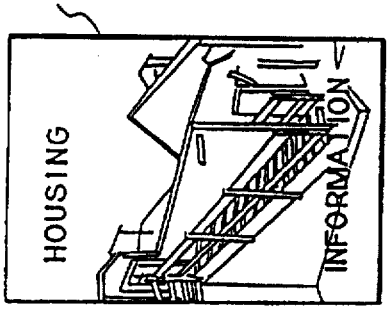
CHARACTER SYNTHESIZING COPY
CHARACTER COLOR: ORANGE
1202

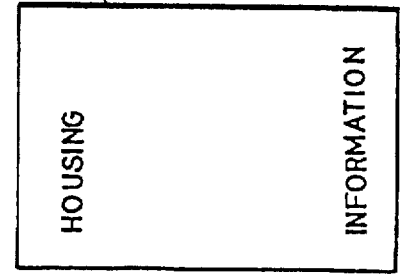
CHARACTER SYNTHESIZING COPY
CHARACTER COLOR: PURPLE
WINDOW COLOR: YELLOW GREEN
1204

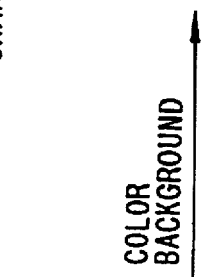
ORIGINAL TO WHICH CHARACTER IS SYNTHESIZED
1200

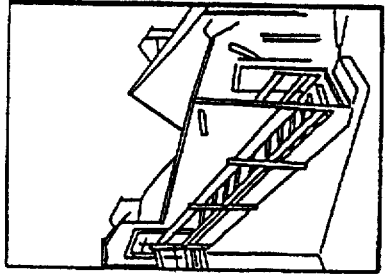
CHARACTER ORIGINAL
1201

COLOR BACKGROUND

WINDOW

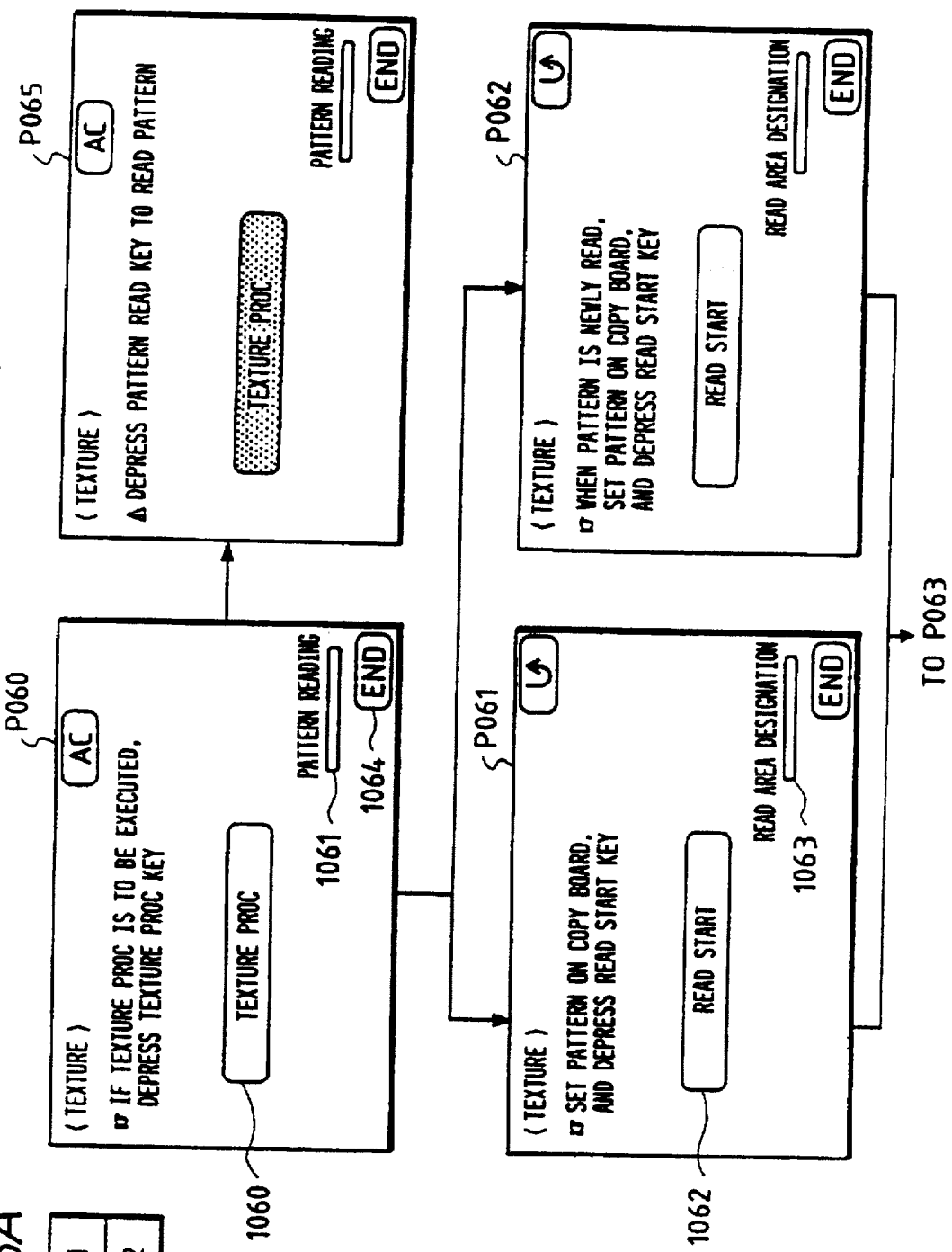

FROM P061, P062

P063

P064

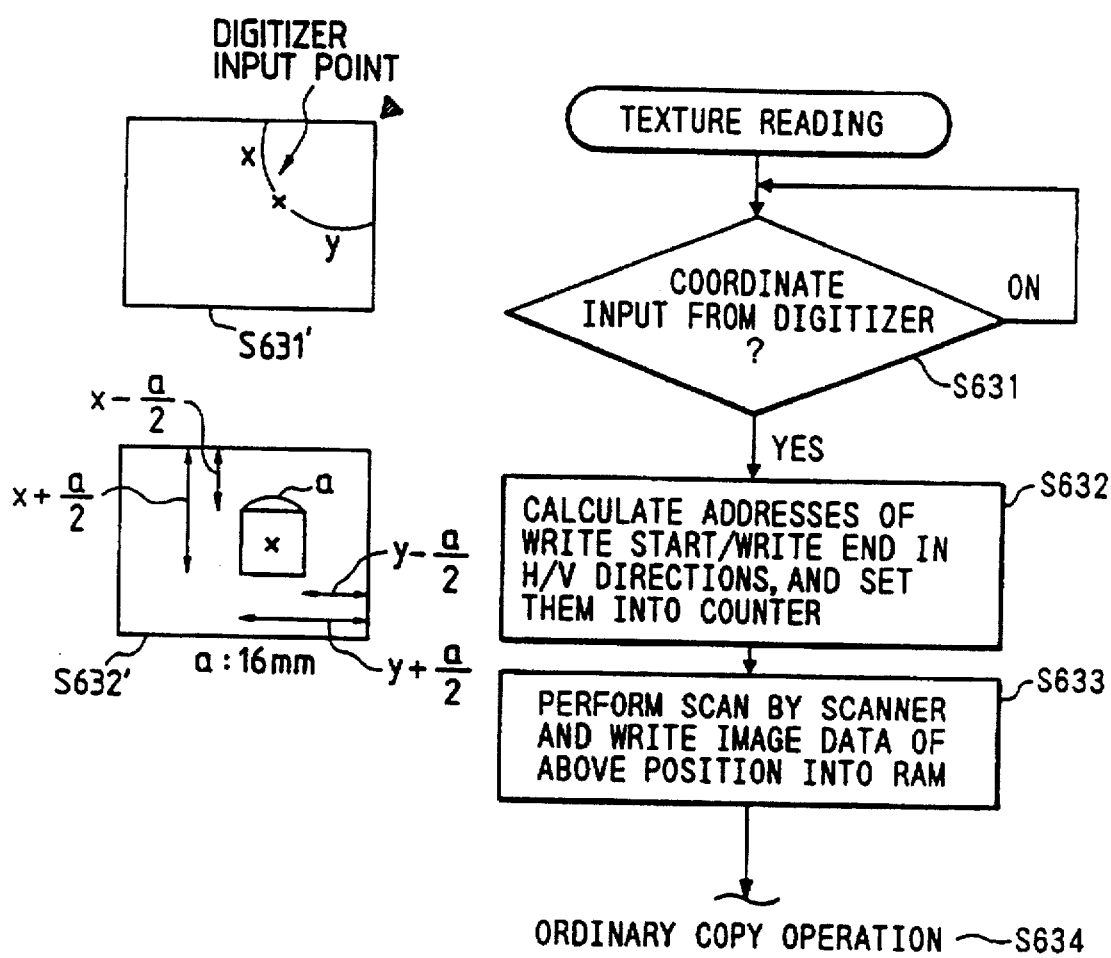

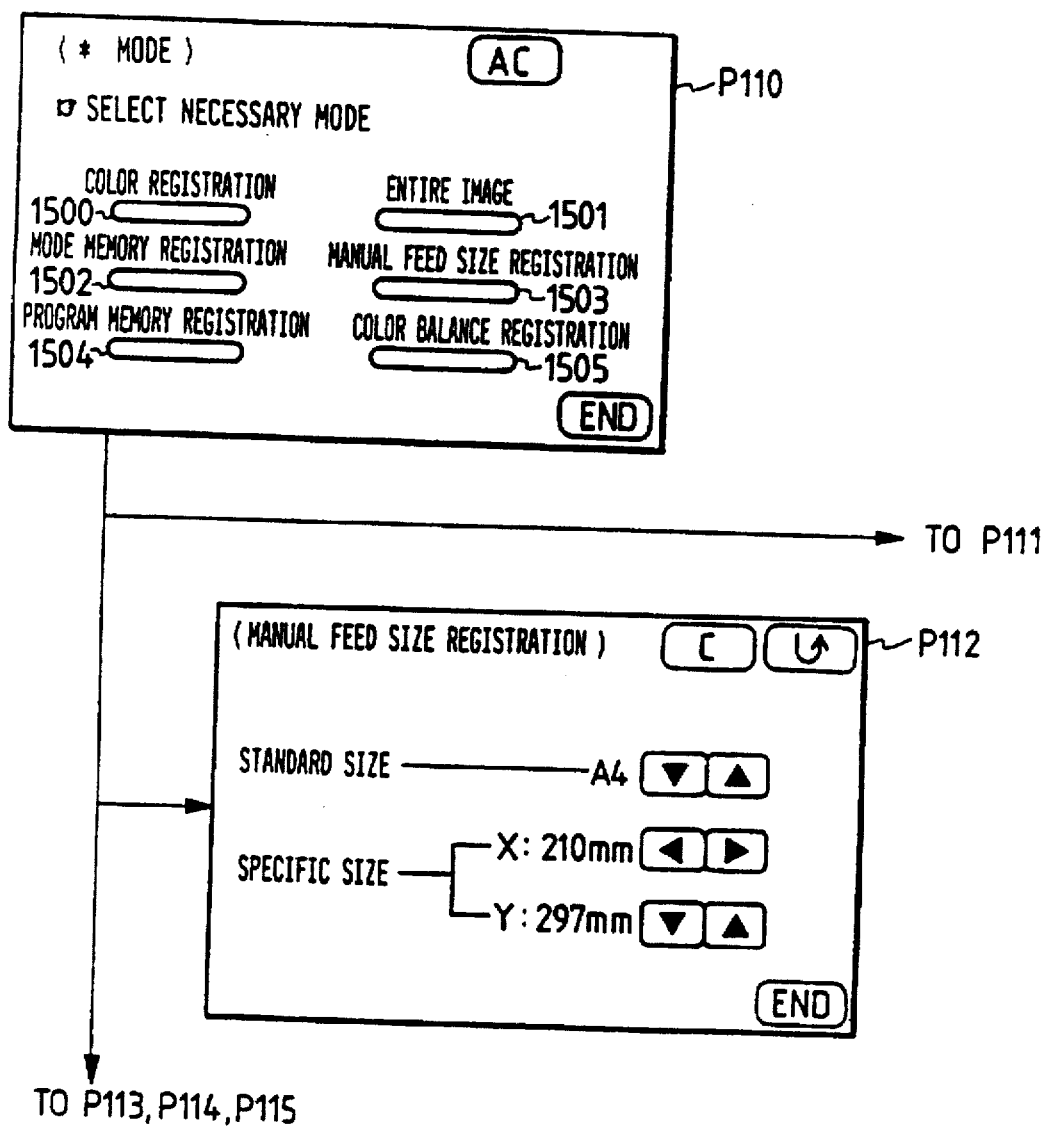

FIG. 65B

FROM P110

(MODE MEMORY REGISTRATION) ↰ — P113
☞ SELECT NUMERAL KEY FOR REGISTERING SET MODE

[M1]  [M2]  [M3]  [M4]

(PROGRAM MEMORY REGISTRATION) ↰ — P114
☞ SELECT NUMERAL KEY OF PROGRAM
   TO BE NEXT REGISTERED

[P1]  [P2]  [P3]  [P4]

(COLOR BALANCE REGISTRATION) [C] [↰] — P115

[−]  ▮▮▮▮▯▯▯  [+]  YELLOW ◀
        +1
[−]  ▮▮▮▮▯▯▯  [+]  MAGENTA ◀
        −1
[−]  ▮▮▮▮▯▯▯  [+]  CYAN ◀
        −1
[−]  ▮▮▮▮▯▯▯  [+]  BLACK ◀
                         [END]

| FIG. 66A |
|---|
| FIG. 66B |
| FIG. 66C |

P080

( * MODE )    (AC)

☞ SELECT NECESSARY MODE

COLOR REGISTRATION    ENTIRE IMAGE

MODE MEMORY REGISTRATION    MANUAL FEED SIZE REGISTRATION

PROGRAM MEMORY REGISTRATION    COLOR BALANCE REGISTRATION
1200

ACS 100% AUTO  1    (END)

P081

( PROGRAM MEMORY REGISTRATION )    (↩)

☞ SELECT NUMERAL KEY OF PROGRAM
  TO BE NEXT REGISTERED (P1)  (P2)  (P3)  (P4)
1201

ACS 100% AUTO  1

P082

◡ COPY CAPABLE (EQUI-MAG)  (AUTO)    ONE SHEET

100%    A4
        A3    ▼

(REDUCTION)(ENLARGEMENT) (≡) (◐) (◑)

(CLEAR)(END)

TO P083

FIG. 67
| FIG. 67A |
|----------|
| FIG. 67B |
FIG. 67A
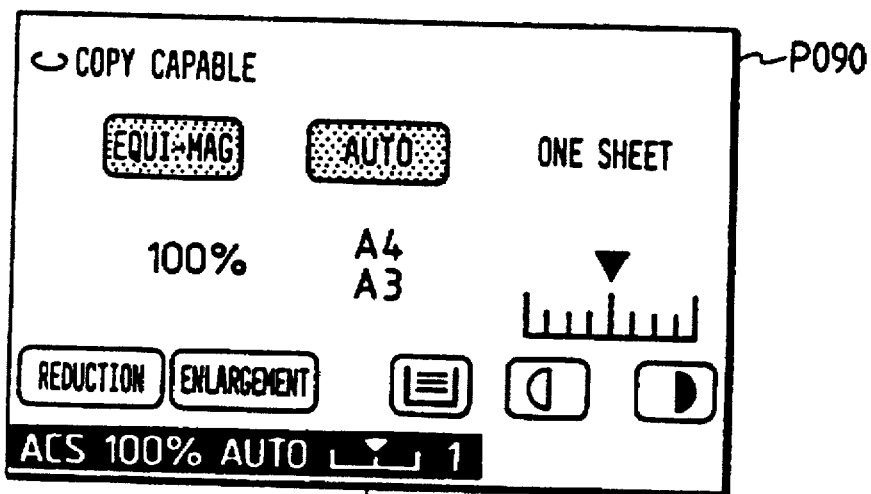
P090
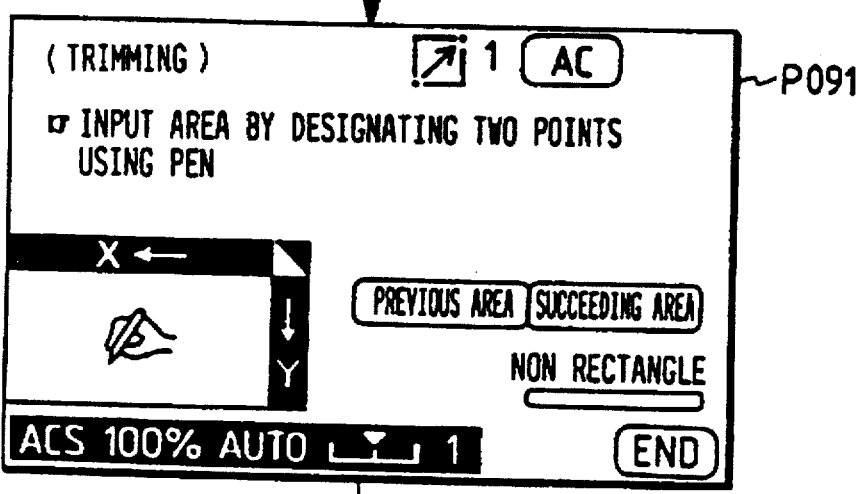
P091
TO P092

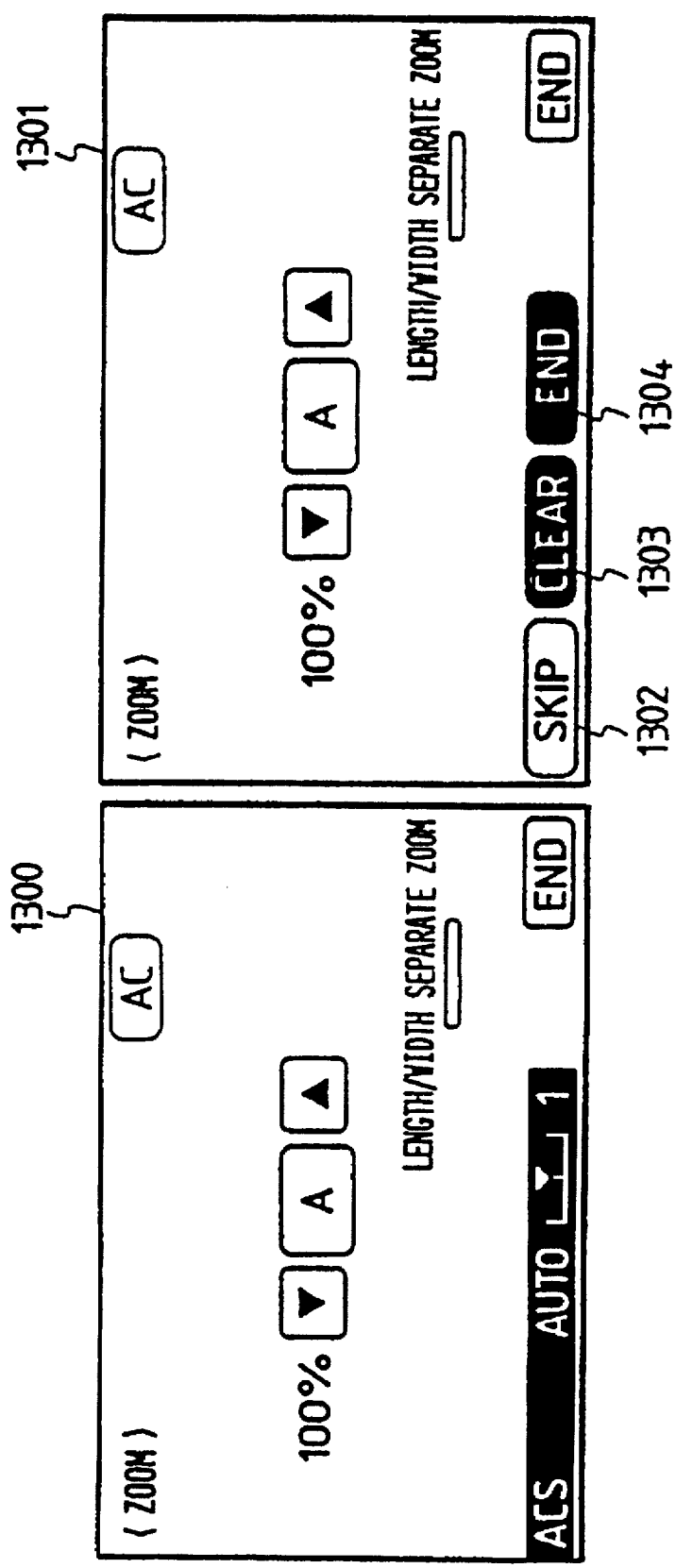

FIG. 71

| IMAGE PLANE NUMBER ① | SKIP FLAG ① |
|---|---|
| IMAGE PLANE NUMBER ② | SKIP FLAG ② |
| IMAGE PLANE NUMBER ③ | SKIP FLAG ③ |
| IMAGE PLANE NUMBER ④ | SKIP FLAG ④ |
| IMAGE PLANE NUMBER ⑤ | SKIP FLAG ⑤ |
| IMAGE PLANE NUMBER ⑥ | SKIP FLAG ⑥ |

SYNTHESIZING

IMAGE PROCESSING APPARATUS AND METHOD IN WHICH A DISCRIMINATION STANDARD IS SET AND DISPLAYED

This application is a division of application Ser. No. 08/481,825, filed Jun. 7, 1995, now U.S. Pat. No. 5,550,638 which is a continuation of application Ser. No. 08/021,853, filed Feb. 24, 1993, now abandoned, and which in turn, is a division of application Ser. No. 07/519,448, filed May 4, 1990, which issued as U.S. Pat. No. 5,239,383 on Aug. 24, 1993.

BACKGROUND OF THE INVENTION

1. Field of the Invention

The present invention relates to an image processing apparatus which executes various processing operations of an input image to perform image edit operations.

2. Related Background Art

In a conventional digital copying machine, an original is illuminated with a halogen lamp or the like, and light reflected by the original is color-separated into, e.g., R (red), G (green), and B (blue) by an optical means such as an optical filter or a prism. The R, G, and B signals are photoelectrically converted to electrical signals using a charge-coupled device such as a CCD. The electrical signals are then converted into digital signals, and the digital signals are subjected to predetermined processing. Thereafter, an image is formed using a recording apparatus such as a laser beam printer, a liquid crystal printer, a thermal printer, an ink-jet printer, or the like.

In a digital copying machine of this type, requirements for outputting smooth images, and outputting sharp characters and lines have been demanded, and extensive studies have been made to meet such requirements.

However, in an area gradation system in which gradation of an image is assured by a dot area, gradation of an output image conflicts with a resolution level, and different processing operations must be performed for an image portion and a character portion. Although many systems have been introduced so far, complex software processing must be executed in most of them. Some real-time processing systems become very expensive due to their circuit scales, and are not suitable for commercial products.

SUMMARY OF THE INVENTION

It is an object of the present invention to eliminate the conventional drawbacks.

It is another object of the present invention to provide an image processing apparatus which can reliably discriminate a character area from an image area.

In order to achieve the above objects, according to the present invention, there is provided an image processing apparatus comprising means for emphasizing a high-frequency component of an input image signal, and means for discriminating a dot area of an image based on the image signal whose high-frequency component is emphasized by the emphasizing means.

Furthermore, there is provided an image processing apparatus comprising means for emphasizing a high-frequency component of an input image signal, and means for discriminating an outline portion of an image on the basis of the image signal whose high-frequency component is emphasized by the emphasizing means.

Moreover, there is provided an image processing apparatus comprising means for emphasizing a high-frequency component of an input image signal, and means for discriminating a halftone area of an image on the basis of the image signal whose high-frequency component is emphasized by the emphasizing means.

It is still another object of the present invention to provide an image processing apparatus which can reliably perform image area separation of a color image.

In order to achieve the above object, according to the present invention, there is provided an image processing apparatus comprising means for inputting a plurality of color component signals of a subtractive color system, means for detecting a minimum value signal from the color component signals input by the input means, means for emphasizing a high-frequency component of the minimum value signal detected by the detection means, and means for discriminating a feature of an image in accordance with the minimum value signal whose high-frequency component is emphasized by the emphasizing means.

It is still another object of the present invention to provide an image processing apparatus which can precisely reproduce an original image.

In order to achieve the above object, according to the present invention, there is provided a copying apparatus comprising conversion means for scanning an original to convert an original image into a plurality of color component signals, means for detecting a minimum value signal from the color component signals converted by the conversion means, means for emphasizing a high-frequency component of the minimum value signal detected by the detection means, means for discriminating a feature of an image in accordance with the minimum value signal whose high-frequency component is emphasized by the emphasizing means, and means for reproducing the original image in accordance with the discrimination result by the discrimination means.

It is still another object of the present invention to provide an image processing apparatus which can perform image area separation in real time.

It is still another object of the present invention to provide a simple, inexpensive image processing apparatus.

Other objects of the present invention will be apparent from the following description and appended claims.

BRIEF DESCRIPTION OF THE DRAWINGS

FIGS. 2A, 2B, and 2C, is a block diagram of an image processing circuit according to the embodiment of the present invention;

FIGS. 3A and 3B are respectively a schematic view and a timing chart showing color read sensors and drive pulses;

FIGS. 4A and 4B are respectively a circuit diagram and a timing chart of an ODRV 118a and an EDRV 119a;

FIGS. 12A and 12B are respectively a circuit diagram and a table for explaining a color correction circuit;

FIG. 13 shows unnecessary transmission regions of a filter;

FIG. 14 shows unnecessary absorption components of a filter;

FIGS. 16A to 16E are views for explaining the principle of outline regeneration;

FIGS. 17A to 17N are views for explaining the principle of outline regeneration;

FIG. 21, including FIGS. 21A and 21B, is a block diagram of a character/image correction unit;

FIG. 22A-1 illustrates a character "N," a portion of which is to be subject to addition/subtraction processing;

FIGS. 22A to 22D are views for explaining addition/subtraction processing performed on a portion of character "N" shown in FIG. 22A-1;

FIGS. 25A to 25Q are views for explaining color residual removal processing, addition/subtraction processing, and the like;

FIGS. 35A to 35F are views and a circuit diagram for explaining mosaic processing, and the like;

FIGS. 37A to 37N are a circuit diagram, timing charts, and explanatory views of a mask bit memory, and the like;

FIG. 40 is a circuit diagram of an address counter;

FIG. 41 is a timing chart in enlargement and reduction states;

FIG. 52 shows a truth table of a selector;

FIGS. 53A and 53B show examples of rectangular and non-rectangular areas;

FIG. 55, including FIGS. 55A, 55B, and 55C, is a chart for explaining a color conversion sequence;

FIG. 56, including FIGS. 56A, 56B, 56C, and 56D, is a chart for explaining a trimming area designation sequence;

FIG. 60, including FIGS. 60A, 60B, and 60C, is a chart for explaining a character synthesizing sequence;

FIG. 61, including FIGS. 61A, 61B, 61C, 61D, 61E, and 61F, is a chart for explaining the character synthesizing sequence;

FIGS. 63A-1 and 63A-2, and 63B-1 and 63B-2 are charts for explaining texture processing;

FIG. 65, including FIGS. 65A, 65B, 65C, and 65D, is a chart for explaining an * mode sequence;

FIG. 66, including FIGS. 66A, 66B, and 66C is a chart for explaining a program memory operation sequence;

FIG. 67, including FIGS. 67A and 67B, is a chart for explaining the program memory operation sequence;

FIGS. 68A and 68B are charts for explaining the program memory operation sequence;

FIG. 71 shows a format of a recording table;

DETAILED DESCRIPTION OF THE PREFERRED EMBODIMENTS

The present invention will be described in detail below with reference to the accompanying drawings.

Figure 1:
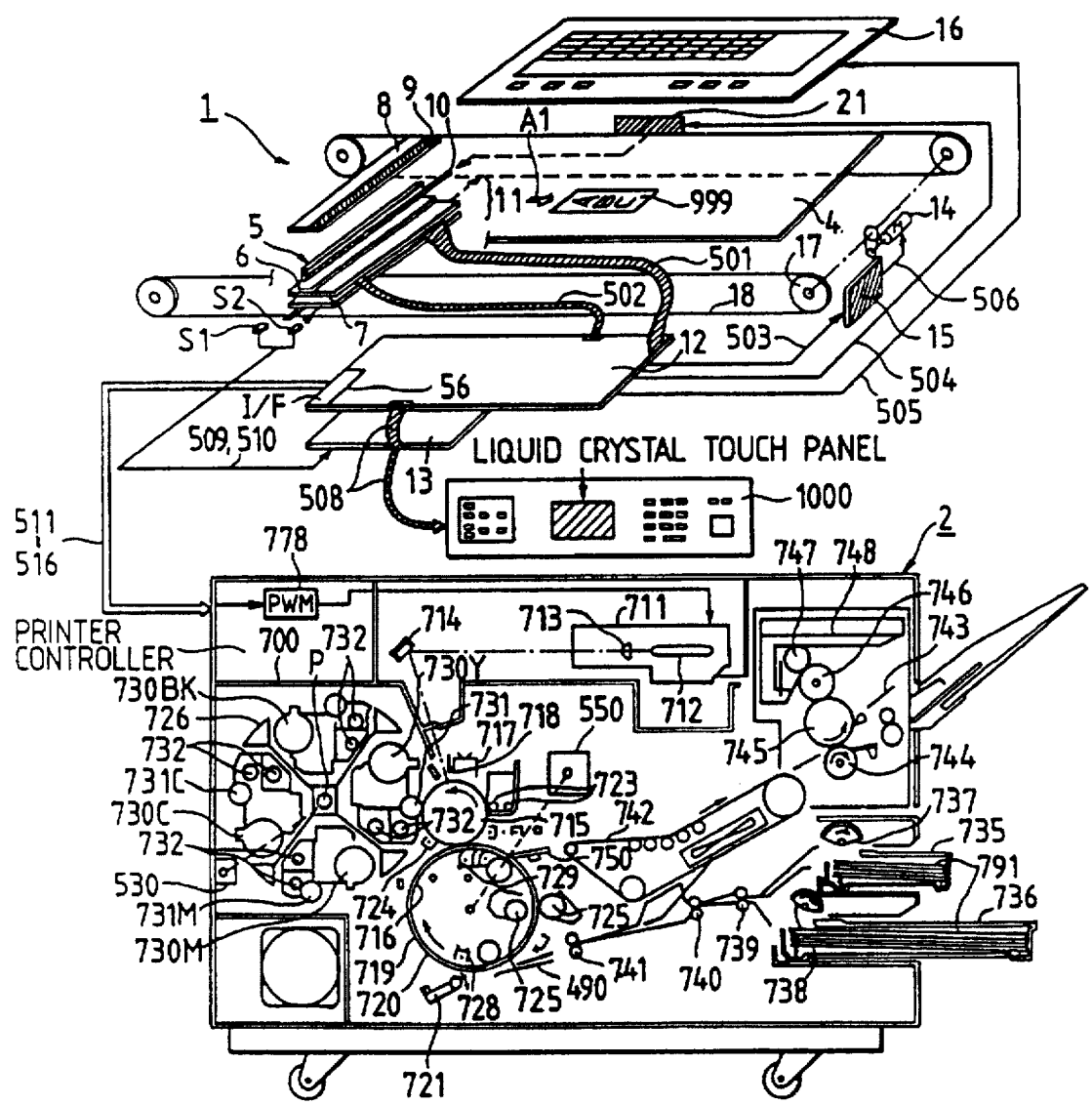
FIG. 1 is a schematic view of an overall image processing apparatus according to an embodiment of the present invention.
Figure 2B:
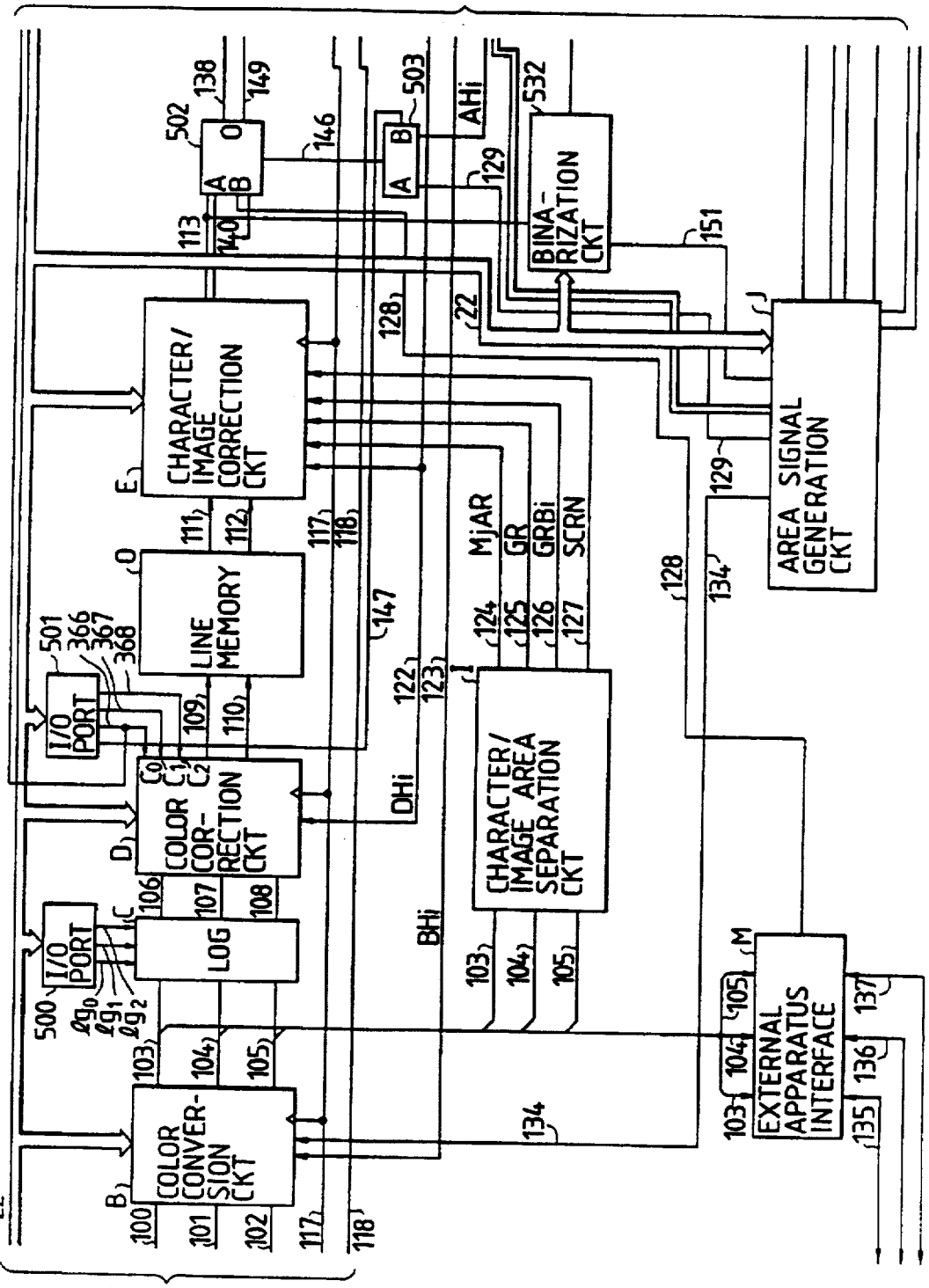

FIG. 1 schematically shows an internal arrangement of a digital color image processing system according to the present invention. The system of this embodiment comprises a digital color image reading apparatus (to be referred to as a color reader hereinafter) 1 in an upper portion, and a digital color image print apparatus (to be referred to as a color printer hereinafter) 2 in a lower portion, as shown in FIG. 1. The color reader 1 reads color image information of an original in units of colors by a color separation means and a photoelectric transducer such as a CCD (to be described later), and converts the read information into an electrical digital image signal. The color printer 2 comprises an electrophotograpic laser beam color printer which reproduces color images in units of colors in accordance with the digital image siganl, and transfers the reproduced images onto a recording sheet in a digital dot format a plurality of times, thereby recording an image.

The color reader 1 will be briefly described below.

The color reader 1 includes a platen glass 4 on which an original 3 is to be placed, and a red lens array 5 for converging an optical image reflected by an original which is exposure-scanned by a halogen exposure lamp 10, and inputting the focused image onto an equi-magnification full-color sensor 6. The components 5, 6, 7, and 10 exposure-scan the original in a direction of an arrow A1 together with an original scanning unit 11. Color separation image signals of one line read during exposure scanning are amplified to predetermined voltages by a sensor output signal amplifier circuit 7, and the amplified signals are input to a video processing unit 12 (to be described later) through a signal line 501. The input signals are then subjected to signal processing. The video processing unit 12 and its signal processing will be described in detail later. The signal line 501 comprises a coaxial cable which can guarantee faithful signal transmission. A signal line 502 is used to supply drive pulses to the equi-magnification full-color sensor 6. All the necessary drive pulses are generated by the video processing unit 12. The color reader 1 also includes white and black plates 8 and 9 used for white and black level correction of image signals (to be described later). When the black and white plates 8 and 9 are irradiated with light emitted from the halogen exposure lamp 10, signal levels of predetermined densities can be obtained. Thus, these plates are used for white and black level correction of video signals. The color reader 1 includes a control unit 13 having a microcomputer. The control unit 13 performs all the control operations of the color reader 1, e.g., display and key input control of an operation panel 1000 through a bus 508, control of the video processing unit 12, detection of a position of the original scanning unit 11 using position sensors S1 and S2 through signal lines 509 and 510, control of a stepping motor drive circuit for pulse-driving a stepping motor 14 or moving the original scanning unit 11 through a signal line 503, ON/OFF control of the halogen exposure lamp 10 using an exposure lamp driver through a signal line 504, control of a digitizer 16 and internal keys through a signal line 505, and the like. In an original exposure-scanning mode, color image signals read by the exposure scanning unit 11 described above are input to the video processing unit 12 through the amplifier circuit 7 and the signal line 501, and are subjected to various processing operations (to be described later). The processed signals are then sent to the color printer 2 through an interface circuit 56.

The color printer 2 will be briefly described below. The printer 2 includes a scanner 711. The scanner 711 comprises a laser output unit for converting image signals from the color reader 1 into light signals, a polygonal mirror 712 of a polygon (e.g., an octahedron), a motor (not shown) for rotating the mirror 712, an f/θ lens (focusing lens) 713, and the like. The color printer 2 includes a reflection mirror 714, and a photosensitive drum 715. A laser beam emerging from the laser output unit is reflected by the polygonal mirror 712, and linearly scans (raster-scans) the surface of the photosensitive drum 715 via the lens 713 and the mirror 714, thereby forming a latent image corresponding to an original image.

The color printer 2 also includes an entire surface exposure lamp 718, a cleaner unit 723 for recovering a non-transferred residual toner, and a pretransfer charger 724. These members are arranged around the photosensitive drum 715.

Furthermore, the color printer 2 includes a developing unit 726 for developing an electrostatic latent image formed on the surface of the photosensitive drum 715, developing sleeves 731Y, 731M, 731C, and 731Bk which are brought into direct contact with the photosensitive drum 715 to perform developing, toner hoppers 730Y, 730M, 730C, and 730Bk for storing supplementary toners, and a screw 732 for transferring a developing agent. These sleeves 731Y to 731Bk, the toner hoppers 730Y to 730Bk, and the screw 732 constitute the developing unit 726. These members are arranged around a rotating shaft P of the developing unit. For example, when a yellow toner image is to be formed, yellow toner developing is performed at a position illustrated in FIG. 1. When a magenta toner image is to be formed, the developing unit 726 is rotated about the shaft P in FIG. 1, so that the developing sleeve 731M in a magenta developing unit is located at a position where it can be in contact with the photosensitive drum 715. Cyan and black images are developed in the same manner as described above.

The color printer 2 includes a transfer drum 716 for transferring a toner image formed on the photosensitive drum 715 onto a paper sheet, an actuator plate 719 for detecting a moving position of the transfer drum 716, a position sensor 720 which approaches the actuator plate 719 to detect that the transfer drum 716 is moved to a home position, a transfer drum cleaner 725, a sheet pressing roller 727, a discharger 728, and a transfer charger 729. These members 719, 720, 725, 727, and 729 are arranged around the transfer roller 726.

The color printer 2 also includes sheet cassettes 735 and 736 for storing paper sheets (cut sheets), sheet feed rollers 737 and 738 for feeding paper sheets from the cassettes 735 and 736, and timing rollers 739, 740, and 741 for taking sheet feed and convey timings. A paper sheet fed and conveyed via these rollers is guided to a sheet guide 749, and is wound around the transfer drum 716 while its leading end is carried by a gripper (to be described later). Thus, an image formation process is started.

Moreover, the color printer includes a drum rotation motor 550 for synchronously rotating the photosensitive drum 715 and the transfer drum 716, a separation pawl 750 for separating a paper sheet from the transfer drum 716 after the image formation process is completed, a conveyor belt 742 for conveying the separated paper sheet, and an image fixing unit 743 for fixing a toner image on the paper sheet conveyed by the conveyor belt 742. The image fixing unit 743 comprises a pair of heat and press rollers 744 and 745.

An image processing circuit according to the present invention will be described below with reference to FIG. 2 and subsequent drawings. This circuit can be applied to a color image copying apparatus in which a full-color original is exposed with an illumination source such as a halogen lamp or a fluorescent lamp (not shown), a reflected color image is picked up by a color image sensor such as a CCD, and an obtained analog image signal is converted into a digital signal by an A/D converter or the like, the digital full-color image is processed, and the processed signal is output to a thermal transfer color printer, an ink-jet color printer, a laser beam color printer, or the like (not shown) to obtain a color image, or a color image output apparatus which receives a digital color image signal in advance from a computer, another color image reading apparatus, a color image transmission apparatus, or the like, performs processing such as synthesizing, and outputs the processed signal. This circuit can also be applied to a head for causing film boiling by heat energy to inject ink droplets, and a recording system using this head. This technique is disclosed in U.S. Pat. Nos. 4,740,796 and 4,740,793.

Figures 1, 63B:
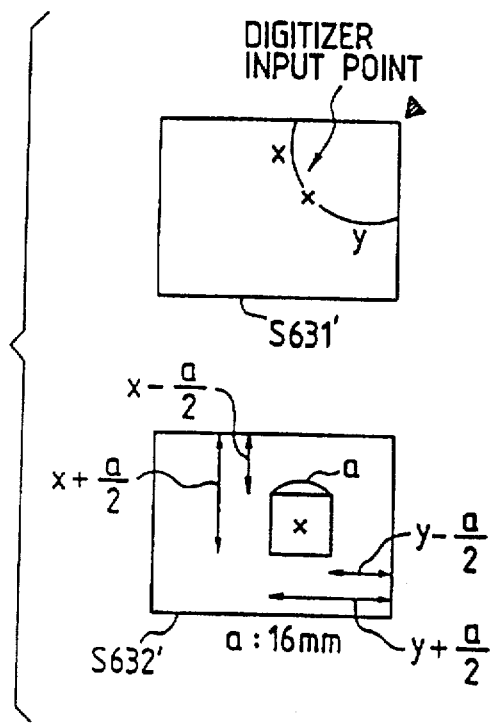
Figures 2, 63B:
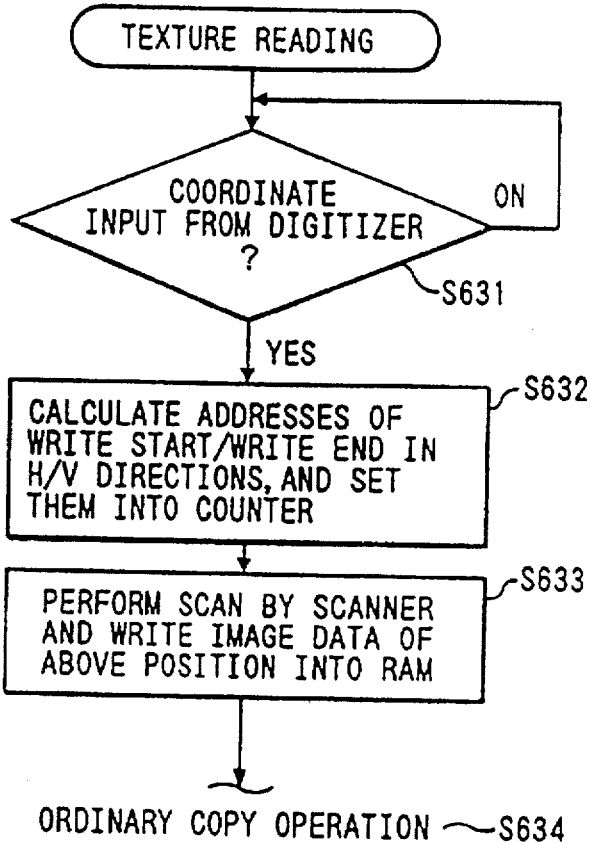

In FIG. 2, an image reading unit A comprises staggered CCD line sensors 500a, a shift register 501a, a sample/hold circuit 502a, an A/D converter 503a, a positional aberration correction circuit 504a, black correction/white correction circuit 506a, a CCD driver 533a, a pulse generator 534a, and an oscillator 558a.

The image processing circuit includes a color conversion circuit B, a LOG conversion circuit C, a color correction circuit D, a line memory O, a character/image correction circuit E, a character synthesizing circuit F, a color balance circuit P, an image process and edit circuit G, an edge emphasis circuit H, a character/image area separation circuit I, an area signal generation circuit J, a 400-dpi binary memory K, a 100-dpi binary memory L, an external apparatus interface M, a switch circuit N, a binarization circuit 532, a driver R such as a laser driver for a laser beam printer, a BJ head driver for a bubble-jet printer, or the like, for driving a printer, and a printer unit S including the driver R.

A bubble-jet recording system is a recording system for injecting ink droplets by utilizing film boiling, and is disclosed in U.S. Pat. Nos. 4,723,129 and 4,740,793.

The image processing circuit also includes a digitizer 58, the operation unit 1000, an operation interface 1000', RAMs 18 and 19, a CPU 20, a ROM 21, a CPU bus 22, and I/O ports 500 and 501.

An original is irradiated with light emitted from an exposure lamp (not shown), and light reflected by the original is color-separated in units of color components, and read by the color read sensors 500a. The read color image signals are amplified to predetermined levels by the shift register (or amplifier circuit) 501a. The CCD driver 533a supplies pulse signals for driving the color read sensors, and a necessary pulse source is generated by the system control pulse generator 534a.

FIGS. 3A and 3B respectively show the color read sensors and drive pulses. FIG. 3A shows the color read sensors used in this embodiment. Each color read sensor has 1,024 pixels in a main scan direction in which one pixel is defined as 63.5 μm (400 dots/inch (to be referred to as "dpi" hereinafter)) so as to read the main scan direction while dividing it into five portions, and each pixel is divided into G, B, and R portions in the main scan direction. Thus, the sensor of this embodiment has a total of 1,024×3=3,072 effective pixels. Chips 58 to 62 are formed on a single ceramic substrate. First, third, and fifth sensors (or CCDs) (58a, 60a, and 62a) are arranged on a line LA, and second and fourth sensors are arranged on a line LB separated from the line LA by four lines (63.5 μm×4=254 μm). These sensors scan in a direction of an arrow AL in an original read mode.

Of the five CCDs, the first, third, and fifth CCDs are independently and synchronously driven by a drive pulse group ODRV 118a, and the second and fourth CCDs are independently and synchronously driven by a drive pulse group EDRV 119a. The pulse group ODRV 118a includes charge transfer clocks O01A and O02A, and a charge reset pulse ORS, and the pulse group EDRV 119a includes charge transfer clocks E01A and E02A, and a charge reset pulse ERS. These clocks and pulses are completely synchronously generated not to be jitters to prevent mutual interferences and to attain noise reduction among the first, third and fifth pulses, and the second and fourth pulses. For this reason, these pulses are generated by one reference oscillation source OSC 558a (FIG. 2).

Figure 4A:
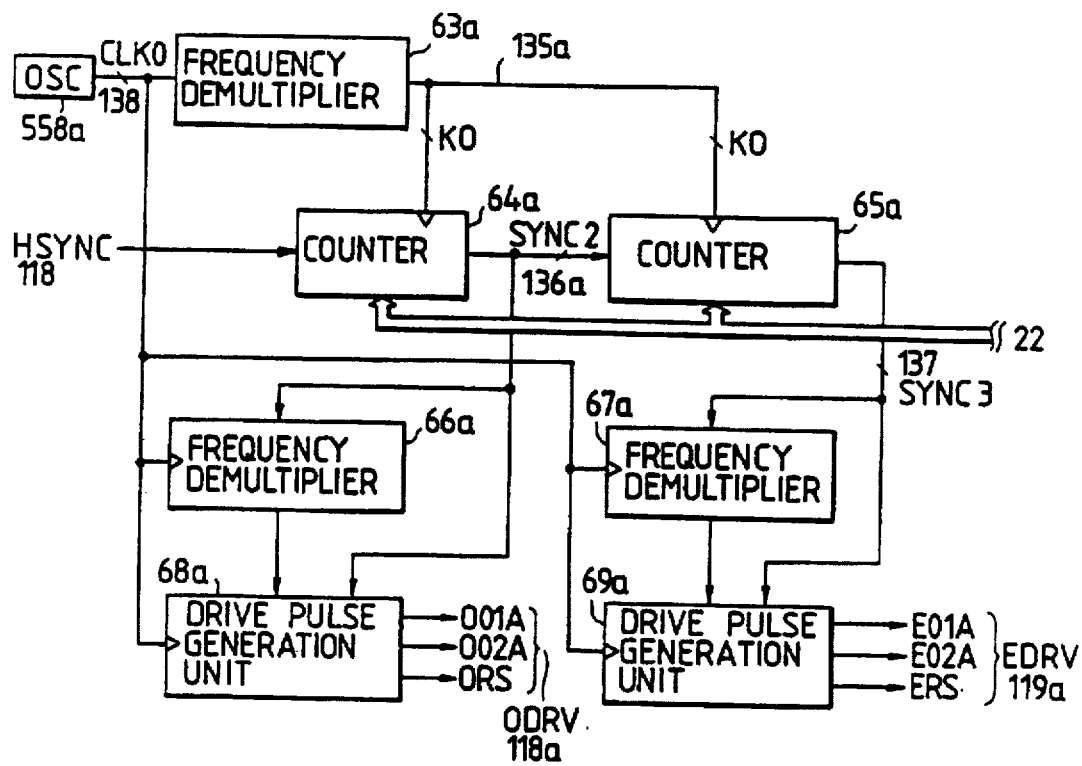
Figure 4B:
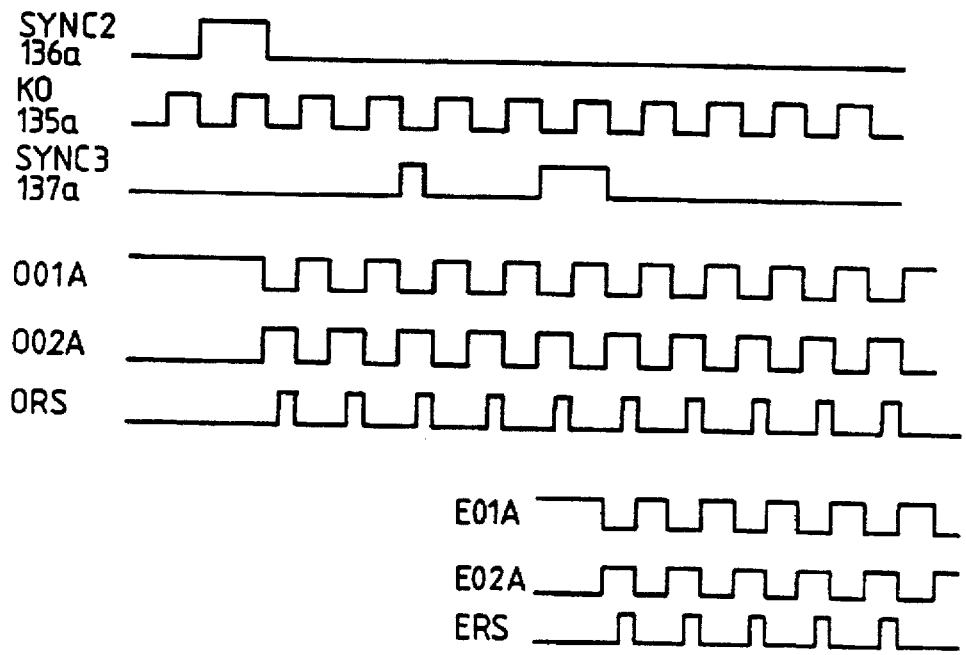

FIG. 4A is a circuit diagram of a CCD drive pulse generation circuit for generating the pulse groups ODRV 118a and EDRV 119a, and FIG. 4B is a timing chart of the CCD drive pulses. The CCD drive pulse generation circuit is included in the system control pulse generator 534a shown in FIG. 2. A clock K0 135a obtained by frequency-dividing an original clock CLK0 generated by the single OSC 558a is used to generate reference signals SYNC2 and SYNC3 for determining generation timings of pulses ODRV and EDRV. The output timings of the reference signals SYNC2 and SYNC3 are determined by setup values of presettable counters 64a and 65a which are set by the CPU bus 22. The reference signals SYNC2 and SYNC3 initialize frequency demultipliers 66a and 67a and drive pulse generation units 68a and 69a. The pulse groups ODRV 118a and EDRV 119a can be obtained as signals free from jitters since they are generated with reference to a signal HSYNC 118 input to this circuit on the basis of the clock CLK0 output from the single oscillation source OSC 558a and frequency-divided clocks which are all synchronously generated, thus preventing signal errors caused by interferences among sensors.

The synchronously obtained sensor drive pulses ODRV 118a are supplied to the first, third, and fifth sensors 58a, 60a, and 62a, and the sensor drive pulses EDRV 119a are supplied to the second and fourth sensors 59a and 61a. The sensors 58a, 59a, 60a, 61a, and 62a independently output video signals V1 to V5 in synchronism with the drive pulses. The video signals V1 to V5 are amplified to predetermined voltage values by independent amplifier circuits 501-1 to 501-5 in units of channels shown in FIG. 2. The amplified signals V1, V3, and V5 are output at a timing of a clock signal OOS 129a in FIG. 3B, and the amplified signals V2 and V4 are output at a timing of a clock signal EOS 134a, and these signals are input to a video image processing circuit through a coaxial cable 101a.

Color image signals obtained by reading an original while dividing the original into five portions and input to the video image processing circuit are separated into three colors, i.e., G (green), B (blue), and R (red) by the sample/hold (S/H) circuit 502a. Therefore, after S/H processing, signals of 3×5=15 systems are subjected to signal processing.

The analog color signals sampled and held by the S/H circuit 502a in units of R, G, and B are convened to digital signals in units of first to fifth channels by the next A/D converter 503a. The digital signals of the first to fifth channels are parallelly and independently output to the next circuit.

In this embodiment, since an original is read by the five staggered sensors which have an interval of four lines (63.5 μm×4=254 μm) in a sub scan direction, and correspond to five divided areas in the main scan direction, as described above, the preceding second and fourth channels and the remaining first, third, and fifth channels have a positional aberration. In order to normally connect outputs of these channels, the positional aberration correction circuit 504a comprising a memory of a plurality of lines corrects the positional aberration.

Figure 5A:
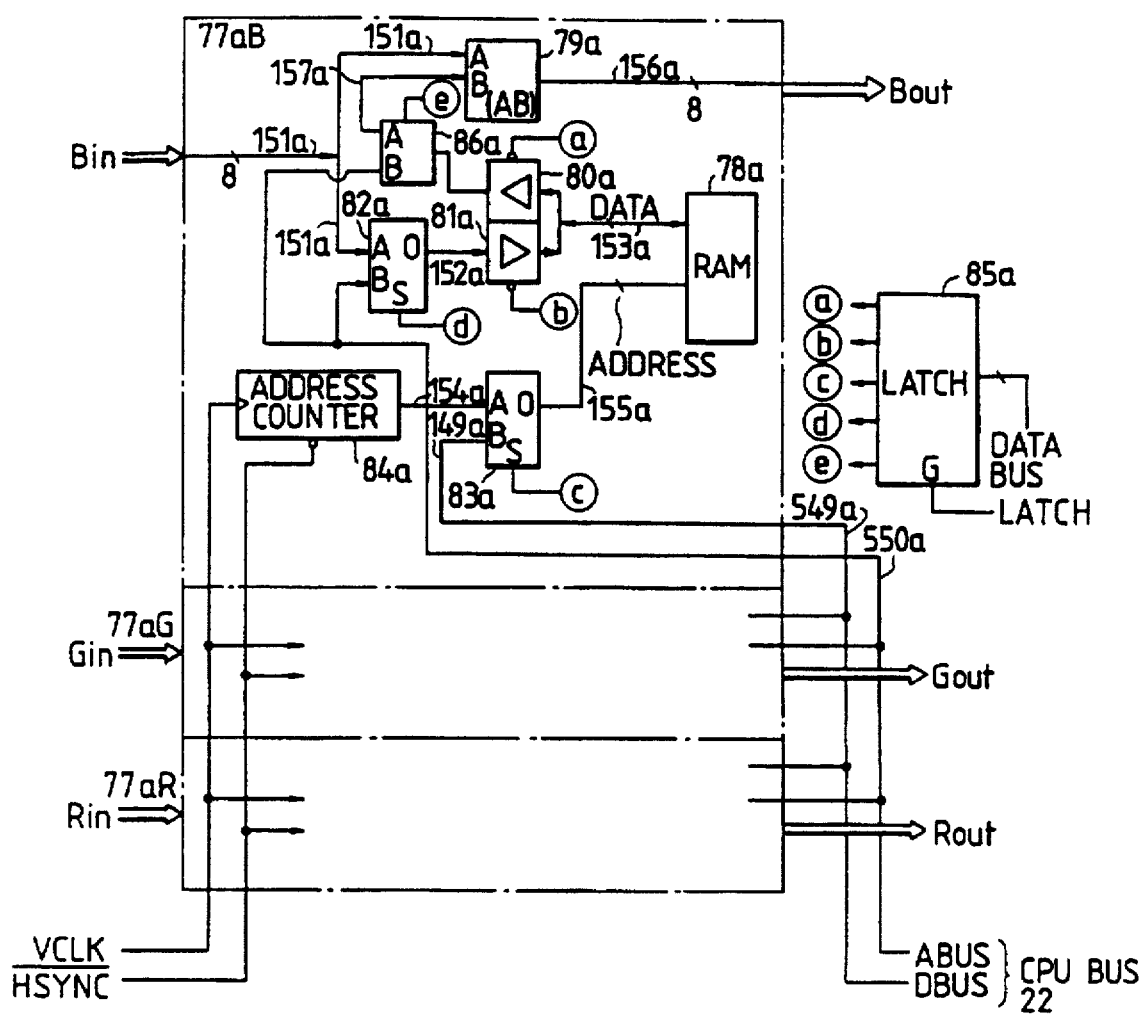
FIGS. 5A and 5B are respectively a circuit diagram and a schematic view for explaining a black correction operation.
Figure 5B:
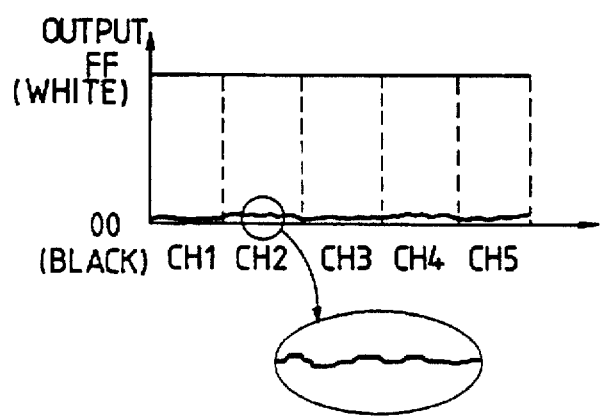

A black correction operation in the black correction/white correction circuit 506a will be described below with reference to FIG. 5A. FIG. 5B shows the principle of black correction. As shown in FIG. 5B, when a light amount input to the sensors is very small, the black level outputs of the first to fifth channels largely vary among chips and pixels. If these signals are directly output to output an image, a stripe or nonuniform pattern is formed in a data portion of an image. Thus, a variation in black output must be corrected, and correction is performed by the circuit shown in FIG. 5A. Prior to the original read operation, the original scanning unit is moved to a position of the black plate having a uniform density and arranged on a non-image region at the distal end portion of an original table, and a halogen lamp is turned on to input a black level image signal to this circuit. As for a blue signal $B_{IN}$, in order to store this image data of one line in a black level RAM 78a, a selector 82a selects an A input (ⓓ), a gate 80a is disabled (ⓐ), and a gate 81a is enabled. More specifically, data lines 151a, 152a and 153a are connected in the order named. Meanwhile, ⓒ is output to a selector 83a so that an output 154a of an address counter 84a which is initialized by a signal $\overline{HSYNC}$ and counts clocks VCLK is input to an address input 155a of the RAM 78a. Thus, a black level signal of one line is stored in the RAM 78a (the above operation will be referred to as a black reference value fetch mode hereinafter).

In an image read mode, the RAM 78a is set in a data read mode, and data of each pixel is read out and input to a B input of a subtracter 79a via data lines 153a and 157a in units of lines. In this case, the gate 81a is disabled (ⓑ), and the gate 80a is enabled (ⓐ). The selector 86a generates an A output. Therefore, for, e.g., the blue signal, a black correction circuit output 156a is obtained as $B_{IN}(i)-DK(i)$ $=B_{OUT}(i)$ with respect to black level data DK(i) (to be referred to as a black correction mode hereinafter). Similarly, the same control is performed for a green signal $G_{IN}$ and a red signal $R_{IN}$ by circuits 77aG and 77aR. Control lines ⓐ, ⓑ, ⓒ, ⓓ, and ⓔ for selector gates for attaining this control are selected by a latch 85a assigned as I/Os of the CPU 20 (FIG. 20) under the control of the CPU. When the selectors 82a, 83a, and 86a select B inputs, the CPU 20 can access the RAM 78a.

Figure 6A:
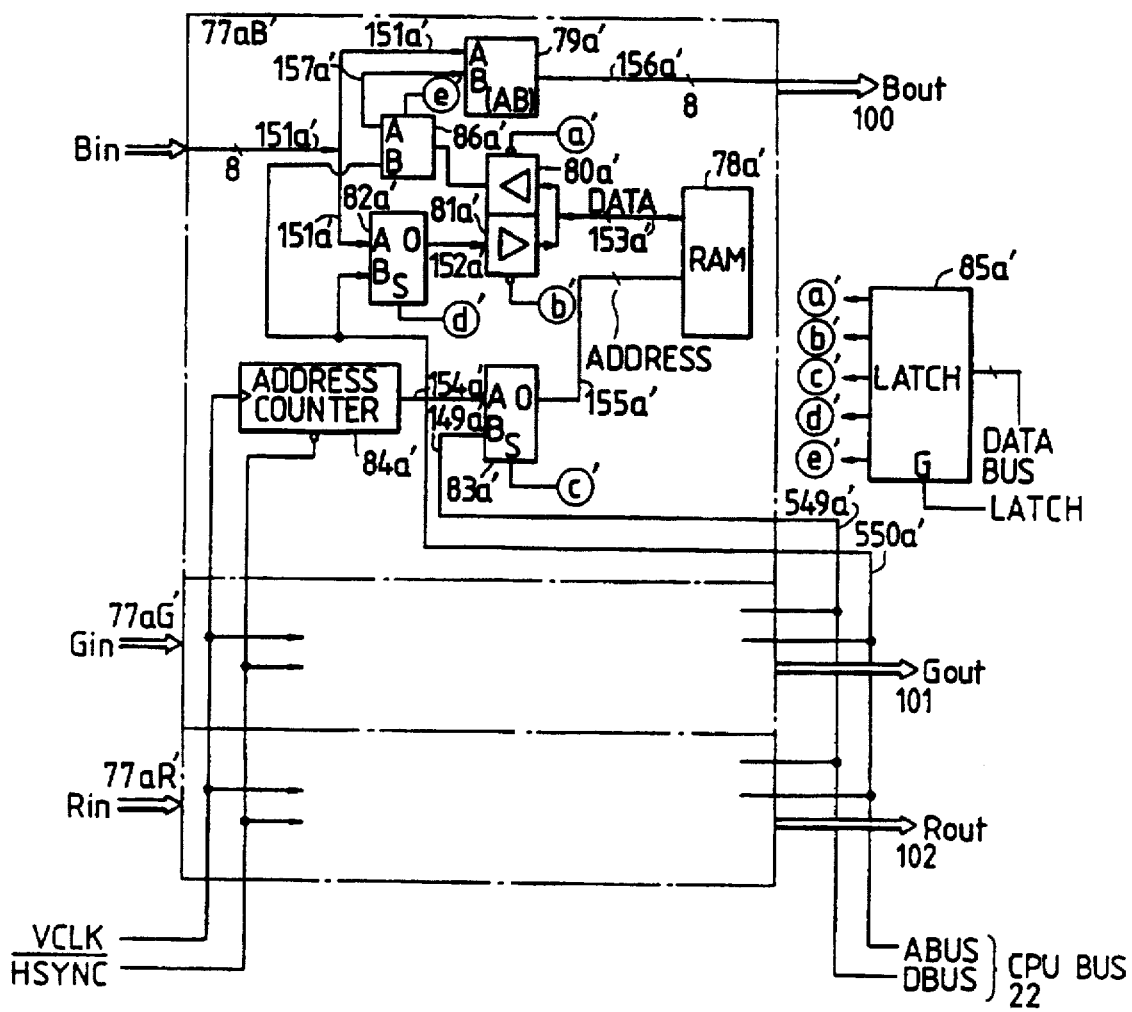
FIGS. 6A to 6D are respectively a circuit diagram and schematic views for explaining shading correction.

White level correction (shading correction) in the black correction/white correction circuit 506a will be described below with reference to FIGS. 6A to 6D. In white level correction, variations in sensitivities of an illumination system, an optical system, and sensors are corrected on the basis of white data obtained when the original scanning unit is moved to a position of the uniform white plate and radiates light onto the white plate. FIG. 6A show a basic circuit arrangement. The basic circuit arrangement is the same as that shown in FIG. 5A. A difference between black and white correction operations is as follows. Black correction is performed by the subtracter 79a, while in white correction, a multiplier 79a' is used. Thus, a description of the same parts will be omitted.

Figure 6B:
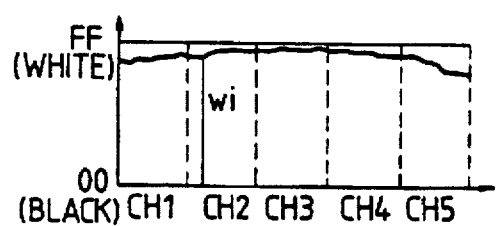
Figure 6C:
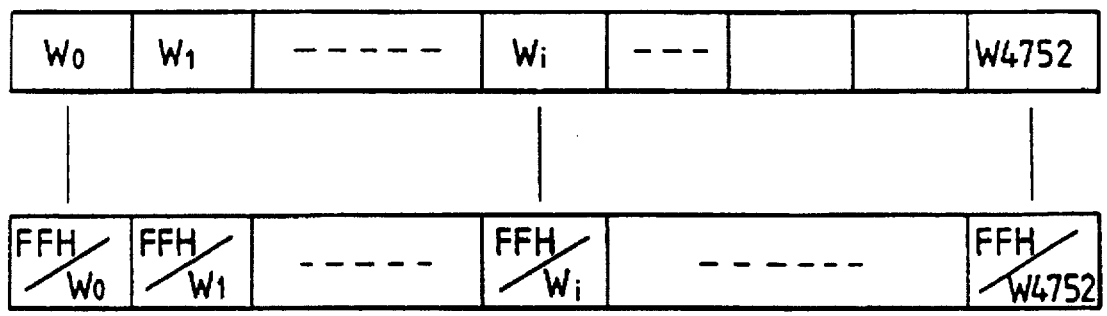
Figure 6D:
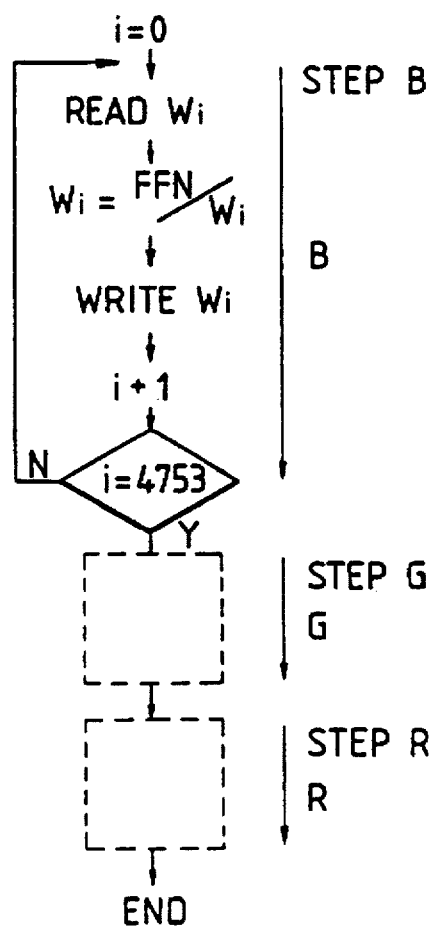

When the CCDs (500a) for reading an original are located at a reading position of the uniform white plate (home position) in a color correction mode, an exposure lamp (not shown) is turned on, and image data of a uniform white level is stored in a one-line correction RAM 78a' prior to a copying operation or a reading operation. For example, if the main scan width corresponds to a width in a longitudinal direction of an A4 size, 16×297 mm=4,752 pixels for 16 pels/mm, that is, the capacity of the RAM is at least 4,762 bytes, and data of the white plate in units of pixels are stored in the RAM 78a', as shown in FIG. 6C, when white plate data Wi of an ith pixel (i=1 to 4,752) is shown in FIG. 6B showing the principle of white correction.

A normal image read value Di of an ith pixel must be corrected with reference to Wi to obtain corrected data $Do=Di\times FF_H/Wi$. The CPU 20 outputs data to signal lines ⓐ', ⓑ', ⓒ', and ⓓ' of a latch 85a' so that gates 80a' and 81a' are enabled, and selectors 82a', 83a', and 86a' select B inputs. As a result, the CPU 20 can access a RAM 78a'. In a white correction sequence shown in FIG. 6D, the CPU 20 sequentially calculates $FF_H/W0$ for the start pixel W0, FF/W1 for a pixel W1, ..., and substitutes data. When the CPU 20 completes calculations of a blue component of a color component image (step B in FIG. 6D), it similarly performs calculations for a green component (step G), and a red component (step R). Thereafter, the gate 80a' is enabled ((ⓐ')), the gate 81a' is disabled ((ⓑ')), and the selectors 83a' and 86a' select A inputs, so that $Do=Di\times FF_H/Wi$ is output in response to input original image data Di. Coefficient data $FF_H/Wi$ read out from the RAM 78a' is multiplied with original image data 151a' from one input terminal via signal lines 153a' and 157a', and the product is then output.

As described above, black and white levels are corrected on the basis of various factors such as a black level sensitivity of an image input system, a variation in dark current of CCDs, a variation in sensitivity among sensors, a variation in light amount of an optical system, a white level sensitivity, and the like, and image data $B_{OUT}$ 101, $G_{OUT}$ 102, and $R_{OUT}$ 103 whose white and black levels are uniformly corrected in units of colors in the main scan direction are obtained. The black- and white-level corrected color separation image data are supplied to the color conversion circuit B for detecting a pixel having a specific color density or a specific color ratio upon instruction from an operation unit (not shown), and converting the detected data into another color density or ratio instructed by the operation unit.

<Color Conversion>

Figure 7:
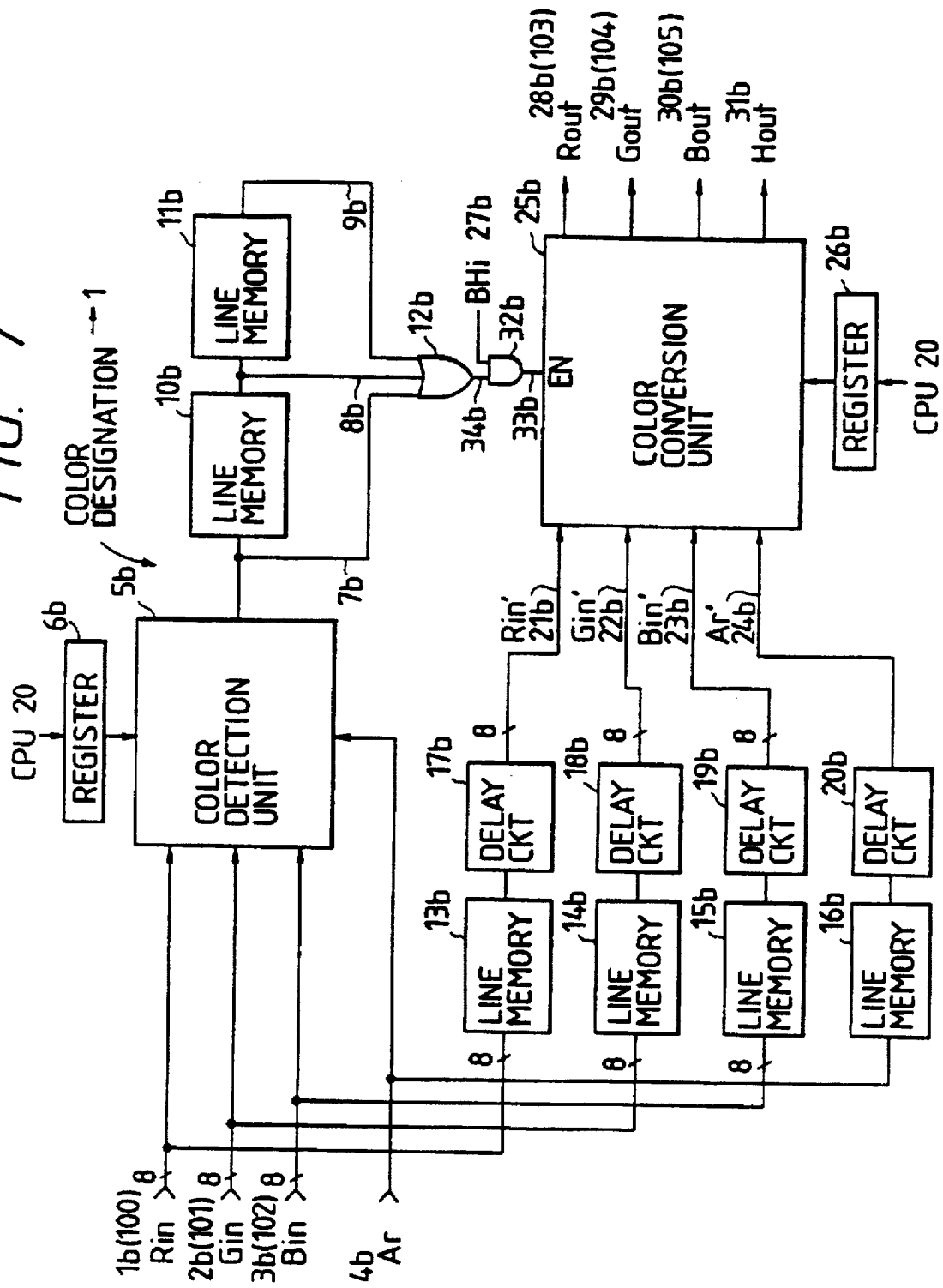
FIG. 7 is a block diagram of a color conversion section.

FIG. 7 is a block diagram of the color conversion (gradation color conversion and density color conversion) unit. The circuit shown in FIG. 7 comprises a color detection unit 5b for judging an arbitrary color set in a register 6b by the CPU 20 from 8-bit color separation signals $R_{IN}$, $G_{IN}$, and $B_{IN}$ (1b to 3b), an area signal Ar 4b for performing color detection and color conversion at a plurality of positions, line memories 10b and 11b for performing processing for expanding a signal of "specific color" output from the color detection unit (to be referred to as a hit signal hereinafter) in a main or sub scan direction (only in the sub scan direction in FIG. 7), an OR gate 12b, line memories 13b to 16b for synchronizing a color conversion enable signal 33b with input color separation data ($R_{IN}$, $G_{IN}$, and $B_{IN}$ 1b to 3b) and the area signal Ar 4b, delay circuits 17b to 20b, and a color conversion unit 25b for performing color conversion on the basis of the enable signal 33b, the synchronized color separation data ($R_{IN}'$, $G_{IN}'$, and $B_{IN}'$ 21b to 23b), an area signal Ar 24b, and color-convened color data set in a register 26b. The color conversion enable signal 33b is generated by an AND gate 32b based on the expanded hit signal 34b and a non-rectangular signal (including rectangle) BHi 27b. A hit signal $H_{OUT}$ 31b is output in synchronism with color-converted color separation data ($R_{OUT}$, $G_{OUT}$, and $B_{OUT}$ 28b to 30b).

An algorithm of gradation color judgement and gradation color conversion will be briefly described below. Note that gradation color judgement or conversion means that color judgement or conversion of colors having the same hue is performed so that color conversion is performed while preserving a density value of colors having the same hue.

As the same color (or hue), it is known that ratios of a red signal $R_1$, a green signal $G_1$, and a blue signal $B_1$ are equal to each other.

Thus, data $M_1$ of one (maximum value color, to be referred to as a main color hereinafter) of colors to be color-converted is selected, and ratios of the selected color to the remaining two color data are calculated. For example, when the main color is R, $M_1=R$ to calculate $G_1/M_1$ and $B_1/M_1$.

A pixel in which the following relations are established for input data $R_i$, $G_i$, and $B_i$ is determined as a pixel to be color-converted:

$$R_i \times \frac{G_1}{M_1} \times \alpha_1 \leq G_i \leq R_i \times \frac{G_1}{M_1} \times \alpha_2 \quad (1)$$

$$R_i \times \frac{B_1}{M_1} \times \beta_1 \leq B_i \leq R_i \times \frac{B_1}{M_1} \times \beta_2 \quad (2)$$

$$M_1 \times \gamma_1 \leq R_i \leq M_1 \times \gamma_2 \quad (3)$$

For $\alpha_1, \beta_1, \gamma_1 \leq 1$ $\alpha_2, \beta_2, \gamma_2 \geq 1$

For color-converted data ($R_2$, $G_2$, and $B_2$), ratios of data $M_2$ of a main color to the remaining two color data are calculated.

For example, when $G_2$ is a main color, $M_2=G_2$, and $R_2/M_2$ and $B_2/M_2$ are calculated.

For the main color $M_1$ of input data, $M_1 \times (R_2/H_2)$ and $M_1 \times (B_2/M_2)$ are calculated.

If data represents a pixel to be color-converted, ($M_1 \times (R_2/M_2)$, $M_1$, and $M_1 \times (B_2/M_2)$) are output; if it does not represent a pixel to be color-converted, ($R_i$, $G_i$, and $B_i$) are output.

Thus, all the same hue portions having gradation are detected, and color-converted data according to the gradation can be output.

Figures 8, 8A:
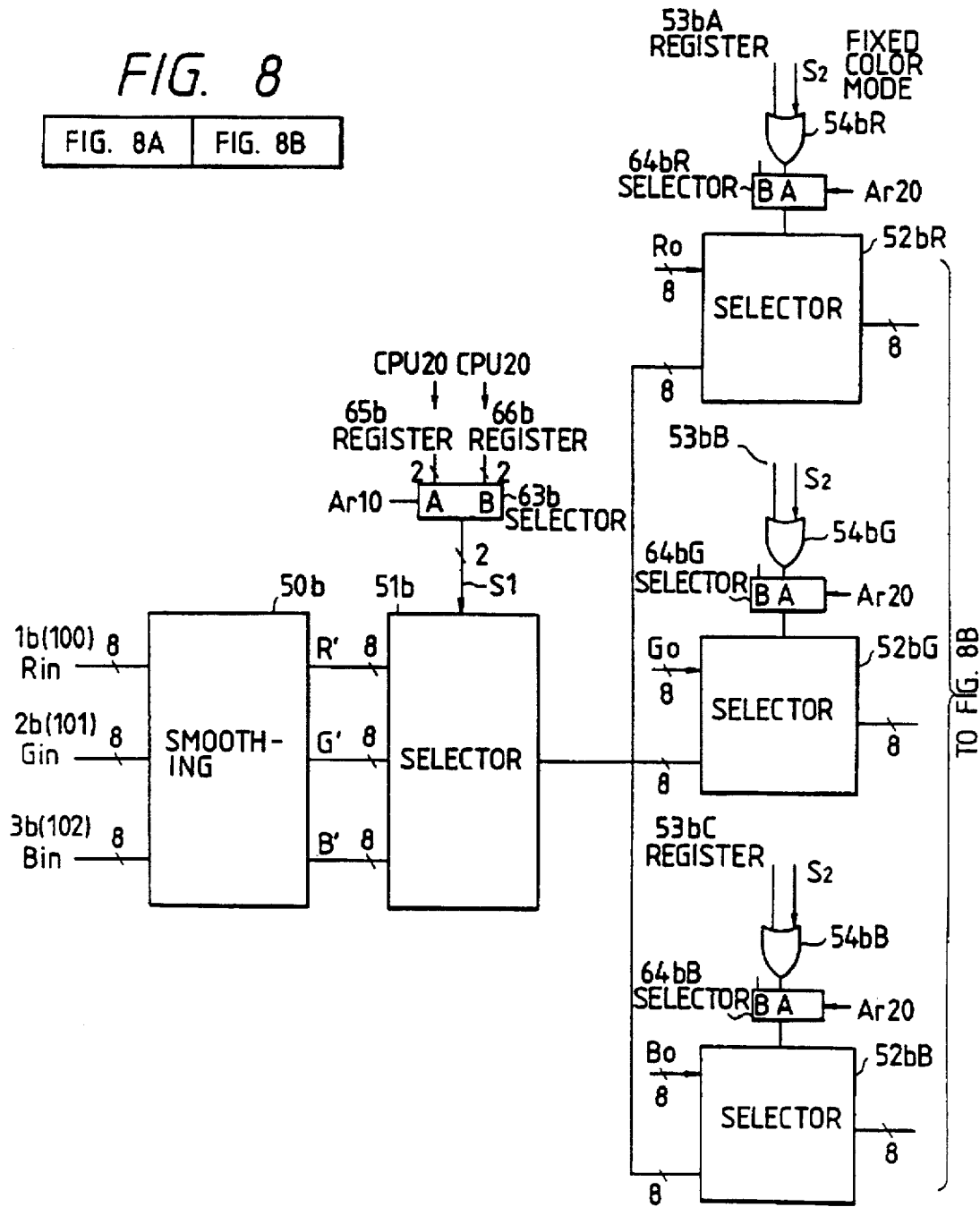
FIG. 8, including
FIGS. 8A and 8B, is a block diagram of a color detection unit.
Figure 8B:
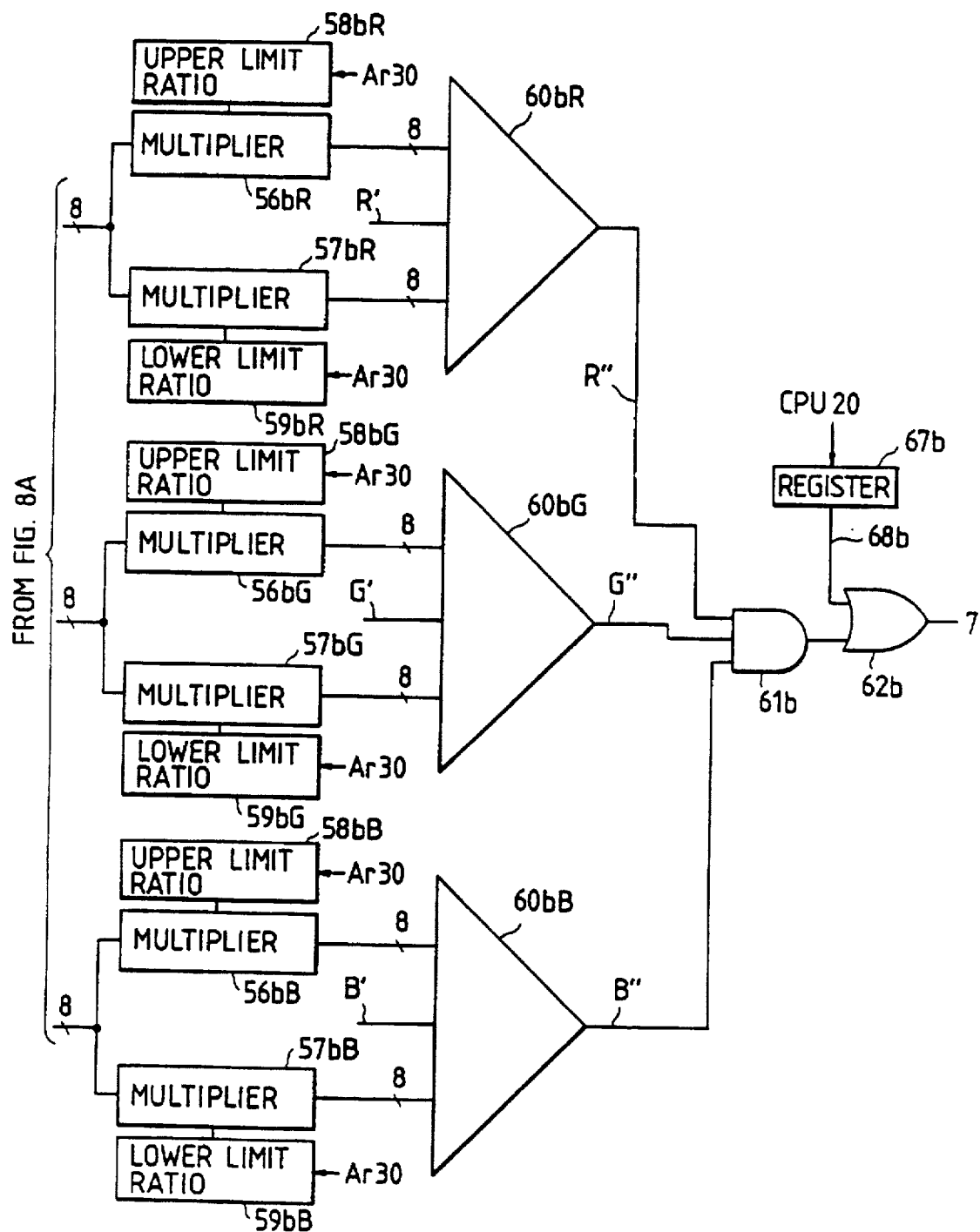

FIG. 8 is a block diagram showing a color judgement circuit. This circuit detects a pixel to be color-converted.

The circuit shown in FIG. 8 includes a smoothing unit 50b for smoothing input data $R_{IN}$ b1, $G_{IN}$ b2, and $B_{IN}$ b3, a selector 51b for selecting one (main color) of the outputs from the smoothing unit, selectors 52$b_R$, 52$b_G$, and 52$b_B$ each for selecting one of the output from the selector 51b and a fixed value $R_0$, $G_0$, or $B_0$, OR gate 54$b_R$, 54$b_G$, or 54$b_B$, selectors 63b, 64$b_R$, 64$b_G$, and 64$b_B$ for setting a select signal in the selectors 51b, 52$b_R$, 52$b_G$, and 52$b_B$ based on area signals Ar 10 and Ar 20, and multipliers 56$b_R$, 56$b_G$, 56$b_B$, 57$b_R$, 57$b_G$, and 57$b_B$ for calculating upper and lower limits.

Upper limit ratio registers 58$b_R$, 58$b_G$, and 58$b_B$, and lower limit ratio registers 59$b_R$, 59$b_G$, and 59$b_B$ set by the CPU 20 can be set up with data for performing color detection of a plurality of areas on the basis of an area signal Ar 30.

The area signals Ar 10, Ar 20, and Ar 30 are signals generated based on the area signal Ar 4b shown in FIG. 7, and are respectively output through necessary numbers of DF/Fs. The circuit of FIG. 8 also includes an AND gate 61b, an OR gate 62b, and a register 67b.

An actual operation will be described below. One of data R', G', and B' obtained by smoothing data $R_{IN}$ b1, $G_{IN}$ b2 and $B_{IN}$ b3 is selected by the selector 51b based on a select signal $S_1$ set by the CPU 20, thereby selecting main color data. Note that the CPU 20 sets different data A and B in registers 65b and 66b, the selector 63b selects one of the data A and B in accordance with the signal Ar 10, and sends the selected data as the select signal $S_1$ to the selector 51b.

In this manner, the two registers 65b and 66b are prepared, the different data are input to the A and B inputs of the selector 63b, and one of these data is selected in accordance with the area signal Ar 10. With this arrangement, color detection can be separately performed for a plurality of areas. The area signal Ar 10 need not be a signal for only a rectangular area but can be one for a non-rectangular area.

Each of the next selectors 52$b_R$, 52$b_G$, and 52$b_B$ selects one of data $R_0$, $G_0$, or $B_0$ set by the CPU 20 and the main color data selected by the selector 51b in accordance with a select signal generated based on outputs 53ba to 53bc from a decoder 53b and a fixed color mode signal $S_2$. Note that the selectors 64$b_R$, 64$b_G$, and 64$b_B$ select one of the data A and B in accordance with the area signal Ar 20, so that they can detect different colors for a plurality of areas as in the selector 63b. In this case, the data $R_0$, $G_0$, and $B_0$ are selected in conventional color conversion (fixed color mode) and for a main color in gradation color judgement, and the main color data is selected for colors other than the main color in gradation color conversion.

An operator can desirably select fixed or gradation color judgement from an operation unit. Alternatively, the fixed or gradation color judgement can be switched in a software manner on the basis of color data (non-convened color data) input from an input device, e.g., a digitizer.

The outputs from these selectors 52$b_R$, 52$b_G$, and 52$b_B$ and upper and lower limit values of data R', G', and B' from the upper limit ratio registers 58$b_R$, 58$b_G$, and 58$b_B$ and the lower limit ratio registers 59$b_R$, 59$b_G$, and 59$b_B$ are multiplied with each other by multipliers 56$b_R$, 56$b_G$, and 56$b_B$, and 57$b_R$, 57$b_G$, and 57$b_B$, and the products are set in window comparators 60$b_R$, 60$b_G$, and 60$b_B$.

The AND gate 61b checks if main color data falls within a predetermined range, and two colors other than the main color fall within a predetermined range in the window comparators 60$b_R$, 60$b_G$, and 60$b_B$. The register 67b can set "1" according to an enable signal 68b from the judgement unit regardless of a judgement signal. In this case, a color to be converted is present in a portion which is set to be "1".

With the arrangement, fixed or gradation color judgement can be performed for a plurality of areas.

Figure 9:
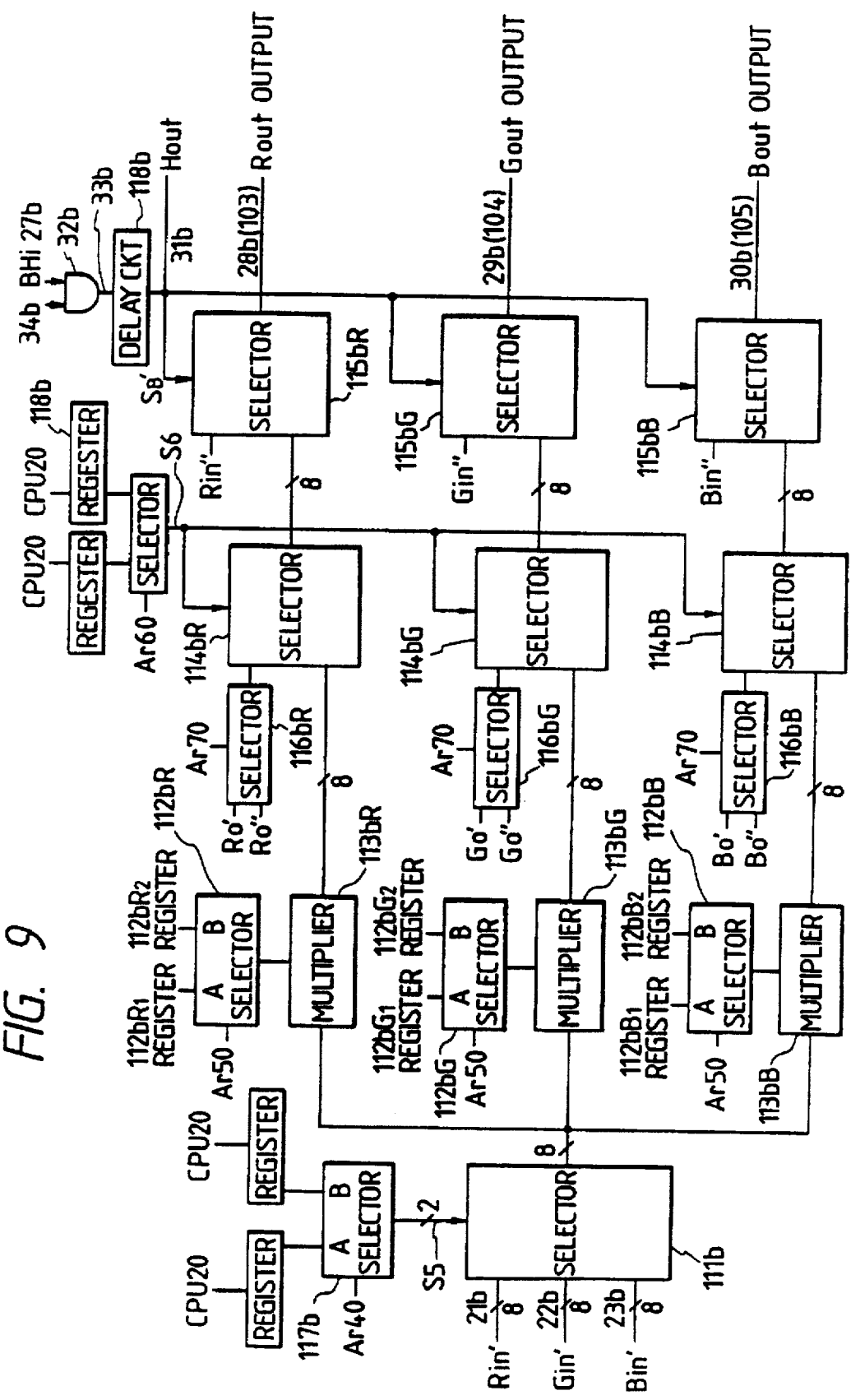
FIG. 9 is a block diagram of a color conversion circuit.

FIG. 9 is a block diagram of a color conversion circuit. This circuit selects a color-converted signal or an original signal on the basis of the output 7b from the color detection unit 5b.

In FIG. 9, the color conversion unit 25b comprises a selector 111b, registers 112$b_{R1}$, 112$b_{R2}$, 112$b_{G1}$, 112$b_{G2}$, 112$b_{B1}$, and 112$b_{B2}$ in each of which a ratio of a converted color to main color data (maximum value) is set, multipliers 113$b_R$, 113$b_G$, and 113$b_B$, selectors 114$b_R$, 114$b_G$, and 114$b_B$, selectors 115$b_R$, 115$b_G$, and 115$b_B$, an AND gate 32b, selectors 117b, 112$b_R$, 112$b_G$, 112$b_B$, 116$b_R$, 116$b_G$, and 116$b_B$ for setting data, which is set by the CPU 20 in accordance with area signals Ar 50, Ar 60, and Ar 70 generated based on the area signal Ar' 24 in FIG. 7, in the selector 111b, the multipliers 113$b_R$, 113$b_G$, and 113$b_B$, the selectors 114$b_R$, 114$b_G$, 114$b_B$, respectively, and a delay circuit 118b.

The actual operation will be described below.

The selector 111b selects one (main color) of input signals $R_{IN}'$ 21b, $G_{IN}'$ 22b, and $B_{IN}'$ 23b in accordance with a select signal S5. The signal S5 is generated such that an area signal Ar 40 causes the selector 117b to select one of A and B inputs corresponding to two data set by the CPU 20. In this manner, color conversion processing for a plurality of areas can be achieved.

The signal selected by the selector 111b is multiplied with register values set by the CPU 20 by the multipliers $113b_R$, $113b_G$, and $113b_B$. In this case, the area signal Ar 50 causes the selectors $112b_R$, $112b_G$, and $112b_B$ to select pairs of register values $112b_{R1} \cdot 112b_{R2}$, $112b_{G1} \cdot 112b_{G2}$, and $112b_{B1} \cdot 112b_{B2}$, thus also achieving color conversion processing for a plurality of areas.

Each of the selectors $114b_R$, $114b_G$, and $114b_B$ selects one of the products and a fixed value selected by the selector $116b_R$, $116b_G$, or $116b_B$ from a pair of fixed values $R_o'.R_o''$, $G_o'.G_o''$, or $B_o'.B_o''$ set by the CPU 20 in accordance with a mode signal S6. In this case, the mode signal S6 is selected by the area signal Ar 60 in the same manner as in the signal S5.

Finally, each of the selectors $115b_R$, $115b_G$, and $115b_B$ selects one of data $R_{IN}''$, $G_{IN}''$, and $B_{IN}''$ (obtained by delaying the data $R_{IN}'$, $G_{IN}'$, and $B_{IN}'$ to adjust timings) and the output from the selector $114b_R$, $114b_G$, or $114b_B$. As a result, data $R_{OUT}$, $G_{OUT}$, and $B_{OUT}$ are output. In addition, a hit signal $H_{OUT}$ is also output in synchronism with the data $R_{OUT}$, $G_{OUT}$, and $B_{OUT}$.

Figure 10:
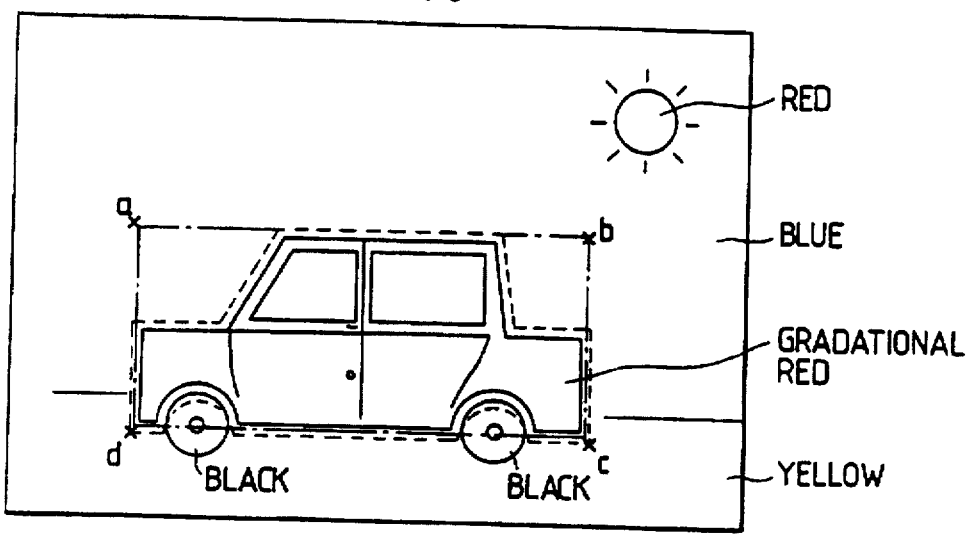
FIG. 10 is a view showing an example of color conversion.

A select signal $S_B'$ is obtained by delaying an AND product of a color judgement result 34b and a color conversion enable signal BHi 34b. As the signal BHi, for example, a non-rectangular enable signal as a dotted line in FIG. 10 is input, so that color conversion processing can be performed for a non-rectangular area. In this case, an area signal is generated on the basis of an area indicated by an alternate long and short dashed line, i.e., coordinates of an uppermost left position ("a" in FIG. 10), an uppermost right position ("b" in FIG. 10), a lowermost left position ("c" in FIG. 10), and a lowermost left position ("d" in FIG. 10). The non-rectangular area signal BHi is an area signal which is input from an input device such as a digitizer, and is developed in the 100-dpi binary memory L. When color conversion is performed using the non-rectangular enable signal, an enable area can be designated along a boundary of a portion to be converted. Therefore, a color detection threshold range can be widened as compared to conventional color conversion using a rectangle. Therefore, a detection power can be increased, and an output image subjected to gradation color conversion with high precision can be obtained.

Color conversion having a lightness according to a main color of the color detection unit 5b (for example, when red is gradation-color-converted to blue, light red is converted to light blue, and dark red is converted to dark blue) or fixed value color conversion can be desirably performed for a plurality of areas.

As will be described later, mosaic processing, texture processing, trimming processing, masking processing, and the like can be executed for only an area (non-rectangular or rectangular area) of a specific color on the basis of the hit signal $H_{OUT}$.

The area signals Ar 10, Ar 20, and Ar 30 are generated based on the area signal Ar 4b, and the area signals Ar 40, Ar 50, Ar 60, and Ar 70 are generated based on the area signal Ar' 24b. These signals are generated based on an area signal 134 from the area signal generation circuit J (FIG. 2). These signals need not always be rectangular area signals but may be non-rectangular area signals. More specifically, the non-rectangular area signal BHi stored in the 100-dpi binary memory and based on non-rectangular area information maybe used.

A method of generating the signal BHi will be described later. The signal BHi can include both rectangular and non-rectangular area signals.

As described above, according to this embodiment, since a color conversion area can be set based not only on a rectangular area signal but also on a non-rectangular area signal, color conversion processing can be executed with higher precision.

As shown in FIG. 2, the outputs 103, 104, and 105 from the color conversion circuit B are supplied to the LOG conversion circuit C for converting image data proportional to a reflectance to density data, the character/image area separation circuit I for discriminating a character area, a halftone area, and a dot area on an original, and the external apparatus interface M for causing this system to communicate data with an external apparatus through cables 135, 136, and 137.

Input color image data proportional to a light amount is input to the LOG conversion circuit C (FIG. 2) to match it with spectral luminous efficiency characteristics of human eyes.

Figure 11A:
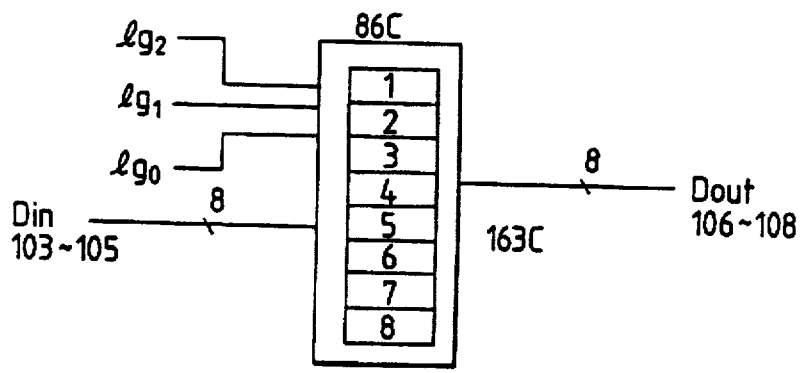
FIGS. 11A and 11B are views for explaining logarithmic conversion.
Figure 11B:
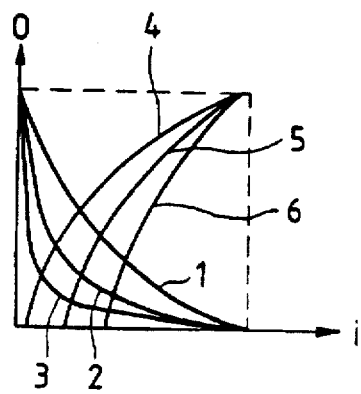

In this circuit, the data is converted so that white=$00_H$ and black=$FF_H$. Since input gamma characteristics vary depending on types of image source input to the image read sensor, e.g., a normal reflective original, a transparent original for, e.g., a film projector, a transparent original of another type, e.g., a negative film, a positive film, or a film sensitivity, or an exposure state, a plurality of LOG conversion LUTs (Look-Up Tables) are prepared, as shown in FIGS. 11A and 11B, and are selectively used according to applications. The LUTs are selected by signal lines lg0, lg1, and lg2 in accordance with an instruction input from the operation unit 1000 or the like as an I/O port. Data output for B, G, and R correspond to density values of an output image. Since signals B (blue), G (green), and R (red) correspond to toner amounts of Y (yellow), M (magenta), and C (cyan), the following image data correspond to yellow, magenta, and cyan.

A color correction circuit performs color correction of color component image data from an original image obtained by the LOG conversion, i.e., yellow, magenta, and cyan components as follows. It is known that spectral characteristics of color separation filters arranged in correspondence with pixels in the color read sensors have unnecessary transmission regions, as indicated by hatched portions in FIG. 13, and color toners (Y, M, and C) transferred to a transfer sheet have unnecessary absorption components, as shown in FIG. 14. Thus, as is well known, masking correction is executed to calculate the following linear equation of the color-component image data Yi, Mi, and Ci to perform color correction:

$$\begin{bmatrix} Y_o \\ M_o \\ C_o \end{bmatrix} = \begin{bmatrix} a_{Y1} & -b_{M1} & -c_{C1} \\ -a_{Y2} & b_{M2} & -c_{C2} \\ -a_{Y3} & -b_{M3} & c_{C3} \end{bmatrix} \begin{bmatrix} Y_i \\ M_i \\ C_i \end{bmatrix}$$

Furthermore, a black addition operation for calculating Min(Yi, Mi, Ci) (minimum value of Yi, Mi, and Ci) using Yi, Mi, and Ci, and adding a black toner based on the calculated value as a black component, and an undercolor removal (UCR) operation for decreasing amounts of color agents to be added in accordance with an amount of an added black component are often executed. FIG. 12A shows a circuit arrangement of the color correction circuit D for performing masking, black addition, and UCR. The characteristic features of this arrangement are:

(1) This arrangement has two systems of masking matrices, and these matrices can be switched at high speed according to "1/0" of one signal line.

(2) The presence/absence of UCR can be switched at high speed according to "1/0" of one signal line.

(3) This arrangement has two systems of circuits for determining a black toner amount, and these circuits can be switched at high speed according to "1/0" of a signal line.

Prior to image reading, desired first and second matrix coefficients $M_1$ and $M_2$ are set by a bus connected to the CPU 20. In this embodiment, we have:

$$M_1 = \begin{pmatrix} aY_1 & -bM_1 & -c_{C1} \\ -aY_2 & bM_2 & -c_{C2} \\ -aY_3 & -bM_3 & c_{C3} \end{pmatrix}, M_2 = \begin{pmatrix} aY_1 & -\beta M_1 & -\gamma_{C1} \\ -aY_2 & \beta M_2 & -\gamma_{C2} \\ -aY_3 & -\beta M_3 & \gamma_{C3} \end{pmatrix}$$

The matrix coefficients $M_1$ are set in registers 87d 95d, and the coefficients $M_2$ are set in registers 96d to 104d.

Each of selectors 111d to 122d, 135d, 131d, and 136d selects an A input when its S terminal="1"; select a B input when its S terminal="0". Therefore, when the matrix $M_1$ is selected, a switching signal MAREA 364 is set to be "1"; when the matrix $M_2$ is selected, the signal 364 is set to be "0".

A selector 123d obtains outputs a, b, and c based on the truth table shown in FIG. 12B according to select signals $C_0$ and $C_1$ (366d and 367d). The select signals $C_0$, $C_1$, and $C_2$ are set to be $(C_2, C_1, C_0)$=(0, 0, 0), (0, 0, 1), (0, 1, 0), and (1, 0, 0), and (0, 1, 1) for a monochrome signal in the order of, e.g., Y, M, C, and Bk, thereby obtaining desirably color-corrected color signals. Assuming that $(C_0, C_1, C_2)$= (0, 0, 0) and MAREA="1", the contents of the registers 87d, 88d, and 89d, i.e., $(a_{Y1}, -b_{M1}, -c_{C1})$ appear at the outputs (a, b, c) of the selector 123d. On the other hand, a black component signal 374d calculated by Min(Yi, Mi, Ci)=k based on the input signals Yi, Mi, and Ci undergoes linear conversion given by Y=ax–b (where a and b are constants) by a linear converter 137d, and the obtained signal is input to B inputs of subtracters 124d, 125d, and 126d. The subtracters 124d to 126d calculate Y=Yi–(ak–b), M=Mi–(ak–b), and C=Ci–(ak–b) as UCR processing, and output the results to multipliers 127d, 128d, and 129d for performing masking calculations.

The multipliers 127d, 128d, and 129d receive $(a_{Y1}, -b_{M1}, -c_{C1})$ at their A inputs, and the above-mentioned [Yi–(ak–b), Mi–(ak–b), Ci–(ak–b)]=[Yi, Mi, Ci] at their B inputs. Thus, as can be seen from FIG. 12A, $Y_{OUT}$=Yi×$(a_{Y1})$+Mi×$(-b_{M1})$+Ci×$(-c_{C1})$ is obtained under the condition of $C_2$=0 (Y or M or C). Thus, yellow image data subjected to masking color correction and UCR processing is obtained. Similarly, the following data are output to $D_{OUT}$:

$$M_{OUT}=Yi\times(-a_{Y2})+Mi\times(-b_{M2})+Ci\times(-c_{C2})$$

$$C_{OUT}=Yi\times(-a_{Y3})+Mi\times(-b_{M3})+Ci\times(-c_{C3})$$

Color selection is controlled by the CPU 20 in accordance with an output order to a color printer and the truth table shown in FIG. 12B based on $(C_0, C_1, C_2)$. Registers 105d to 107d, and 108d to 110d are used to form a monochromatic image. An output can be obtained by performing weighting addition of colors by MONO=$k_1$Yi+$l_1$Mi+$m_1$Ci.

When a Bk signal is output, $C_2$=1 according to the select signal $C_2$ (368) input to the selector 131d, that is, a Bk signal is subjected to linear conversion given by Y=cx–d by a linear converter 133d, and is output from the selector 131d. A black component signal BkMj 110 is output to an outline portion of a black character on the basis of the output from the character/image area separation circuit I (to be described later). Color switching signals $C_0'$, $C_1'$, and $C_2'$ 366 to 368 are set by an output port 501 connected to the CPU bus 22, and the signal MAREA 364 is output from the area signal generation circuit J. Gate circuits 150d to 153d control so that when DHi="1" based on the non-rectangular area signal DHi 22 read out from a binary memory (bit map memory) L537, signals $C_0'$, $C_1'$, $C_2'$="1, 1, 0", thereby automatically outputting data for a monochromatic image.

<Character/Image Area Separation Circuit>

Figure 15A:
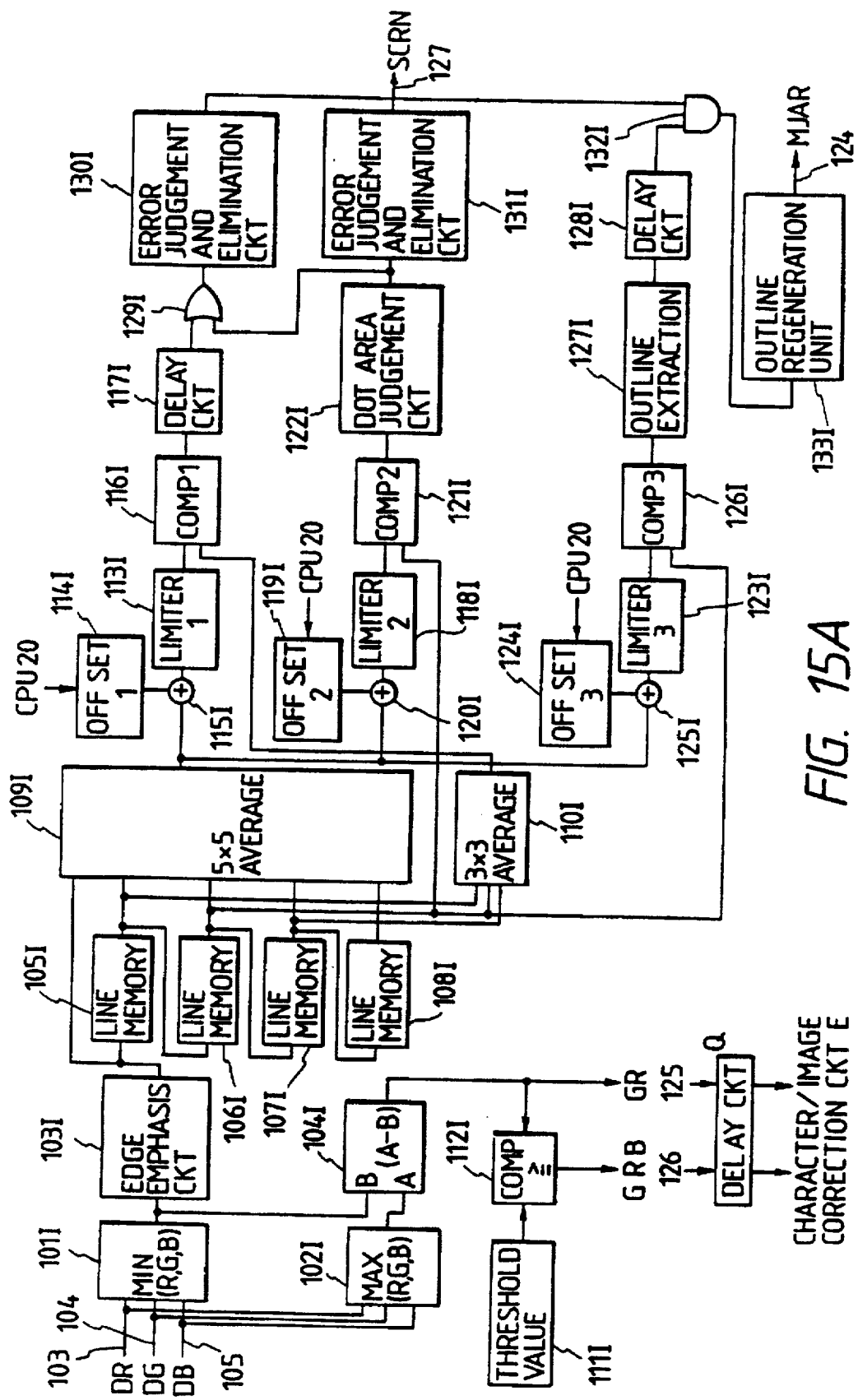
FIGS. 15A to 15C are respectively circuit diagrams and a view for explaining a character/image area separation circuit.

FIG. 15A shows the character/image area separation circuit I. The character/image separation circuit I checks using read image data if the image data represents a character or an image or in chromatic or achromatic color. The processing flow of this circuit will be described below with reference to FIGS. 15A to 15C.

The data R (red) 103, G (green) 104, and B (blue) 105 input from the color conversion circuit B to the character/image area separation circuit I are input to a minimum value detection circuit MIN(R,G,B) 101I, and a maximum value detection circuit MAX(R,G,B) 102I. These blocks select maximum and minimum values based on three different luminance signals of input R, G, and B data. A difference between the selected signals is calculated by a subtracter 104I. If the difference is large, i.e., when input R, G, and B data are not uniform, it indicates that input signals are not achromatic color signals representing black or white but chromatic color signals deviated to a certain color. Of course, when the difference is small, the R, G, and B signals are at almost the same levels, and are achromatic signals which are not deviated to a certain color. This difference signal is output to a delay circuit Q as a gray signal GR 125. This difference is compared with a threshold value arbitrarily set in a register 111I by the CPU 20 by a comparator 121I, and a comparison result is output to the delay circuit Q as a gray judgement signal GRBi 126. The phases of these signals GR 125 and GRBi 126 are matched with those of other signals by the delay circuit Q. Thereafter, these signals are input to the character/image correction circuit E (to be described later), and are used as processing judgement signals.

Meanwhile, the minimum value signal obtained by the circuit MIN(R,G,B) 101I is also input to an edge emphasis circuit 103I. The edge emphasis circuit 103I performs the following calculation using adjacent pixel data in the main scan direction, thereby performing edge emphasis:

$$D_{OUT} = \frac{9}{8} D_i - \frac{1}{16}(D_{i-1} + D_{i+1})$$

$D_{OUT}$: edge-emphasized image data
$D_i$: ith pixel data

Note that the edge emphasis is not limited to the above-mentioned method, and various other known methods may be used. Line memories for performing a delay of 2 lines or 5 lines in the sub scan direction are arranged, and a 3×3 or 5×5 pixel block is used, so that normal edge emphasis can be performed. In this case, the edge emphasis effect can be obtained not only in the main scan direction but also in the sub scan direction. Thus, the edge emphasis effect can be enhanced. With this edge emphasis, precision of black character detection (to be described below) can be effectively improved.

The image signal which is edge-emphasized in main scan direction is then subjected to average value calculations in 5×5 and 3×3 pixel windows by 5×5 and 3×3 average circuits 109I and 110I. Line memories 105I to 108I are subscan delay memories for performing average value processing. The average value of a total of 5×5=25 pixels calculated by the 5×5 average circuit 109I is added to offset values independently set in offset units connected to the CPU bus 22 by adders 115I, 120I, and 125I. The added 5×5 average values are input to a limiter 1 (113I), a limiter 2 (118I), and a limiter 3 (123I). The limiters are connected to the CPU bus 22, and limiter values can be independently set in these limiters. When the 5×5 average value is larger than a setup limiter value, an output is clipped by the limiter value. The output signals from the limiters are respectively input to a comparator 1 116I, a comparator 2 121I, and a comparator 3 126I. The comparator 1 116I compares the output from the limiter 1 113I with the output from the 3×3 average circuit 110I. The comparison output of the comparator 1 116I is input to a delay circuit 117I, so that its phase is to be matched with an output signal from a dot area judgement circuit 122I (to be described later). The signal is binarized using average values of the 5×5 and 3×3 pixel blocks in order to prevent painting and omissions caused by the MTF at a predetermined density or more, and is filtered through a 3×3 low-pass filter, so that high-frequency components of a dot image are cut so as not to detect dots of the dot image upon binarization.

The output signal from the comparator 2 (121I) is subjected to binarization with through image data so as to detect high-frequency components of an image, so that a dot area can be detected by the next dot area judgement circuit 122I. The dot area judgement circuit 122I recognizes a dot from a direction of an edge since a dot image is constituted by a set of dots, and counts the number of dots around it, thereby detecting a dot image. More specifically, the circuit 122I performs dot judgement as follows.

[Dot Judgment]

Figure 15B:
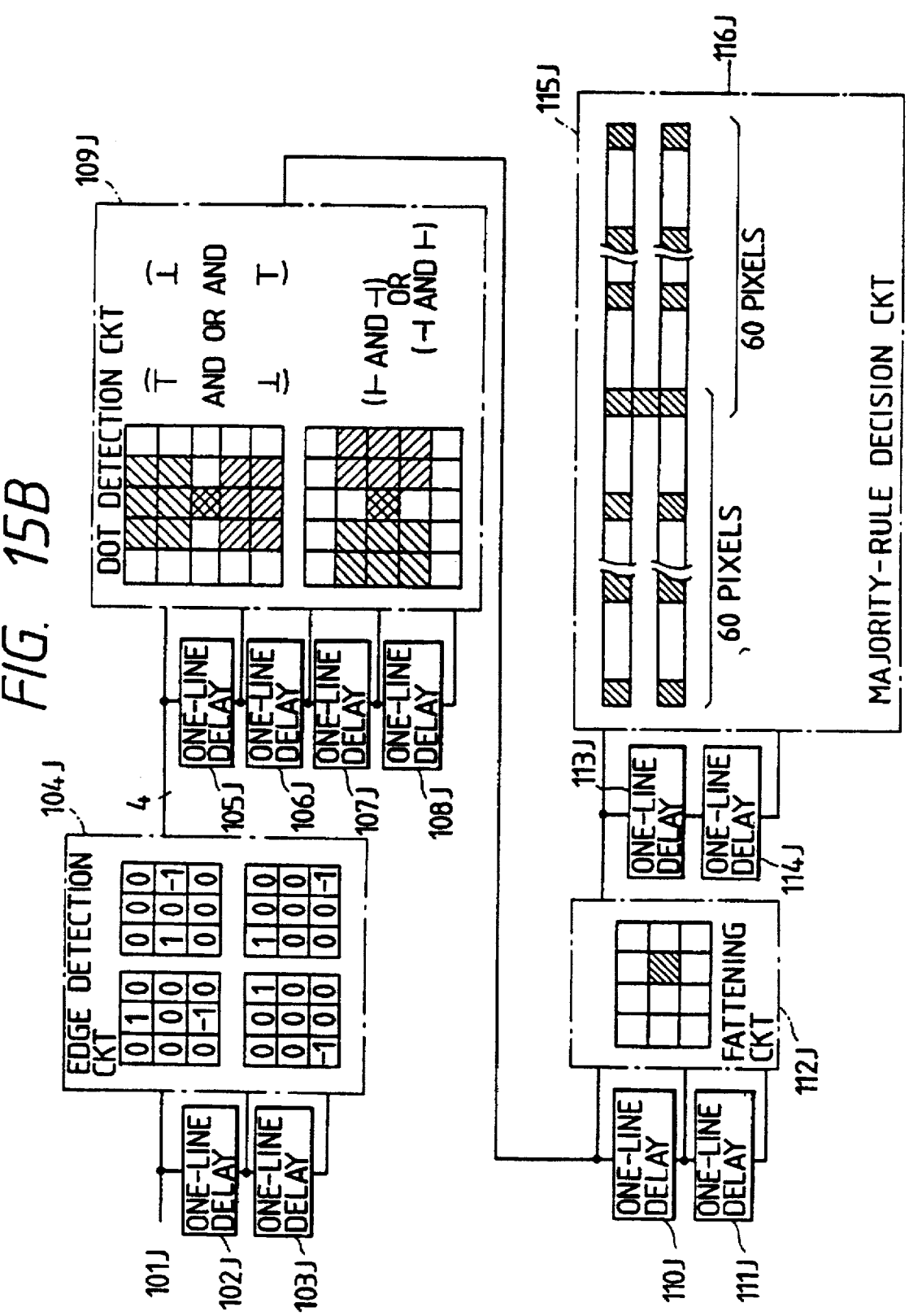

The dot area judgement circuit 122I will be described below with reference to FIG. 15B. A signal 101J binarized by the comparator 2 (121I) of the character/image area separation circuit (FIG. 15A) is delayed by one line in each of one-line delay memories (FIFO memories) 102J and 103J shown in FIG. 15B. Thus, the binary signal 101J, and the signals delayed by the FIFO memories 102J and 103J are input to an edge detection circuit 104J. The edge detection circuit 104J independently detects edge directions for a total of four directions, i.e., vertical, horizontal, and two oblique directions with respect to an objective pixel. After the edge directions are quantized in 4 bits by the edge detection circuit, the 4-bit edge signal is input to a dot detection circuit 109J and a one-line delay memory (FIFO memory) 105J. 4-bit edge signals delayed by one line each by the FIFO memory 105J, and one-line delay memories (FIFO memories) 106J, 107J, and 108J are input to the dot detection circuit 109J. The dot detection circuit 109J judges based on surrounding edge signals whether or not an objective pixel is a dot. For example, as indicated by hatched portions in the dot detection circuit 109J in FIG. 15B, a total of seven pixels ■■ of previous two lines including an objective pixel include at least one pixel corresponding to an edge in a ⊥ direction (a density gradient is present in a direction of the objective pixel), and a total of seven pixels (■■ pixels) of the following two lines including the objective pixel include at least one pixel corresponding to an edge in a ⊤ direction (a density gradient is present in the direction of the objective pixel). In addition, when there are edges of ⊢ and ⊣ or ⊣ and ⊢ in the horizontal direction, it is determined as a dot. A dot is determined when ⊤ and ⊥. After the dot judgement result is similarly delayed by one-line delay memories 110J and 111J, the delayed results are fattened by a fattening circuit 112J. When there is at least one pixel which is determined as a dot in a total of 12 pixels (=3 lines×4 pixels), the fattening circuit 112J judges the objective pixel as a dot regardless of the judgement result of the objective pixel. The fattened dot judgement result is delayed by one line by each of one-line delay memories 113J and 114J. The output from the fattening circuit 112J and the signal delayed by a total of two lines by the one-line delay memories 113J and 114J are input to a majority-rule decision circuit 115J. The majority-rule decision circuit 115J samples every four pixels from lines before and after a line including the objective pixel. The circuit 115J samples pixels from 60-pixel widths on the right and left sides of the objective pixel, that is, samples 15 pixels each from the right and left pixel widths, i.e., a total of 30 pixels from two lines, thereby calculating the number of pixels which are judged as dots. If the calculated value is larger than a preset value, it can be determined that the objective pixel is a dot.

In the copying machine of this embodiment, a moving speed of the image reading unit of the image reader is changed according to a magnification in the sub scan direction (sheet feed direction). In this case, in order to perform accurate dot judgement, FIFO memory control of the one-line delay memories 102J, 103J, 105J, 106J, 107J, 108J, 110J, 111J, 113J, and 114J is performed up to a predetermined magnification such that write access is made for one of two lines, and now rite access is made for the other line.

Since the write access of the FIFO memories is controlled in this manner, dot judgement can be performed using an equi-magnification image even in a zoom mode. Thus, judgement precision in the zoom mode can be improved. The types of filters for edge detection, the sizes of matrices of the dot detection circuits, the fattening circuit, and the majority-rule decision circuit are not limited to those described in the above embodiment, and sub scan thinning in the zoom mode may be performed every three lines. Thus, various modifications may be made.

Figure 15C:
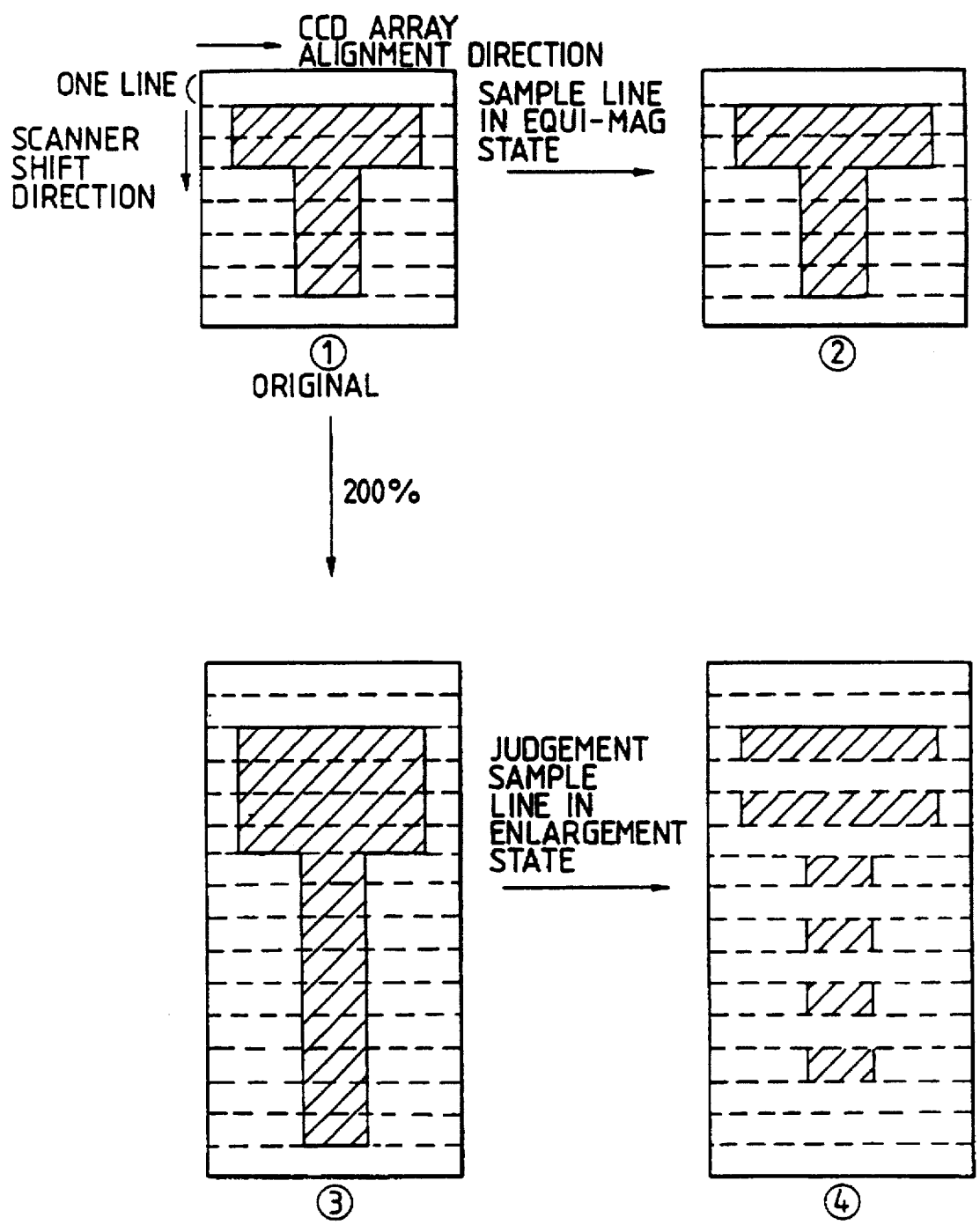

Sampling in an enlargement state will be described below with reference to FIG. 15C. ① of FIG. 15C shows an original image. When an image is read at an equi-magnification, an original image is read within dotted lines shown in ① in FIG. 15C. This image is continuously written in the FIFO memories in units of lines. More specifically, as shown in ② in FIG. 15C, all the line data are written in the FIFO memories without omissions. An enlargement state will be described below. For the sake of simplicity, a 200% enlargement state will be described. As described above, the moving speed of the reading unit is decreased in the enlargement state. For this reason, in the 200% enlargement state, the moving speed is halved, and a one-line image is read by a width half a one-line width. ③ in FIG. 15C shows a read image in correspondence with an original image.

As shown in ④ in FIG. 15C, the read image data is written in the FIFO memories in the same manner as in the equi-magnification state. In this state, write access of the FIFO memories is performed while data is thinned every other lines, as shown in ④ in FIG. 15C.

In this embodiment, the 200% enlargement state has been described. Write access is performed once per two lines. This write method can be modified according to a magnification in the zoom mode.

The judgement result from the dot area judgement circuit 122I and the signal from the delay circuit 117 are locally ORed by an OR gate 129I. An error judgement is eliminated from the logical sum by an error judgement and elimination circuit 130I, and the obtained signal is output to art AND gate 132I. The OR gate 129I outputs a judgement signal which is judged as a halftone area or a dot area. By utilizing a characteristic that a small area is present in a character, and a large area is present in an image such as a photograph, the error judgement and elimination circuit 130I thins an image area, and eliminates isolated image areas. More specifically, if there is at least one pixel other than that of an image such as a photograph within a 1 (mm)×1 (mm) area around a central pixel xij, it is determined that the central pixel falls outside an image area. More specifically, binary signals within the area are logically ANDed, and only when all "1"s are obtained, the central pixel xij=1 is set. After isolated image areas are removed in this manner, the fattening processing is executed to recover the thinned image area. More specifically, if there is at least one pixel of an image area such as a photograph within a 2 (mm)×2 (mm) area, the central pixel xij is determined as an image area. In the fattening processing, thinned binary signals are logically ORed within the area, and when at least one pixel is "1" (image area), the central pixel xij=1 is set.

The error judgement and elimination circuit 130I outputs an inverted signal of the fattened binary signal. The inverted signal serves as a mask signal of halftone and dot images.

Similarly, the output from the dot area judgement circuit 122I is directly input to an error judgement and elimination circuit 131I and is subjected to thinning processing and fattening processing.

Note that the mask size of the thinning processing is set to be equal to or smaller than that of the fattening processing, so that the fattened judgement result can cross. More specifically, in both the error judgement and elimination circuits 130I and 131I, after thinning processing using a 17×17 pixel mask, another thinning is executed using a 5×5 pixel mask. Thereafter, fattening processing is executed using a 34×34 pixel mask. An output signal SCRN 127 from the error judgement and elimination circuit 131I serves as a judgement signal for executing smoothing processing of only a dot judgement portion in the character/image correction circuit E (to be described later) and for preventing moiré of a read image.

An output signal from the comparator 3 126I is subjected to outline extraction so as to obtain a sharp character in the next circuit. As an extraction method, the binarized output of the comparator 3 126I is subjected to thinning processing and fattening processing using a 5×5 pixel block, and a difference between the fattened and thinned signal is determined as an outline. An outline signal extracted in this manner is input to a delay circuit 128I so that its phase is matched with the mask signal output from the error judgement and elimination circuit 130I. Thereafter, a portion of the outline signal, which is judged as an image, is masked by the mask signal by an AND gate 132I, thereby outputting an outline signal of an original character portion. The output from the AND gate 132I is output to an outline regeneration unit 133I.

The reason why average values in the 5×5 and 3×3 windows are calculated, as described above, is to detect a halftone area. The matrix sizes and window sizes are not limited to those described above, and average values of two different areas including an objective pixel need only be calculated.

The matrix sizes of the thinning processing and fattening processing in the error judgement and elimination circuits 130I and 131I can also be arbitrarily set.

As described above, according to the outline edge extraction algorithm of this embodiment, not only a frame signal is extracted but also it is logically ANDed with a mask signal based on a halftone or dot signal. Thus, character/image areas can be separated with high precision.

Since appropriate offsets can be set in average values of 5×5 pixel blocks used in detection of halftone, dot, and character areas by the CPU 20, these areas can be precisely detected.

Furthermore, according to this embodiment, since the output signal from the dot area judgement circuit and a binary signal indicating a dot or halftone area are subjected to thinning processing and fattening processing to eliminate error judgement, an error judgement portion can be eliminated from the area signal, and image area separation can be performed with high precision.

Since a signal used in character/image area separation is the Min(R,G,B) signal, three colors, i.e., R, G, and B information can be effectively used as compared to a case wherein a luminance signal Y is used. In particular, character/image separation in a yellowish image can be performed with high precision.

Since the edge-emphasized Min(R,G,B) signal is subjected to character/image area separation, a character portion can be easily detected, and error judgement can be easily prevented.

<Outline Regeneration Unit>

The outline regeneration unit 133I executes processing for converting a pixel which is not judged as a character outline portion into a character outline portion based on information of surrounding pixels, and sends a resultant MjAr 124 to the character/image correction circuit E to execute processing, as will be described later.

More specifically, as shown in FIGS. 16A to 16E, as for a thick character (FIG. 16A), a dotted line portion in FIG. 16B is judged as a character portion, and is subjected to processing to be described later. As for a thin character (FIG. 16C), however, a character portion is judged like a dotted line portion in FIG. 16D, and gaps are formed in the character portion, as indicated by hatching in FIG. 16D. Therefore, if such a character is subjected to the processing to be described later, error judgement occurs, and the obtained character is not easy to read. In order to prevent this, outline regeneration processing for converting a portion which is not determined as a character into a character portion based on surrounding information is performed. More specifically, hatched portions are determined as character portions, so that the character portions can be regenerated, as shown in FIG. 16E. As a result, error judgement can be eliminated for characters in colors which are not easy to detect or for thin characters, and image quality can be improved.

FIGS. 17A to 17H show how to regenerate an objective pixel in a character portion using surrounding information. In FIGS. 17A to 17D, an objective pixel is determined as a character portion regardless of its information when two pixels vertically, horizontally, or obliquely adjacent to an objective pixel in a 3×3 pixel block are character portions (both $S_1$ and $S_2$="1"). In FIGS. 17E to 17H, an objective pixel is determined as a character portion regardless of its information when two pixels adjacent to those horizontally, vertically, or obliquely adjacent to an objective pixel in a 5×5 pixel block are character portions (both $S_1$ and $S_2$="1"). In this manner, two stages (a plurality of types of blocks) of structures can overcome errors in a wide range. The size and number of pixel blocks, and types of filter can be variously modified. For example, a 7×7 pixel block may be employed.

Figure 18:
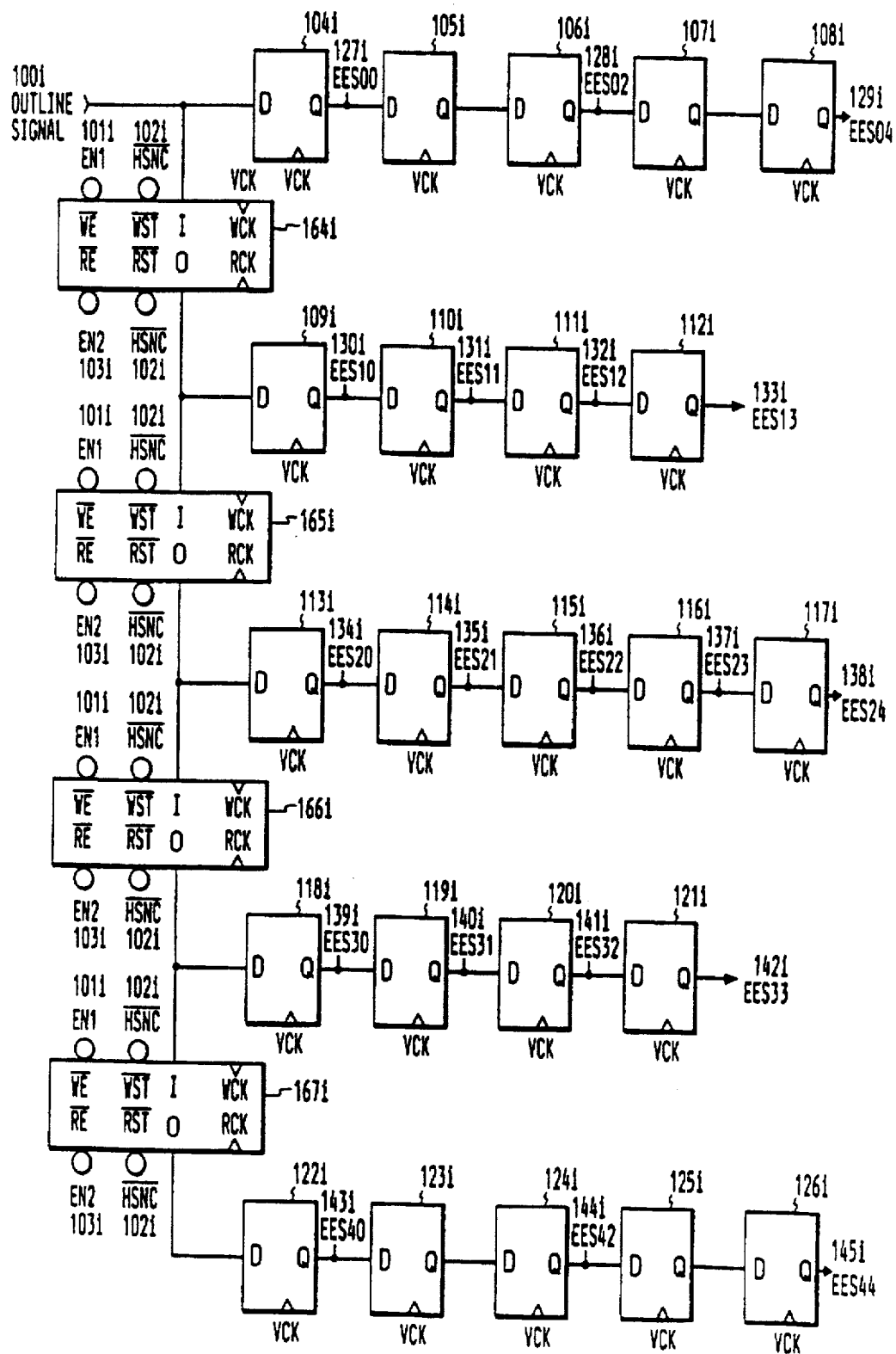
FIG. 18 is a circuit diagram of an outline regeneration circuit.
Figure 19:
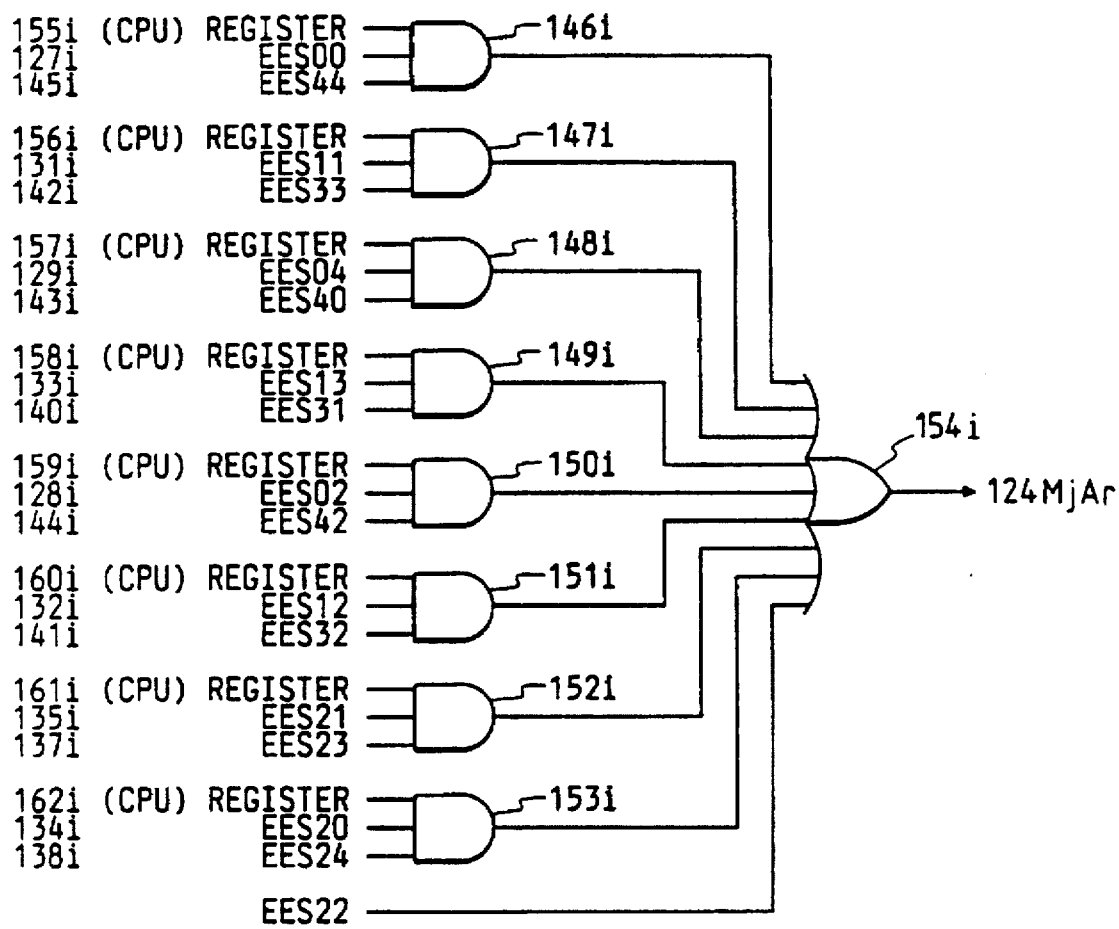
FIG. 19 is a circuit diagram of the outline regeneration circuit.

FIGS. 18 and 19 show the outline regeneration unit for realizing the processing shown in FIGS. 17A to 17H. The circuit shown in FIGS. 18 and 19 comprises line memories 164i to 167i, DF/Fs 104i to 126i for obtaining information around an objective pixel, AND gates 146i to 153i for realizing FIGS. 17A to 17H, and an OR gate 154i.

The four line memories and the 23 DF/Fs extract information of the pixels $S_1$ and $S_2$ in FIGS. 17A to 17H. The AND gates 146i to 153i can be independently enabled/ disabled by registers 155*i* to 162*i* corresponding to operations of FIGS. 17A to 17H. Note that signals of the registers are controlled by the CPU 20.

The correspondences between the AND gates 146*i* to 153*i* and FIGS. 17A to 17H are as follows:

```
146i - Fig. 17E
147i - Fig. 17A
148i - Fig. 17G
149i - Fig. 17C
150i - Fig. 17F
151i - Fig. 17B
152i - Fig. 17D
153i - Fig. 17H
```

Figure 20:
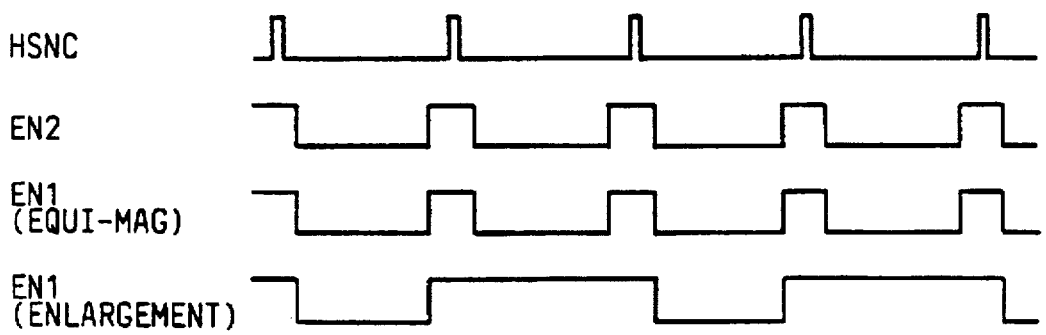
FIG. 20 is a timing chart of signals EN1 and EN2.

FIG. 20 shows a timing chart of a signal $\overline{WE}$ (EN1) and a signal $\overline{RE}$ (EN2) of the line memories 164*i* to 167*i*. The signals EN1 and EN2 are generated at the same timing in an equi-magnification mode, and the signal $\overline{WE}$ is written once per two thinned lines in an enlargement mode (e.g., 200% to 300%). A thinning amount can be arbitrarily determined. Thus, the sizes of FIGS. 17A to 17H can be expanded. In the enlargement mode, information is input to the line memories as an image enlarged in only the sub scan direction. Thus, the sizes of FIGS. 17A to 17H are expanded, so that processing can be executed using an equi-magnification image even in the enlargement mode.

FIGS. 17I to 17N are views for explaining this in more detail. FIG. 17I shows a shape of an outline regeneration filter of a 3×3 pixel block in an equi-magnification mode. When A=B=1 or C=D=1 or E=F=1, an objective pixel is forcibly set to be 1, i.e., a character outline.

FIG. 17J shows a shape of an 200% outline regeneration filter, and corresponds to a 3×3 pixel block in the equi-magnification mode. This block is generated as described above. A to F respectively correspond to A' to F'. That is, A' to F' are set every other lines in the sub scan direction, so that character/image areas can be separated under the same condition as in the equi-magnification mode even in a zoom mode.

FIGS. 17H to 17N show practical applications. Assume that FIG. 17M shows an input of the outline regeneration unit in the equi-magnification mode, and FIG. 17N shows an input in a 200% mode. When FIG. 17I is applied to FIG. 17N, since E=F=I, $\hat{1}$ can become "1", and an outline shown in FIG. 17K can be obtained. On the other hand, when FIG. 17J is applied to FIG. 17N, since E'=F'=1, ①' and ①" become "1", and an outline shown in FIG. 17L is obtained. In the enlargement mode, an outline regeneration block is formed using thinned data to execute regeneration processing, so that outline regeneration having the same detection power can be performed in both the 200% enlargement mode and the equi-magnification mode.

In this embodiment, 200% enlargement has been exemplified. The same processing can be executed when a magnification is changed.

<Character/Image Correction Circuit>

The character/image correction circuit E executes the following processing for a black character, a color character, a dot image, and a halftone image on the basis of the judgement signal generated by the character/image area separation circuit L.

[Processing 1] Processing for Black Character

[1-1] The signal BkMj 112 obtained by black extraction is used as a video signal.

[1-2] Y, M, and C data are subjected to subtraction according to the multi-value achromatic signal GR 125 or a setup value. Bk data is subjected to addition according to the multi-value achromatic signal GR 125 or a setup value.

[1-3] Edge emphasis is executed.

[1-4] A black character is printed at a high resolution of 400 lines (400 dpi).

[1-5] Color residual removal processing (to be described later) is executed.

[Processing 2] Processing for Color Character

[2-1] Edge emphasis is executed.

[2-2] A color character is printed at a high resolution of 400 lines (400 dpi).

Processing [3] Processing for Dot Image

[3-1] Smoothing (two pixels in the main scan direction in this embodiment) is executed to take a moiré countermeasure.

[Processing 4] Processing for Halftone Image

[4-1] Selection of smoothing (two pixels each in the main scan direction) or through processing can be enabled.

A circuit for executing the above processing operations will be described below.

FIG. 21 is a block diagram of the character/image correction unit E.

The circuit shown in FIG. 21 comprises a selector 6*e* for selecting a video input signal 111 or BkMj 112, an AND gate 6*e*' for generating a signal for controlling the selector, a block 16*e* for performing color residual removal processing (to be described later), an AND gate 16*e* for generating an enable signal of the removal processing, a multiplier 9*e*' for multiplying the signal GR 125 and a setup value 10*e* of an I/O port, a selector 11*e* for selecting a product 10*e*' or a setup value 7*e* of an I/O port in accordance with an output 12*e* of an I/O port 3, a multiplier 15*e* for multiplying an output 13*e* from the selector 6*e* with an output 14*e* from the selector 6*e*, an XOR gate 20*e* for logically XORing a product 18*e* and an output 9*e* from an I/O port 4, an AND gate 22*e*, an adder/subtracter 24*e*, line memories 26*e* and 28*e* for delaying one-line data, an edge emphasis block 30*e*, a smoothing block 31*e*, a selector 33*e* for selecting through data or smoothing data, a delay circuit 32*e* for performing synchronization of a control signal SCRN 127 of the selector 33*e*, a selector 42*e* for selecting an edge-emphasis or smoothing result, a delay circuit 36*e* for performing synchronization of a control signal MjAr 124 of the selector 42*e*, an OR gate 39*e* for logically ORing an output 37*e* from the delay circuit 36*e* and an output from an I/O port 8, an AND gate 41*e*, an inverter circuit 44*e* for outputting a high-resolution 400-line (dpi) signal ("L" output) to a character judgement unit, an AND gate 46*e*, an OR gate 48*e*, and a delay circuit 43*e* for performing synchronization between a video output 113 and a signal LCHG 49*e*. The character/image correction unit E is connected to the CPU bus 22 through an I/O port 1*e*.

Three sections, i.e., [1] a section for performing color residual removal processing for removing a color signal remaining around an edge of a black character portion, and performing subtraction of Y, M, and C data of a black character judged portion at a predetermined ratio, and addition of Bk data at a predetermined ratio, [2] a section for selecting edge emphasis for a character portion, smoothing for a dot judged portion, and through data for other halftone images, and [3] a section for setting the signal LCHG at "L" level (for performing printing at a high resolution of 400 dpi) will be described below.

[1] Color Residual Removal Processing and Addition/Subtraction Processing

In this section, processing for a portion where both the signal GRBi 126 as an achromatic color and the signal MjAr 124 as a character portion are active, i.e., for a black character edge portion and its surrounding portion, that is, removal of Y, M, and C components falling outside the black character edge portion and black addition of an edge portion are executed.

A detailed operation will be described below.

This processing is executed only when a character portion is judged (MjAr 124="1"), a black character is determined (GRBi 126="1"), and a printing mode is a color mode (DHi 122="0"). Therefore, this processing is not executed in an ND (black and white) mode (DHi="1") or for a color character (GRBi="0").

In an original scan mode of one of Y, M, and C data of recording colors, the video input 111 is selected by the selector 6e shown in FIG. 21 ("0" is set in an I/O-6 (5e)). The components 15e, 20e, 22e, and 17e generate data to be subtracted from video data 8e.

For example, if "0" is set in the I/O-3 12e, the output data 13e from the selector 6e is multiplied with a value set in the I/O-7 17e and selected by the selector 11e by the multiplier 15e. In this case, the data 18e 0 to 1 times the data 13e is generated. When "1" is set in registers 9e and 25e, data of complementary number of 2 of the data 18e are generated by the components 17e, 20e, and 22e. Finally, data 8e and 23e are added by the adder/subtracter 24e. In this case, however, since the data 23e is a complementary number of 2, subtraction of 17e–8e is actually performed, and a difference is output as 25e'.

When "1" is set in the I/O-3 12e, the selector 11e selects B data.

In this case, a product obtained by multiplying the multi-value achromatic signal GR 125 (which has a larger value when it is closer to an achromatic color) generated by the character/image area separation circuit I with a value set in the I/O-2 10e by the multiplier 9e is used as a multiplicator of the data 13e. When this mode is used, coefficients can be independently changed in units of colors Y, M, and C, and a subtraction amount can be changed according to achromaticity.

When a recording color Bk is scanned, the selector 6e selects the signal BkMj 112 ("1" is set in the I/O-6 5e). The components 15e, 20e, 22e, and 17e generate data to be added to the video data 8e. A difference from the Y, M, or C scan mode is that "0" is set in the I/O-4 9e. Thus, since 23e=8e and Ci=0, 17e+8e can be output as 25e'. The coefficient 14e is generated in the same manner as in the Y, M, or C scan mode. In a mode wherein "1" is set in the I/O-3 12e, a coefficient is changed according to achromaticity. More specifically, when the achromaticity is large, an addition amount becomes large; otherwise, it becomes small.

FIGS. 22A to 22D illustrate this addition/subtraction processing. FIGS. 22A and 22C show an enlarged hatched portion of a black character N illustrated in FIG. 22A-1. For video data Y, M, or C, a portion where a character signal portion is "1" is subtracted from the video data (FIG. 22B), and for video data Bk, a portion where a character signal portion is "1" is added to the video signal portion (FIG. 22D). In FIGS. 22A to 22D, 13e=18e, i.e., Y, M, or C data of a character portion is "0", and Bk data is twice the video data.

With this processing, an outline portion of a black character is printed in an almost single black color. Portions indicated by marks "*" in FIG. 22B of Y, M, or C data falling outside an outline signal remain as residual color portions around a character, and present poor appearance.

In color residual removal processing, the residual color portions are removed. In this processing, for a portion which falls within a range of an expanded area of a character portion, and where the video data 13e is smaller than a value to be compared set by the CPU 20, i.e., a pixel having a possibility of a color residue outside a character portion, a minimum value of three or five pixels around the pixel is calculated.

This processing will be described below using the following circuit.

Figure 23:
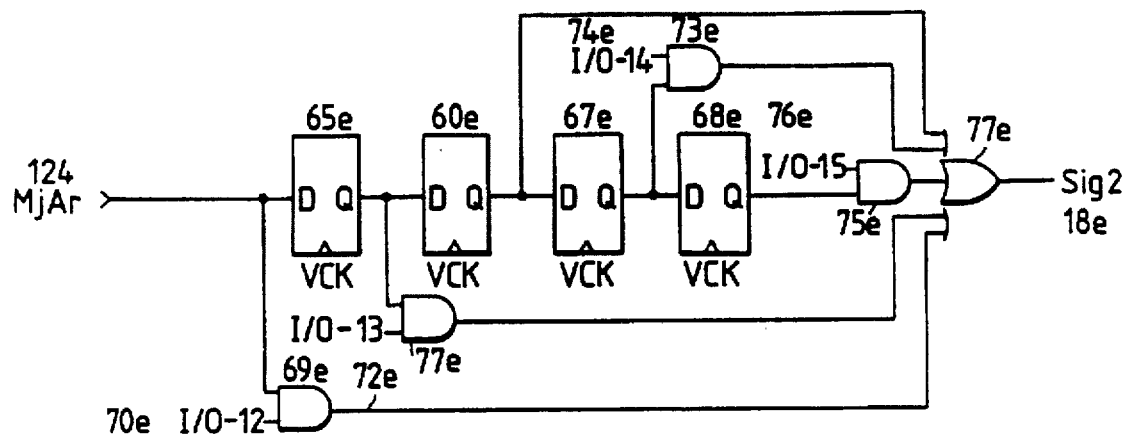
FIG. 23 is a circuit diagram of a switching signal generation circuit.

FIG. 23 shows a character area expansion circuit for expanding an area of a character portion, and comprises DF/Fs 65e to 68e, AND gates 69e, 71e, 73e, and 75e, and an OR gate 77e.

When "1" is set in all I/O ports 70e, 72e, 74e, and 76e, a signal expanded by two pixels on both sides in the main scan direction is output as Sig2 18e if the signal MjAr 124="1". When "0" is set in the I/O ports 70e and 75e and "1" is set in the I/O ports ? 1e and 73e, a signal expanded by one pixel on both sides in the main scan direction is output as Sig2 18e. This switching signal is input to the AND gate 16e' shown in FIG. 21.

The color residual removal circuit 16e will be described below.

Figure 24:
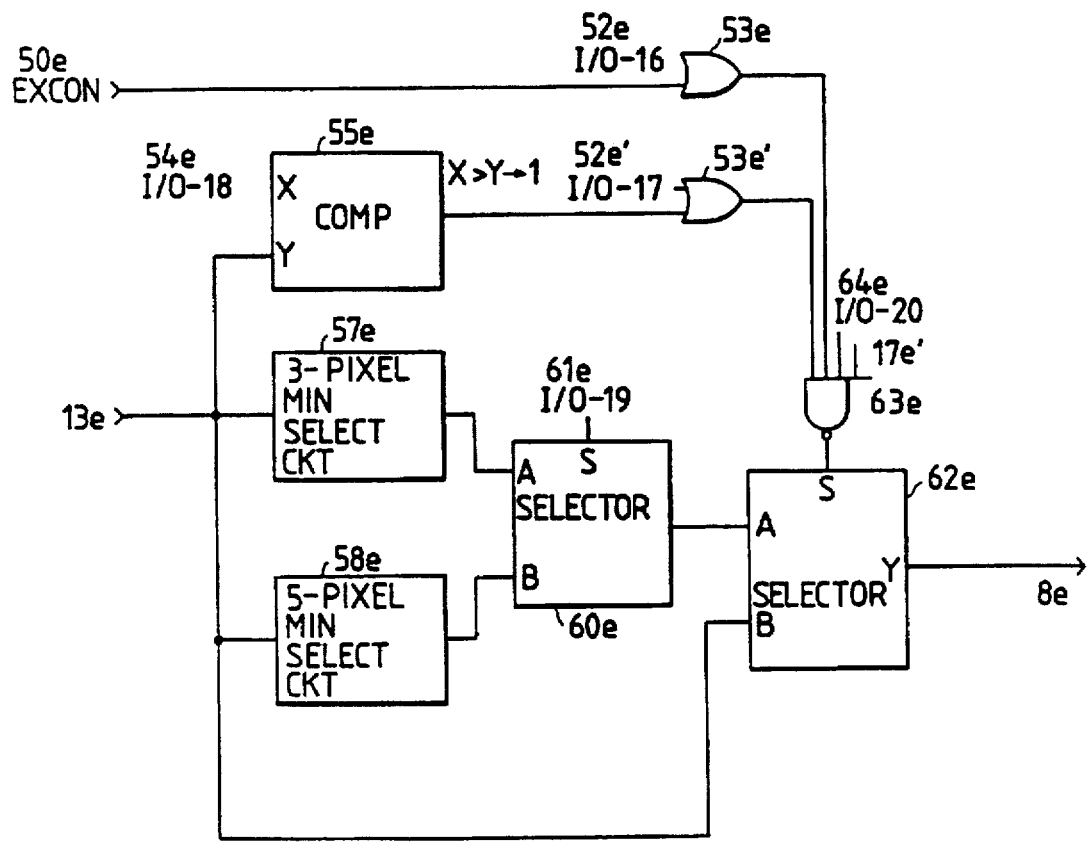
FIG. 24 is a color residual removal processing circuit.

FIG. 24 is a circuit diagram of the color residual removal processing circuit.

The circuit shown in FIG. 24 comprises a 3-pixel min select circuit 57e for selecting a minimum value of a total of three pixels, i.e., an objective pixel and two adjacent pixels from the input signal 13e, a 5-pixel min select circuit 58e for selecting a minimum value of a total of five pixels, i.e., an objective pixel and two pixels on both sides of the objective pixel from the input signal 13e, a comparator 55e for comparing the input signal 13e and an I/O-18 (54e), and outputting "1" when the I/O-18 54e is larger than the signal 13e, selectors 61e and 62e, OR gates 53e and 53e', and a NAND gate 63e.

In this arrangement, the selector 60e selects the 3- or 5-pixel minimum value in accordance with the value of an I/O-19 from the CPU bus 22. The 5-pixel minimum value can enhance a color residual removal effect. The minimum values can be selected in manual selection by an operator or in automatic selection by the CPU. The number of pixels for which the minimum value is to be calculated can be arbitrarily set.

The selector 62e selects an A input when the output from the NAND gate 63e is "0", i.e., when the comparator 55e determines that the video data 13e is smaller than the register value 54e and an input 17e' is "1"; otherwise, it selects a B input (in this case, registers 52e and 64e are "1", and a register 52e' is "0").

When the B input is selected, through data is output as the data 8e.

An EXCON 50e can be used in place of the comparator 55e when a signal obtained by binarizing a luminance signal is input.

When the above-mentioned color residual removal processing is executed, color misregistration around a character can be removed, and a clearer image can be obtained.

FIGS. 25A to 25F show a portion subjected to the above-mentioned two processing operations. FIG. 25A shows a black character N, and FIG. 25B shows an area which is judged as a character in Y, M, or C data as density data. That is, character judged portions (*2, *3, *6, and *7) become "0" by subtraction processing, and portions *1 and *4 are respectively set to be *1←*0 and *4←*5 by the color residual removal processing, i.e., consequently become "0", thus obtaining a portion illustrated in FIG. 25C.

For Bk data shown in FIG. 25D, only addition processing is performed for character judged portions (*8, *9, *10, and *11), thereby obtaining an output with a clear black outline.

For a color character, no modification is made, as shown in FIG. 25F.

[2] Edge Emphasis or Smoothing Processing

In this section, processing for executing edge emphasis for a character judged portion, smoothing processing for a dot portion, and outputting through data for other portions is executed.

Character portion→Since MjAr 124="1", a selector 42e selects an output of an edge emphasis circuit 30e, which is generated based on signals on three lines 25e, 27e, and 29e, and outputs the selected output. Note that edge emphasis is executed based on a matrix and a formula shown In FIG. 26.

Figures 26, 27:
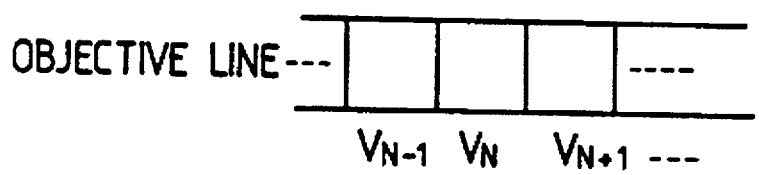
FIG. 26 is a view showing edge emphasis processing.
FIG. 27 is a view showing smoothing processing.

Dot portion→Since SCRN 35e="1" and MjAr 21e="0", a signal 27e is subjected to smoothing by a smoothing circuit 31e, and the smoothed signal is selected by and output from a selector 33e and the selector 42e. Note that smoothing is processing for, when an objective pixel is $V_N$, as shown in FIG. 27, determining $(V_N+V_{N+1})/2$ as data of $V_N$, i.e., smoothing of main scan two pixels. Thus, moiré noise which may be generated in a dot portion can be prevented.

Other portions→Other portions mean portions which are neither a character portion (character outline) nor a dot portion, i.e., halftone portions. In this case, since both MjAr 124 and SCRN 35e="0", the data 27e is directly output as the video output 113.

When a character is a color character, the above-mentioned two processing operations are not performed even for a character judged portion.

In this embodiment, the color residual removal processing is executed in only the main scan direction. However, this processing may be executed in both the main and sub scan directions.

The types of edge emphasis filter are not to those described above.

Smoothing processing may also be executed in both the main and sub scan directions.

[3] Processing for Outputting Character Portion
High Resolution of 400 Lines (dpi)

A signal LCHG is output from a gate 48e in synchronism with the video output 113. More specifically, an inverted signal of the signal MjAr 124 is output in synchronism with a signal 43e. For a character portion, LCHG (200/400 switching signal)=0, and for other portions, LCHG="1".

A character judged portion, more specifically, a character outline portion is printed by a laser beam printer at a high resolution of 400 lines (dpi), and other portions are printed with multigradation of 200 lines.

Figure 25G:
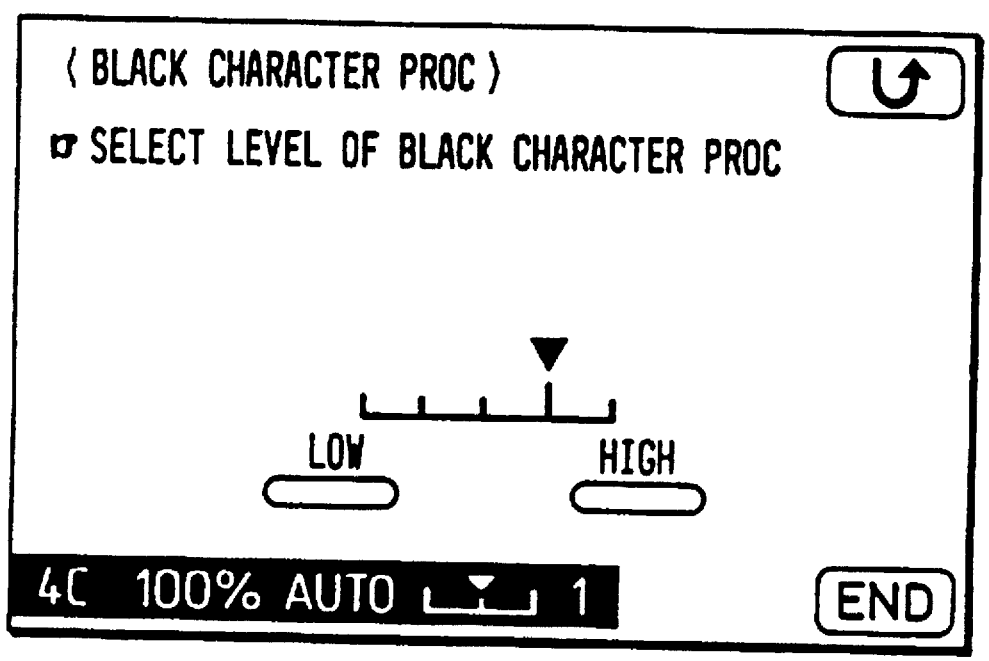

FIG. 25G shows a soft key screen of a liquid crystal touch panel 1109 of the operation unit 1000 for changing conditions of character/image separation processing. In this embodiment, five conditions can be selected by a soft key. The soft key has positions "low", "−2", "−1", "normal", and "high" from the left-hand side of FIG. 25G. These positions will be described in detail below.

[Low]

The position "low" is used to avoid error judgement which inevitably occurs when an original from which line images end the like cannot be discriminated is copied. At this position, a limiter value of the limiter 123I shown in FIG. 15A is set to be an appropriate value.

Figure 25H:
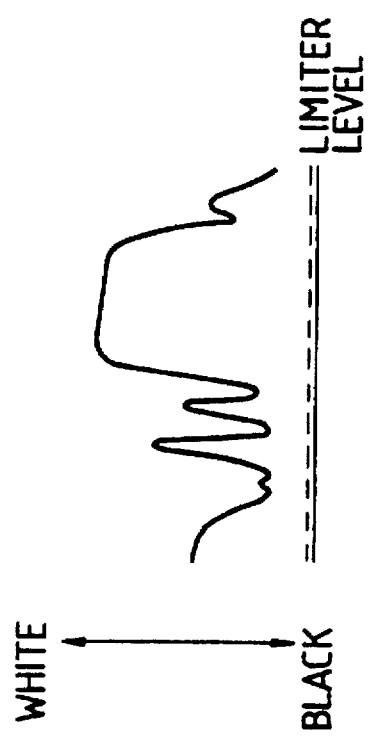
Figure 25I:
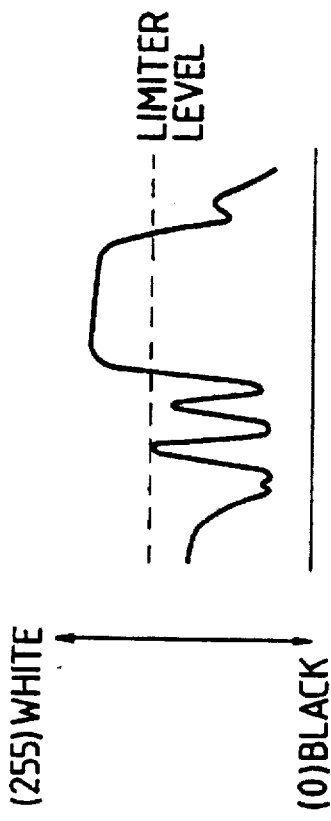
Figure 25J:
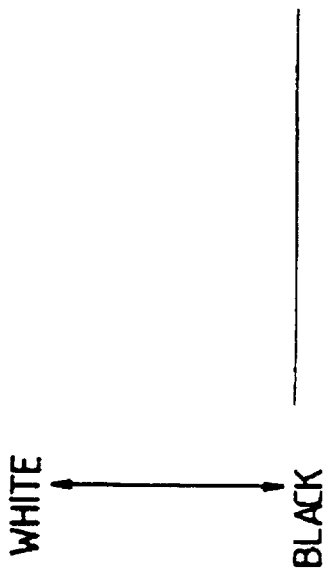
Figure 25K:
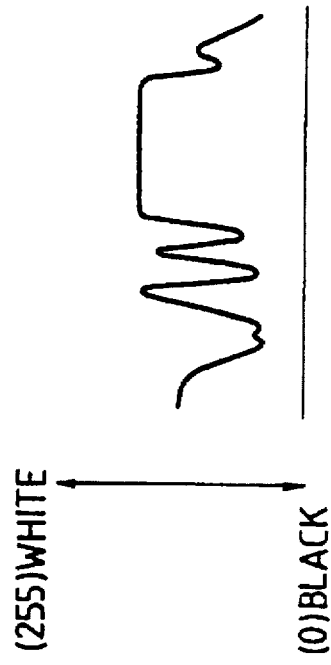

As shown in FIG. 25H, at the position "normal", a limiter level is present in a bright portion of an original (limiter value=158 in this embodiment). An output exceeding this limiter value is clipped to the limiter value, as shown in FIG. 25I. When the position "low" is selected, the limiter level is set to be "0", as shown in FIG. 25J, and all the outputs are clipped to "0" (FIG. 25K). For this reason, an output binarized by the comparator 3 (126I) shown in FIG. 15A is all "1"s (or all "0"s), and no outline is extracted. As a result, no black character processing described above is executed for the read image signal. In this manner, the position "low" can prevent generation of an outline signal, thereby preventing processing of a portion subjected to image area separation.

[−2] [−1]

At the positions "−2" and "−1", error judgement of an original including both characters and images is made inconspicuous. In a normal original copying mode, the resolution switching signal LCHG is controlled so that an outline portion of a black character of a character portion is printed in single black color at a high resolution. At the positions "−2" and "−1", the resolution switching signal is controlled in the same manner as for all other image portions, a black character is not printed in single black color, and a ratio of Y, M, and C data is increased as the value of the position is decreased like "−1" and "−2". Thus, control is made to decrease an image difference of processed images according to a judgement result.

This will be described below with reference to FIGS. 25L to 25P. FIG. 25L shows read image data which becomes dark as a value is increased, and becomes light as a value is decreased. In image area separation of this embodiment, processing is performed for two pixels of an outline portion, as shown in FIG. 25L. When a soft lever displayed on the touch panel is at the positions [normal] and [high], a ratio of an outline portion is increased, so that for Y, M, and C data, a Y, M, or C toner is not printed on two pixels of the outline portion of a black character and a line, as shown in FIG. 25M, and for Bk data, a black line or character can look sharp, as shown in FIG. 25N. In the [−1] and [−2] modes, toners of Y, M, and C data can be slightly left on an outline portion, as shown in FIG. 25O, and a toner of Bk data is decreased, as shown in FIG. 25P.

[Normal]

At the position "normal", the above-mentioned processing is executed.

[High]

At the position "high", parameters are set so no error judgement occurs for a character, and a thin or light character is printed in single black color. More specifically, when the limiter value of the limiter 3 (123I in FIG. 15A) of the outline signal is increased, an outline signal of a highlight portion can be extracted.

In this manner, image area separation conditions and processing based on separation are changed according to an image to be read, so that error judgement can be avoided or made inconspicuous.

Since the limiter value can be easily changed by the CPU 20, a circuit arrangement will not be complicated.

The number of levels of black character processing need not always be five. When the number of levels is increased, processing matching with an original image can be selected.

<Relationship With Mode Selection>

Processing according to selection of an output color mode such as a four-color mode, a three-color mode, a single-color mode, or the like will be described below.

A digital copying machine has a function of copying an image in a color different from an original color, e.g., a function of copying a full-color original in monocolor. In a portion subjected to image area separation described above, a color balance is changed to meet a requirement of a clear character. For this reason, when the above-mentioned processing is performed for an input image after an image area is separated, an output image in considerably degraded.

In this embodiment, in order to provide an image processing apparatus which is free from image degradation caused by a difference in output color mode, conditions of the image area judgement means or processing means according to judgement are changed according to an output color mode.

When a monochromatic signal described in the masking unit is selected, or when a three-color mode for forming an image using only Y, M, and C toners is selected, input image processing by the image area separation processing of this embodiment is not performed.

More specifically, processing is performed as follows.

As shown in FIG. 25H, in a four-color mode for recording an image in four colors, e.g., Y, M, C, and Bk, a limiter level is present in a bright portion of an original (limiter value= 158 in this embodiment). An output exceeding this limiter value is clipped to the limiter value, as shown in FIG. 25I. In the three-color mode for recording an image in three colors, i.e., Y, M, and C, when the limiter level is set to be 0, as shown in FIG. 25J, all the output signals are clipped to 0. For this reason, an output binarized by the comparator 3 (126I) in FIG. 15A becomes all "1" s or (all "0"s), no outline is extracted, and no processing is executed to a read image signal. In this manner, in the three-color mode, generation of an outline signal is prevented, so that processing of a portion where an image area is separated is inhibited.

In the single-color mode, processing for extracting a character signal is inhibited as in the three-color mode.

In this embodiment, a color copying machine which has a judgement means for judging based on input image information whether the input image information is image or character information, and a processing means for processing the input information in accordance with the judgement result, has a color mode different from a normal copying mode, and varies the processing according to the judgement result in the color mode different from the normal copying mode. Thus, processing can be simplified, and error judgement can be prevented.

<Relationship Between Lamp Light Amount and Control>

A digital color copying machine is required to have background color omission processing performed in a conventional analog copying machine. A system of omitting a background color of a newspaper by changing a lamp light amount is proposed.

When a light amount of a light source is changed, however, the level of light reflected by an original also changes, and error judgement tends to occur in a separation system which judges characters or images according to a contrast or color of a read image signal.

In this embodiment, the character/image judgement conditions are changed according to an original read light amount, thereby eliminating error judgement in character/ image judgement caused by a change in light amount.

Figure 25Q:
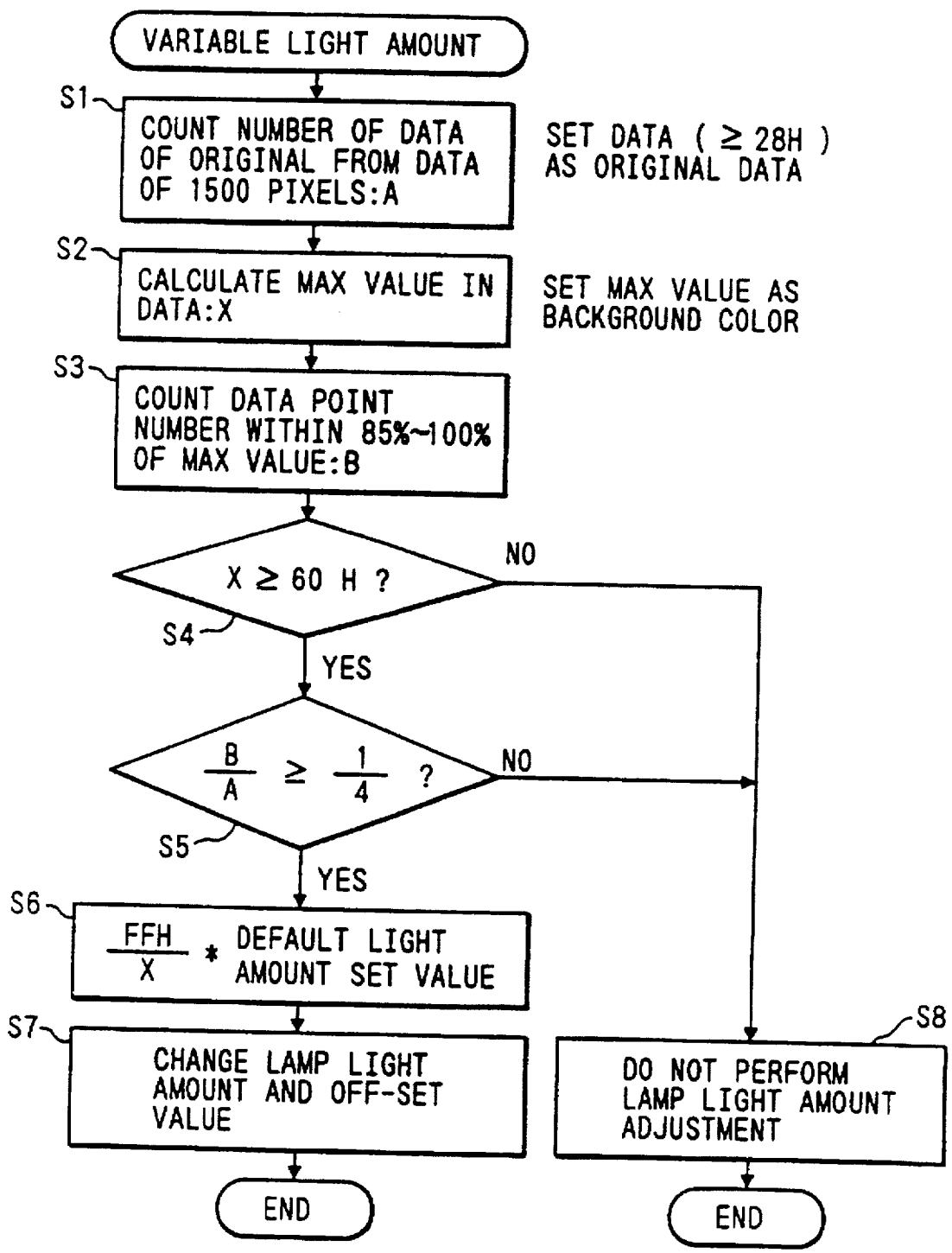

Lamp light amount adjustment will be described below. FIG. 25Q shows the flow of lamp light amount adjustment. In a prescan mode of detecting a position, size, and the like of an original, data of 50 points in the main scan direction and 30 lines at equal intervals in the sub scan direction, i.e., data of a total of 1,500 points are read, and the number of data of an original is counted (S1). A maximum value of the data is detected (S2), and the number of data points having values within 85% to 100% of the maximum value is counted (S3). In this case, only when the maximum value is equal to or larger than 60 H (S4) and points ¼ the total have values 85% to 100% of the maximum value (S5), light amount adjustment is performed (S7). A light amount is set so that the maximum value becomes $FF_H$:

(Light Amount Set Value) =

$$\frac{FF_H}{\text{(Maximum Value)}} \times \text{(Default Light Amount Set Value)}$$

The value obtained by the above equation is set as a lamp light amount set value (S6).

When the maximum value of data is less than 60 H, or when points less than ¼ the total of points have values 85% to 100% of the maximum value, lamp light amount adjustment is not performed.

When the light amount adjustment is performed, values larger than the normal one are set in the offset register 2 (119I) and the offset register 3 (124I). When the lamp light amount is increased, the dynamic range of a read original density is narrowed. Thus, a noise component of an original is undesirably detected, error judgement in dot detection and error detection in outline extraction occur. In order to prevent error detection caused by the noise component, the offset values are increased only when the light amount adjustment is performed.

In this manner, according to this embodiment, in a copying machine having an original reading means for reading an image by optical scanning, a light amount adjusting means for adjusting a light amount of a read light source in correspondence with a density of an original to be read, a judgement means for judging that the read image information is halftone or character information, and a processing means for processing the input information on the basis of the judgement result, the judgement condition is changed when the light amount adjustment is performed.

In this embodiment, lamp light amount control is performed under a given condition. However, lamp light amount control may be executed in all the cases.

Sampling data in a prescan mode can be increased/ decreased. A threshold value for determining whether or not light amount adjustment is to be executed can be changed.

A condition for judging character and image areas may be selected from a plurality of stages according to light amount adjustment.

<Character/Image Synthesizing Circuit>

Figure 28A:
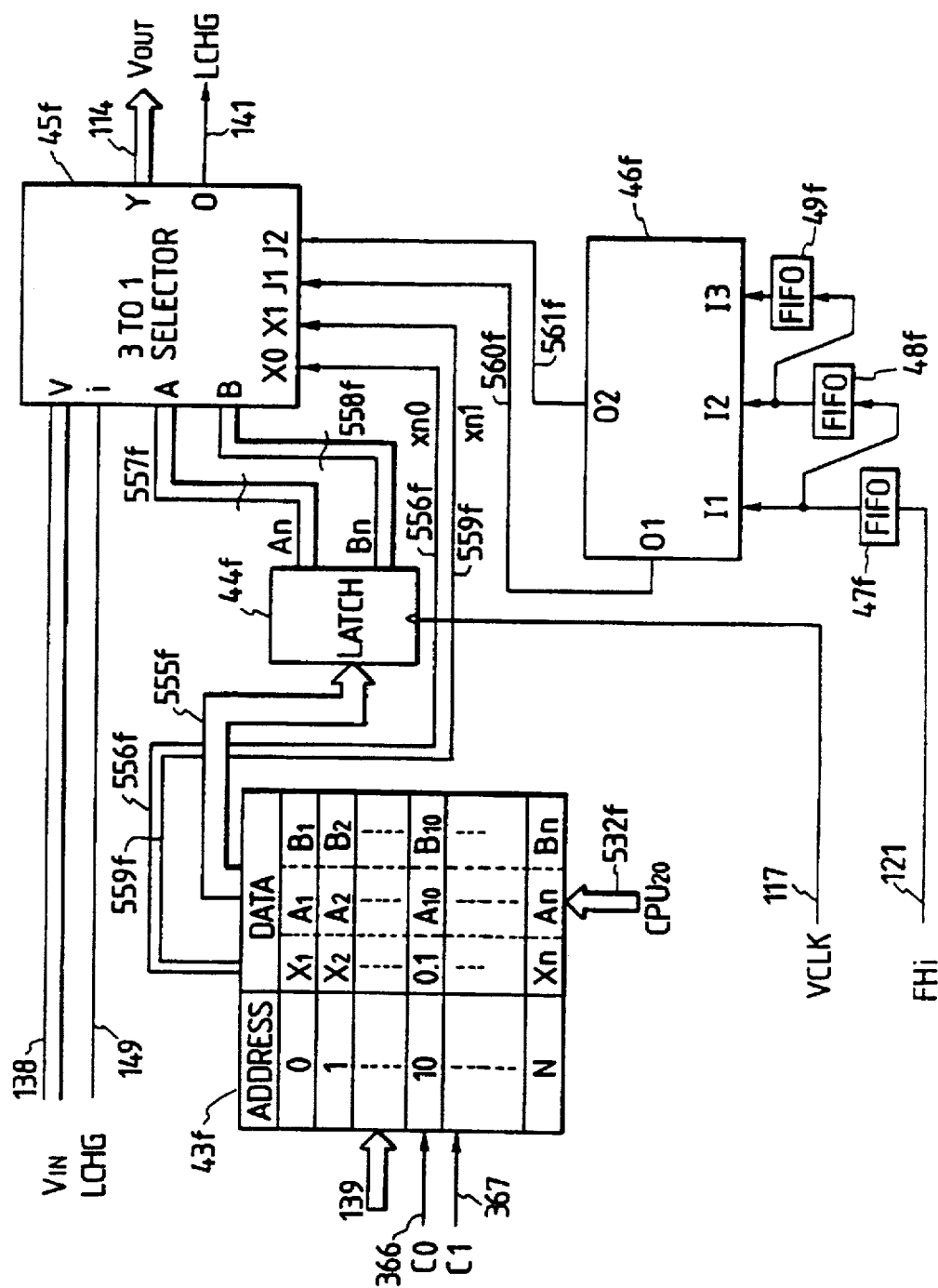
FIGS. 28A to 28C are respectively a circuit diagram and views for explaining image process and modulation using binary signals.
Figures 28B, 28C:
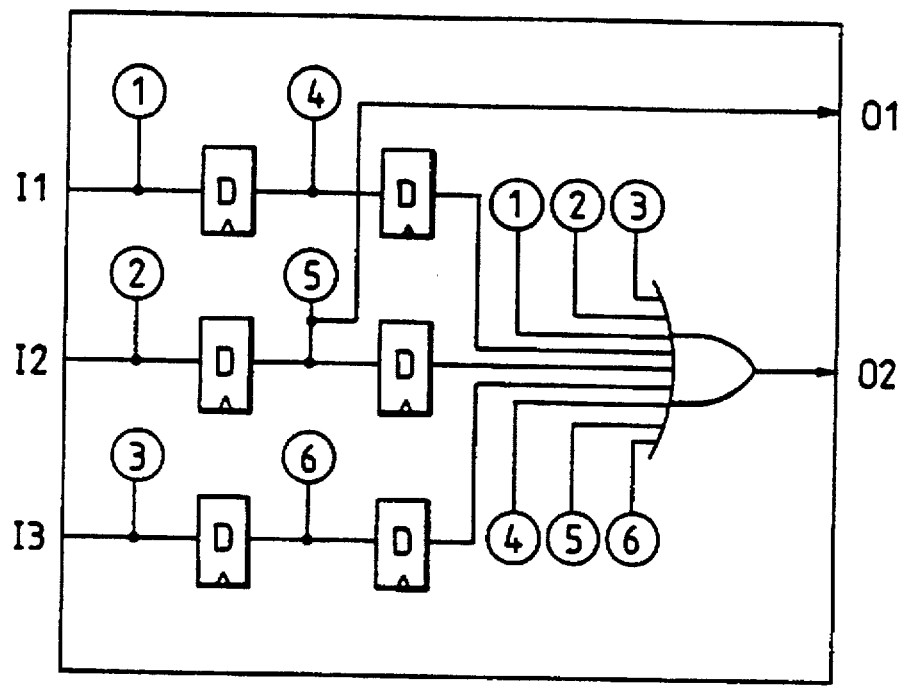
Figure 29A:
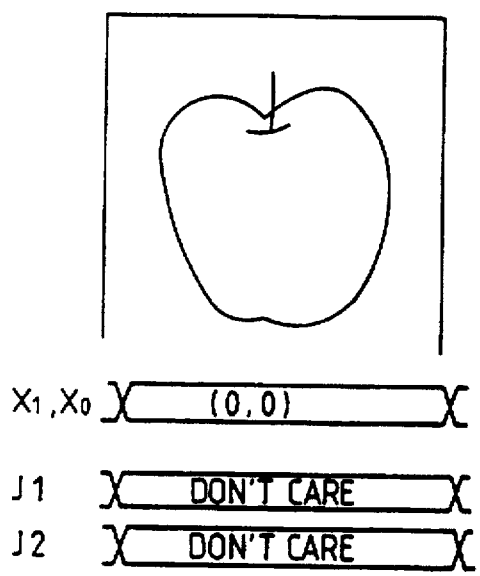
FIGS. 29A to 29D are views showing character/image synthesizing processing.
Figure 29B:
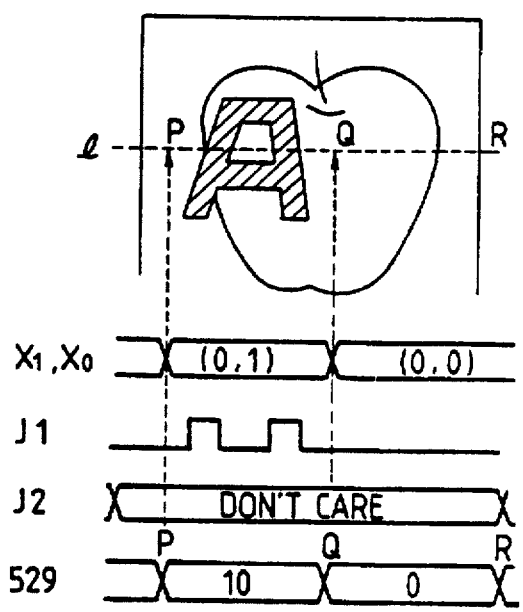
Figure 29C:
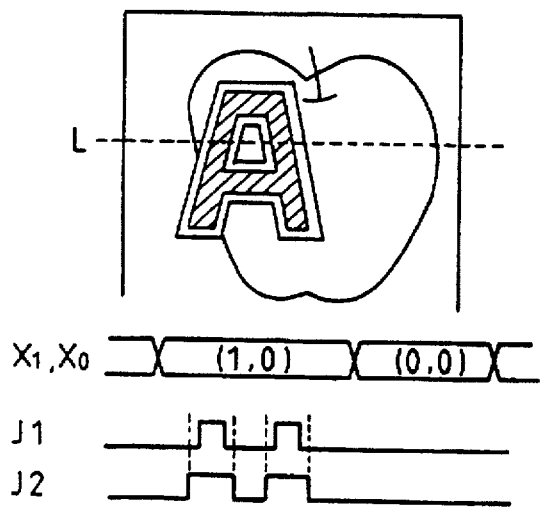

The character/image synthesizing circuit F will be described below. FIG. 28A is a block diagram of a process and modulation circuit of a binary image signal. Color image data 138 input from an image data input unit is input to a V input of a 3 to 1 selector 45f. An A input of the 3 to 1 selector 45f receives a $A_n$ of a lower-bit portion $(A_n, B_n)$ 555f read out from a memory 43f, and a B input thereof receives $B_n$ after the lower-bit portion 555f is latched by a latch 44f in response to a signal VCLK 117. Therefore, one of the V, A, and B inputs appears at an output Y of the selector 45f on the basis of select inputs $X_0$, $X_1$, J1, and J2 (114). Data $X_n$ consists of upper 2 bits of data in the memory, and serves as a mode signal for determining a process or modulation mode. A signal 139 is a code signal output from the area signal generation circuit, is switched in synchronism with the signal VCLK 117 under the control of the CPU 20 shown in FIG. 2, and is input to the memory 43f as an address signal. More specifically, when $(X_{10}, A_{10}, B_{10})=(01, A_{10}, B_{10})$ is written in advance at an address "10" of the memory 43f, if "10" is given between points P and Q of the code signal 139 and "0" is given between points Q and R in synchronism with scanning of a main scanning line 1, data $X_n=(0, 1)$ is read out between P and Q, and at the same time, data $(A_{10}, B_{10})$ is latched in $(A_n, B_n)$. FIG. 28C shows a truth table of the 3 to 1 selector 45f. As shown in FIG. 28C, $(X_1, X_0)=(0, 1)$ corresponds to a case (B). If J1="1", the A input is output to the Y output, and, hence, the constant $A_{10}$ appears at the Y output. On the other hand, if J1="0", the V input is output to the Y output, and hence, input color image data is directly output as the output 114. In this manner, so-called butt-to-line character synthesis of a character portion having a value $(A_{10})$ to a color image of an apple shown in, e.g., FIG. 29B can be realized. Similarly, when $(X_1, X_0)=(1, 0)$ and a signal J1 in FIG. 29C is input to a binary input, FIFO memories 47f to 49f and a circuit 46f (shown in detail in FIG. 28B) generate a signal J2 in FIG. 29C. As a result, a character with a frame is output to an image of an apple, as shown in FIG. 29C, according to the truth table of FIG. 28C (outline or open type). Similarly, in FIG. 29D, a rectangular area in an apple is output at a density of ($B_n$), and a character in the image of the apple is output at a density of ($A_n$.) FIG. 29A shows a case of ($X_1$, $X_0$)=(0, 0), i.e., no processing is performed for a binary signal regardless of changes in J1 and J2.

A signal having an expanded width input to the input J2 undergoes expansion corresponding to 3×3 pixels according to FIG. 28B. When a hardware circuit is added, the signal can be easily expanded more.

An FHi signal 121 input to the FIFO memory 47f is a non-rectangular area signal stored in the 100-dpi binary memory L shown in FIG. 2. When this FHi signal 121 is used, the above-mentioned various processing modes are realized.

Figure 29D:
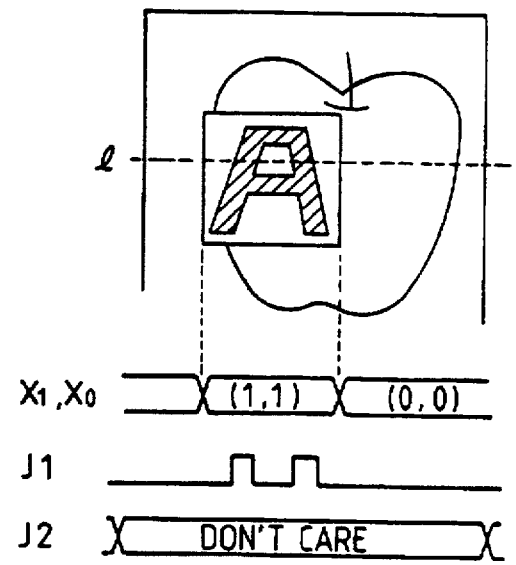

The outputs C0 and C1 (366, 367) output from the I/O port 501 (FIG. 2) in correspondence with an output color to be printed (Y, M, C, Bk) are input to lower 2 bits of the address of the memory 43f, and hence, are changed like "0, 0", "0, 1", "1, 0", and "1, 1" in correspondence with outputs Y, M, C, and Bk. Therefore, in, e.g., a yellow (Y) output mode, addresses "0", "4", "8", "12", "16", . . . , are selected; in a magenta (M) output mode, addresses "1", "5", "9", "13", "17", . . . , are selected; in a cyan (C) output mode, addresses "2", "6", "10", "14", "18", . . . , are selected; and in a black (Bk) output mode, "3", "7", "11", "15", "19", . . . , are selected. Thus, upon operation instructions on the operation panel (to be described later), for example, X1 to X4="1, 1" (A1, A2, A3, A4)=($\alpha$1, $\alpha$2, $\alpha$3, $\alpha$4) and (B1, B2, B3, B4)=($\beta$1, $\beta$2, $\beta$3, $\beta$4) are written at addresses corresponding to the area code signal 139 for determining an area and corresponding memory addresses in the area. For example, if the signal J1 is changed, as shown in FIG. 29D, a color is determined by a mixture of (Y, M, C, Bk)=($\alpha$1, $\alpha$2, $\alpha$3, $\alpha$4) during a "Lo" period of J1, and a color is determined by a mixture of (Y, M, C, Bk)=($\beta$1, $\beta$2, $\beta$3, $\beta$4) during a "Hi" period of J1. More specifically, an output color can be arbitrarily determined by the memory content. On the operation panel (to be described later), each of Y, M, C, and Bk is adjusted or set in units of %. Since each gradation level has 8 bits, its value can be varied within a range of 00 to 255. Therefore, a variation of 1% corresponds to 2.55 in digital value. If set values are (Y, M, C, Bk)=(y %, m %, c %, k %), values to be set (i.e., values written in the memory) are respectively (2.55y, 2.55m, 2.55c, 2.55k). In practice, rounded values are written in the predetermined memory. When densities are adjusted in units of % by an adjustment mechanism, values obtained by adding (darkening) or subtracting (lightening) 2.55Δ with respect to a variation of Δ% can be written in the memory.

In this manner, according to this embodiment, output colors Y, M, C, and Bk can be designated in units of %, and operability of color designation can be improved.

In the truth table of FIG. 28C, a column of i corresponds to an I/O table of the character/image gradation/resolution switching signal LCHG 149. When the A or B input is output to the output Y according to the inputs $X_1$, $X_0$, J1, and J2, i="0"; when the input V is output to the output Y, the input is directly output. The signal LCHG 149 is a signal for switching an output printing density. When LCHG="0", printing is made at, e.g., a high resolution of 400 dpi; when LCHG="1", printing is performed with multigradation of 200 dpi. Therefore, if LCHG="0" when the input A or B is selected, an inner area of a synthesized character is printed at 400 dpi, and an area other than the character is printed at 200 dpi. As a result, the character can be output sharp at a high resolution, and a halftone portion can be smoothly output with multigradation. For this purpose, the signal LCHG 149 is output from the character/image correction circuit E on the basis of the signal MjAr as the output from the character/image area separation circuit I, as described above.

<Image Process and Edit Circuit>

Figure 30:
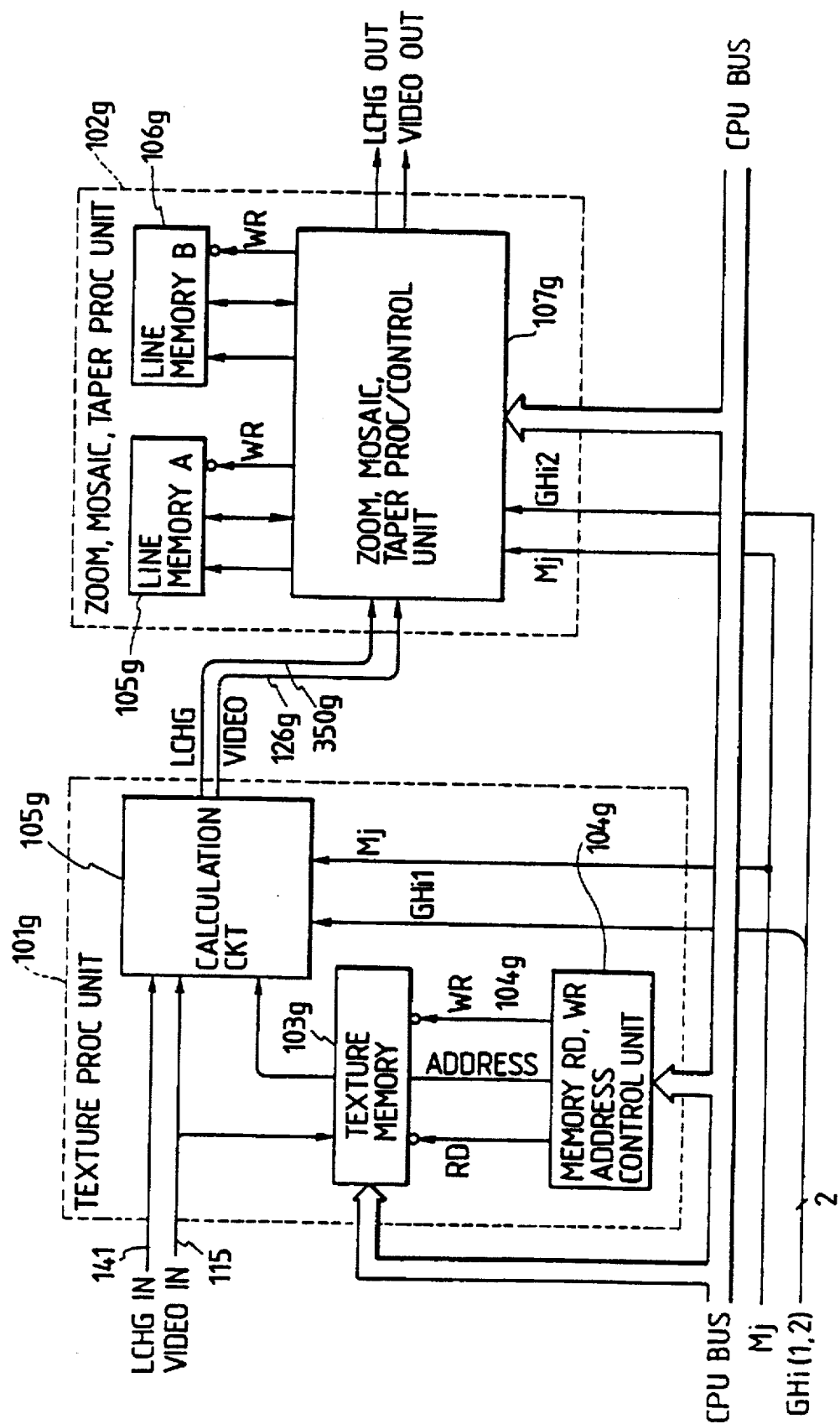
FIG. 30 is a block diagram of an image process and edit circuit.

An image signal 115 subjected to color balance adjustment in the circuit P (FIG. 2) and a gradation/resolution switching signal 141 are input to the image process and edit circuit G. FIG. 30 is a schematic view of the image process and edit circuit G.

The input image signal 115 and gradation/resolution switching signal LCHG 141 are input to a texture processing unit 101g. The texture processing unit can be roughly constituted by a texture memory 103g for storing a texture pattern, a memory RD,WR address control unit 104g for controlling the memory 103g, and a calculation circuit 105g for performing modulation processing of input image data on the basis of the stored pattern. Image data processed by the texture processing unit 101g is then input to a zoom, mosaic, taper processing unit 102g. The zoom, mosaic, taper processing unit comprises double buffer memories 105g and 106g, and a processing/control unit 107g, and various processing operations are independently controlled by the CPU 20. The texture processing unit 101g, and the zoom, mosaic, taper processing unit 102 can perform texture processing and mosaic processing of independent areas in accordance with processing enable signals GHi1 (119) and GHi2 (149) sent from the switch circuit N.

The gradation/resolution switching signal LCHG 141 input together with the image data 115 is processed while its phase is matched with an image signal in various edit processing operations. The image process and edit circuit G will be described in detail below.

<Texture Processing Unit>

Figure 31A:
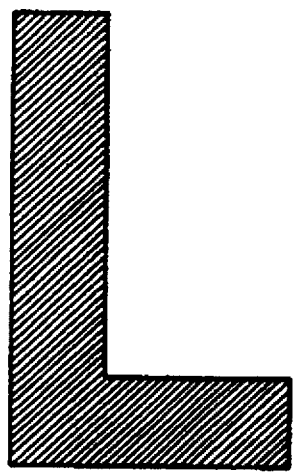
FIGS. 31A to 31C are views showing texture processing.
Figure 31B:
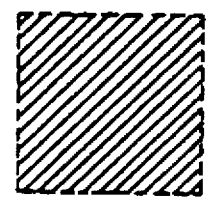
Figure 31C:
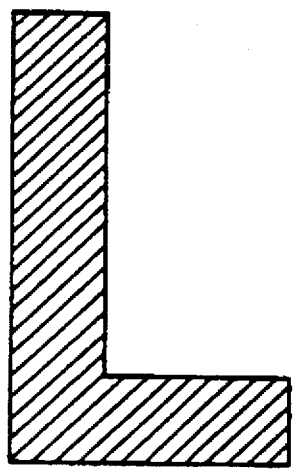

In the texture processing, a pattern written in the memory is cyclically read out to modulate video data. For example, an image shown in, e.g., FIG. 31A is modulated by a pattern shown in FIG. 31B, thereby generating an output image, as shown in FIG. 31C.

Figure 32:
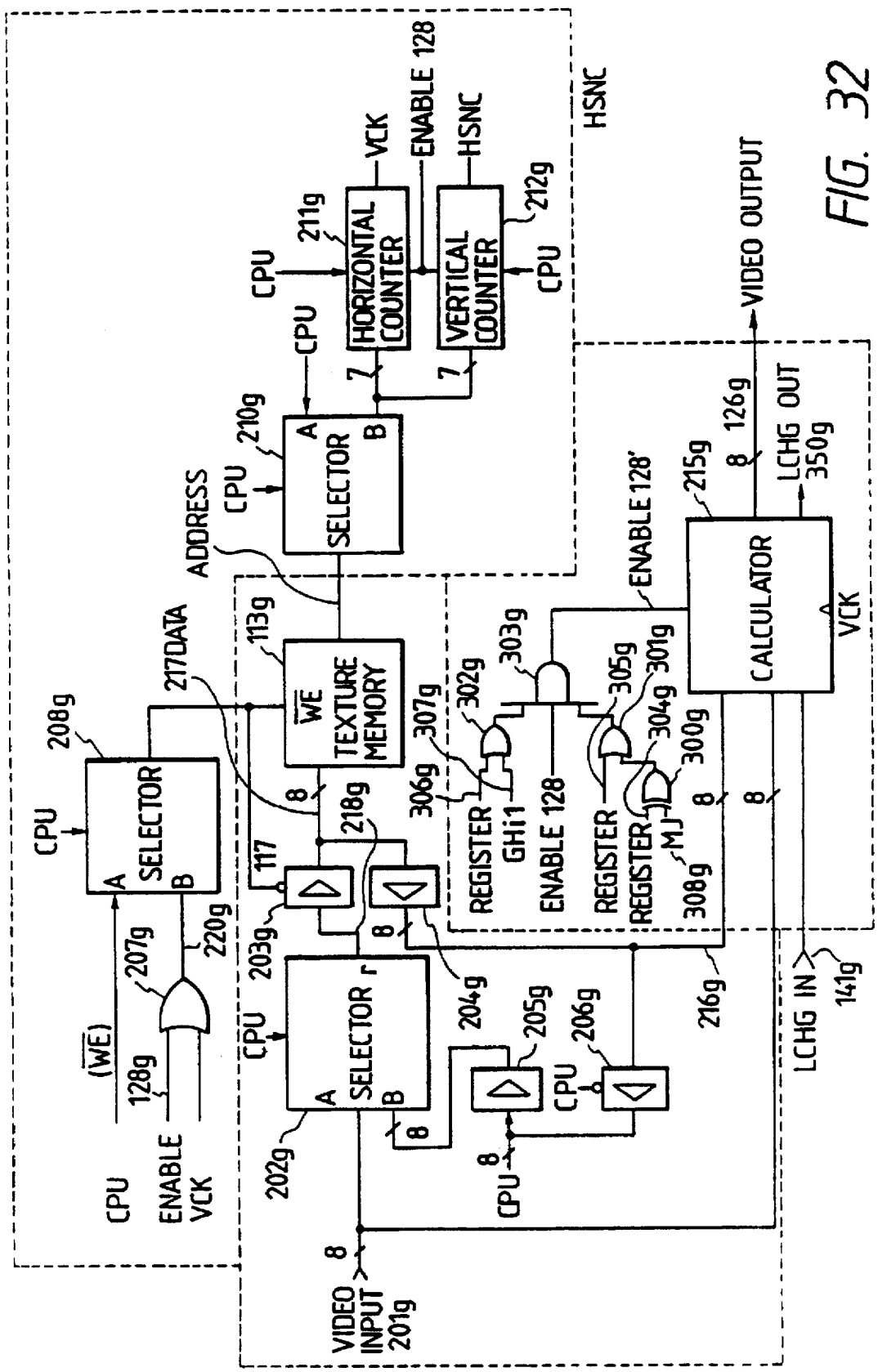
FIG. 32 is a circuit diagram of a texture processing circuit.

FIG. 32 is a circuit diagram for explaining the texture processing unit. A write section of modulation data 218g of the texture memory 113g and a calculation section (texture processing) of data 216g from the texture memory 113g and image data 215g will be described below in turn.

[Data Write Section of Texture Memory 113g]

In a data write mode, the color correction circuit D for performing masking, UCR, black extraction, and the like outputs (Y+M+C)/3, and the data is input from a video input 201g. This data is selected by a selector 202g. A selector 208g selects data 220g, and inputs the selected data to a terminal $\overline{WE}$ of the memory 113g and an enable signal terminal of a driver 203g. A memory address is generated by a vertical counter 212g which is incremented in synchronism with a horizontal sync signal HSYNC, and a horizontal counter 211g which is incremented in synchronism with an image clock VCK. When a selector 210g selects its B input, the address is input to an address terminal of the memory 113g. In this manner, a density pattern of an input image is written in the memory 113g. As this pattern, a position on an original is designated by an input device, e.g., a digitizer 58, and image data obtained by reading the designated portion is written in the memory 113g.

[Data Write Access by CPU]

CPU data is selected by the selector 202g. On the other hand, the selector 208g selects its A input, and the selected input is input to the terminal $\overline{WE}$ of the memory 113g and the enable signal terminal of the driver 203g. The memory address is input to the address terminal of the memory 113g when the selector 210g selects its A input. In this manner, an arbitrary density pattern is written in the memory.

[Calculation Section of Data 216g of Texture Memory 113g and Image Data 215g]

This calculation is realized by a calculator 215g. In this embodiment, the calculator comprises a multiplier. Only when an enable signal 128g is enabled, a calculation of the data 216g and 201g is executed; when it is disabled, the input 201g goes through the calculator.

300g and 301g respectively designate XOR and OR gates. When "1" and "0" are respectively set in registers 304g and 305g as portions for generating an enable signal using an MJ signal 308g, i.e., a character synthesizing signal, texture processing is performed for a portion excluding a character synthesizing signal. On the other hand, when "0" and "0" are respectively set in the registers 304g and 305g, the texture processing is performed for a portion including the character synthesizing signal.

A gate 302g serves to generate an enable signal using a GHi1 signal 307g, i.e., a non-rectangular area signal. When "0" is set in the register 306g, the texture processing is performed for only a portion where the GHi1 signal is enabled. In this case, if the enable signal 128 is kept enabled, non-rectangular texture processing is performed regardless of a non-rectangular area signal, i.e., in synchronism with HSYNC. If the signal GHi1 and the enable signal 128 are synchronized, texture processing synchronous with a non-rectangular area signal is executed. If a 31b-bit signal is used as the signal GHi1, texture processing can be executed for only a specific color.

The $LCGH_{IN}$ signal 141g is a gradation/resolution switching signal, is delayed by the calculator 215g, and is output as a signal $LCHG_{OUT}$ 350g. In this manner, in the texture processing unit, the gradation/resolution switching signal LCHG 141 is also subjected to predetermined delay processing in correspondence with an image subjected to the texture processing.

<Mosaic, Zoom, Taper Processing Unit>

The operation of the mosaic, zoom, taper processing unit 102g of the image process and edit circuit G will be briefly described below with reference to FIG. 33.

The image data 126g and the LCHG signal 350g input to the mosaic, zoom, taper processing unit 102g is first input to a mosaic processing unit 401g, In the mosaic processing unit 401g, the input data are subjected to determination of the presence/absence of mosaic processing and the main scan size of a mosaic pattern, synthesis of a character, and the like in accordance with the MJ signal 145 output from the character synthesizing circuit F, the area signal GHi2 (149) output from the switch circuit N, and a mosaic clock HCLK from a mosaic processing control unit 402g. Thereafter, the processed data are input to a 1 to 2 selector 403g, The area signal GEi2 is generated on the basis of non-rectangular area information stored in the binary memory L (FIG. 2). In response to this signal, mosaic processing of a non-rectangular area is allowed. Note that the main scan size of the mosaic processing can be varied by controlling the mosaic clock HCLK. Control of the mosaic clock MCLK will be described in detail later.

The 1 to 2 selector 403g outputs the input image signal and the LCHG signal to one of terminals Y1 and Y2 in accordance with a line memory select signal LMSEL obtained by frequency-dividing a signal HSYNC 118 by a D flip-flop 406g.

The outputs from the terminal Y1 of the 1 to 2 selector 403g are connected to a line memory A 404g and an A input of a 2 to 1 selector 407g. The outputs from the terminal Y2 are connected to a line memory B 405g and a B input of the 2 to 1 selector 407g. When an image is sent from the selector 403g to the line memory A, the line memory A 404g is set in a write mode, and the line memory B 405g is set in a read mode. Similarly, when an image is sent from the selector 403g to the line memory B 405g, the line memory B is set in the write mode, and the line memory A 404g is set in the read mode. In this manner, image data alternately read out from the line memories A 404g and B 405g are output as continuous image data while being switched by the 2 to 1 selector 207g in response to an inverted signal of the LMSEL signal output from the D flip-flop processing by an enlargement processing unit 414g, and 406g. The output image signal from the 2 to 1 selector 407g is subjected to predetermined enlargement processing by an enlargement processing unit 414g, and the processed signal is then output.

Read/write control of these memories will be described below. In the write and read modes, addresses supplied to the line memories A 404g and B405g are incremented/decremented by up/down counters 409g and 410g in synchronism with the signal HSYNC as a reference of one scan period, and an image CLK. The address counters (409g and 410g) are controlled by a counter enable signal output from the line memory address control unit 413g, and control signals WENB and RENB, generated from a zoom control unit 415g, for respectively controlling write and read addresses. These controlled address signals are respectively input to the 2 to 1 selectors 407g and 408g. The 2 to 1 selectors 407g and 408g supply a read address to the line memory A 404g and a write address to the line memory B 405g in response to the above-mentioned line memory select signal LMSEL when the line memory A 404g is in the read mode. When the line memory A 404g is in the write mode, an operation opposite to that described above is executed. Memory write pulses WEA and WEB to the line memories A and B are output from the zoom control unit 415g. The memory write pulses WEA and WEB are controlled when an input image is to be reduced and when an input image is subjected to mosaic processing by a mosaic length control signal MOZWE in the sub scan direction, which is output from the mosaic processing control unit 402g. A detailed description of these operations will be made below.

<Mosaic Processing>

Figure 34:
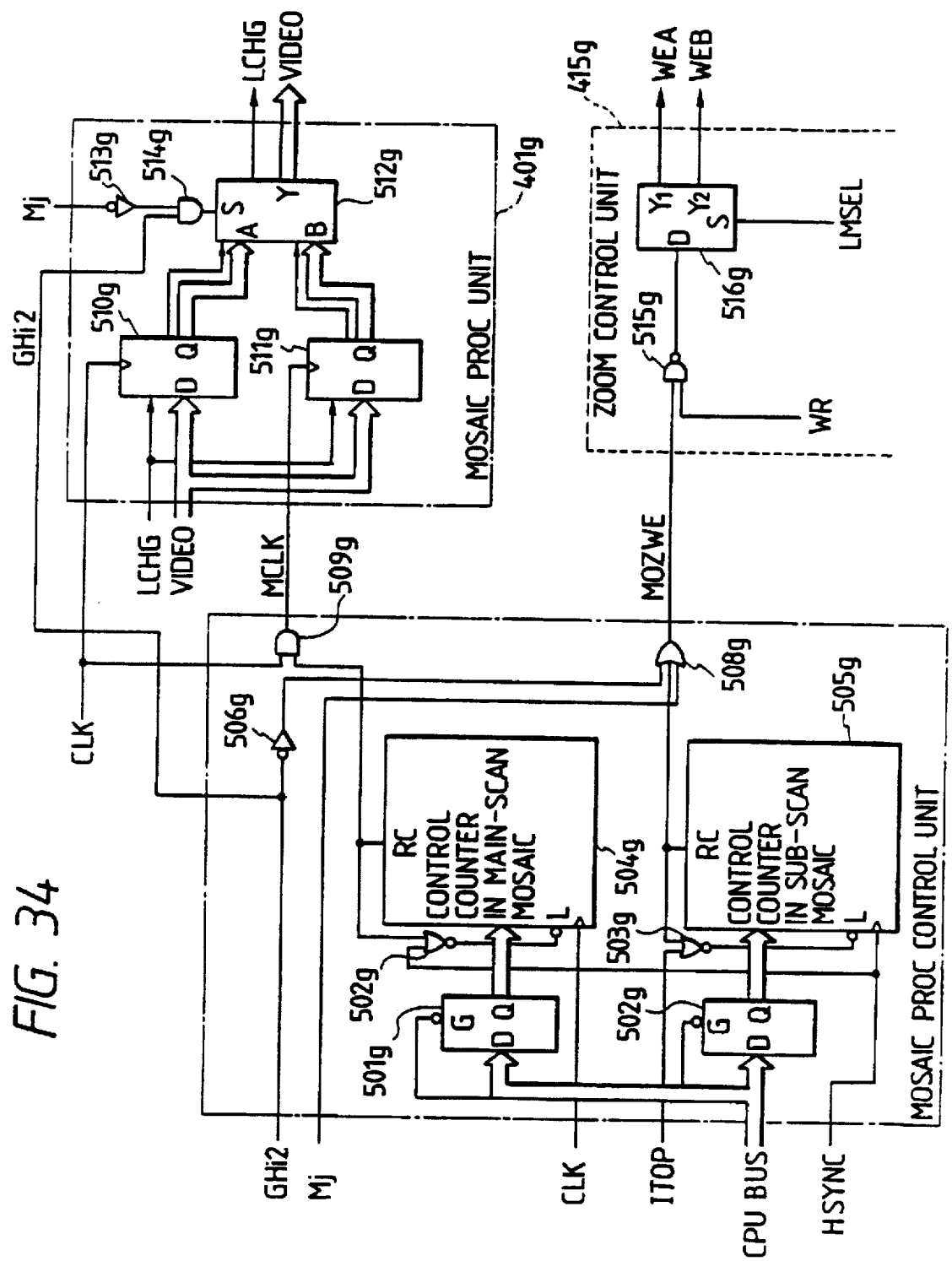
FIG. 34 is a circuit diagram of a mosaic processing unit.

Mosaic processing is basically realized by repetitively outputting one image data. The mosaic processing operation will be described below with reference to FIG. 34.

The mosaic processing control unit 402g independently performs main and sub scan mosaic processing operations. The CPU sets variables corresponding to a desired mosaic size in latches 501g (main scan) and 502g (sub scan) connected to the CPU bus. The main scan mosaic processing is executed by continuously writing the same data at a plurality of addresses of the line memory. The sub scan mosaic processing is executed by thinning data to be written in the line memory every predetermined lines in a mosaic processing area.

(Main Scan Mosaic Processing)

A variable corresponding to a main scan mosaic width is set by the CPU in the latch 501g. The latch 501g is connected to a main scan mosaic width control counter 504g, and loads a set value in response to an HSYNC signal and a ripple carry of the counter 504g. The counter 504g loads a value set in the latch 501g in response to each HSYNC signal. When the counter 504g counts a predetermined value, it outputs a ripple carry to a NOR gate 502g and an AND gate 509g. A mosaic clock MCLK from the AND gate 509g is obtained by thinning the image clock CLK by the ripple carry from the counter 504g. Only when the ripple carry is generated, the clock MCLK is output. The clock MCLK is then input to the mosaic processing unit 401g.

The mosaic processing unit 401g comprises two D flip-flops 510g and 511g, a selector 512g, an AND gate 514g, and an inverter 513g. The flip-flops 510g and 511g are connected to the gradation/resolution switching signal LCHG in addition to an image signal, and hold the input image data and the LCHG signal in response to the image clock CLK (510g) and the mosaic processing clock MCLK (511g), respectively. More specifically, the gradation/resolution switching signal LCHG corresponding to one pixel is held in the flip-flops 510g and 511g in a phase-matched state during CLK and MCLK periods. The held image signal and LCHG signal are input to the 2 to 1 selector 512g. The selector 512g switches its output in accordance with a mosaic area signal GHi2, and a binary character signal Mj. The selector 512g performs an operation shown in the truth table below using the AND gate 514g and the inverter 513g.

| GHi2 | Mj | Y |
|------|-----|---|
| 0 | 0 | A |
| 0 | 1 | A |
| 1 | 0 | B |
| 1 | 1 | A |

When the mosaic area signal GHi2 149 is "0", the selector 512g outputs the signals from the flip-flop 510g regardless of the Mj signal. When the GHi2 signal 149 is "1" and the MJ signal is "0", the selector 512g outputs the signals from the flip-flop 511g which is controlled by the mosaic clock MCLK. When the Mj signal is "1", the selector 512g outputs the signals from the flip-flop 510g. With this control, a portion of an image subjected to main scan mosaic processing can be output without being processed. More specifically, no mosaic processing is performed for a character synthesized in an image by the character synthesizing circuit F (FIG. 2), and only an image can be subjected to mosaic processing. The outputs from the selector 512g are input to the 2 to 1 selector 403g shown in FIG. 33. In this manner, the main scan mosaic processing is performed.

(Sub Scan Mosaic Processing)

The sub scan mosaic processing is controlled by the latch 502g connected to the CPU bus, a counter 505g, and a NOR gate 503g as in the main scan mosaic control. The sub scan mosaic width control counter 505g, generates a ripple carry pulse in synchronism with an ITOP signal 144 and by counting an HSYNC signal 118. The ripple carry pulse is input to an OR gate 508g together with an inverted signal $\overline{GHi2}$ of the mosaic area signal GHi2 149, and the character signal Mj. The sub scan mosaic control signal MOZWE is subjected to control shown in the truth table below.

| GHi2 | Mj | RC | MOZWE |
|------|-----|-----|-------|
| 0 | X | X | 1 |
| 1 | 0 | 0 | 0 |
| 1 | 0 | 1 | 1 |
| 1 | 1 | X | 1 |

Figure 35A:
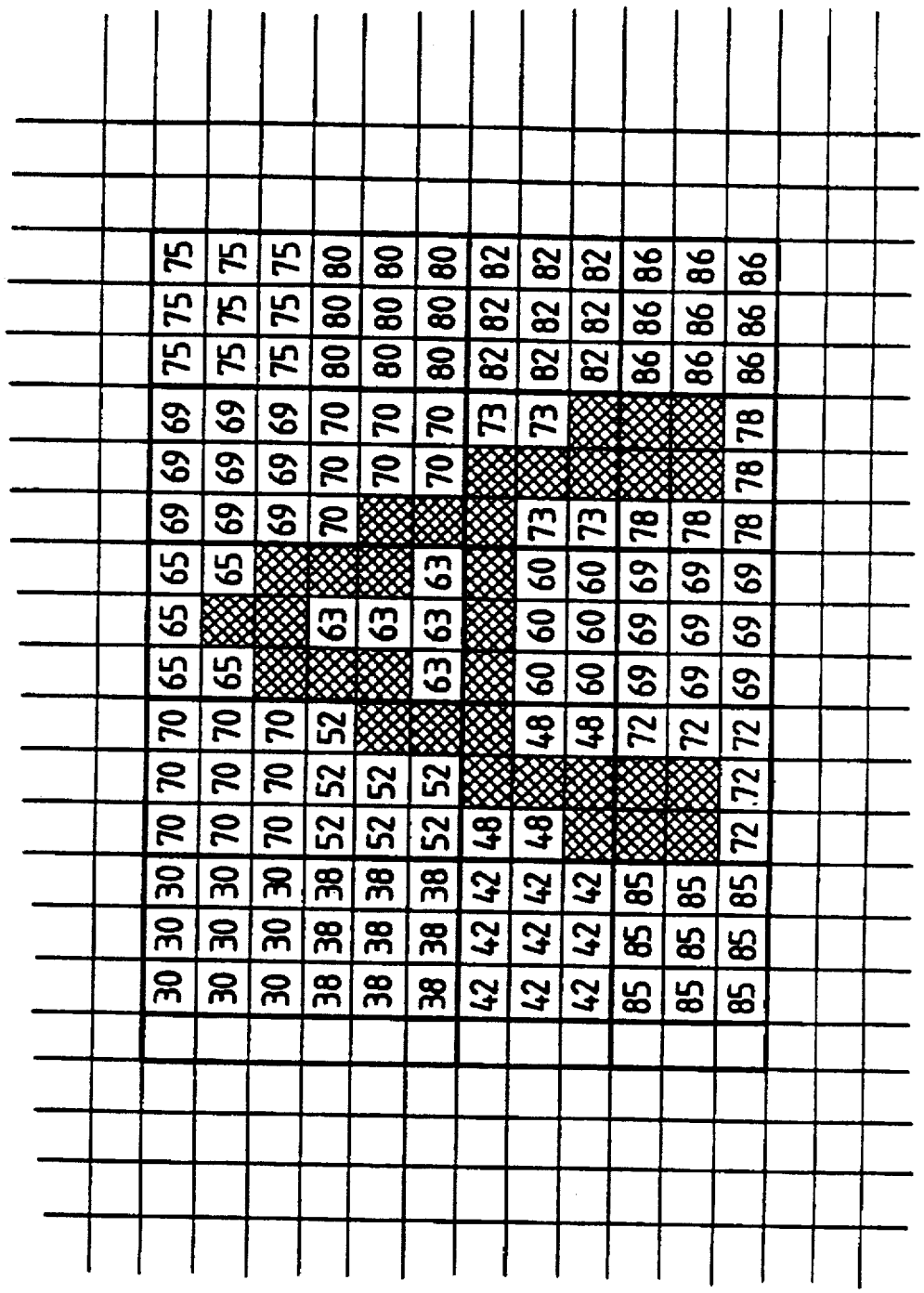

The MOZWE signal output in these combinations is input to the zoom control unit 415g, and controls a write pulse generated by a line memory write pulse generation circuit (not shown) in a NAND gate 515g. The write pulse generation circuit can vary an output clock rate of, e.g., a rate multiplier normally used in zoom control. Since this circuit falls outside the scope of the present invention, a detailed description thereof will be omitted in this embodiment. A WR pulse controlled by the MOZWE signal is output alternately as the pulses WEA and WEB from the 1 to 2 selector in response to the switching signal LMSEL which switches pulses in response to the HSYNC signal 118. With the above-mentioned control, even when the mosaic area signal GHi2 149 is "1", if the Mj signal goes to "1" level, write access of the memory is performed. Thus, a portion of a sub-scan mosaic-processed image can be output without being processed. FIG. 35A shows a distribution of density values in units of pixels for a given recording color when mosaic processing is actually executed. In the mosaic processing shown in FIG. 35A, pixels in a 3×3 pixel block are used as typical pixel values. In this processing, a character "A", i.e., hatched pixels in FIG. 35A are not subjected to mosaic processing based on the character signal Mj. More specifically, when a synthesized character overlaps a mosaic processing area, the character has a priority over the mosaic processing. Therefore, when the mosaic processing is performed, an image can be formed, so that a character can be read. A mosaic area is not limited to a rectangular area. For example, mosaic processing can be executed to a non-rectangular area.

(Inclination and Taper Processing)

Inclination processing will be described below with reference to FIGS. 33 and 36.

Figure 33:
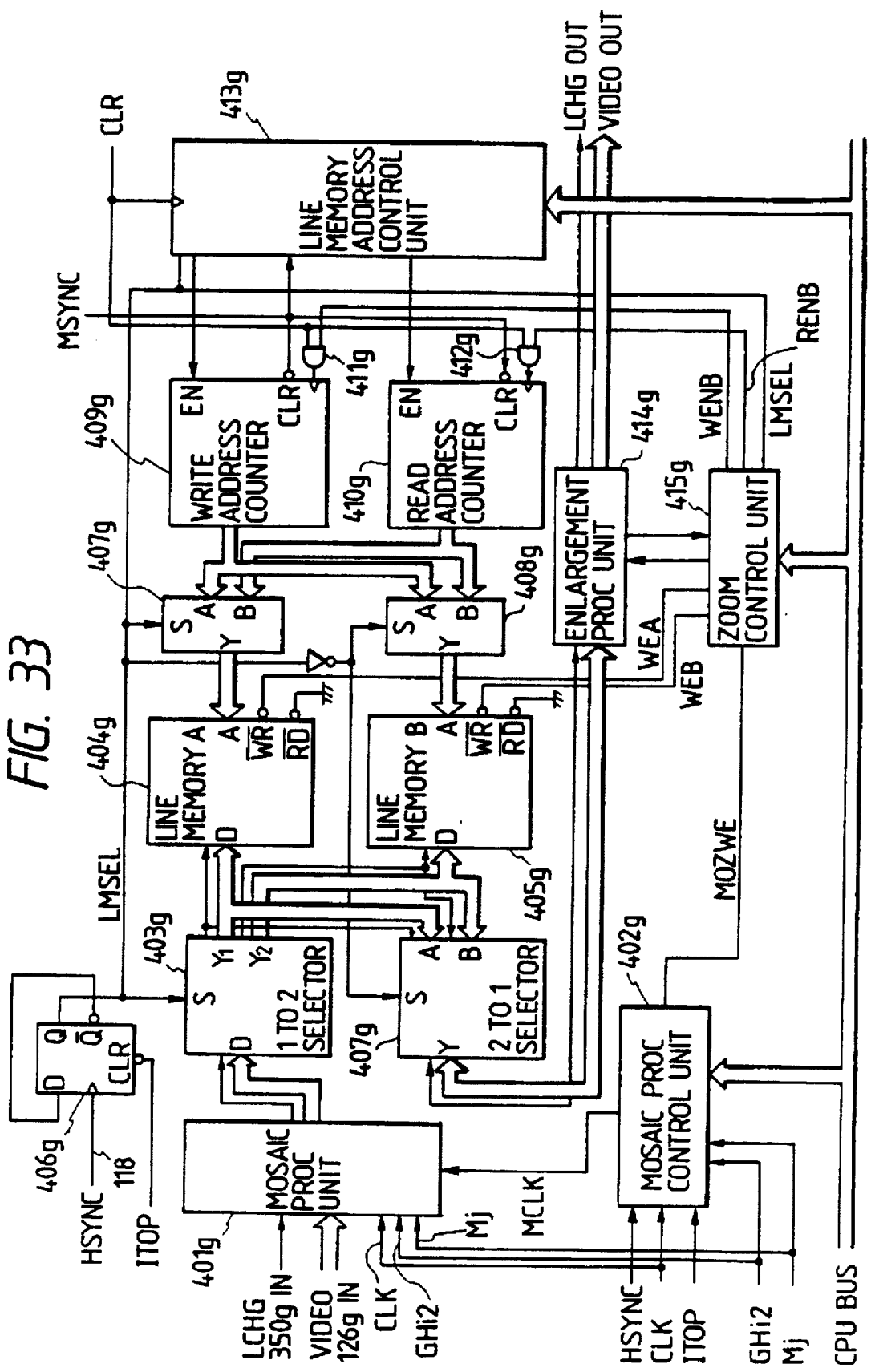
FIG. 33 is a circuit diagram of a zoom, mosaic, taper processing unit.
Figure 36:
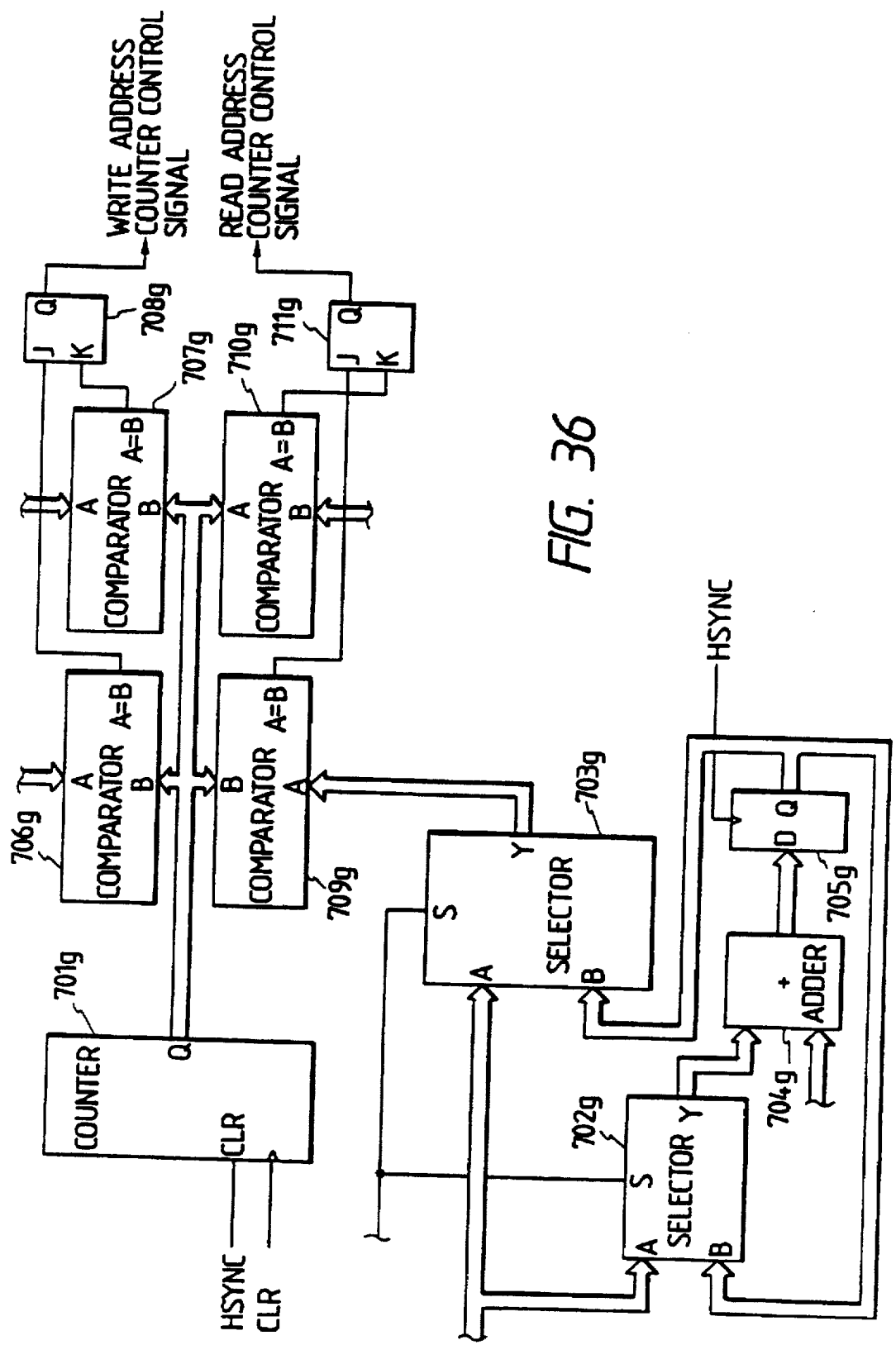
FIG. 36 is a circuit diagram of a line memory address control unit.

FIG. 36 shows the internal arrangement of the line memory address control unit 413g shown in FIG. 33. The line memory address control unit 413g controls enable signals of the write and read counters 409g and 410g. The control unit 413g controls the counters to determine a portion of one main scan line to be written in or read out from the line memory, thereby achieving, e.g., shift and inclination of a character. An enable control signal generation circuit will be described below with reference to FIG. 36.

A counter output of a counter 701g is reset to "0" in response to the HSYNC signal, and the counter 701g then counts the image clocks CLK 117. The output Q of the counter 701g is input to comparators 706g, 708g, 709g, and 710g. The A input sides of the comparators excluding the comparator 709g are independent latches (not shown) connected to the CPU bus 22. When arbitrarily set values and the output from the counter 701g coincide with each other, these comparators output pulses. The output of the comparator 706g is connected to the J input of the J-K flip-flop 708g, and the output from the comparator 707g is connected to the K input. The J-K flip-flop 708g outputs "1" from when the comparator 706g outputs a pulse until the comparator 707g outputs a pulse. This output is used as a write address counter control signal, and the write address counter is enable during only a "1" period to generate an address to the line memory. A read address counter control signal similarly controls the read address counter. The A input of the comparator 709g is connected to a selector 703g to vary an input value to the comparator depending on a case wherein inclination processing may or may not be performed. When the inclination processing is not performed, a value set in a latch (not shown) connected to the CPU bus 22 is input to the A input of the selector 703g, and the A input is output from the selector 703g in response to a select signal output from a latch (not shown). The following operations are the same as those of the comparators 706g and 707g. When the inclination processing is performed, a value input to the A input of the selector 703g is also input to a selector 702g as a preset value. When the select signals input to the selectors 702g and 703g select their B inputs, the output from the selector 702g is added to a value set in a latch (not shown) by an adder 704g. The sum represents a change amount per line based on an inclination angle, and if a required angle is represented by θ, the change amount can be given by tanθ. The sum is input to a flip-flop 705g which receives the HSYNC signal 118 as a clock, and is held by the flip-flop 705g for one main scan period. The output from the flip-flop 705g is connected to the B inputs of the selectors 702g and 703g. When this addition is repeated, the output from the selector to the comparator 709g changes at a predetermined rate for each scan period, so that the start of the read address counter can be varied from the HSYNC signal at a predetermine rate. Thus, data are read out from the line memories A 404g and B 405g at timings shifted from the HSYNC signal, thus allowing the inclination processing. The above-mentioned change amount can be either a positive or negative value. When the change amount is positive, the read timing is shifted in a direction to separate from the HSYNC signal; when it is negative, the read timing is shifted in a direction to be closer to the HSYNC signal. The select signals of the selectors 702g and 703g are changed in synchronism with the HSYNC signal, so that a portion of an image can be converted to an inclined character.

As an enlargement processing methods, 0th, linear, SINC interpolation methods, and the like are known. However, since this operation is not incorporated in the present invention, a detailed description thereof will be omitted. When a main scan magnification is changed in synchronism with the HSYNC signal for each scan line while the inclination processing is being executed, taper processing can be realized.

The above-mentioned processing operations can also be performed for a non-rectangular area in accordance with the non-rectangular area signal GHi as in the mosaic processing and texture processing.

In these processing operations, the input gradation/resolution switching signal is processed while its phase is matched with an image signal. More specifically, the switching signal LCHG 142 is similarly processed as an image signal is processed in the zoom, inclination, taper processing modes, and the like. The output image data 114 and the output gradation/resolution switching signal LCHG 142 are output to the edge emphasis circuit.

Figure 35B:
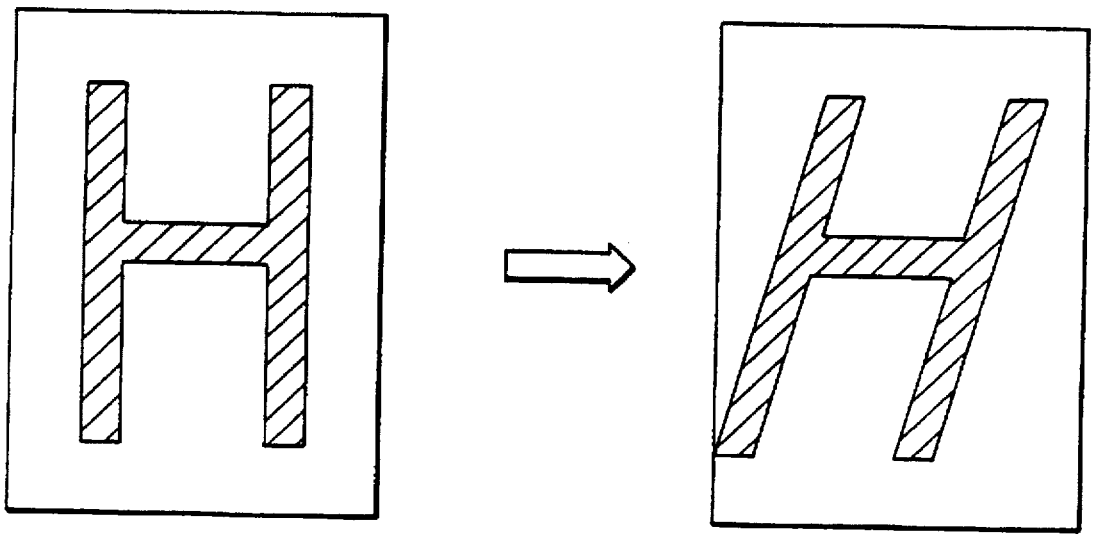
Figure 35C:
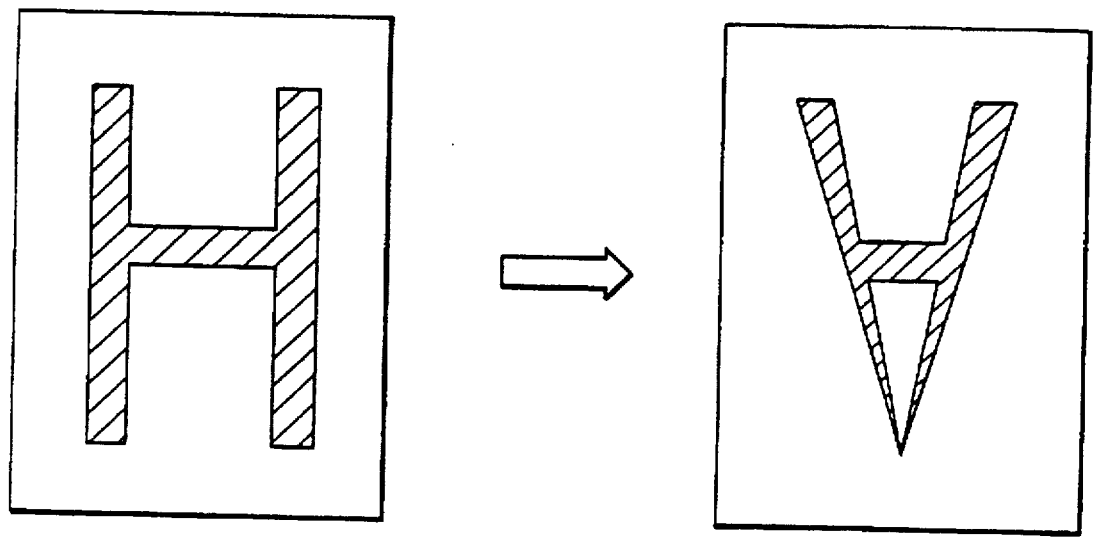

FIGS. 35B and 35C show the principle of the above-mentioned inclination processing and taper processing.

<Outline Processing Unit>

Figure 35D:
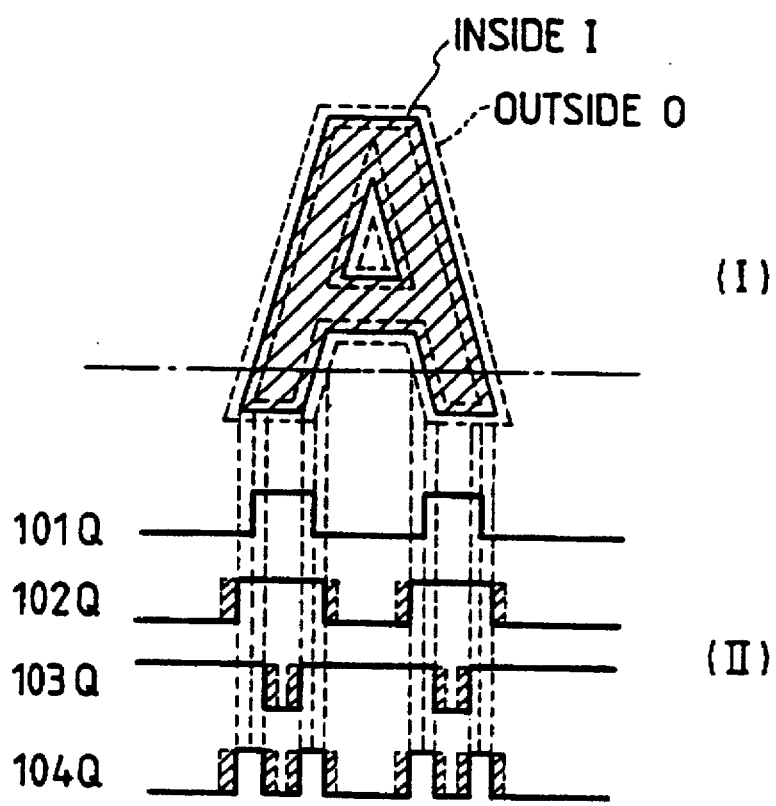
Figure 35E:
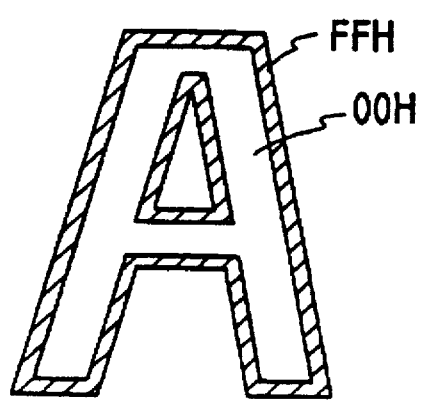
Figure 35F:
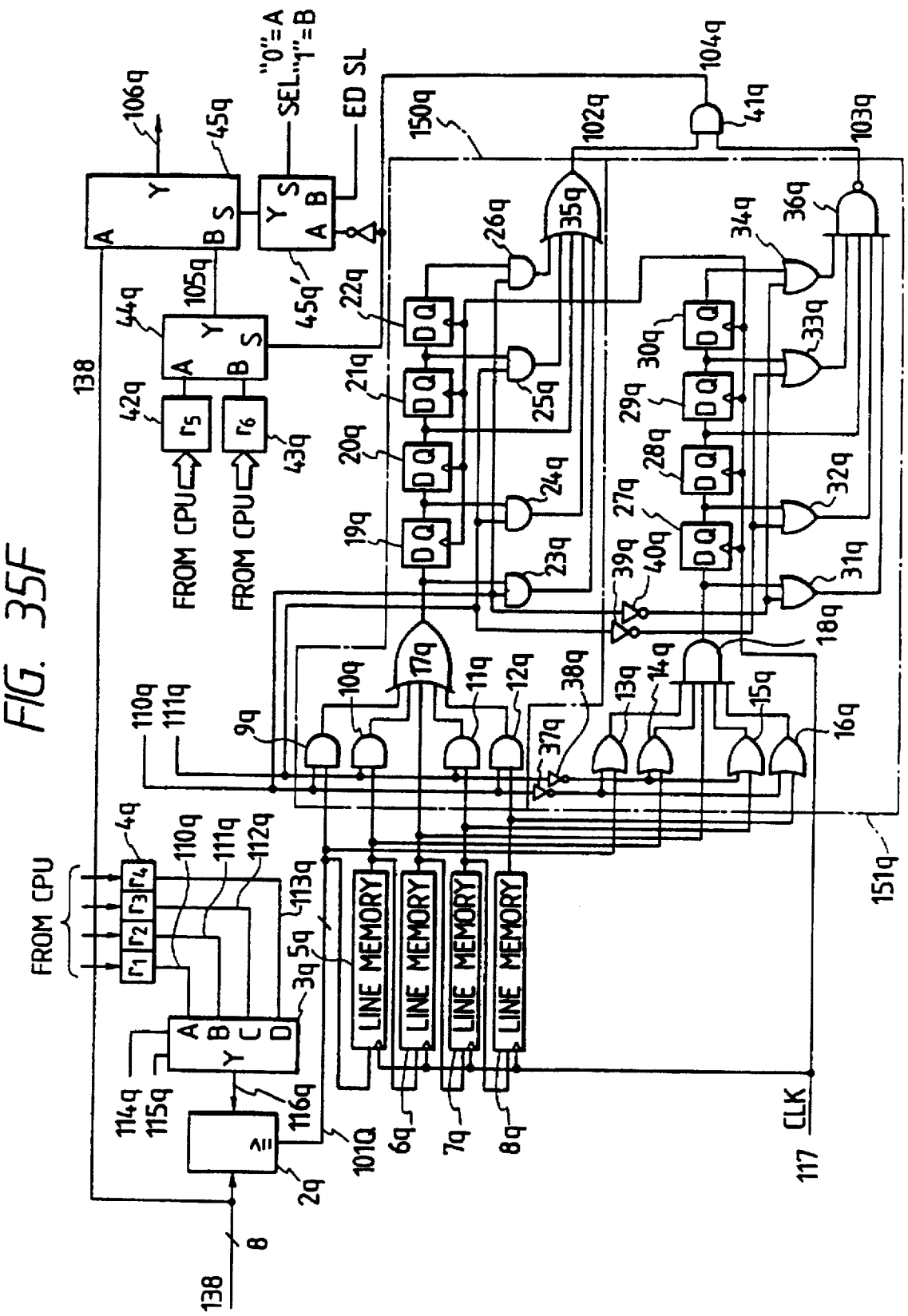

FIGS. 35D and 35F are views for explaining outline processing. In this embodiment, as shown in FIG. 35D, an inside signal of a character or image (an inner broken line in (I) of FIG. 35D, 103Q in (II) thereof) and an outside signal (an outer broken line in (I) of FIG. 35D and 102Q in (II) thereof) are generated, and are logically ANDed, thereby extracting an outline. In the timing chart ((II) of FIG. 35D), 101Q designates a signal obtained by binarizing a multi-value original signal by a predetermined threshold value. The signal 101Q represents a boundary portion between an original image (hatched portion) and a background shown in (I) of FIG. 35D. Contrary to this, 102Q designates a signal obtained by expanding a "Hi" portion of the signal 101Q to fatten a character portion (fattened signal), and 103Q designates a signal by shrinking the "Hi" portion of the signal 101Q to thin a character portion (thinned signal), and than inverting the obtained signal. 104Q designates an AND product of the signals 102Q and 103Q, i.e., an extracted outline signal. A hatched portion of the signal 104Q represents that a wider outline can be extracted. That is, a fattening width is further increased in the signal 102Q, and a shrinking width is further increased in the signal 103Q, so that an outline having a different width can be extracted. In other words, the width of the outline can be changed. FIG. 35F is a circuit diagram for realizing the outline processing described with reference to FIG. 35D. This circuit is arranged in the image process and edit circuit G shown in FIG. 2. Input multi-value image data 138 is compared with a predetermined threshold value 116q by a comparator 2q, thereby generating a binary signal 101q. The threshold value 116q is an output from a data selector 3q, i.e., a signal selected by and output from the selector 3q in correspondence with a certain color in accordance with outputs 110q to 113q from values r1, r2, r3, and r4 set in a register group 4q in units of printing colors, i.e., yellow, magenta, cyan, and black by the CPU (not shown). A binarization threshold value can be varied in units of colors in response to signals 114q and 115q which are switched in units of colors by the CPU (not shown), thereby varying a color outline effect. The data selector 3q respectively selects A, B, C, and D inputs when, for example, (114q, 115q)=(0, 0), (0, 1), (1, 0), and (1, 1), and these inputs respectively correspond to yellow, magenta, cyan, and black threshold values. The binary signal 101q is stored in line buffers 5q to 8q for five lines, and is output to a next fattening circuit 150q and a next thinning circuit 151q. The circuit 150q generates a signal 102q. When a total of 25 (or 9) pixels of a 5×5 (or 3×3) small pixel block include at least one "1" pixel, the circuit 150q determines the value of a central pixel to be "1". More specifically, for an original image (hatched portion) shown in (I) of FIG. 35D, an outside signal O of two pixels (or one pixel) is generated. Similarly, the circuit 151q generates a signal 103q. When a total of 25 (or 9) pixels of a 5×5 (or 3×3) small pixel block include at least one "0" pixel, the circuit 151q determines the value of a central pixel to be "0". That is, an inside signal I of two pixels (or one pixel) is formed for (I) of FIG. 35D. Therefore, as has been described with reference to (II) of FIG. 35D, the signals 102q and 103q are logically ANDed by an AND gate 41q, thus forming an outline signal 104q. As can be seen from a circuit operation, signals 110q and 111q are select signals for selecting the 3×3 or 5×5 small pixel block. When the 3×3 pixel block is selected, (110q, 111q)=(0, 1). An outline width in this case corresponds to two pixels since a fattening width is one pixel and a thinning width is one pixel. When the 5×5 pixel block is selected, (110q, 111q)=(1, 1), and the outline width corresponds to four pixels. These selections are controlled by an I/O port connected to the CPU (not shown), so that an operator can switch the pixel block according to a required effect.

In FIG. 35F, a selector 45q can switch whether the original signal 138 is directly output or the extracted outline is output. The selector 45q selects one of the A and B inputs based on an output from a selector 45q'. The selector 45q' outputs one of an inverted signal of the outline signal 104q and a signal ESDL output from the I/O port connected to the CPU (not shown) as a select signal of the selector 45q. In this case, the CPU inputs a select signal SEL to the selector 45q'.

A selector 44q selects one of fixed values r5 and r6, which are set in registers 42q and 43q by the CPU, in accordance with the outline signal 104q. All the selectors 44q, 45q, and 45q' select the A inputs when a switching terminal S=0; they select the B inputs when S=1.

When "1" is input to the switching terminal of the selector 45q', the B input terminal is selected, and the selector 45q is switched by the signal ESDL output from the I/O port connected to the CPU (not shown). When ESDL="0", the A input of the selector 45q is selected, and normal copy mode is set; when ESDL="1", the B input is selected, and an outline output mode is set. The registers 42q and 43q are set up with the fixed values r5 and r6 by the CPU (not shown). When the outline output 104q is "0" in the outline output mode, the fixed value r5 is output; when 104q="1", the fixed value r6 is output. More specifically, for example, if r5=$00_H$ and r6=$FF_H$, the outline portion is $FF_H$, i.e., black, and other portions are $00_H$, i.e., white, thus forming an outline image, as shown in FIG. 35E. Since the values r5 and r6 are programmable, they can be changed in units of colors to obtain different effects. That is, $FF_H$ and $00_H$ need not always be set, and two different levels, e.g., $FF_H$ and $88_H$ may be set.

When "0" is set in the switching terminal S of the selector 45q', the A input is selected, and an inverted signal of the outline signal 104q is input to the switching terminal S of the selector 45q. The selector 45q outputs original data at the A input for an outline portion, and outputs $00_H$, i.e., white as the fixed value at the B input selected by the selector 44q for portions excluding the outline portion. In this manner, the outline portion can be subjected to processing not by the fixed value but by multi-value original data for each of Y, M, C, and K.

According to this embodiment, a mode of outputting a binary outline image output (multi-color outline processing mode) and a mode of outputting a multi-value outline image output (full-color outline processing mode) can be arbitrarily selected by an operator for each of Y, M, C, and K.

For the threshold values of outline extraction, the values r1, r2, r3, and r4 are set in the registers 4q, so that different values can be set for Y, M, C, and K, respectively. These values can also be rewritten by the CPU.

When a matrix size is selected, an outline width can be changed, thus obtaining a different outline image.

The outline extraction matrix size is not limited to the 5×5 and 3×3 sizes described above, and can be desirably changed by increasing/decreasing the numbers of line memories and gates.

The outline processing circuit Q shown in FIG. 35F is arranged in the image process and edit circuit G shown in FIG. 2. This image process and edit circuit G also includes the texture processing unit 101g and the zoom, mosaic, taper processing unit 102g. Since these units are connected in series with each other, their processing operations can be desirably combined upon operation of the operation unit 1000 (to be described later). The order of these processing modes can be desirably set by a combination of a parallel circuit of the processing units and selectors.

In this embodiment, each color component input to the outline processing circuit Q is binarized to obtain an outline signal for each color component, and an outline image is output in color corresponding to the color component. However, the present invention is not limited to this method. For example, an ND image signal can be generated based on a read signal R (red), G (green), or B (blue), an outline can be extracted based on these signals, and original multi-value data, predetermined binary data or the like in units of recording colors can be substituted in the extracted outline portion to form an outline image. In this case, the ND image signal can also be generated based on one of the R, G, and B signals. In particular, since the G signal has characteristics closest to those of the neutral density signal (ND image signal), this G signal can be directly used as the ND signal in terms of a circuit arrangement.

A Y signal (luminance signal) of an NTSC system may also be used.

<Non-rectangular Area Memory>

A means for storing a non-rectangular area designated in the present invention will be described below.

In conventional designated area edit processing, as a designated area, a rectangular area, only a non-rectangular area with the limited number of input points (FIG. 37F), or a combination of the rectangular and non-rectangular areas (FIG. 37G) are available. Therefore, the following drawbacks are posed.

Figure 37B:
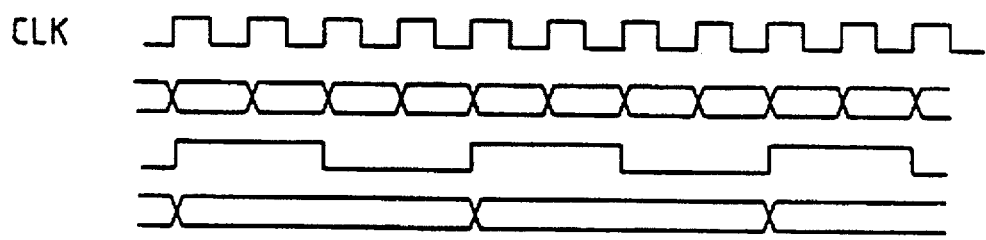
Figure 37C:
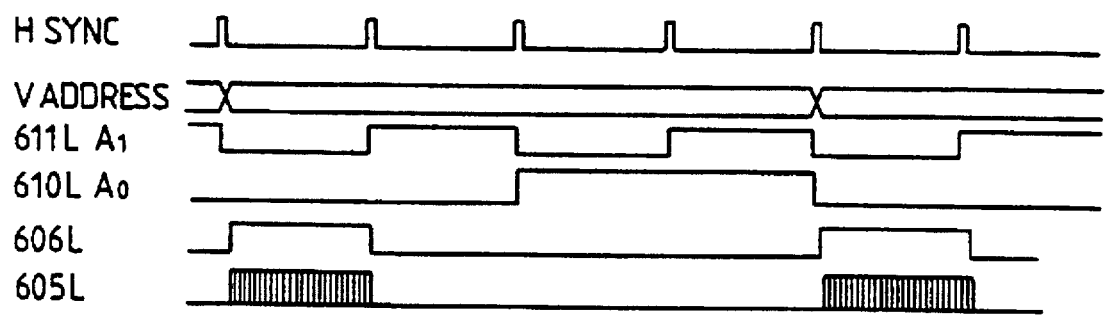
Figure 37D:
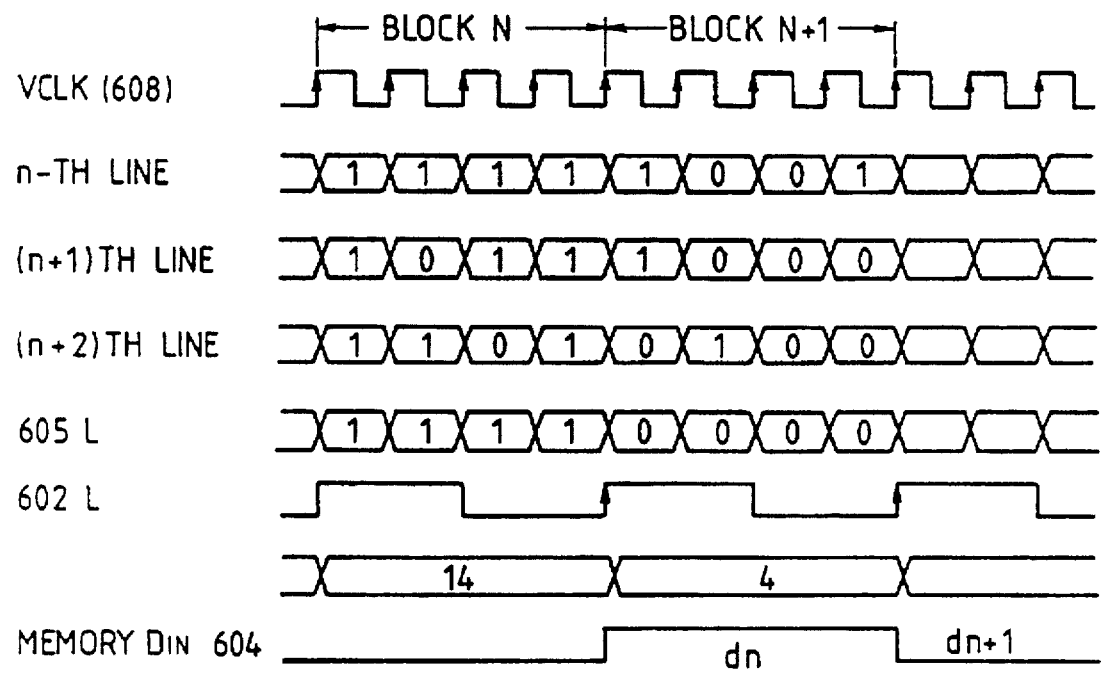
Figure 37E:
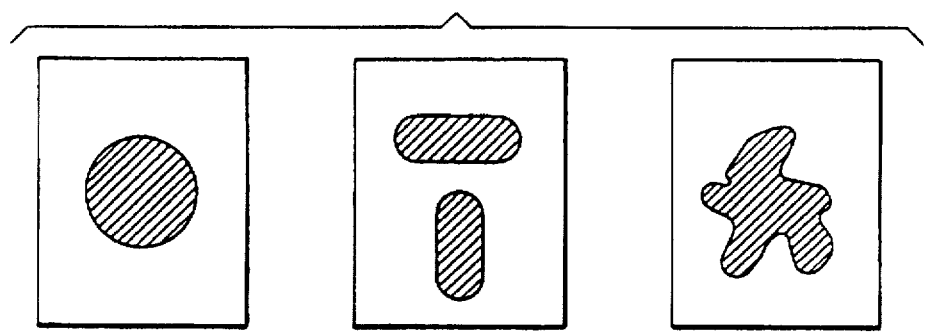
Figure 37F:
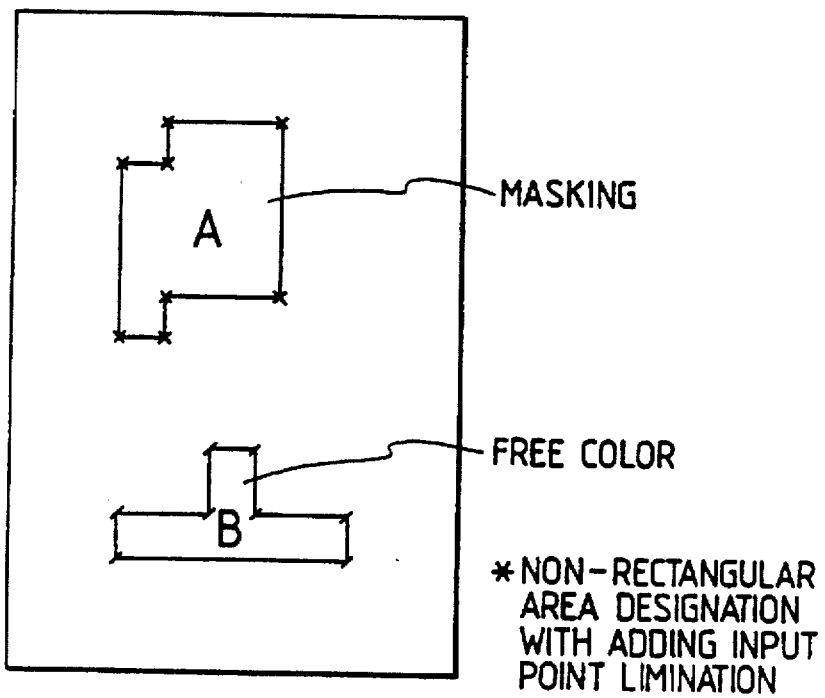
Figure 37G:
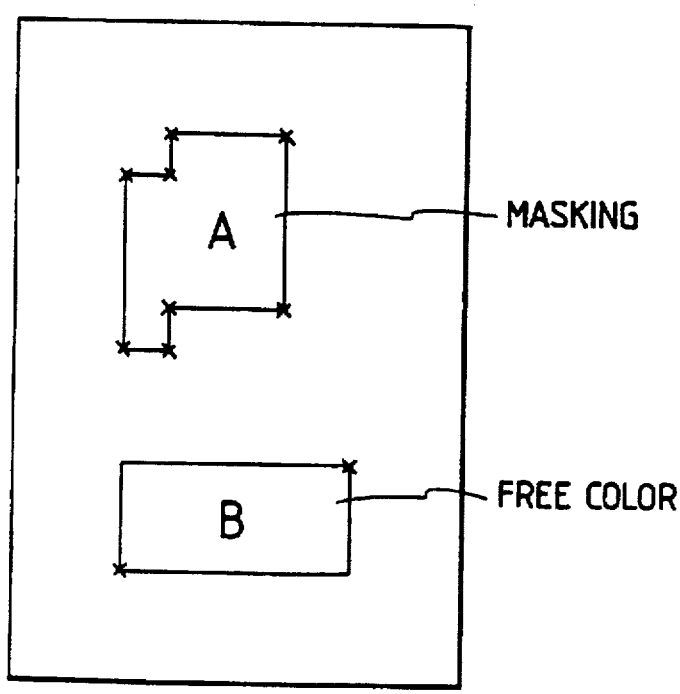
Figure 37H:
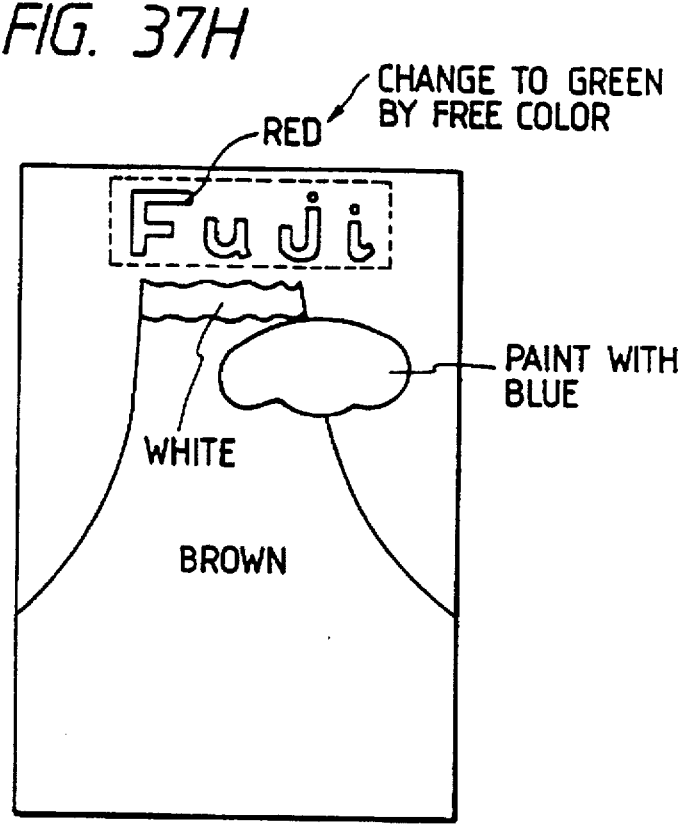

That is, as shown in FIG. 37H, since red letters "Fuji" cannot be color-converted into green letters or only a red cloud portion cannot be painted in blue, edit processing is considerably restricted.

In this embodiment, a memory for storing a non-rectangular area is arranged to overcome such high-grade edit processing.

FIG. 37A is a block diagram showing in detail a mask bit map memory 573L for restricting an area having an arbitrary shape, and its control. The memory corresponds to the 100-dpi memory L in the entire circuit shown in FIG. 2, and is used as a means for generating switching signals for determining an ON (executing) or OFF (not executing) state of various image process and edit modes, such as the above-mentioned color conversion, image trimming (non-rectangular trimming), image painting (non-rectangular painting), and the like for shapes illustrated in, e.g., FIG. 37E. More specifically, in FIG. 2, the switching signals are supplied through signal lines BHi 123, DHi 122, FHi 121, GHi 119, PHi 145, and AHi 148 as ON/OFF switching signals for the color conversion circuit B, the color correction circuit D, the character synthesizing circuit F, the image process and edit circuit G, the color balance circuit P, and the external apparatus image synthesizing circuit 502.

Note that "non-rectangular area" described here does not exclude a rectangular area, but includes it.

Since a mask is formed so that 4×4 pixels are used as one block and one block corresponds to one bit of a bit map memory. Therefore, in an image having a pixel density of 16 pels/mm, for 297 mm×420 mm (A3 size), (297×420×16×16)÷16=2 Mbits, i.e., the mask can be formed by two 1-Mbit DRAM chips.

In FIG. 37A, a signal 132 input to a FIFO memory 559L is a non-rectangular area data input line for generating a mask as described above. As the signal 132, an output signal 421 of the binarization circuit 532 shown in FIG. 2 is input through the switch circuit N.

The binarization circuit receives the signal from the reader A or the external apparatus interface M. When the signal 132 is input, it is input to buffers 559L, 560L, 561L, and 562L corresponding to 1 bit×4 lines in order to count the number of "1"s in the 4×4 block. FIFO memories 559L to 562L are connected as follows. That is, as shown in FIG. 37A, the output of the FIFO memory 559L is connected to the input of the memory 560L, and the output of the memory 560L is connected to the input of the memory 561L. The outputs from the FIFO memories are latched by latches 563L to 565L in response to a signal VCLK, so that four bits are in parallel with each other (see the timing chart of FIG. 37D). An output 615L from the FIFO memory 559L, and outputs 616L, 617L, and 618L from the latches 563L, 564L, and 565L are added by adders 566L, 567L, and 568L (signal 602L). The signal 602L is compared with a value (e.g., "12") set in a comparator 569L through an I/O port 25L by the CPU 22. More specifically, it is checked if the number of "1"s in the 4×4 block is larger than a predetermined value.

In FIG. 37D, the number of "1"s in a block N is "14", and the number of "1"s in a block (N+1) is "4". When the signal 602L represents "14", an output 603L of the comparator 569L in FIG. 37A goes to "1" level since "14">"12"; when the signal 602L represents "4", the output 603L goes to "0" level since "4"<"12". Therefore, the output from the comparator is latched once per 4×4 block by a latch 570L in response to a latch pulse 605L (FIG. 37D), and the Q output of the latch 570L serves as a $D_{IN}$ input of the memory 573L, i.e., mask generation data. An H address counter 580L generates a main scan address of the mask memory. Since one address is assigned to a 4×4 block, the counter 580L counts up in response to a clock obtained by ¼ frequency-dividing a pixel clock VCLK 608 by a frequency demultiplexer 577L. Similarly, a V address counter 575L generates a sub scan address of the mask memory. The counter 575L counts up in response to a clock obtained by ¼ frequency-dividing a sync signal HSYNC for each line for the same reason as described above. The operations of the H and V address counters are controlled to be synchronized with a counting addition operation of "1"s in the 4×4 block.

Lower 2 bits 610L and 611L of the V address counter are logically NORed by a NOR gate 572L to generate a signal 606L for gating a ¼ frequency-divided clock 607L. Then, an AND gate 571L generates a latch signal 605L for performing latching once per 4×4 block, as shown in the timing chart of FIG. 37C. A data bus 616L is included in the CPU bus 22 (FIG. 2), and can set non-rectangular area data in the bit map memory 573L upon an instruction from the CPU 20. For example, as shown in FIG. 37E, a circle or an ellipse is calculated by the CPU 20 (a sequence therefor will be described later), and calculated data is written in the memory 573L, thereby generating a regular non-rectangular mask. In this case, for example, the radius or central position of the circle can be input by numerical designation using a ten-key pad of the operation unit 1000 (FIG. 2) or the digitizer 58. An address bus 613L is also included in the CPU bus 22. A signal 615L corresponds to the write pulse WR from the CPU 20. In a WR mode of the memory 573L set by the CPU 20, the write pulse goes to "Lo" level, end gates 578L, 576L, and 581L are enabled. Thus, the address bus 613L and the data bus 616L from the CPU 20 are connected to the memory 573L, and predetermined non-rectangular area data is randomly written in the memory 573L. When WR (write) and RD (read) operations are sequentially performed by the H and V address counters, gates 576L' and 582L connected to the I/O port 25L are enabled by control lines of these gates, and sequential addresses are supplied the memory 573L.

Figure 39:
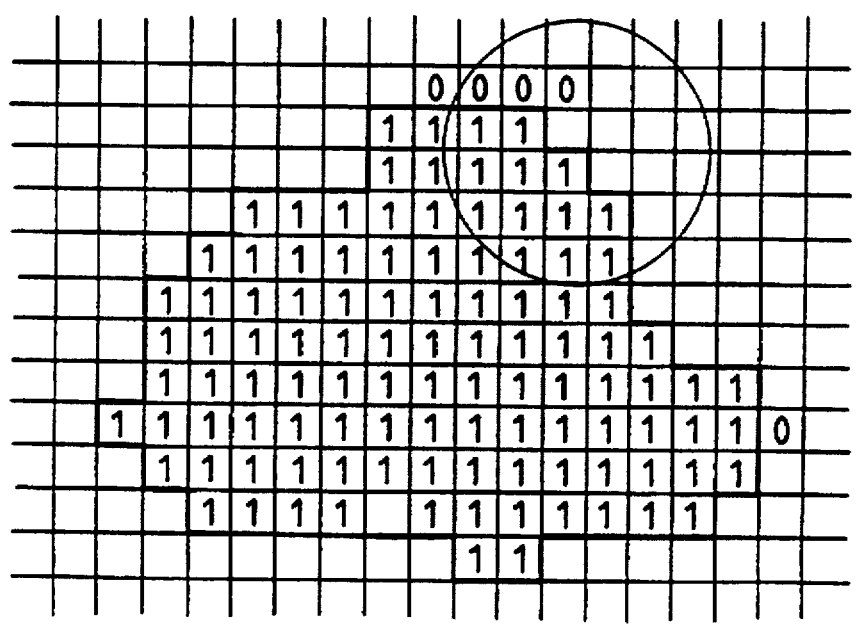
FIG. 39 is a view showing an example of a mask.

For example, if a mask shown in FIG. 39 is formed by the output 421 from the binarization circuit 532 or by the CPU 20, trimming, synthesis, and the like of an image can be performed on the basis of an area surrounded by a bold line.

Furthermore, the bitmap memory 573L shown in FIG. 37A can read out reduced or enlarged data by thinning or interpolation in both the H and V directions in the read mode. FIG. 40 shows in detail the H or V address counter (580L, 575L) shown in FIG. 37A. As shown in FIG. 40, for example, a signal MULSEL 636L is set to be "0" so that the B input of a selector 634L is to be selected. A thinning circuit (rate multiplier) 635L for an input clock 614L thins data so that a clock CLK is generated once per three timing pulses, as shown in FIG. 41 (timing chart) (setup is made by an I/O port 641L) (637L). For example, "2" is set in a signal 630L, and an output 638L from an address counter 632L and the value set in the signal 630L (e.g., "2") are added to each other only when a thinned output 637L is output, and the sum is loaded in the counter. Therefore, as shown in FIG. 41, since the counter is incremented by "+2" every third clocks like 1→2→3→5→6→7→9, . . . , thus achieving 80% reduction. In an enlargement mode, since MULSEL="1" and an A input 614L is selected, the address count is incremented like 1→2→3→3→4→5→6→6, . . . , as shown in the timing chart of FIG. 41.

Figure 37I:
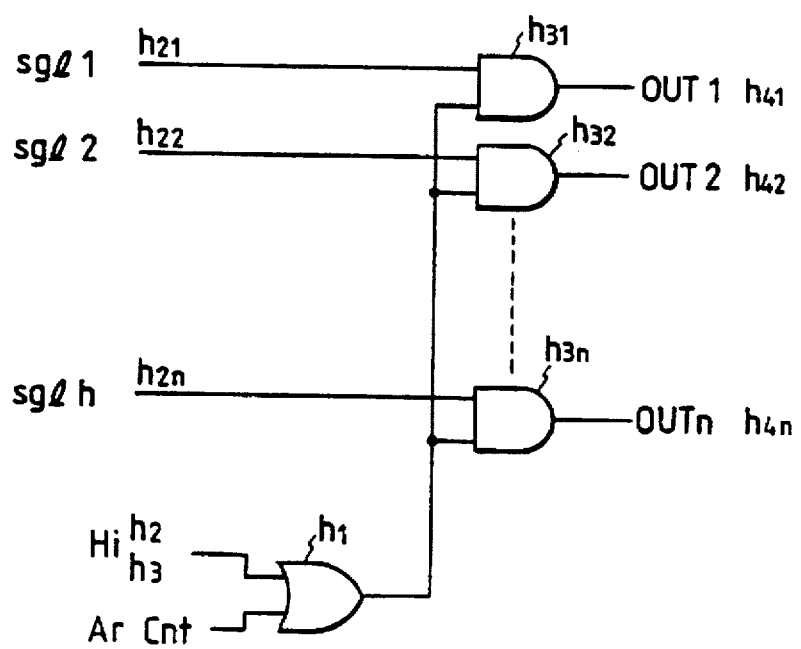
Figure 37J:
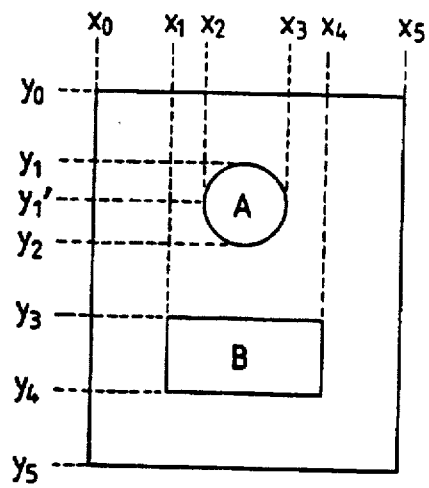
Figure 37K:
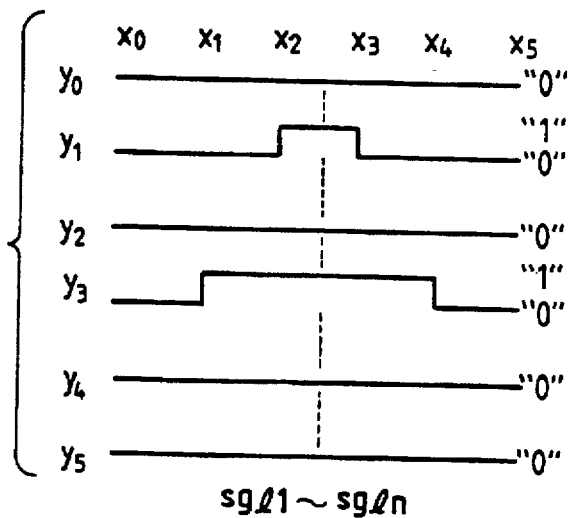
Figure 37L:
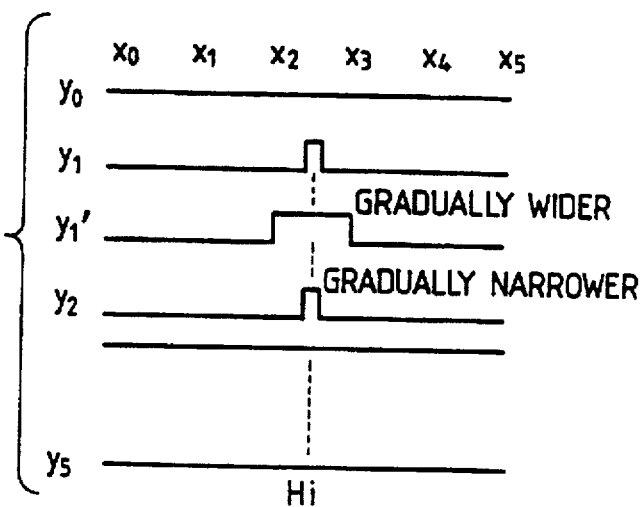
Figure 37M:
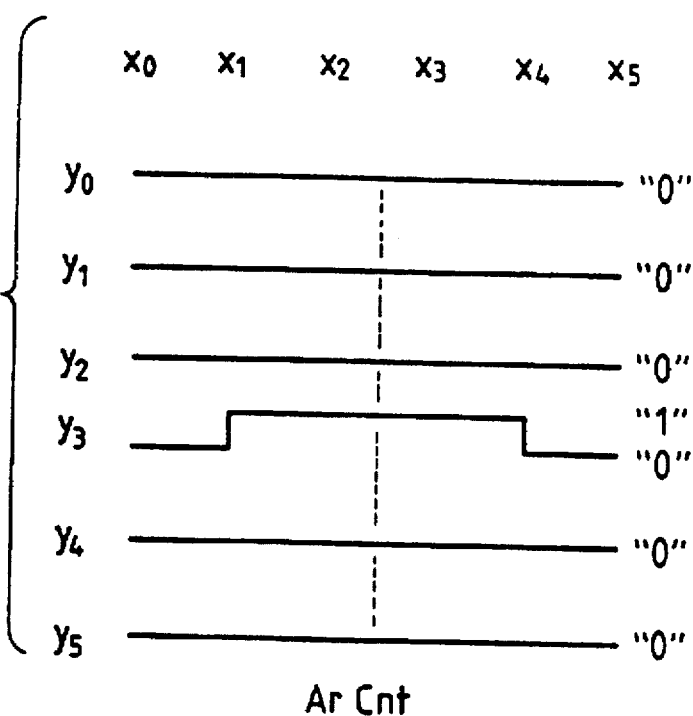

FIG. 40 shows in detail the H and V address counters 580L and 575L shown in FIG. 37L. Since these circuits have the same hardware arrangement, a description except for FIG. 37A will be omitted.

Figure 42A:
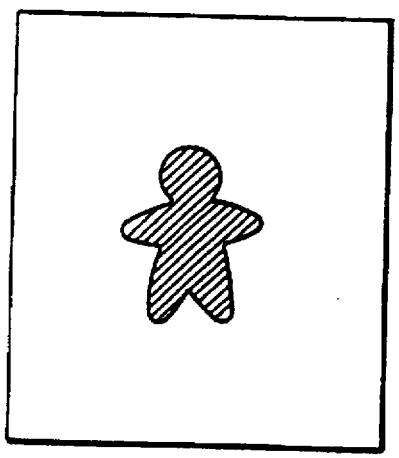
FIGS. 42A to 42C are views showing an example of enlargement and reduction.
Figure 42B:
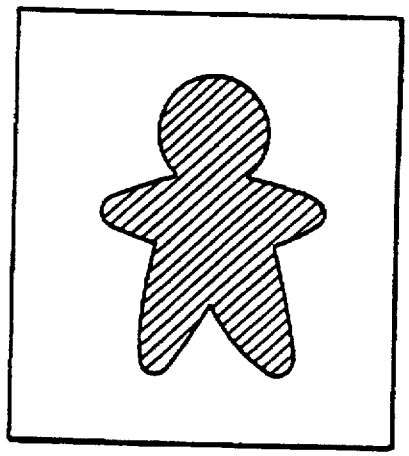
Figure 42C:
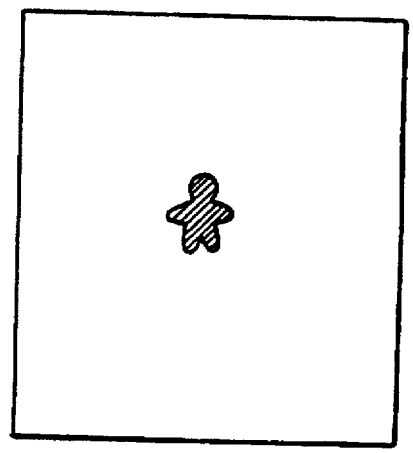

When the address counters are controlled in this manner, as shown in FIGS. 42A to 42C, an enlarged image 2 and a reduced image 1 are generated in response to an input non-rectangular area 1. Therefore, once a non-rectangular area is input, another input operation is not necessary, and a zoom operation can be performed according to various magnifications using one mask plane.

Figure 43A:
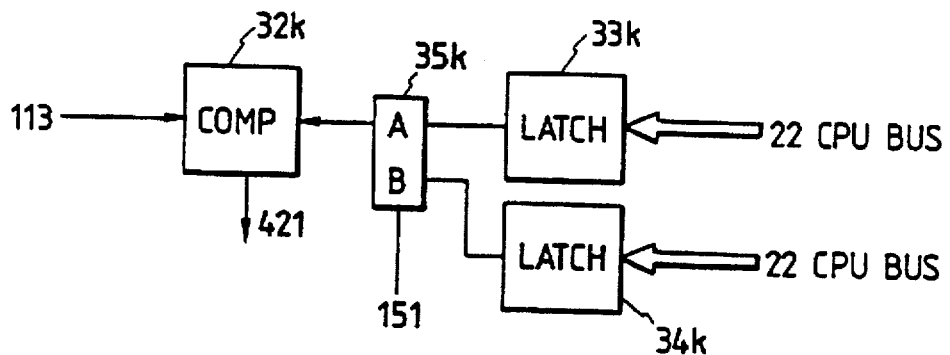
FIGS. 43A to 43C are circuit diagrams and a schematic view of a binarization circuit.
Figure 43B:
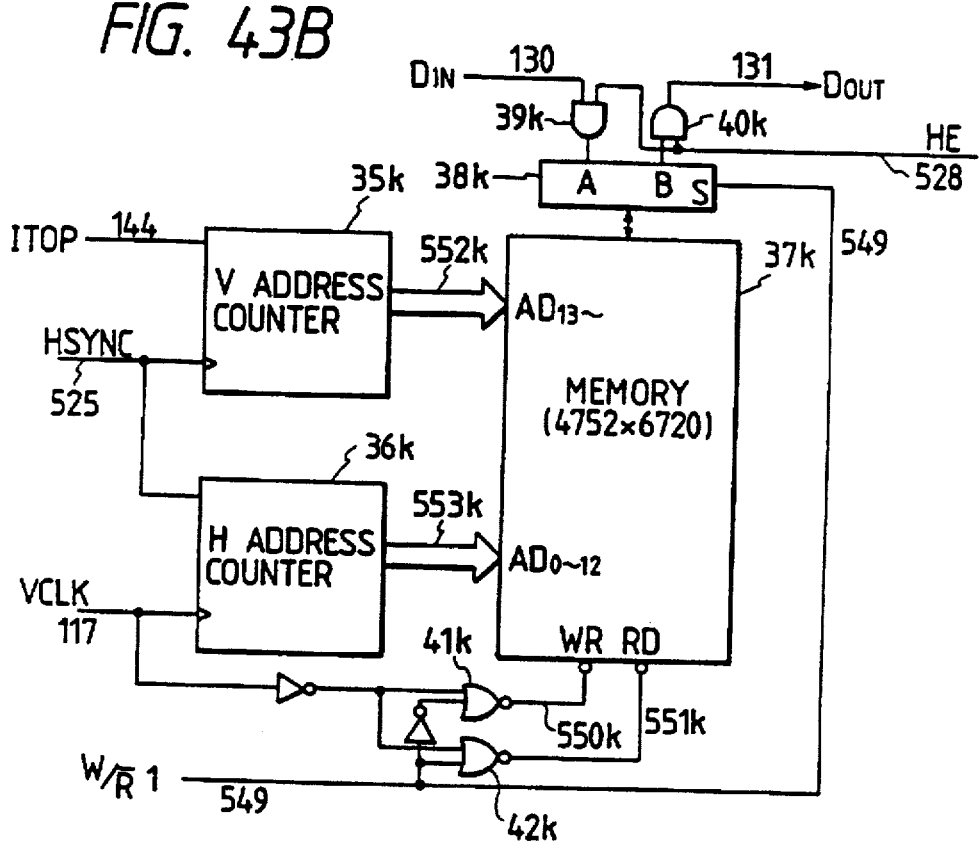
Figure 43C:
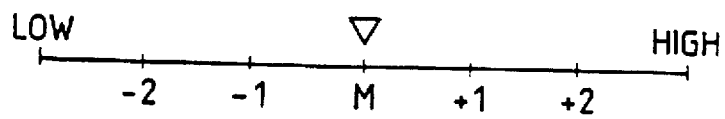

The binarization circuit (532 in FIG. 2) and the high-density memory K will be described below. In FIG. 43A, the binarization circuit 532 compares the video signal 113 output from the character/image correction circuit E with a threshold value 141k to obtain a binary signal. The threshold value is set by the CPU bus 22 in cooperation with the operation unit. More specifically, if the level position of the operation unit shown in FIG. 43C is set to be "M" (middle point), the threshold value is "128" with respect to an amplitude value=256 of input data. As the level position is shifted toward a "+" direction, the threshold value is changed by every "−30"; as it is shifted toward a "−" direction, the threshold value is changed by every "+30". Therefore, in correspondence with "LOW→−2→−1→M→+1→+2→HIGH", the threshold value is controlled to change like "2→188→158→128→98→68→38".

As shown in FIG. 43A, two different threshold values are set by the CPU bus 22. These threshold values are switched by a selector 35k in accordance with a switching signal 151, and the selected value is set in a comparator 32k as the threshold value. The switching signal 151 from the area signal generation circuit J can set another threshold value within a specific area set by the digitizer 58. For example, a single-color area of an original has a relatively low threshold value, and a multi-color area has a relatively high threshold value, so that a uniform binary signal can always be obtained regardless of colors of an original.

Figure 44:
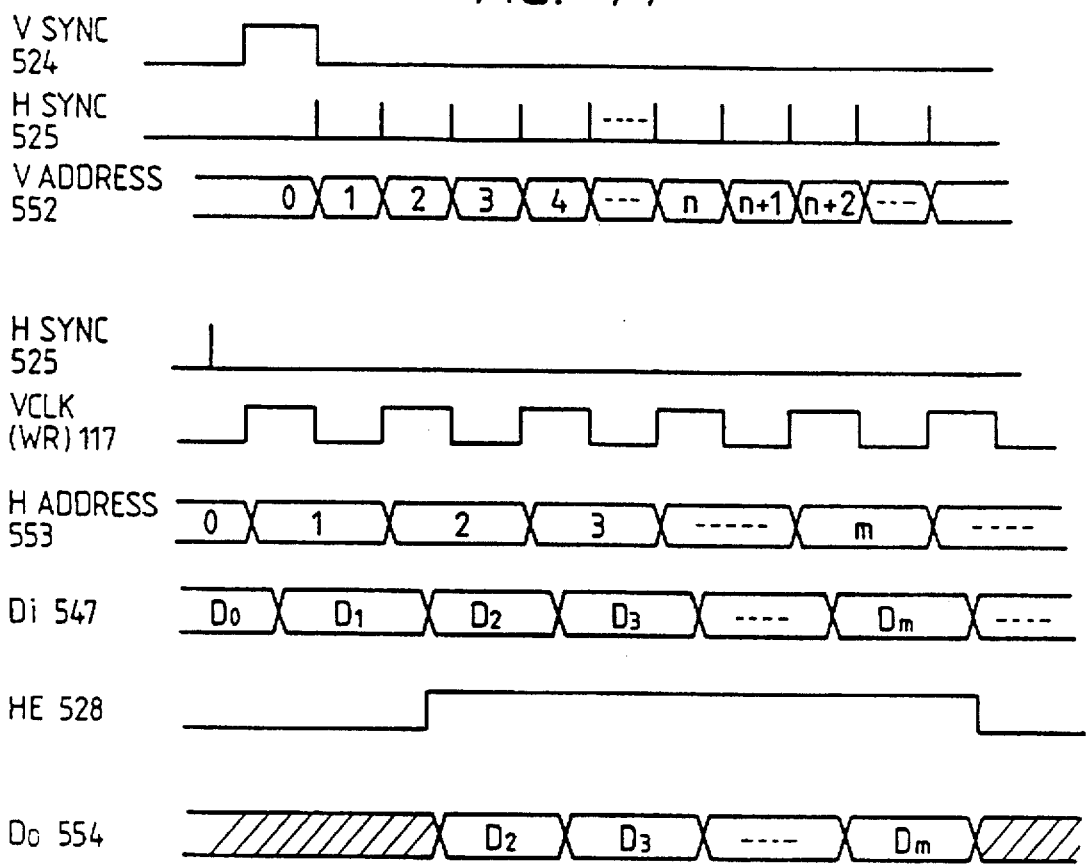
FIG. 44 is a timing chart of an address counter.
Figure 45A:
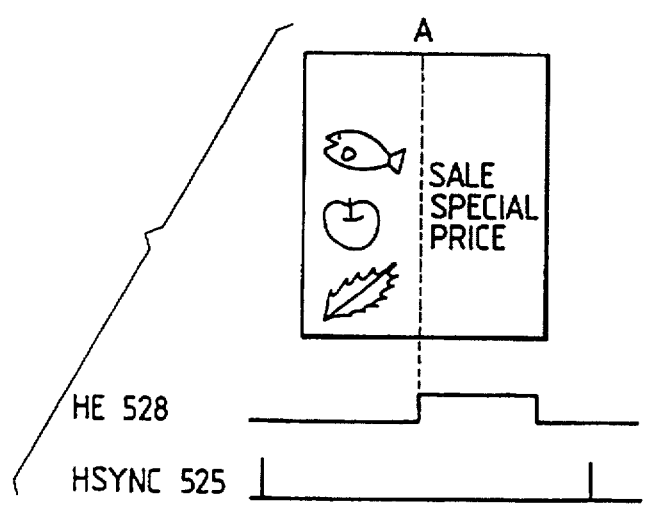
FIGS. 45A and 45A' are charts showing an example of bit map.
Figure 45A:

The memory K stores the binary signal 421 output as the signal 130 for one page. In this embodiment, since an image is processed at a density of 400 dpi, the memory has a capacity of about 32 Mbits. FIG. 43D shows in detail the memory K. Input data $D_{IN}$ 130 is gated by an enable signal HE 528 from the area signal generation circuit J in a memory write mode, and is input to a memory 37k when a W/R 1 signal 549 from the CPU 20 is at "Hi" level in the write mode. At the same time, a V address counter 35k for counting a main scan (horizontal) sync signal HSYNC 118 in response to a vertical sync signal ITOP 144 of an image to generate a vertical address, and an H address counter 36k for counting an image transfer clock VCLK 117 in response to the signal HSYNC 118 to generate a horizontal address corresponding to image data to be stored. In this case, as a memory WP input (write timing signal) 551k, a clock which is in-phase with the clock VCLK 117 is input as a strobe signal, and input data Di are sequentially stored in the memory 37k (timing chart of FIG. 44). When data is read out from the memory 37k, the control signal W/R 1 is set at "Lo" level, thereby reading out output data $D_{OUT}$ in the same sequence as described above. Both the data write and read access operations are performed in response to a signal HE 528. For example, when the signal HE 528 goes to "Hi" level at an input timing of $D_2$ and goes to "Lo" level at an input timing of $D_m$, as shown in FIG. 44, an image between $D_2$ and $D_m$ is input to the memory 37k, no image is written in $D_0$, $D_1$, $D_{m+1}$, and thereafter, and data "0" is written instead. The same applies to the read mode. That is, during a period other than a "Hi" period of the signal HE, data "0" is read out. The signal HE is generated by the area signal generation circuit J. More specifically, when a character original as shown in FIG. 45 is placed on an original table, the signal HE in the write mode of a binary signal can be generated as shown in A of FIG. 45, so that a binary image of only a character portion can be fetched in the memory, as shown in FIG. 45A'.

Figure 46A:
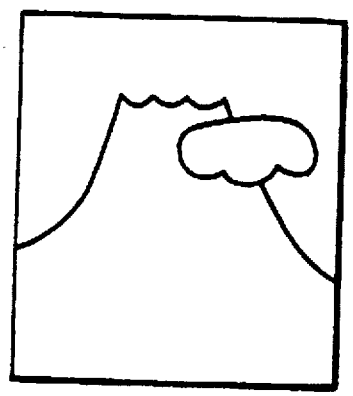
FIGS. 46A to 46D are views showing an example of character/image synthesizing processing.
Figure 46C:
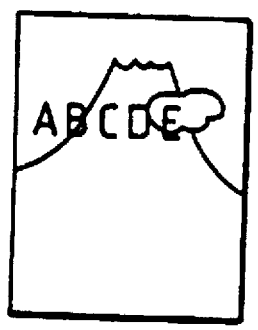
Figure 46B:
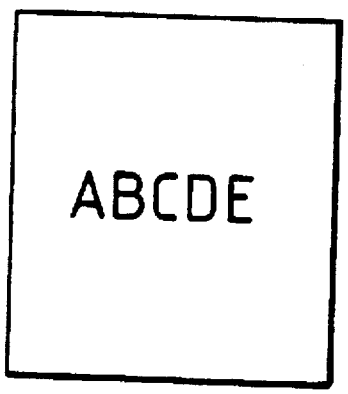
Figure 46D:
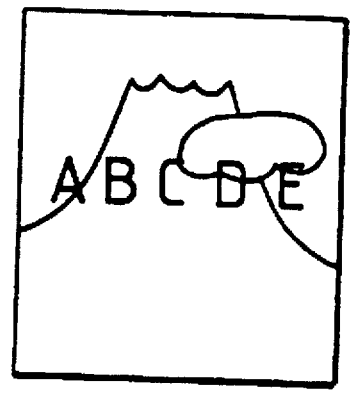

Since the address counters 35k and 36k for reading out data from the memory 37k have the same arrangement as that shown in FIG. 40 and are operated at the same timings shown in FIG. 41, when a binary character image shown in FIG. 46B, which is prestored in the memory, as shown in FIGS. 46A to 46D, is synthesized with an image shown in FIG. 46A, the two images can be synthesized after they are reduced, as shown in FIG. 46C, or the two images can be synthesized after only a character portion to be synthesized is enlarged while the size of a background image (FIG. 46A) is left unchanged, as shown in FIG. 46D.

Figure 47:
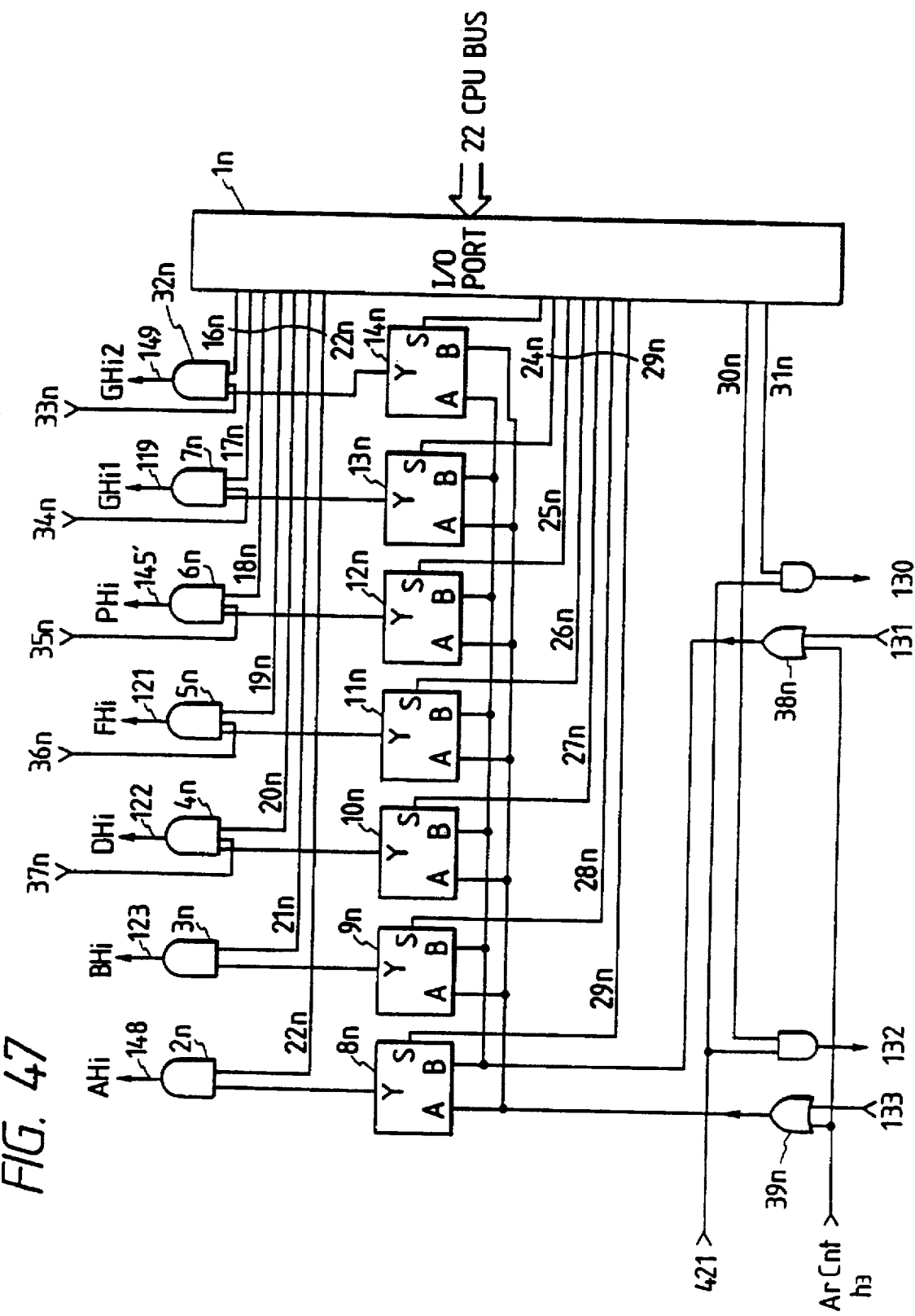
FIG. 47 is a circuit diagram of a switch circuit.
Figure 48A:
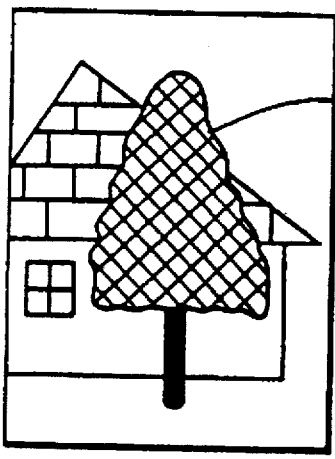
FIGS. 48A to 48C show an example of a non-linear mask.
Figure 48C:
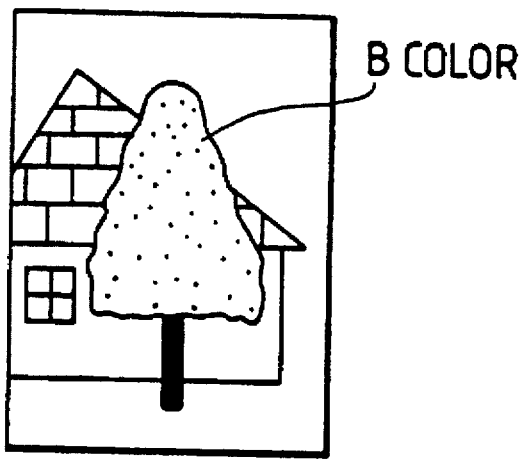
Figure 48B:
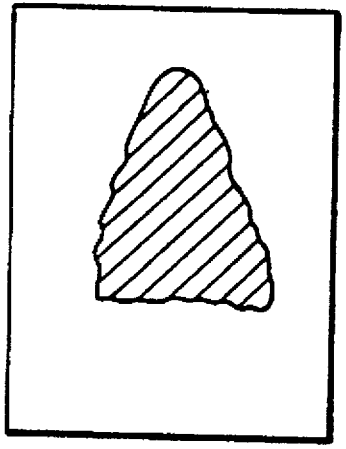

FIG. 47 shows the switch circuit for performing distribution of data from the 100-dpi binary bit map memory L (FIG. 2) for a non-rectangular mask, and the 400-dpi binary memory K (FIG. 2) to the image processing blocks A, B, D, F, P, and G, switching distribution of binary video images to the memories L and K, and for selectably outputting rectangular and non-rectangular area signals in real time. Real-time switching between the rectangular and non-rectangular area signals will be described later. Mask data for restricting a non-rectangular area stored in the memory L is sent to, e.g., the color conversion circuit B described above (BHi 123), and color conversion is performed for a portion inside a shape shown in, e.g., FIG. 48B. The circuit in FIG. 47 includes an I/O port 1n connected to the CPU bus 22, and 2 to 1 selectors 8n to 13n, each of which selects the A input when a switching input S="9", and selects the B input when S="0". For example, in order to supply the output from the 100-dpi mask memory L to the color conversion circuit B, the selector 9n can select the A input, i.e., 28n="1", and an AND gate 3n can set a 21n input to be "1". Similarly, other signals can be arbitrarily controlled by inputs 16n to 31n. Outputs 30n and 31n from the I/O port in are control signals for selecting one of the binary memories L and K in which the output from the binarization circuit 532 (FIG. 2) is to be stored. When 30n="1", the binary input 421 is input to the 100-dpi memory L; when 31n="1", it is input to the 400-dpi memory K. When AHi 148="1", image data sent from an external apparatus is synthesized; when BHi 123="1", color conversion is performed, as described above; and when DHi 122="1", monochromatic image data is calculated and output from the color correction circuit. Signals FHi 121, PHi 145, GHi1 119, and GHi2 149 are respectively used for character synthesis, color balance change, texture processing, and mosaic processing operations.

In this manner, the 100- and 400-dpi memories L and K are arranged, so that character information is input to the high-density, i.e., 400-dpi memory K, and area information (including rectangular and non-rectangular areas) is input to the 100-dpi memory L. Thus, character synthesis can be performed for a predetermined area, in particular, a non-rectangular area.

Figure 62:
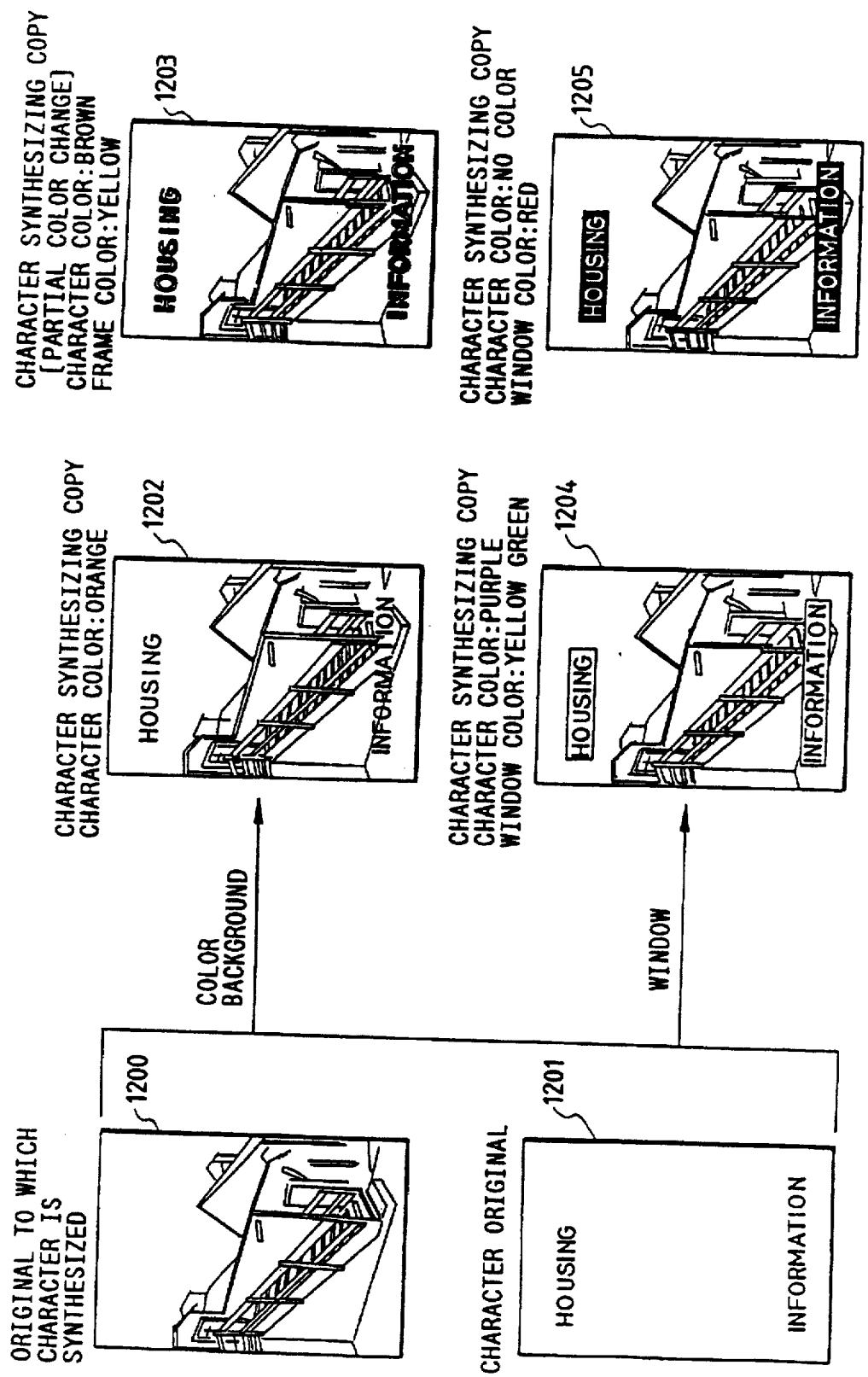
FIG. 62 is a chart for explaining the character synthesizing sequence.

When a plurality of bit map memories are arranged, color window processing shown in FIG. 62 can be achieved.

Figure 49A:
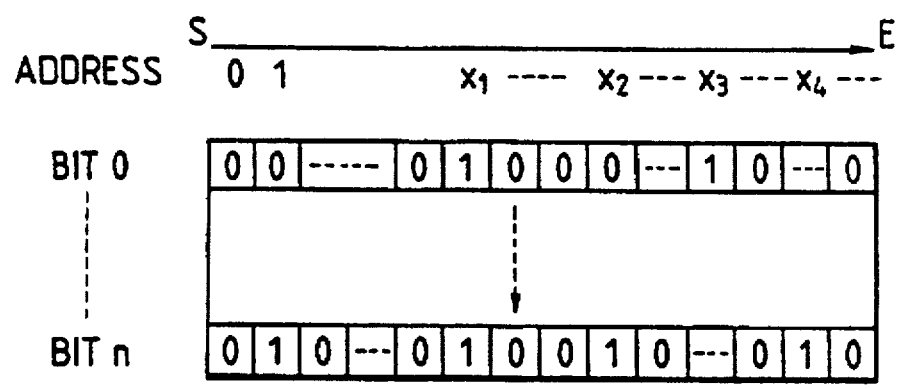
FIGS. 49A to 49F are explanatory views and a circuit diagram of an area signal generation circuit.
Figure 49B:
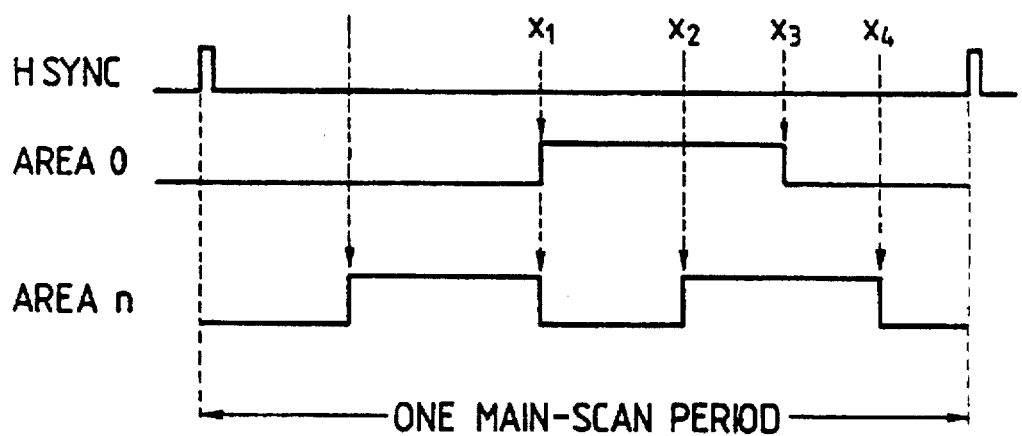
Figure 49C:
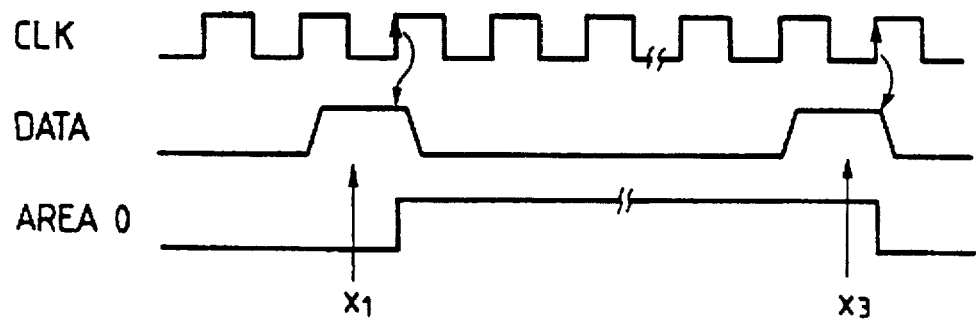
Figure 49D:
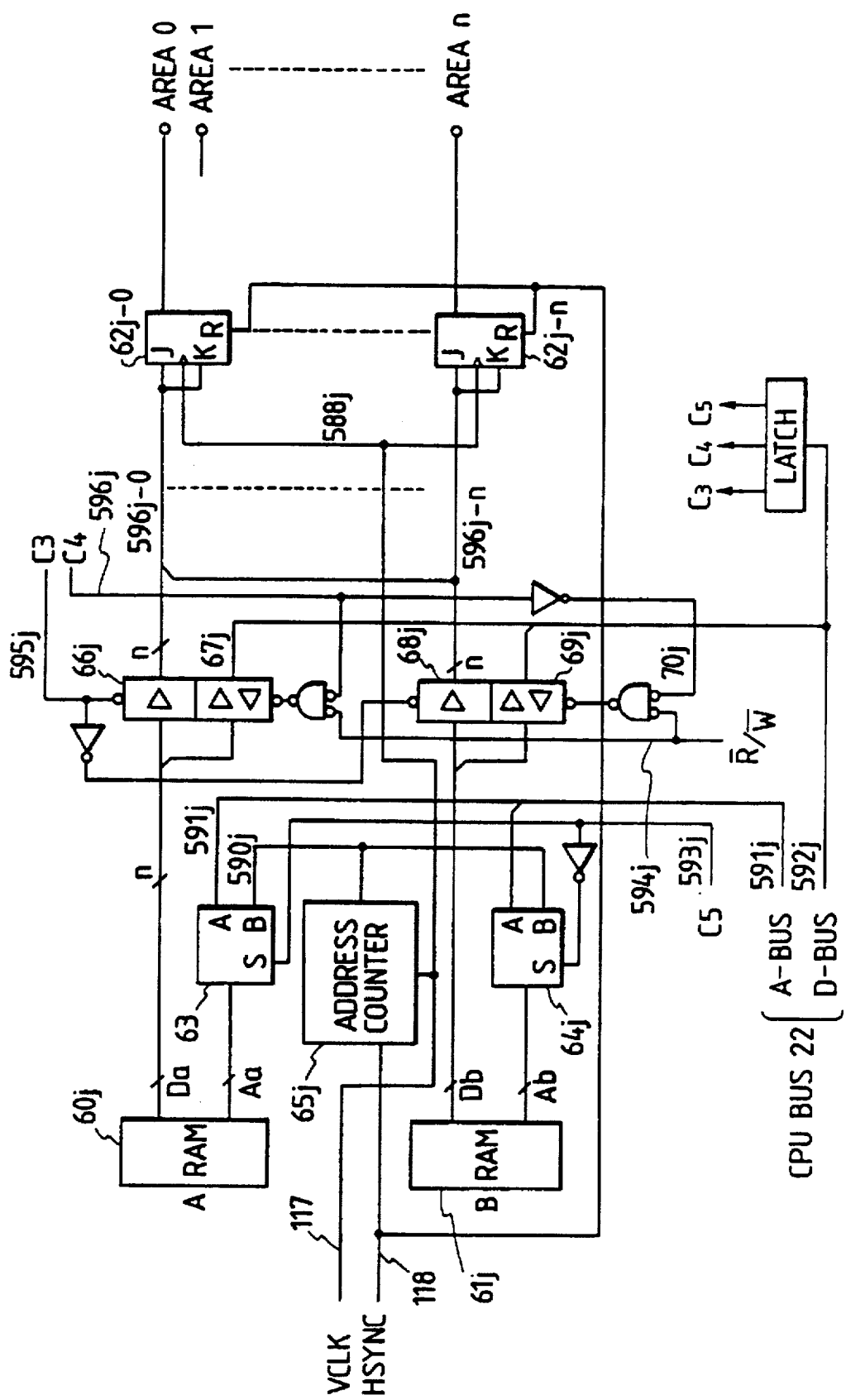
Figure 49E:
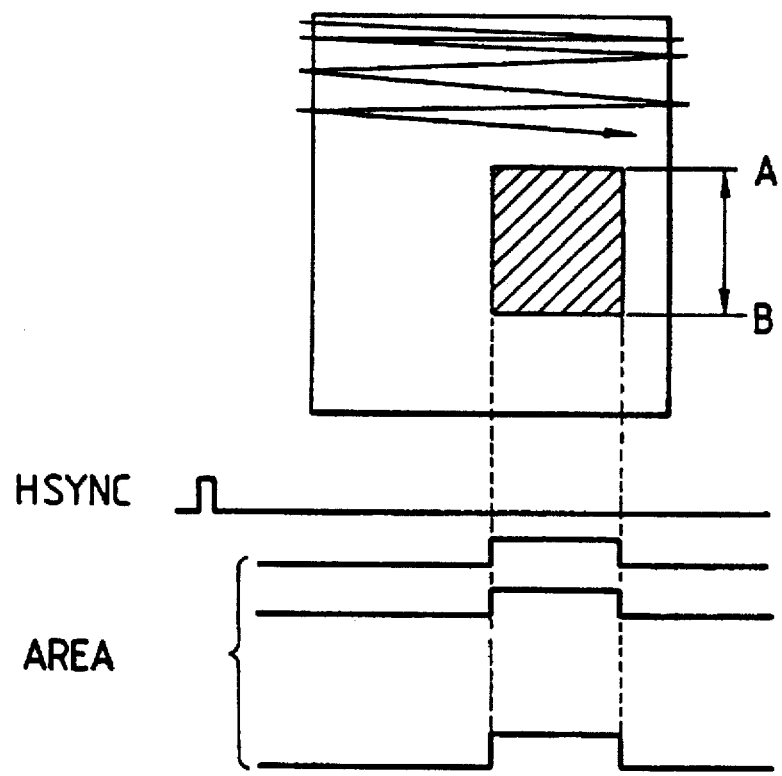
Figure 49F:
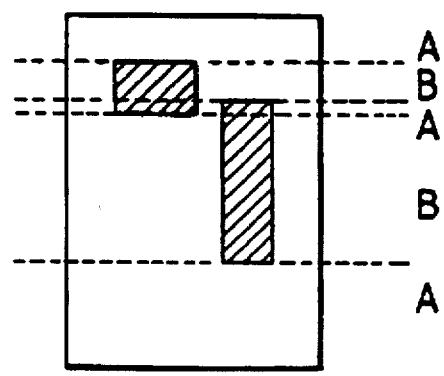

FIGS. 49A to 49F are views for explaining the area signal generation circuit J. An area indicates, for example, a hatched portion of FIG. 49E, and is distinguished from other areas by a signal AREA shown in the timing chart of FIG. 49E during a sub scan period A→B. Each area is designated by the digitizer 58 shown in FIG. 2. FIGS. 49A to 49D show an arrangement wherein generation positions, durations of periods, and the numbers of periods of a large number of area signals can be programmably obtained by the CPU 20. In this arrangement, one area signal is generated by one bit of a RAM which can be accessed by the CPU. In order to obtain, for example, n area signals AREA0 to AREAn, two n-bit RAMs are prepared (60j and 61j in FIG. 49D). Assuming that area signals AREA0 and AREAn shown in FIG. 49B are to be obtained, "1" is set in bits "0" of addresses $x_1$ and $x_3$ of the RAM, and "0" is set in all bits of the remaining addresses. On the other hand, "1" is set at addresses 1, $x_1$, $x_2$, and $x_4$ of the RAM, and "0" is set in bits n of other addresses. When data in the RAM are sequentially read out in synchronism with a predetermined clock 117 with reference to the signal HSYNC 118, data "1" are read out at timings of the addresses $x_1$ and $x_3$, as shown in FIG. 49C. Since the readout data are input to the J and K terminals of J-K flip-flops 62j-0 to 62j-n, their outputs are subjected to a toggle operation, i.e., when data "1" is read out from the RAM and the clock CLK is input, their outputs change like "0" to "1" or "1" to "0", thereby generating a period signal such as AREA0, i.e., an area signal. When data ="0"s over all the addresses, no area period is formed, and no area is set. FIG. 49D shows the circuit arrangement of this circuit, and 60j and 61j designate the above-mentioned RAMs. In order to switch area periods at high speed, for example, a memory write operation for setting a different area is performed by the CPU 20 for the RAM B 61j, while read access of the RAM A 60j is performed in units of lines, so that period generation and memory write access by the CPU are alternately switched. Therefore, when a hatched area shown in FIG. 49F is designated, the RAMs A and B are switched like A→B→A→B→A. If (C₃, C₄, C₅)=(0, 1, 0) in FIG. 49D, a counter output counted in response to the clock VCLK 117 is supplied to the RAM A 60j (Aa) as an address through a selector 63j. In this case, a gate 66j is enabled, and a gate 68j is disabled, so that all the bit width, i.e., n bits are read out from the RAM A 60j and are input to the J-K flip-flops 62j-0 to 62j-n. Thus, period signals AREA0 to AREAn are generated in accordance with set values. Write access of the RAM B by the CPU is performed by an address bus A-Bus, a data bus D-Bus, and an access signal R/W during this period. In contrast to this, period signals can be generated on the basis of data set in the RAM B 61j in the same manner as described above if (C₃, C₄, C₅)=(1, 0, 1) is set, and data write access of the RAM 60j by the CPU can also be executed.

Figure 50:
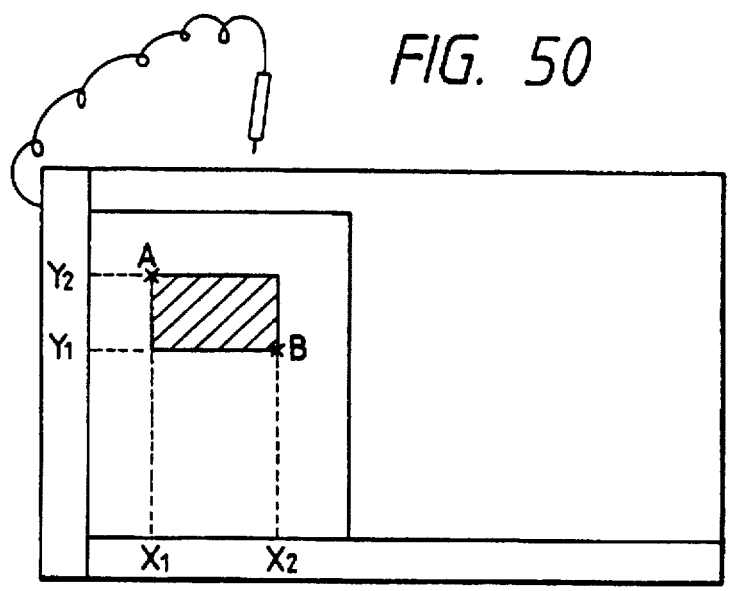
FIG. 50 shows area designation by a digitizer.

The digitizer 58 performs area designation, and inputs coordinates of a position designated by the CPU 20 through an I/O port. For example, in FIG. 50, if two points A and B are designated, coordinates A ($X_1,Y_2$) and B ($X_2,Y_2$) are input.

FIG. 37I is a view for explaining a method of executing process and edit processing for rectangular and non-rectangular areas when an original includes both rectangular and non-rectangular images. In FIG. 37I, sgl1 to sgln and ArCnt designate rectangular area signals, such as outputs AREA0 to AREAn of the rectangular area signal generation circuit shown in FIG. 49D.

On the other hand, Hi designates a non-rectangular area signal, such as an output 133 from the bit map memory L and its control circuit shown in FIG. 37A.

Figure 37N:
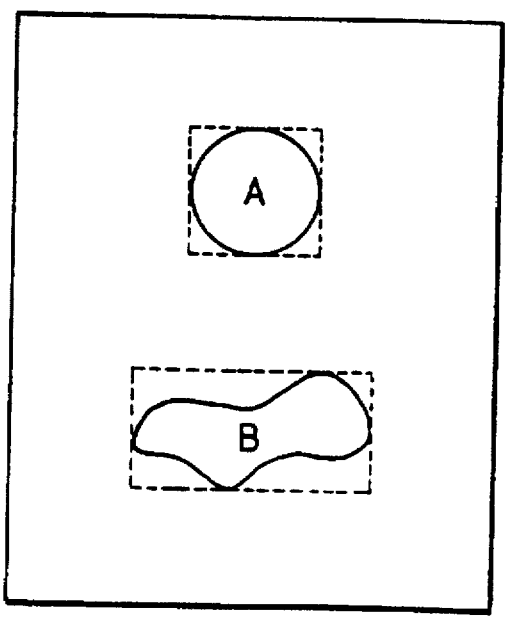
Figure 38:
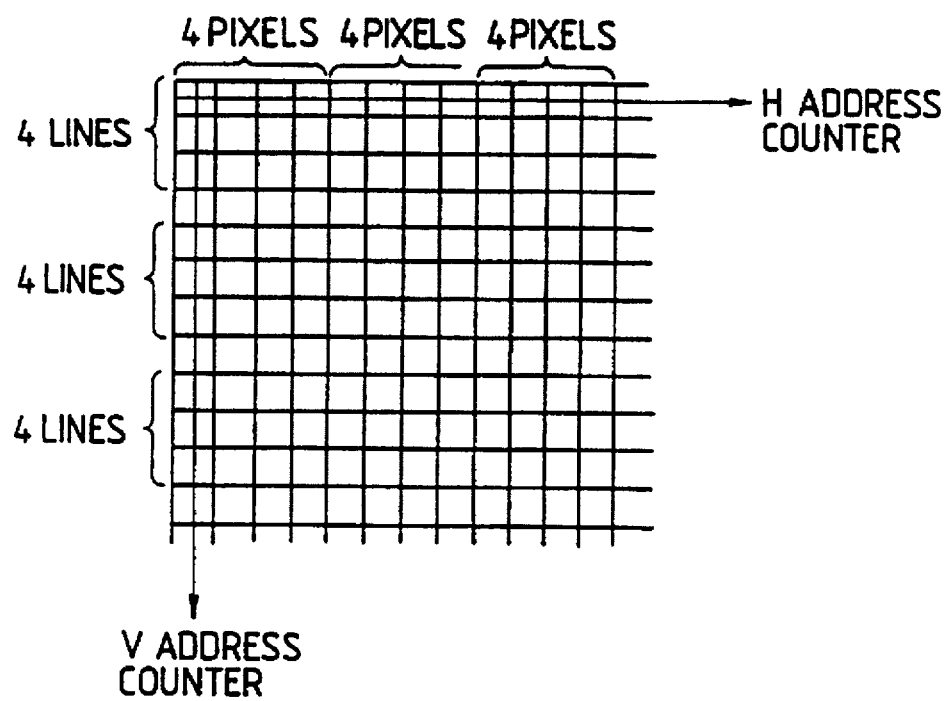
FIG. 38 is a view showing addresses.

The signals sgl1 to sgln ($h_2$1 to $h_2$n) are enable signals of process and edit processing. For a rectangular area, all the signals corresponding to a portion to be subjected to the process and edit processing are enabled. For a non-rectangular area, the signals corresponding to only a rectangular area which inscribes the non-rectangular area are enabled. More specifically, signals corresponding to rectangular areas indicated by dotted lines are enabled for non-rectangular areas indicated by solid lines A and B in FIG. 37N.

The signal ArCnt ($h_3$) is enabled in synchronism with the signals sgl1 to sgln for a rectangular area. For a non-rectangular area, the signal ArCnt is disabled.

The signal Hi ($h_2$) is enabled within a non-rectangular area. For a rectangular area, the signal Hi is disabled.

The Hi signal $h_2$ and the ArCnt signal $h_3$ are logically ORed by an OR gate $h_1$, and the logical sum is logically ANDed with the signals sgl1 to sgln ($h_2$1 to $h_2$n) by AND gates $h_3$1 to $h_3$n, respectively.

In this manner, outputs out1 to outn ($h_4$1 to $h_4$n) allow a desired combination of rectangular and non-rectangular area signals.

FIGS. 37J to 37M are views for explaining changes in input signals when a rectangular area signal (B) and a non-rectangular area signal (A) are present at the same time.

The signals sgl1 to sgln (FIG. 37K) are enabled for the entire rectangular area, and for a rectangular area which inscribes a non-rectangular area, as described above.

The Hi signal (FIG. 37L) is disabled for a rectangular area, and is enabled for the entire non-rectangular area, as described above.

The signal ArCnt (FIG. 37M) is enabled for the entire rectangular area, and is disabled for the entire non-rectangular area, as described above.

Finally, a correspondence between FIGS. 37I and 47 will be described below.

The OR gate $h_1$ shown in FIG. 37I corresponds to OR gates 38n and 39n in FIG. 47; the AND gates $h_3$1 to $h_3$n in FIG. 37I, 4n to 7n, and 32n in FIG. 47; area signals sgl1 to sgln ($h_2$1 to $h_2$n) in FIG. 37I, 33n to 37n in FIG. 47; and the outputs out1 to outn ($h_4$1 to $h_4$n) in FIG. 37I, DHi, FHi, PHi, GHi1, and GHi2 in FIG. 47.

In this manner, process and edit processing can be performed for a plurality areas including both rectangular and non-rectangular areas of one original.

As described above, according to this embodiment, since a means for designating a rectangular area (area signals sgl1 to sgln), a means for designating a non-rectangular area (hit signals Hih$_2$), and a non-rectangular area real-time selection means (AND gates $h_3$1 to $h_3$n) are arranged, edit processing can be performed for an original including both rectangular and non-rectangular area designation operations.

In particular, according to this embodiment, since signals sgl1 to sgln define a rectangular area which inscribes a non-rectangular area, a rectangular or non-rectangular area can be selected in accordance with the non-rectangular area signal Hi and the rectangular area signal ArCnt.

Area designation according to the nature of an area to be designated can be performed. For example, when an area can be roughly designated, area designation can be performed using a rectangular area; when an area must be exactly designated, area designation can be performed using a non-rectangular area. Thus, edit processing with a high degree of freedom can be efficiently performed.

The number of areas and the number of AND gates can be desirably set. The kinds of processing performed for each area can be desirably determined by setting the I/O port 1n based on inputs from the operation unit 1000.

Figure 51:
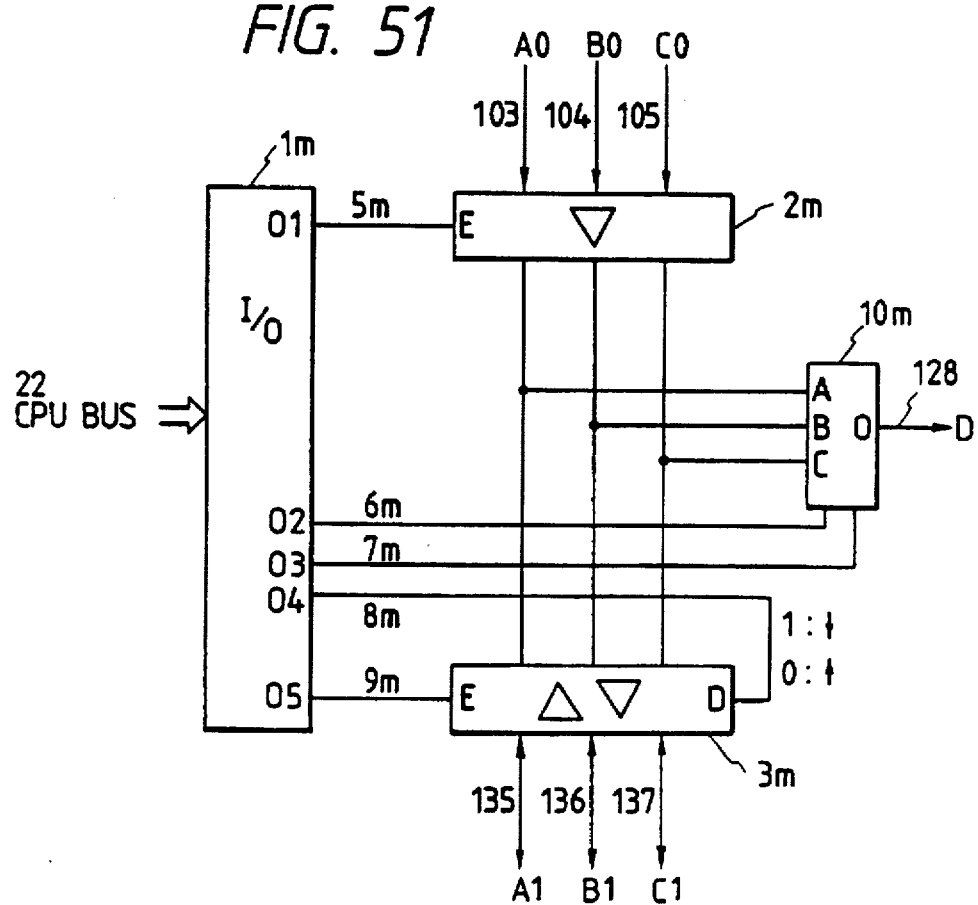
FIG. 51 is a circuit diagram of an interface with an external apparatus.

FIG. 51 shows the interface M for performing bidirectional communication of image data with an external apparatus connected to the image processing system of this embodiment. An I/O port 1m is connected to the CPU bus 22, and outputs signals 5m to 9m for controlling directions of data buses A0 to C0, A1 to C1, and D. Bus buffers 2m and 3m have terminals for an output tristate control signal E. The buffer 3m can change its direction in accordance with the D input. When E input="1", the buffers 2m and 3m output signals; when E="0", they are set in an output high-impedance state. A 3 to 1 selector 10m selects one of three parallel inputs A, B, and C in accordance with select signals 6m and 7m. In this circuit, basically, there are bus flows of 1. (A0, B0, C0)→(A1, B1, C1) and 2. (A1, B1, C1)→D. These bus flows are controlled by the CPU 20 as shown in the truth table of FIG. 52. This system can receive both a rectangular image (FIG. 53A) and a non-rectangular image (FIG. 53B), which are input from an external apparatus through the buses A1, A2, and A3. When a rectangular image shown in FIG. 53A is input, the I/O port 501 outputs a control signal 147 so that the switching input of the selector 503 shown in FIG. 2 is set to be "1" to select the A input. At the same time, predetermined data are written by the CPU at predetermined addresses of the RAMs 60j and 61j (FIG. 51) in the area signal generation circuit J, which correspond to areas to be synthesized, thereby generating a rectangular area signal 129. In an area where an image input 128 from the external apparatus is selected by the selector 507, not only the image data 128 but also the gradation/resolution switching signal 140 are simultaneously switched. More specifically, in an area where an image from the external apparatus is input, the gradation/resolution switching signal which is generated based on a character area signal MjAr 124 (FIG. 2) detected from color separation signals of an image read from an original table, is stopped, and is forcibly set at "Hi" level, thereby smoothly outputting an image area to be synthesized from the external apparatus with multigradation. As has been described above with reference to FIG. 51, when the bit map mask signal Ahi 148 from the binary memory L is selected by the selector 503 in response to the signal 147, synthesis of an image from the external apparatus can be realized, as shown in FIG. 53B.

<Summary of Operation Unit>

Figure 54:
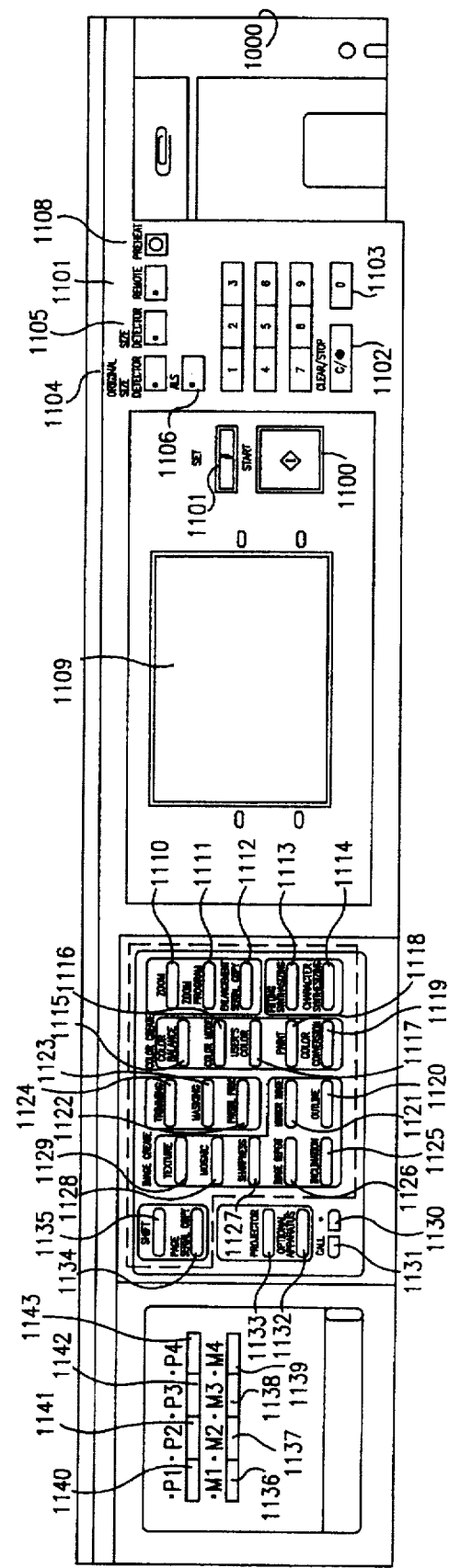
FIG. 54 shows an outer appearance of an operation unit.

FIG. 54 schematically shows an outer appearance of the operation unit 1000 according to this embodiment. A key 1100 serves as a copy start key. A key 1101 serves as a reset key, and is used to reset all set values on the operation unit to power-on values. A key 1102 is a clear/stop key, and is used to reset an input count value upon designation of a copy count or to interrupt a copying operation. A key group 1103 is a ten-key pad, and is used to input numerical values, such as a copy count, a magnification, and the like. A key 1104 is an original size detection key. A key 1105 is a center shift designation key. A key 1106 is an ACS function (black original recognition) key. When an ACS mode is ON, an original in signal black color is copied in black. A key 1107 is a remote key which is used to transfer the right of control to a connected apparatus. A key 1108 is a preheat key.

A liquid crystal display 1109 displays various kinds of information. The surface of the display 1109 serves as a touch panel. When the surface of the display 1109 is pressed by, e.g., a finger, a coordinate value of the pressed position is fetched.

In a normal or ordinary state, the display 1109 displays a magnification, a selected sheet size, a copy count, and a copy density. During setting of various copy modes, guide screens necessary for setting the corresponding modes are sequentially displayed. (The copy mode is set by soft keys displayed on the screen.) In addition, the display 1109 displays a self-diagnosis screen of a guide screen.

A key 1110 is a zoom key which serves as an enter key of a mode of designating a zoom magnification. A key 1111 is a zoom program key, which serves as an enter key of a mode of calculating a magnification based on an original size and a copy size. A key 1112 is an enlargement serial copy key, which serves as an enter key of an enlargement serial copy mode. A key 1113 is a key for setting a fitting synthesizing mode. A key 1114 is a key for setting a character synthesizing mode. A key 1115 is a key for setting a color balance. A key 1116 is a key for setting color modes, e.g., a monochrome mode, a negative/positive reversal mode, and the like. A key 1117 is a user's color key, which can set an arbitrary color mode. A key 1118 is a paint key, which can set a paint mode. A key 1119 is a key for setting a color conversion mode. A key 1120 is a key for setting an outline mode. A key 1121 is a key for setting a mirror image mode. Keys 1124 and 1123 are keys for respectively designating trimming and masking modes. A key 1122 can be used to designate an area, and processing of a portion inside the area can be set independently of other portions. A key 1129 serves as an enter key of a mode for performing an operation for reading a texture image, and the like. A key 1128 serves as an enter key of a mosaic mode, and is used to change, e.g., a mosaic size.

A key 1127 serves as an enter key of a mode for adjusting sharpness of an edge of an output image. A key 1126 is a key for setting an image repeat mode for repetitively outputting a designated image.

A key 1125 is a key for enabling inclination/taper processing of an image. A key 1135 is a key for changing a shift mode. A key 1134 is a key for setting a page serial copy mode, an arbitrary division mode, and the like. A key 1133 is used to set data associated with a projector. A key 1132 serves as an enter key of a mode of controlling an optional apparatus connected. A key 1131 is a recall key, which can recall up to previous three set contents. A key 1130 is an asterisk key. Keys 1136 to 1139 are mode memory call keys, which are used to call a mode memory to be registered. Keys 1140 to 1143 are program memory call keys, which are used to call an operation program to be registered.

<Color Conversion Operation Sequence>

Figure 55B:
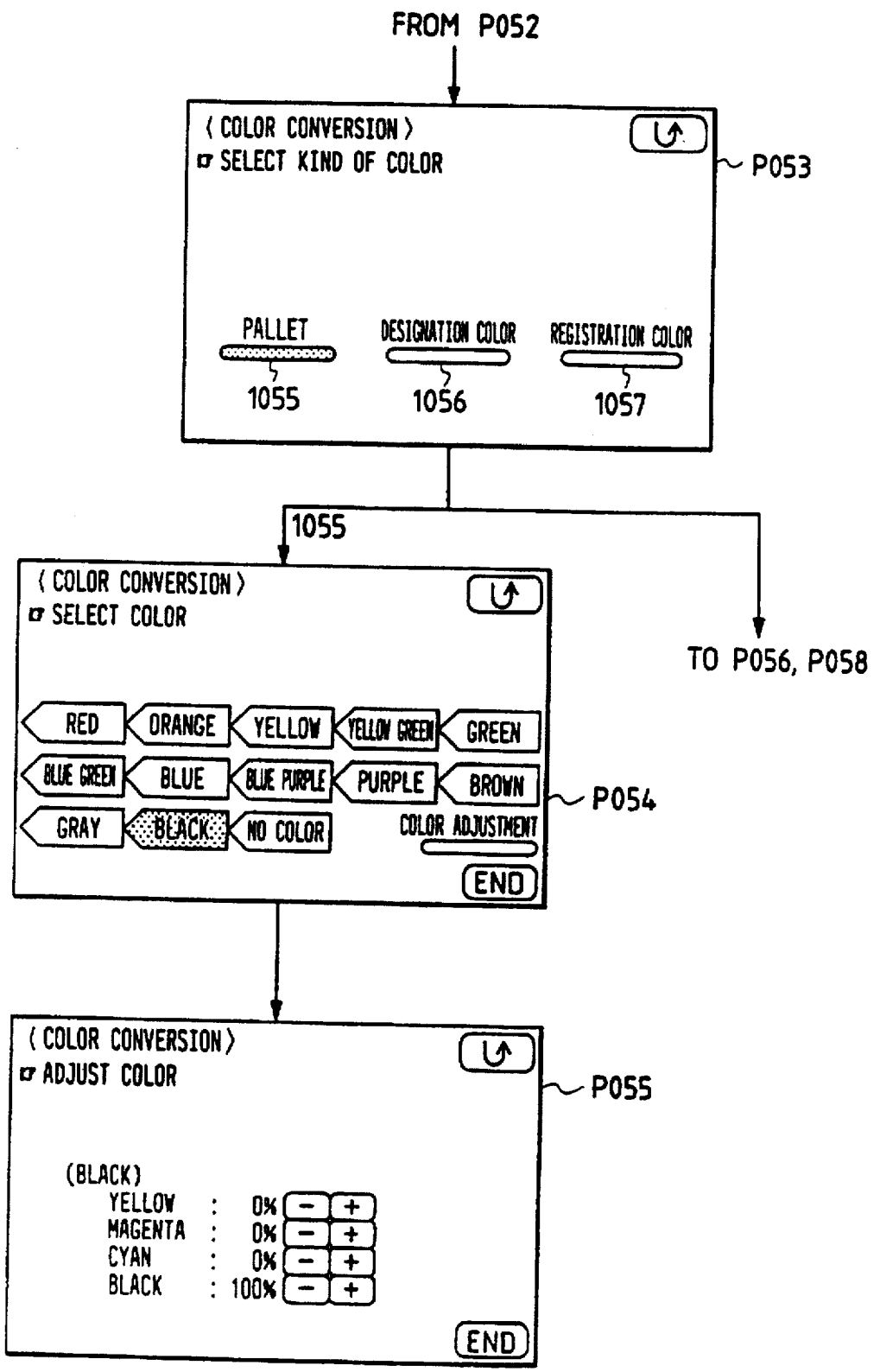

A sequence of the color conversion operation will be described below with reference to FIG. 55.

When the color conversion key 1119 on the operation unit is depressed, the display 1109 displays a page or image plane P050. An original is placed on the digitizer, and a color before conversion is designated with a pen. When an input is completed, the screen display is switched to a page P051. On this page, a width of the color before conversion is adjusted using touch keys 1050 and 1051. After the width is set, a touch key 1052 is depressed. The screen display is switched to a page P052, and whether or not a color density is changed after color conversion is selected using touch keys 1053 and 1054. When "density change" is selected, the converted color has gradation in correspondence with a color density before conversion. That is, the above-mentioned gradation color conversion is executed. On the other hand, when "density unchange" is selected, the color is converted to a designated color at an equal density. When "density change/unchange" is selected, the screen display is switched to a page P053, a kind of color after conversion is selected. When a key 1055 is depressed on the page P053, an operator can designate an arbitrary color on the next page P054. When a color adjustment key is depressed, the screen display advances to a page P055, and color adjustment can be performed for each of Y, M, C, and Bk in units of 1%.

When a key 1056 is depressed on the page P053, the screen display advances to a page P056, and a desired color of an original on the digitizer is designated with a pointing pen. On the next page P057, a color density can be adjusted.

When a key 1057 is depressed on the page P053, the screen display advances to a page P058, and a predetermined registration color can be selected by a number.

<Trimming Area Designation Sequence>

Figure 56B:
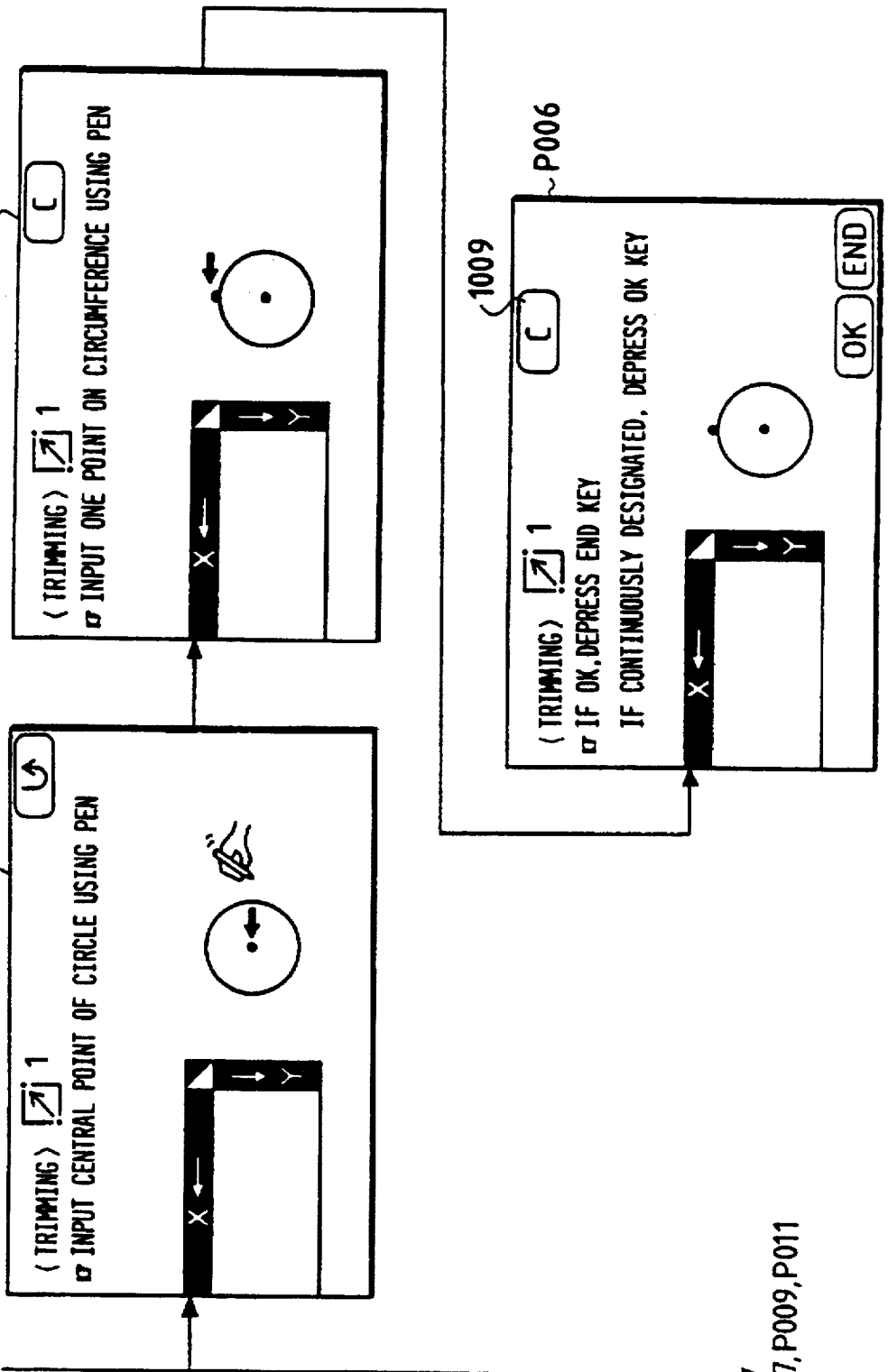
Figure 56D:
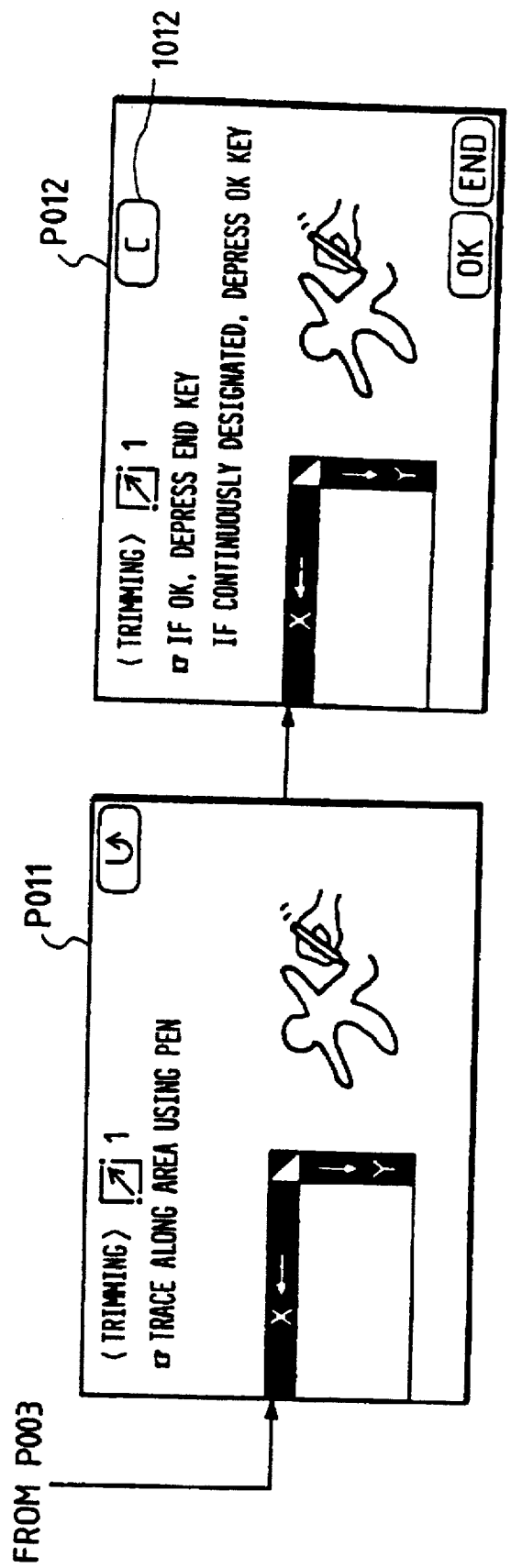

A trimming area designation sequence (the same applies to masking, and also applies to partial processing and the like in terms of a method of designating an area) will be described below with reference to FIGS. 56 and 57.

The trimming key 1124 on the operation unit 1000 is depressed. When the display 1109 displays a page P001, two diagonal points of a rectangle are input using the digitizer, and a page P002 is then displayed, so that a rectangular area can be successively input. When a plurality of areas are designated, a previous area key 1001 on the page P001 and a succeeding area key 1002 are depressed in turn, so that designated areas on an X-Y coordinate system can be recognized like in the page P002.

In this embodiment, a non-rectangular area can be designated using the bit map memory. During display of the page P001, a touch key 1003 is depressed to display a page P003. On the page P003, a desired pattern is selected. When necessary coordinates of a circle, an oval, an R rectangle, or the like are input, the CPU 20 develops it into the bitmap memory by calculations. When a free pattern is selected, a desired pattern is traced using a pointing pen of the digitizer 58, thereby continuously inputting coordinates. The input values are processed and are recorded on a bit map.

Non-rectangular area designation will be described in detail below.

(Circular Area Designation)

When a key 1004 is depressed on the page P003, the display 1009 then displays a page P004, and a circular area can be designated.

Figure 58:
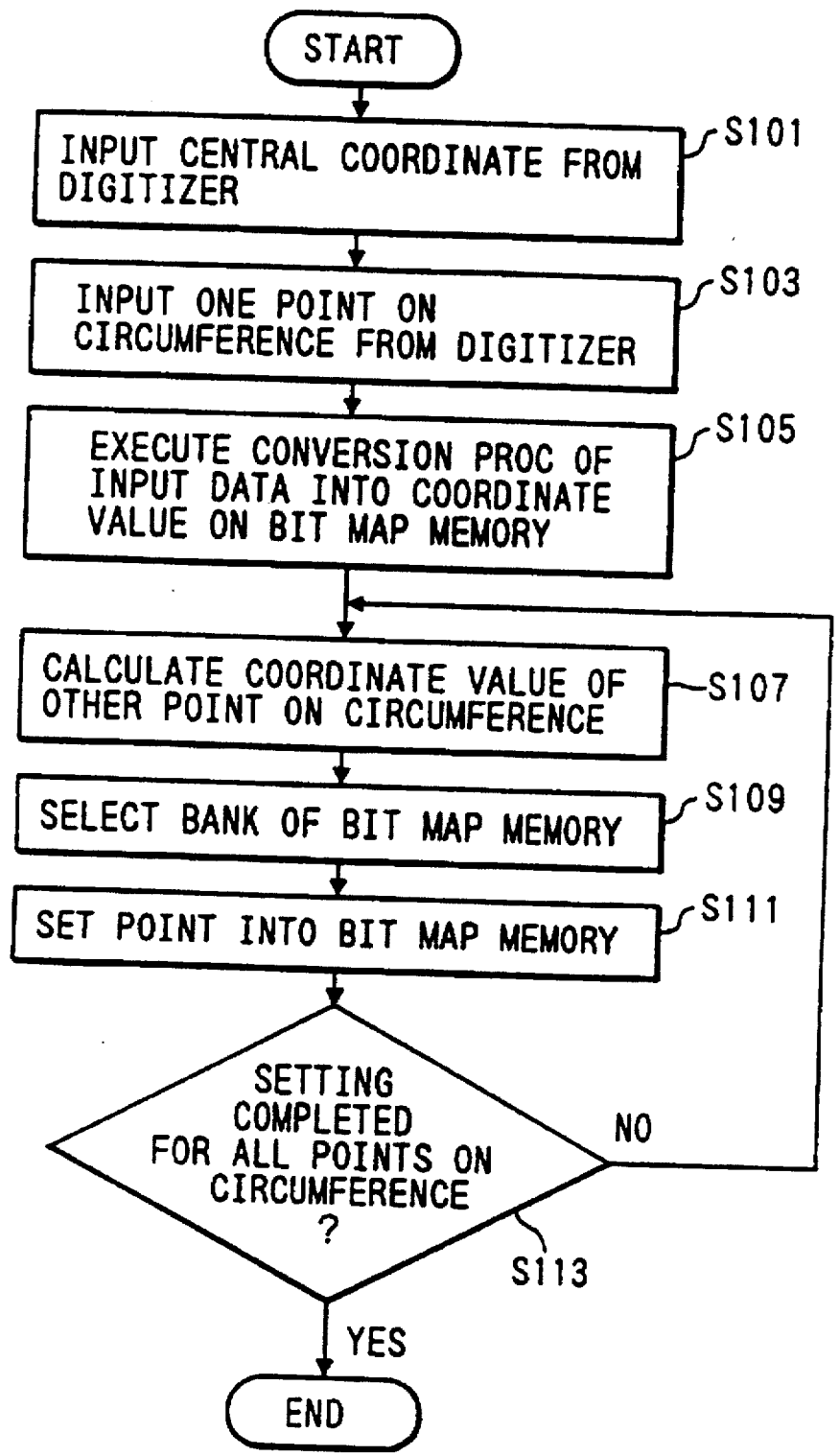
FIG. 58 is a flow chart showing a circular area designation algorithm.

Circular area designation will be described below with reference to the flow chart of FIG. 58. In step S101, a central point is input using the digitizer 58 shown in FIG. 2 (P004). The display 1009 then displays a page P005, and in step S103, one point on a circumference of a circle having a radius to be designated is input by the digitizer 58. In step S105, the input coordinate value is converted to a coordinate value in the bit map memory L (100-dpi binary memory) in FIG. 2 by the CPU 20.

In step S107, a coordinate value of another point on the circumference is calculated. In step S109, a bank of the bit map memory L is selected, and in step S111, the calculation results are input to the bit map memory L via the CPU bus 22. In FIG. 37A, the data is input to the driver 578L through the CPU DATA bus 616L, and is then written in the bitmap memory through a signal line 604L. Since address control has already been described, a description thereof will be omitted. This operation is repeated for all the points on the circumference (S113), thus completing circular area designation.

Note that in place of inputting data calculated by the CPU 20, template information corresponding to information of two points input in advance is stored in the ROM 11, and the two points are designated by the digitizer to directly write data in the bit map memory L without calculations.

(Oval Area Designation)

Figure 59:
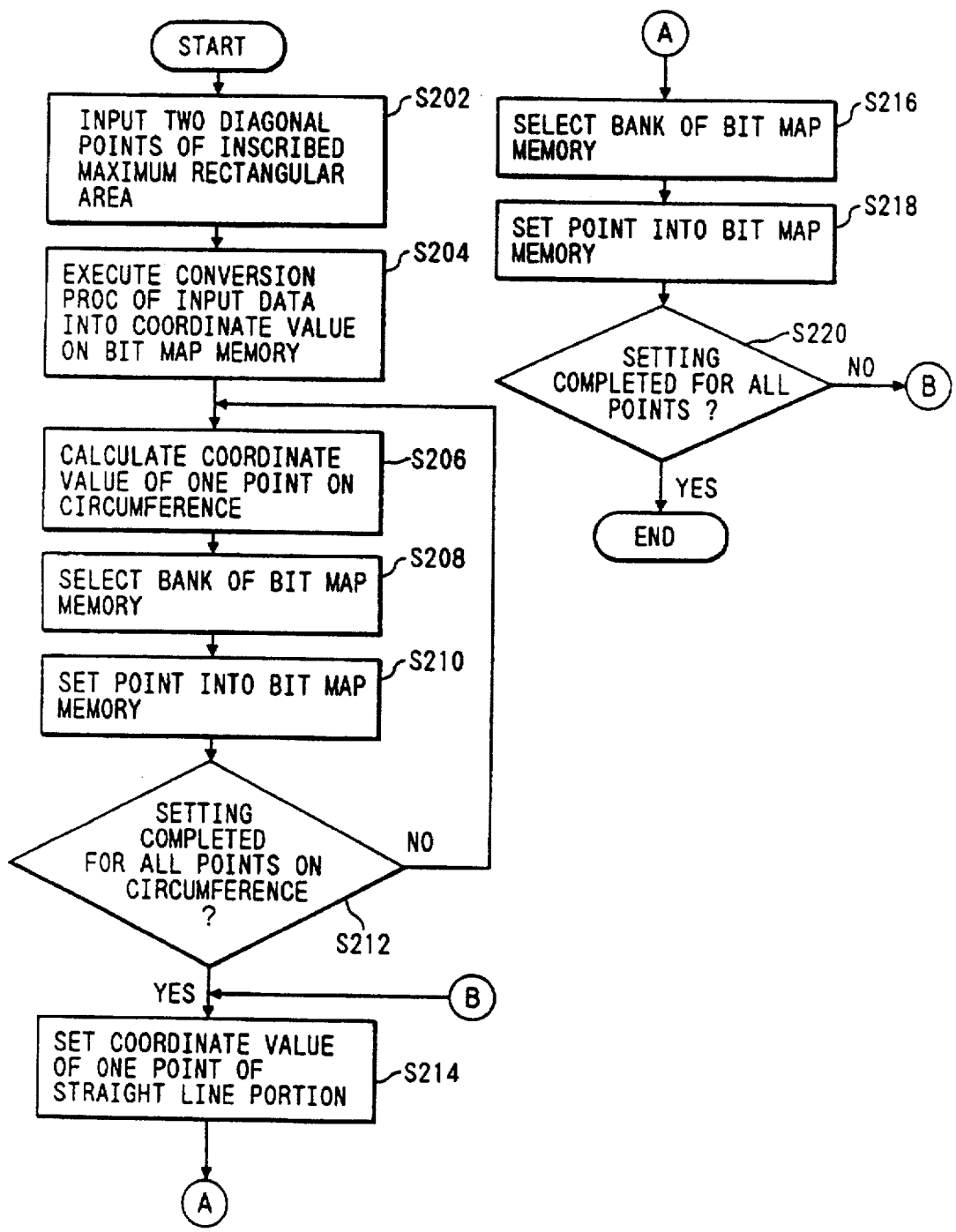
FIG. 59 is a flow chart showing an elliptical and R rectangular area designation algorithm.

When a key 1005 is depressed on the page P003, the display advances to a page 007. The oval area designation will be described below with reference to the flow chart of FIG. 59.

In step S202, two diagonal points of a maximum rectangular area which inscribes an oval are designated by the digitizer 58. Coordinate values of the circumferential portion are written in the bit map memory L in steps 8206 to 8212 in the same manner as in the circular area designation.

Coordinate values of straight line portions are written in the memory L in steps S214 to S220, thus completing area designation. Note that template information may be pre-stored in the ROM 11 as in the circular area designation.

(R Rectangular Area Designation)

A designation method of an R rectangle is the same as that of an oval as well as a memory write access method, and a detailed description thereof will be omitted.

The circle, the oval, and the R rectangle have been exemplified. Other non-rectangular areas can be designated on the basis of template information, as a matter of course.

On pages P006, P008, P010, and P102, a clear key (1009 to 1012) is depressed after each pattern is input, so that a content in the bit map memory can be partially deleted.

Therefore, when a pattern is erroneously designated, only two-point designation can be immediately cleared, and can be performed again.

A plurality of areas can be successively designated. When a plurality of areas are designated, upon execution of processing of overlapping areas, an area designated later is preferentially processed. Alternatively, areas designated earlier may have priority over others.

Figure 57:
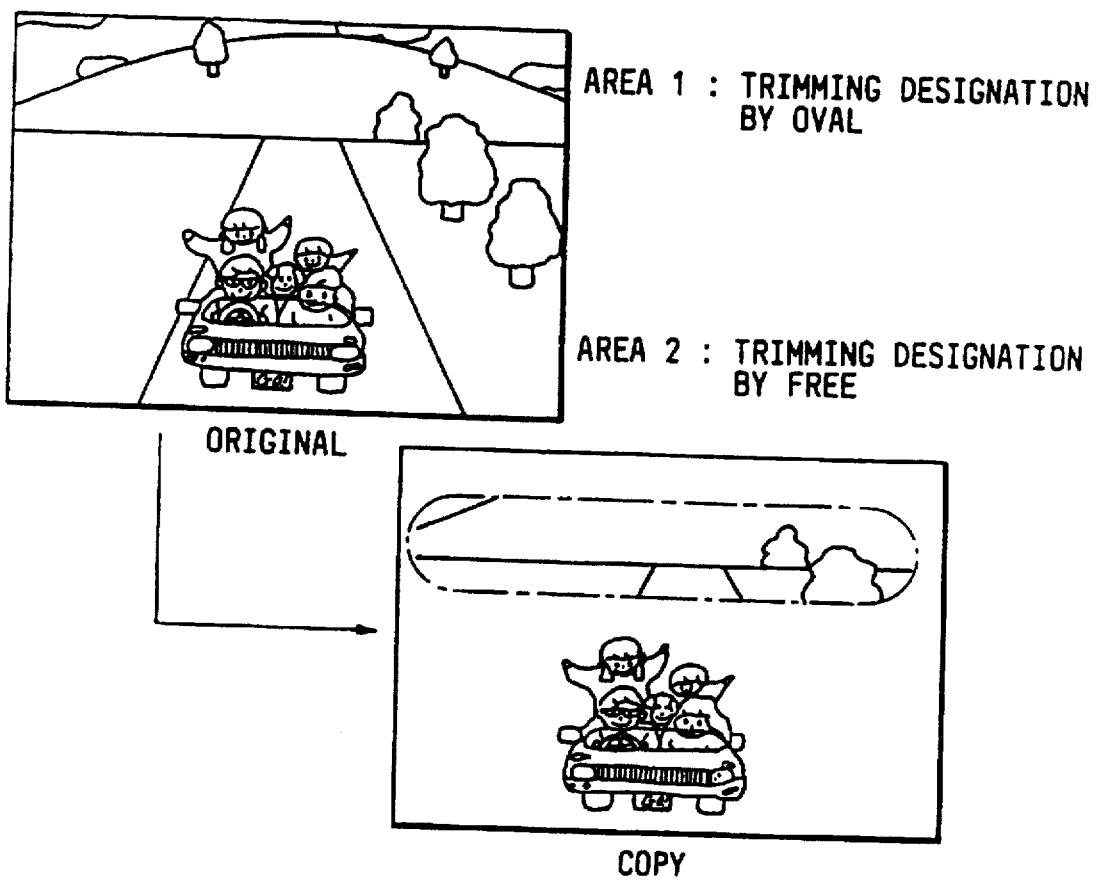
FIG. 57 is a view for explaining the trimming area designation sequence.

FIG. 57 shows an output example of oval trimming by the above-mentioned setting method.

<Operation Sequence Associated With Character Synthesis>

Figure 60B:
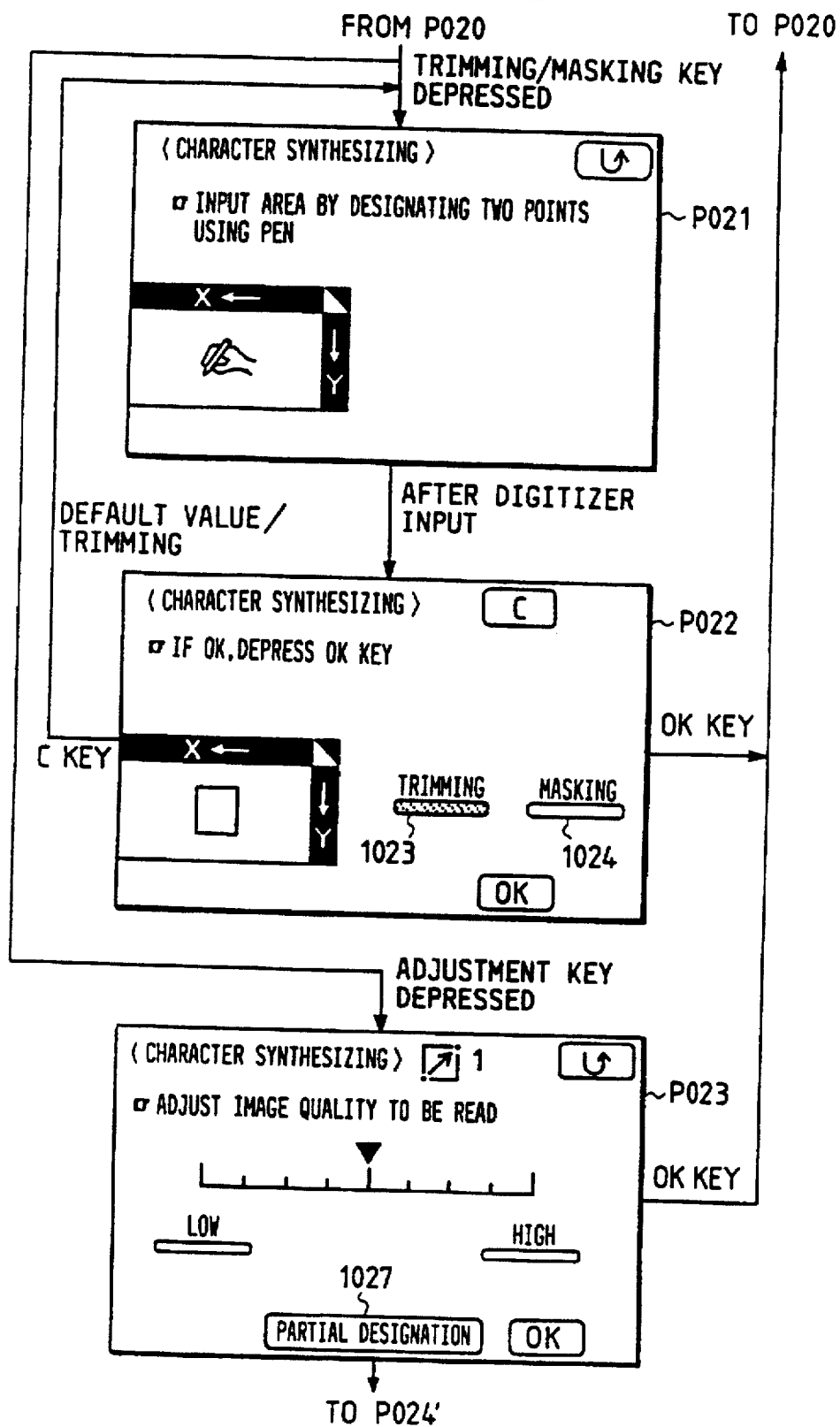
Figure 60C:
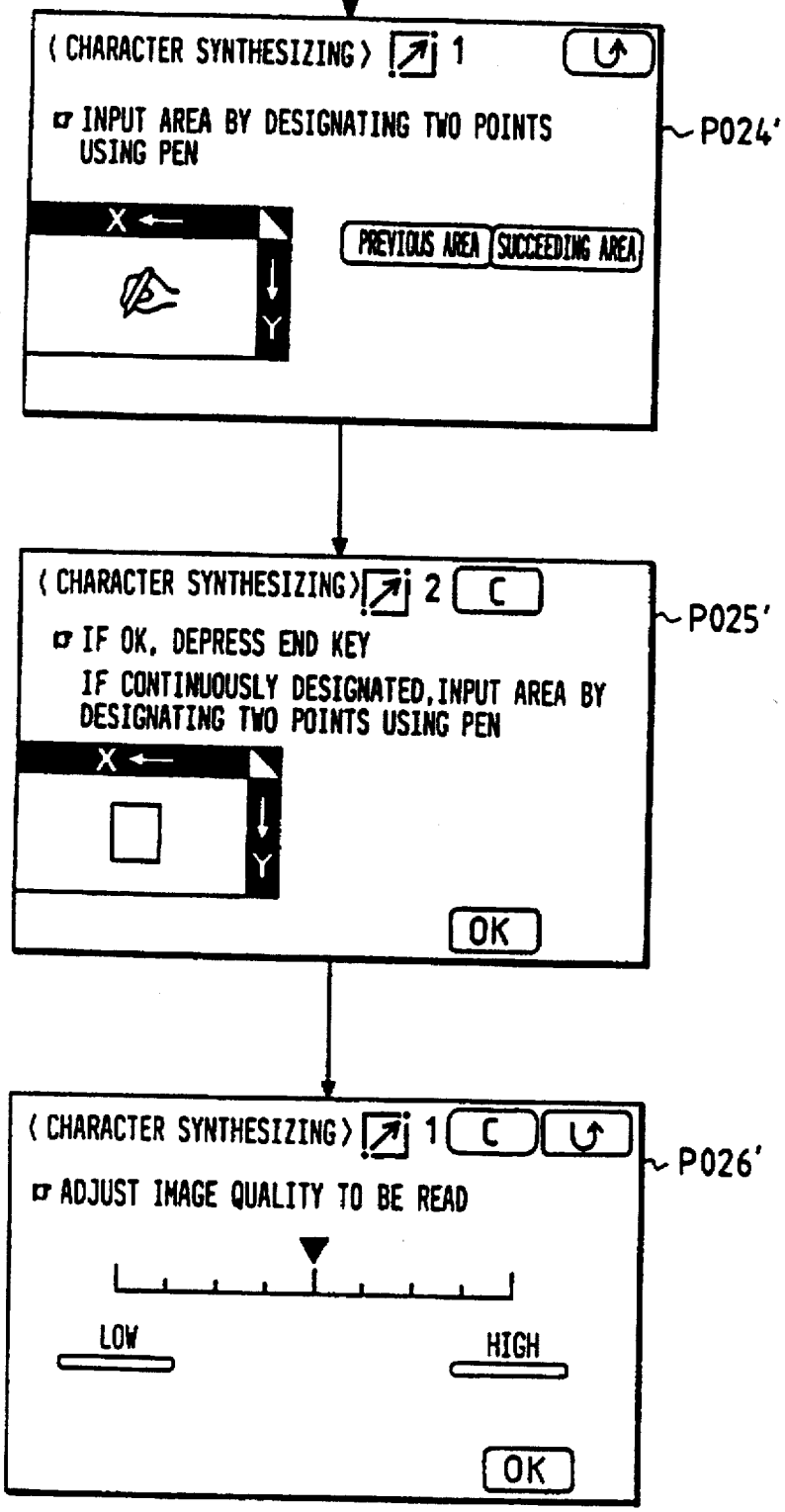

An operation sequence associated with character synthesis will be described below with reference to FIGS. 60, 61, and 62. When the character synthesizing key 1114 on the operation unit is depressed, the liquid crystal display 1109 displays a page P020. When a character original 1201 to be synthesized is placed on the original table, and a touch key 1020 is depressed, the character original is read, the read image information is subjected to binarization processing, and the processed image information is stored in the bit map memory (FIG. 2). Since the detailed processing means have already been described, a repetitive description thereof will be avoided. In this case, in order to designate a range of an image to be stored, a touch key 1021 on the page P020 is depressed to display a page P021. The character original 1201 is placed on the digitizer 58, and a range is designated by pointing two points using the pointing pen of the digitizer. Upon completion of the designation, the screen display advances to a page P022, and whether a portion inside the designated range is read (trimming) or a portion outside the designated range is read (masking) is selected using touch keys 1023 and 1024. In some character originals, it is difficult to extract a character portion from them during binarization processing. In this case, a touch key 1022 on the page P020 is depressed to display a page P023, so that the slice level of the binarization processing can be adjusted using touch keys 1025 and 1026.

In this manner, since the slice level can be manually adjusted, appropriate binarization processing can be performed according to a character color or width of an original.

Furthermore, a touch key 1027 is depressed, and an area is designated on pages P024' and P025', so that a slice level can be partially modified on a page P026'.

In this manner, an area is designated, and the slice level of only the designated area can be changed. Thus, even when a black character original partially includes, e.g., yellow characters, the slice levels of black and yellow characters are separately and appropriately set, so that satisfactory binarization processing can be performed for the entire characters.

In this case, the above-mentioned processing can be executed according to non-rectangular area information stored in the binary memory L shown in FIG. 2, as a matter of course.

Figure 61B:
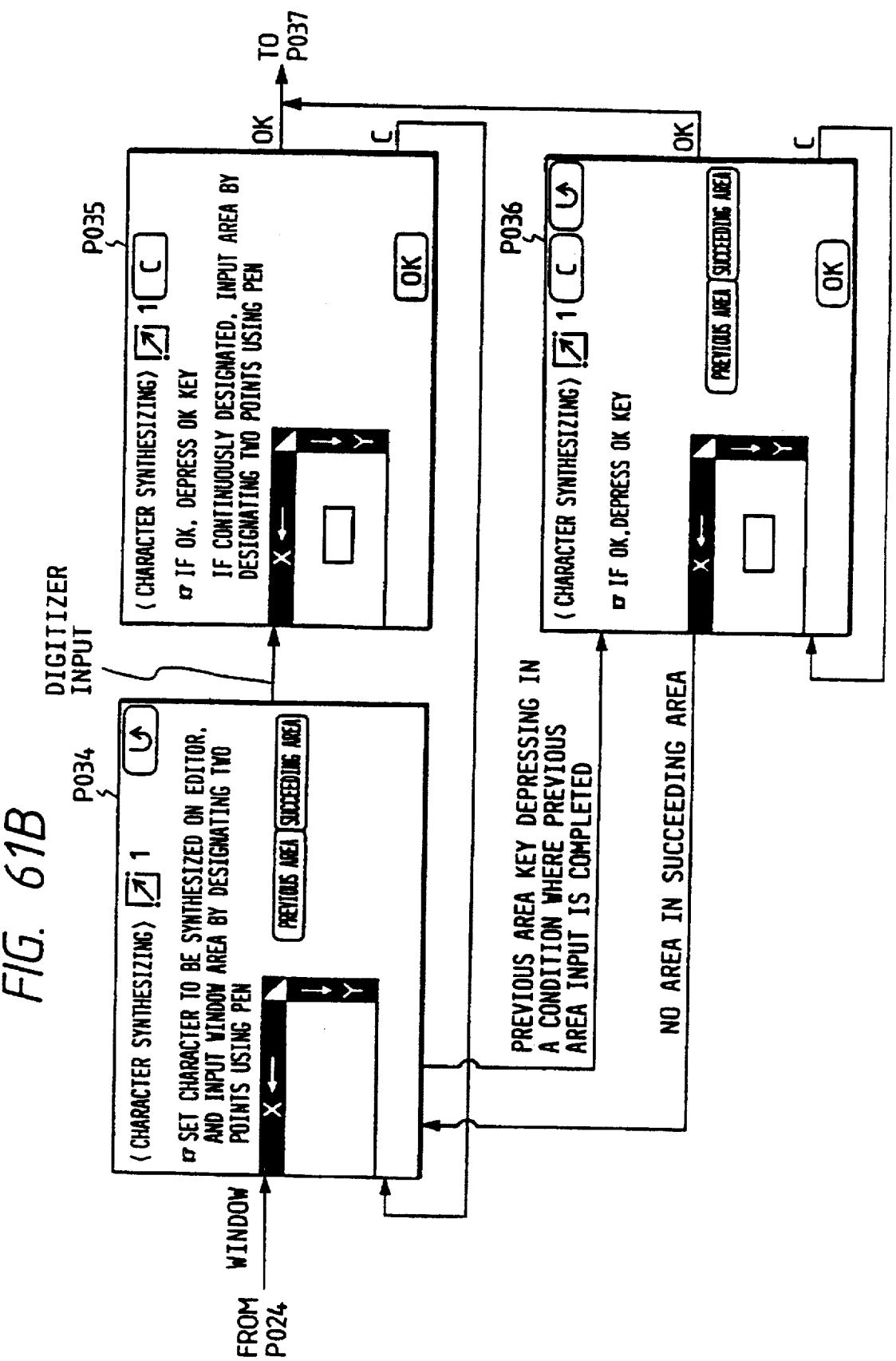
Figure 61C:
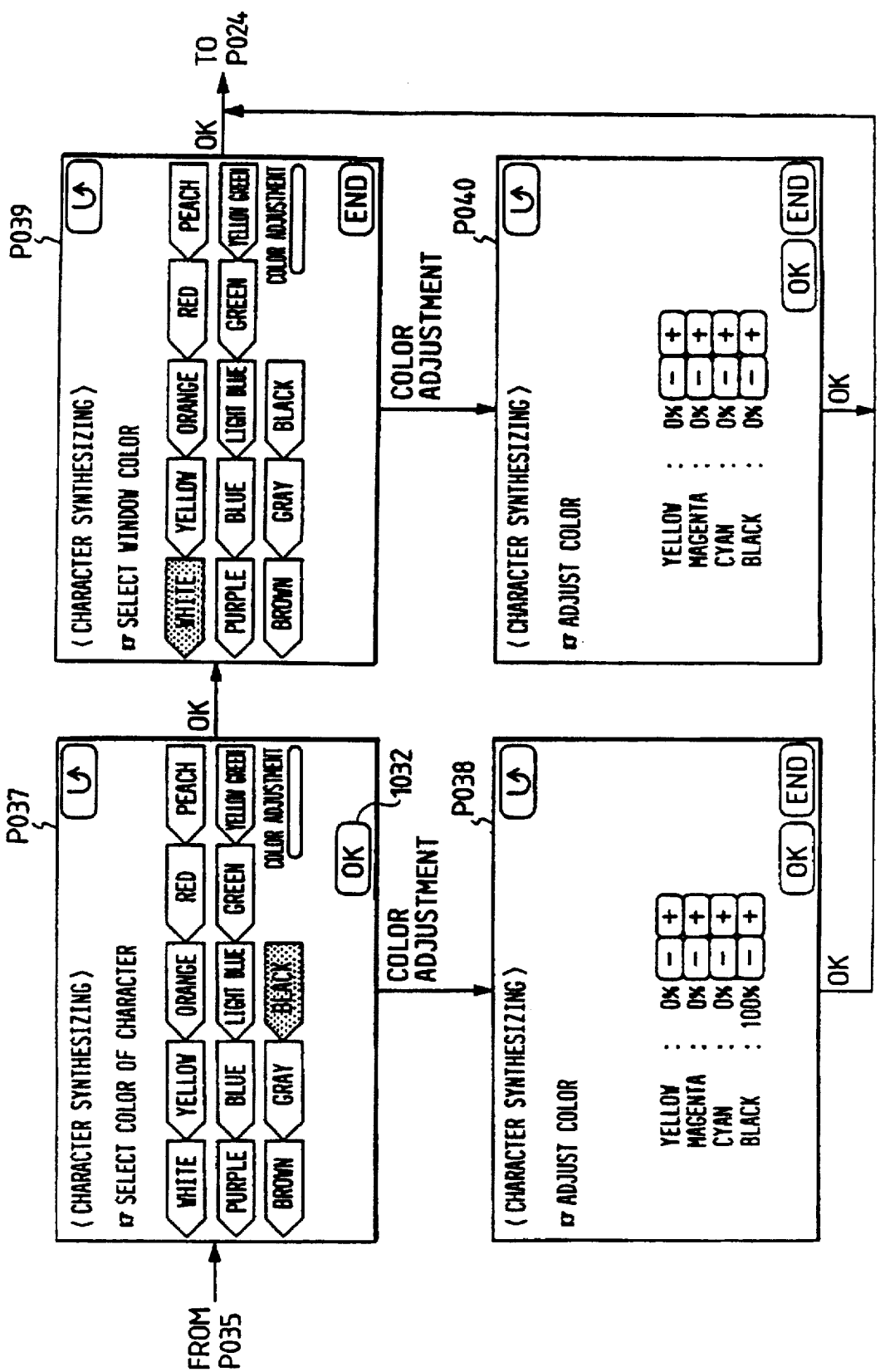
Figure 61E:
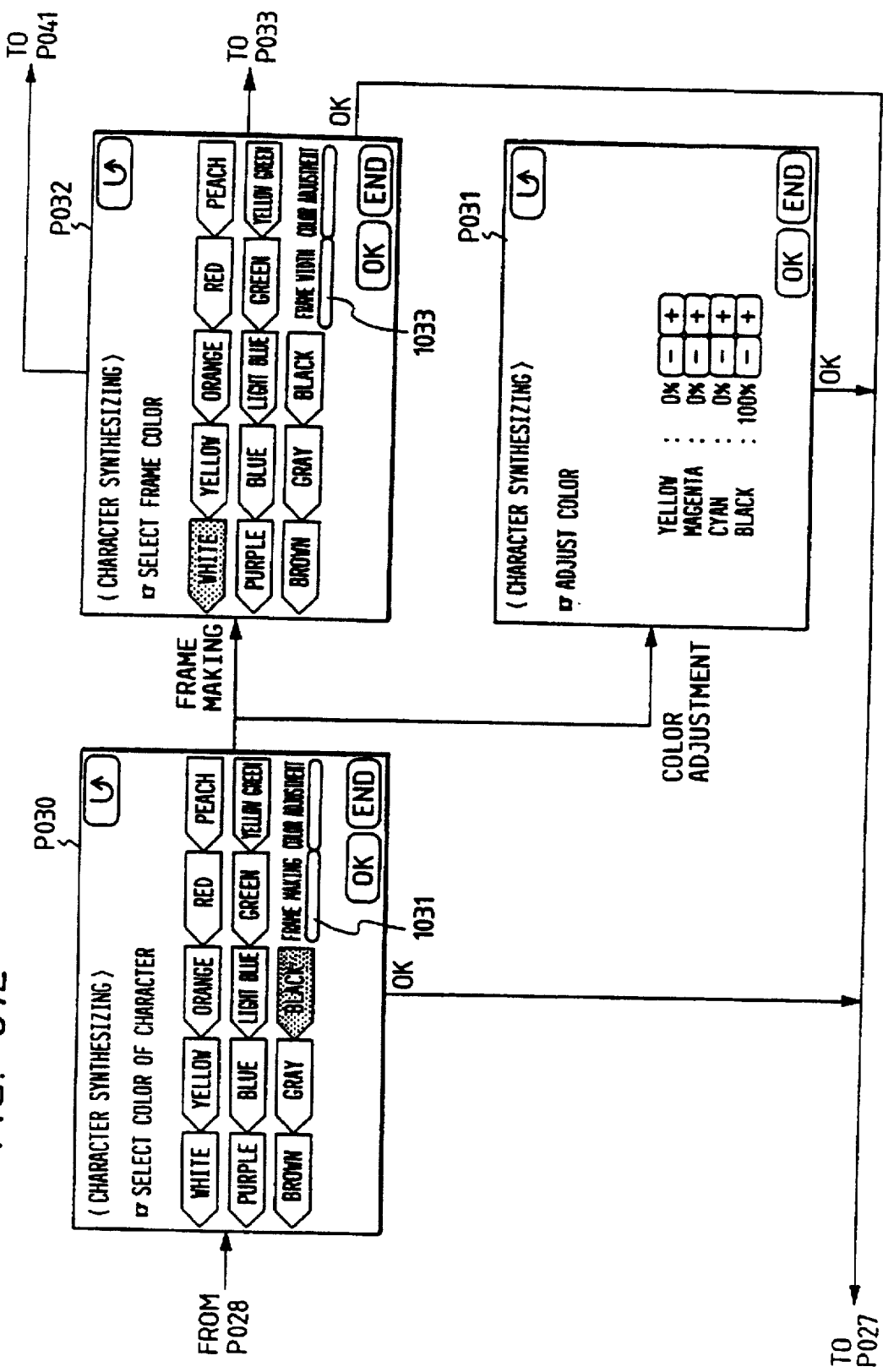

Upon completion of reading of the character original, the display 1109 displays a page P024 shown in FIG. 61.

In order to select color background processing, a touch key 1027 on the page P024 is depressed to display a page P025. A color of a character to be synthesized is selected from displayed colors. A character color can be partially changed. In this case, a touch key 1029 is depressed to display a page P027, and an area is designated. Thereafter, a character color is selected on a page P030. Furthermore, color frame making processing can be added to a frame of a character to be synthesized. In this case, a touch key 1031 on the page P030 is depressed to display a page P032, and a color of a frame is selected. In this case, color adjustment can be performed as in the color conversion described above. Furthermore, a touch key 1033 is depressed, and a frame width is adjusted on a page P041.

A case will be described below wherein tiling processing (to be referred to as window processing hereinafter) is added to a rectangular area including characters to be synthesized. A touch key 1028 on the page P024 is depressed to display a page P034, and an area is designated. Window processing is executed within a range of the designated area. Upon completion of the area designation, a character color is selected on a page P037. A touch key 1032 is then depressed to display a page P039, and a window color is selected.

In the color selection, a touch key 1030 as a color adjustment key is depressed on the page P025 to display a page P026, and a density of a selected color can be changed.

Character synthesis is performed in the above-mentioned sequence. FIG. 62 shows an output example obtained when the above-mentioned setting method is actually executed.

Note that not only a rectangular area but also a non-rectangular area can be designated.

<Texture Processing Setting Sequence>

Figure 63A:
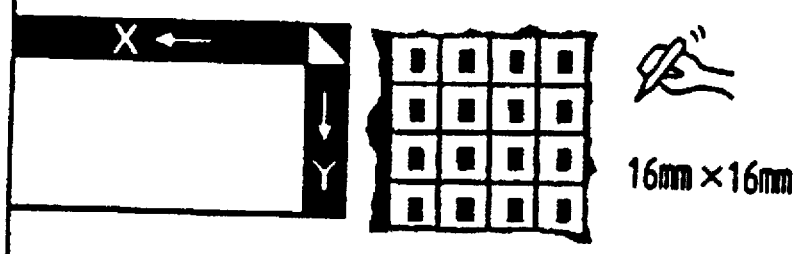
FIGS. 63A, including
Figure 2:
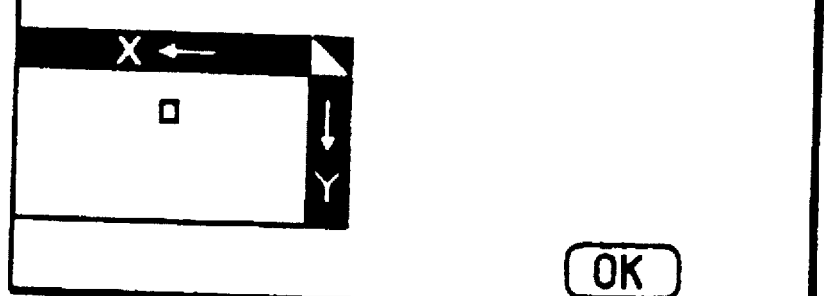
FIG. 2, including

The texture processing will be described below with reference to FIG. 63A.

When the texture key 1129 on the operation unit 1000 is depressed, the display 1109 displays a page P060. When the texture processing is to be executed, a touch key 1060 is depressed to be reverse-displayed. When an image pattern for the texture processing is loaded in the texture image memory (113g in FIG. 32), a touch key 1061 is depressed. In this case, if the pattern has already been stored in the image memory, a page P062 is displayed, and when no image can be displayed, a page P061 is displayed. An original of an image to be read is placed on the original table, and a touch key 1062 is depressed, so that image data can be stored in the texture image memory. In order to read an arbitrary portion of the original, a touch key 1063 is depressed, and designation is made on a page P063 using the digitizer 58. Designation can be made by pointing one central point of a 16 mm×16 mm reading range by a pointing pen.

Reading of a texture pattern by designating one point can be performed as follows.

When the touch key 1060 is depressed to set texture processing without reading a pattern, and the copy start key 1100, or other mode keys (1110 to 1143), or a touch key 1064 is depressed to leave the page P064, the display 1109 generates warning as shown in a page P065.

The size of the reading range may be designated by an operator using the ten-key pad.

FIG. 63B-2 shows the flow chart of the CPU 20 when a texture pattern is read as shown in FIG. 63B-1.

In the texture mode, it is checked if coordinates of a central point of a portion (in this embodiment, a square is exemplified but other figures, e.g., a rectangle may be available) used as a texture pattern on an original is input from the digitizer 58 (S631). In this case, the coordinate input is recognized by (x,y) coordinates of an input point, as shown in a block S631'. If NO in step S631, an input is waited; otherwise, write star, and end addresses in the horizontal and vertical directions are calculated (S632') and are set in the counters (S632). In this case, if lengths a of vertical and horizontal sides are set to be different from each other, a rectangular pattern can be formed. Image data is then read by scanning the reader A, and the image data at a predetermined position is written in the texture memory 113g (FIG. 32) (S633). Thus, the storage operation of the texture pattern is completed, and a normal copying operation is performed in the above-mentioned method (step S634) to synthesize the texture pattern.

According to this embodiment, when one point is designated on the digitizer, the texture pattern can be read, and operability can be remarkably improved.

<Mosaic Processing Setting Sequence>

Figure 64A:
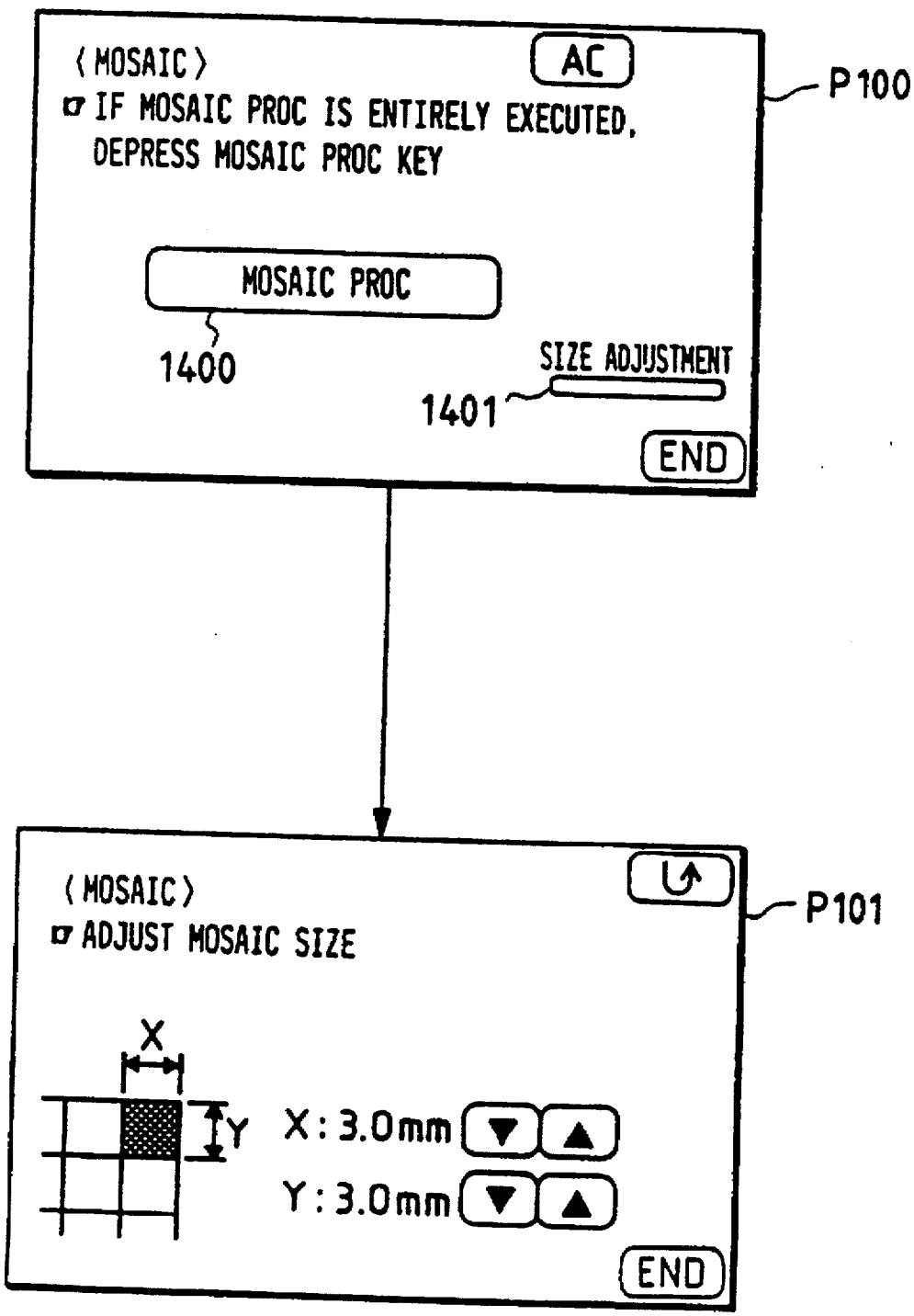
FIGS. 64A and 64B are charts for explaining mosaic processing.

FIG. 64A is a view for explaining a sequence for setting mosaic processing.

When the mosaic key 1128 on the operation unit is depressed, the display 1109 displays a page P100. In order to perform mosaic processing of an original image, a touch key 1400 is depressed and reverse-displayed.

A mosaic size upon execution of mosaic processing is changed on a page P101 displayed by depressing a touch key 1401. The mosaic size can be changed independently in both the vertical (Y) and horizontal (X) directions.

Figure 64B:
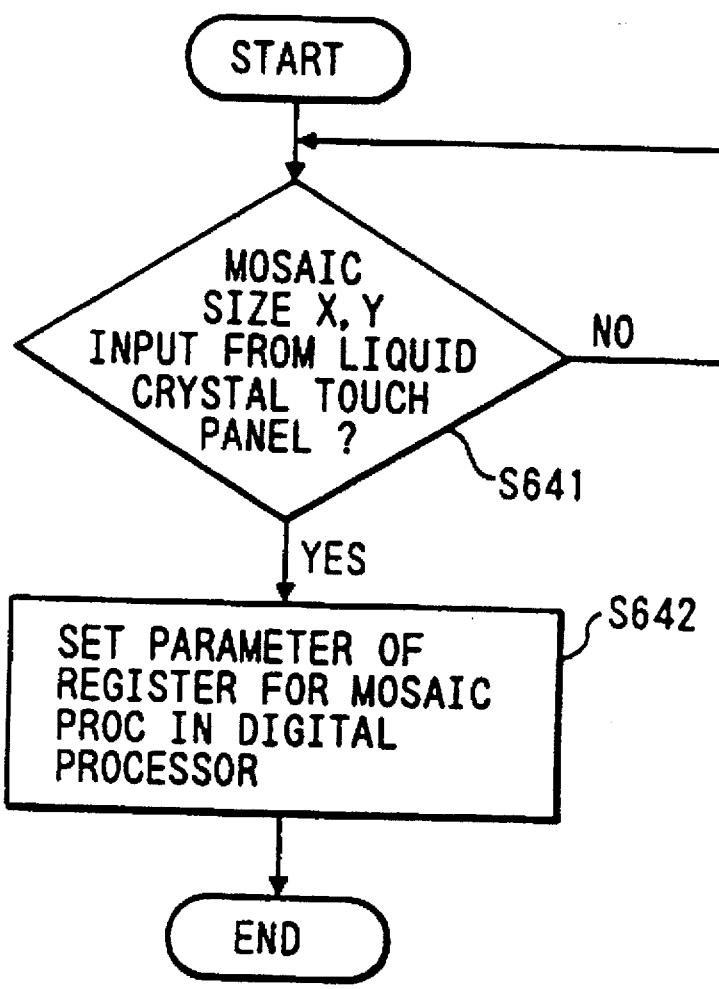

FIG. 64B is a flow chart showing a setting operation of the mosaic size. When the mosaic mode is set, the CPU 20 checks if a mosaic size (X, Y) is input from the liquid crystal touch panel 1109 (S641). If NO in step S641, an input is waited; otherwise, parameters (X, Y) are set in mosaic processing registers (in 402g in FIG. 34) in the digital processor (S642). Based on these parameters, mosaic processing is executed by the above-mentioned method in a size of X mm (horizontal direction)×Y mm (vertical direction).

In this embodiment, since the mosaic size can be set independently in the vertical and horizontal directions, various needs on image edit processing can be met. In particular, this mode can be widely utilized in the field of design.

<* Mode Operation Sequence>

Figure 65C:
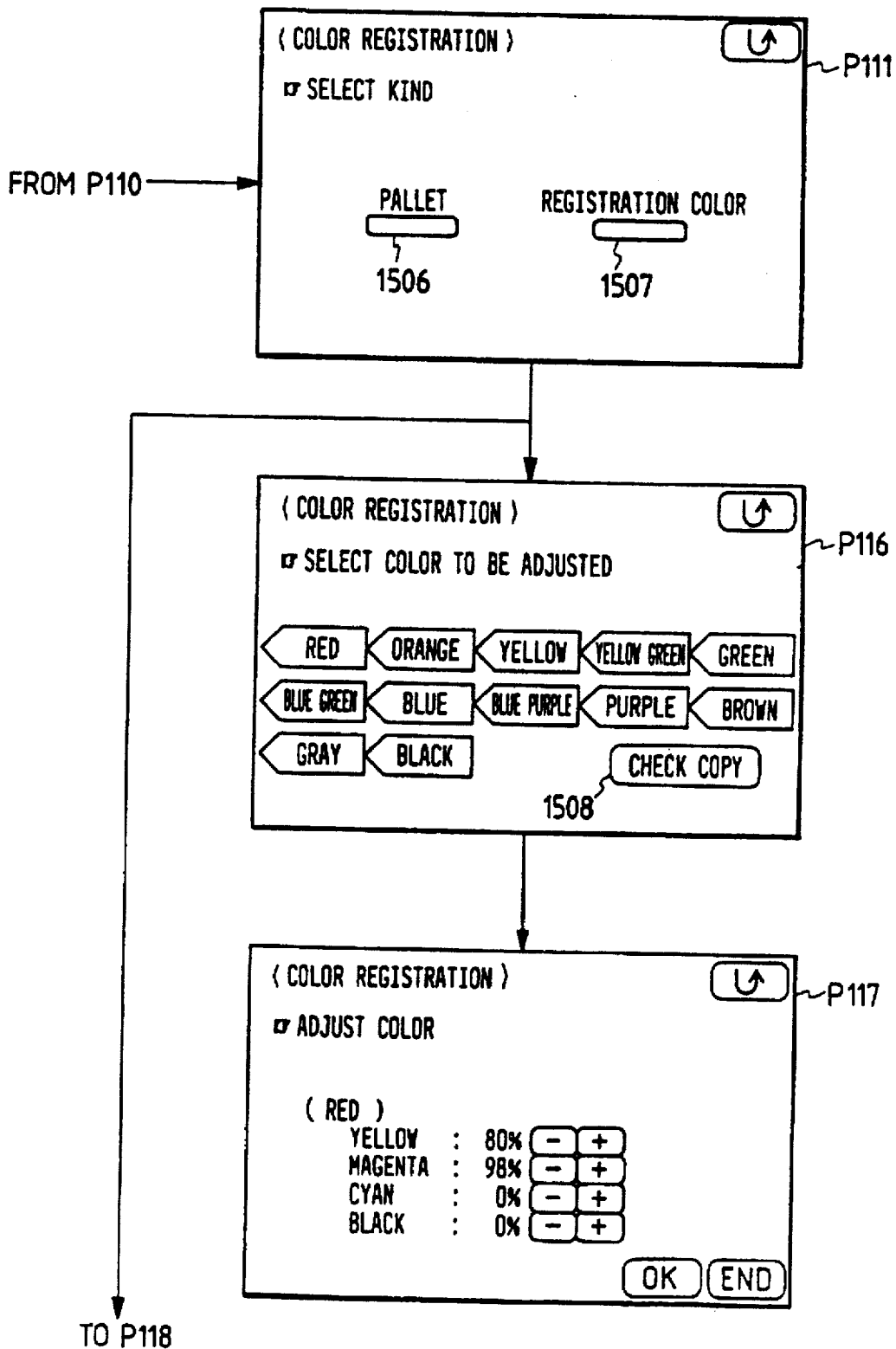
Figure 65D:
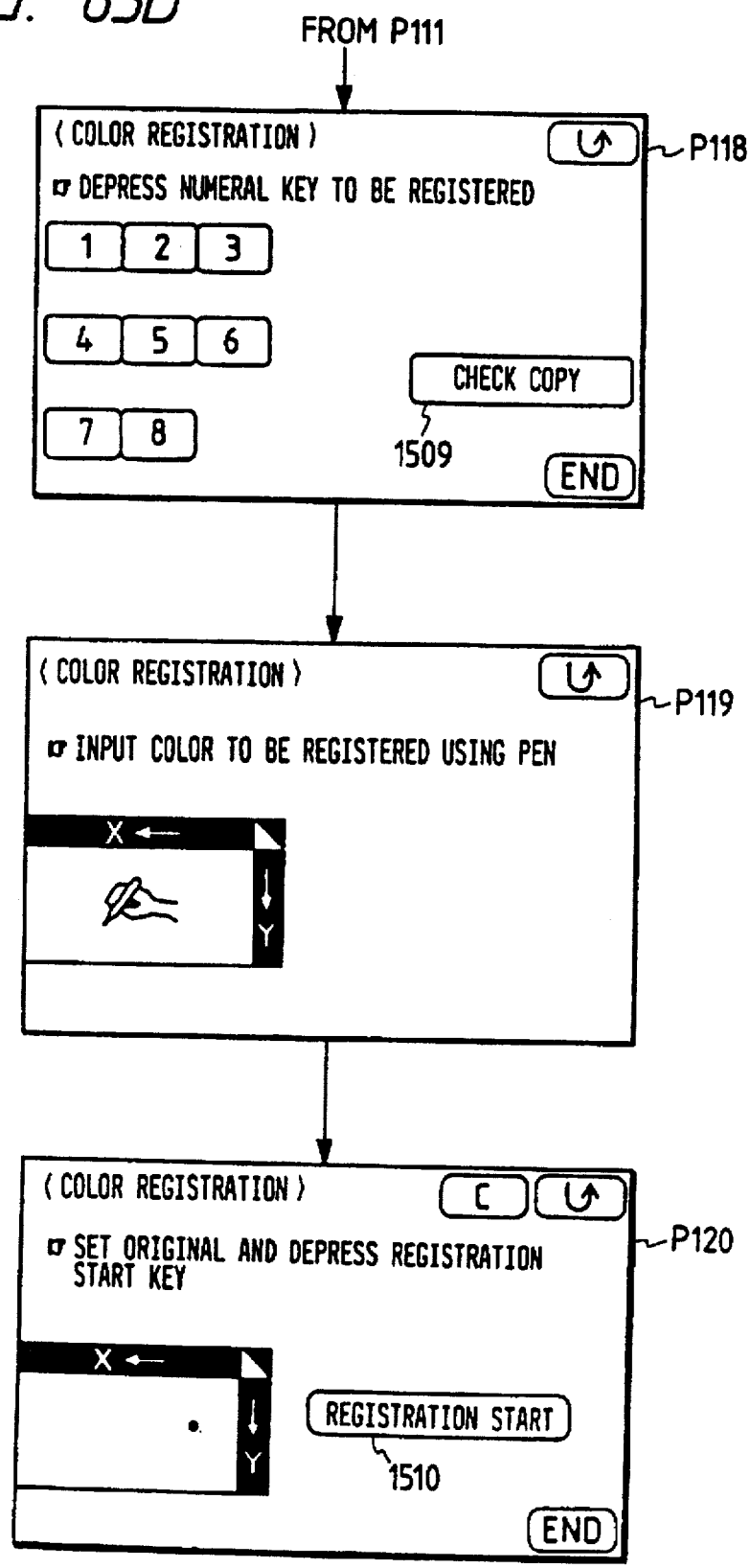

FIG. 65 is a view for explaining an * mode operation sequence.

When the * key 1130 on the operation unit 1000 is depressed, the control enters the * mode, and the display 1109 displays a page P110. Upon depression of a touch key 1500, a color registration mode for registering a paint user's color and color information used in color conversion or color character is set. Upon depression of a touch key 1501, a function of correcting an image omission caused by a printer is turned on/off. A touch key 1502 is used to start a mode memory registration mode. A touch key 1503 is used to start a mode of designating a manual feed size. A touch key 1504 is used to start a program memory registration mode. A touch key 1505 is used to start a mode of setting a default value of color balance.

(Color Registration Mode)

When the touch key 1500 is depressed during display of the page P110, the color registration mode is started. The display 1109 displays a page P111, and a kind of color to be registered is selected. When pallet colors are to be changed, a touch key 1506 is depressed, and a color to be changed is selected on a page P116. On a page P117, values of yellow, magenta, cyan, and black components can be adjusted in units of 1%.

When an arbitrary color on an original is to be registered, a touch key 1507 is depressed, and a registration number is selected on a page P118. A color to be registered is then designated using the digitizer 58. On a page P120, an original is set on the original table, and a touch key 1510 is depressed to register a desired color.

(Manual Feed Size Designation)

As shown in a page P112, a manual feed size can be selected from both standard and specific sizes.

A specific size can be designated in units of 1 mm in both the horizontal (X) and vertical (Y) directions.

(Mode Memory Registration)

As shown in a page P113, a set mode can be registered in the mode memory.

(Program Memory Registration)

As shown in a page P114, a series of programs for performing area designation and predetermined processing operations can be registered.

(Color Balance Registration)

As shown in a page P115, color balance of each of Y, M, C, and Bk can be registered.

<Program Memory Operation Sequence>

Figure 66B:
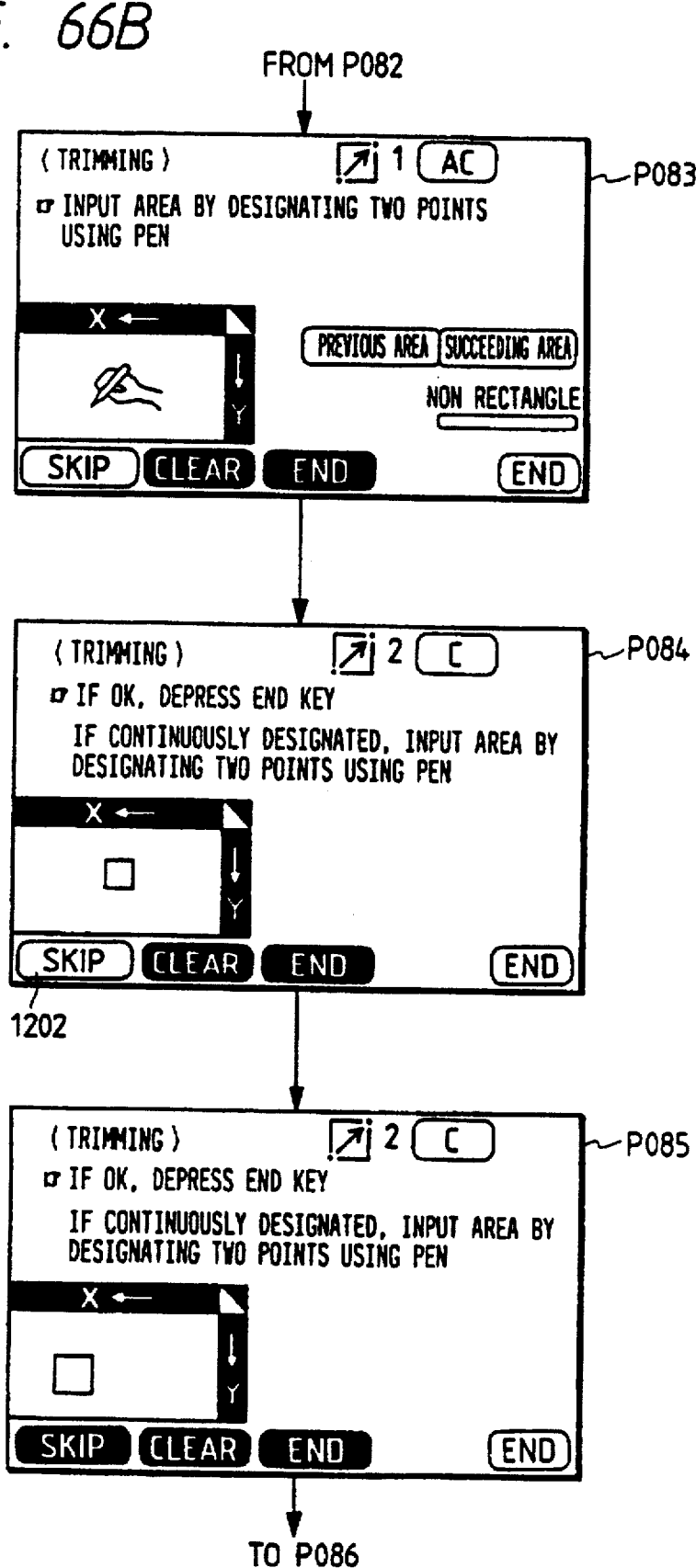
Figure 66C:
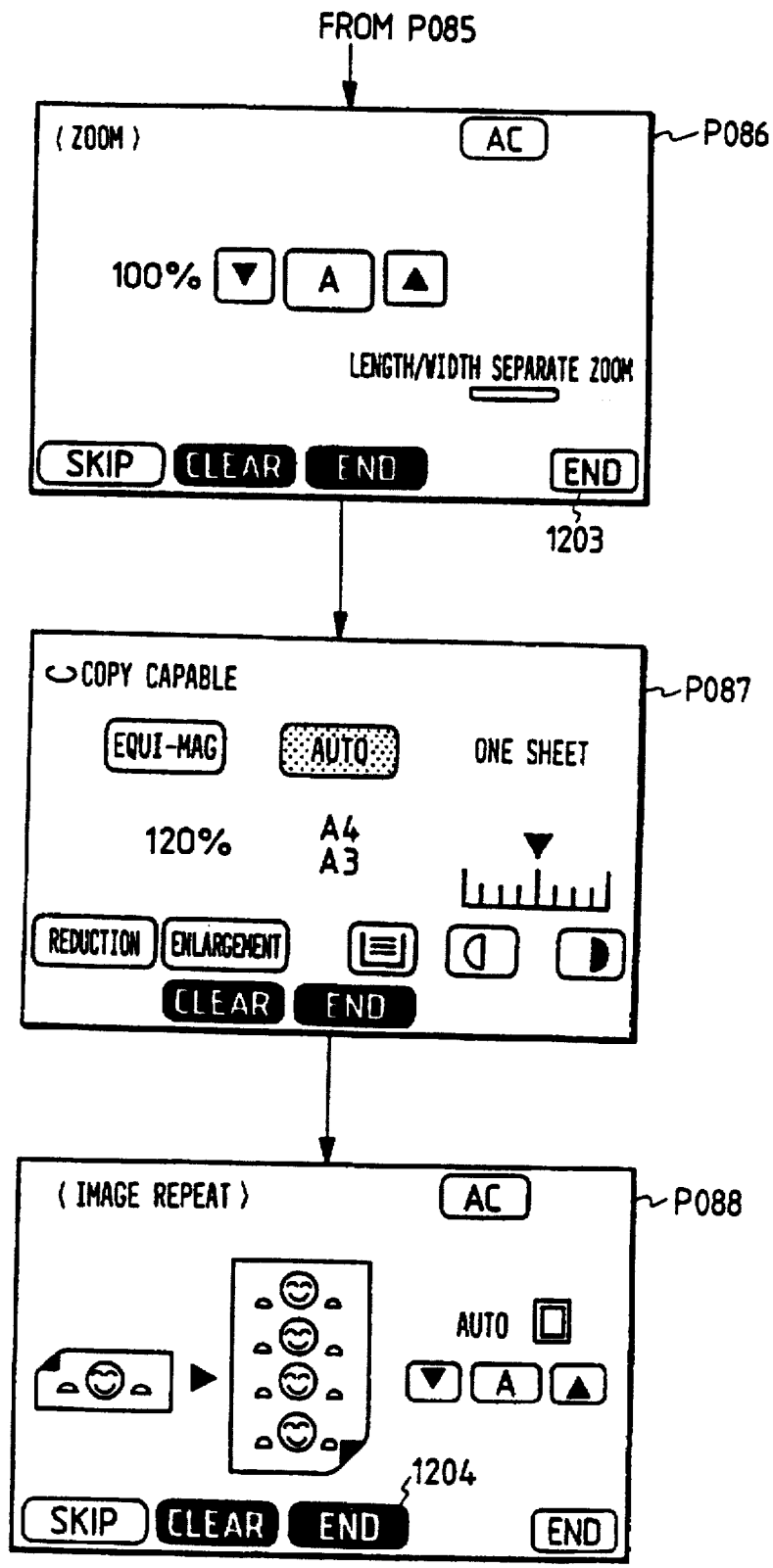
Figure 67B:
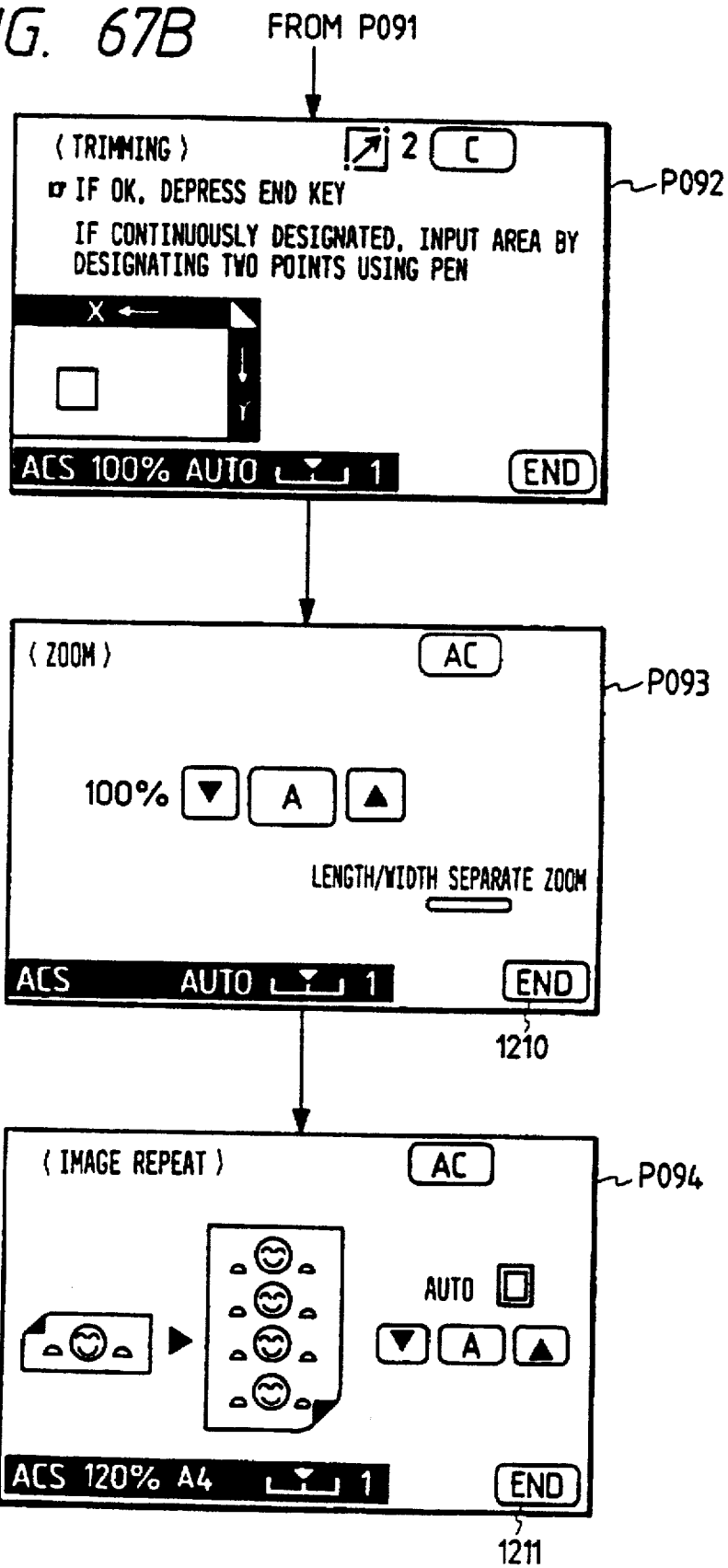

A registration operation of the program memory and its use sequence will be explained below with reference to FIGS. 66 and 67.

The program memory has a memory function of storing operation sequences associated with setting operations, and reproducing the stored sequences. In this function, necessary modes can be combined, or setting operations can be made while skipping unnecessary pages. For example, a sequence for executing zoom processing of a certain area and setting an image repeat mode will be programmed below.

The * key 1130 on the operation unit is depressed to display a page P080 on the display, and a touch key 1200 as a program memory key is then depressed. In this embodiment, a maximum of four programs can be registered. On the page P081, a number to be registered is selected. Thereafter, a program registration mode is started. In the program registration mode, a page 1300 in FIG. 68A in a normal mode is displayed like a page 1301 as shown in FIG. 68B. A touch key 1302 as a skip key is depressed when a present page is to be skipped. A touch key 1303 as a clear key is used to interrupt registration during the program memory registration mode, and to restart registration. A touch key 1304 as an end key is used to leave the program memory registration mode and to register a program in a memory having a number determined first.

The trimming key 1124 on the operation unit is depressed, and an area is designated by the digitizer. In this case, the display 1109 displays a page P084. However, if no more area designation is required, a touch key 1202 is depressed to skip this page (a page P085 is displayed in turn).

When the zoom key 1110 on the operation unit is depressed, the display 1109 displays a page P086. A magnification is set on this page, and a touch key 1203 is then depressed to turn a display to a page P087. Finally, the image repeat key 1126 on the operation unit is depressed, and a setting operation associated with the image repeat mode is performed on the page P088. Thereafter, a touch key 1204 is depressed to register the above program in the program memory No. 1.

In order to call the program registered in the abovementioned sequence, the key 1140 for calling the program memory "1" on the operation unit is depressed. The display 1109 displays a page P091 to wait for an area input. When an area is input using the digitizer, the display 1109 displays a page P092, and then turns it to the next page P093. When a magnification is set on this page and a touch key 1210 is depressed, the display 1109 displays a page P094, and the image repeat mode can be set. When a touch key 1211 is depressed, the control leaves a mode utilizing the program memory (to be referred to as a trace mode hereinafter). While the program memory is called and a programmed operation is executed, the edit mode keys (1110 to 1143) are invalidated, and an operation can be executed according to a registered program.

Figure 69:
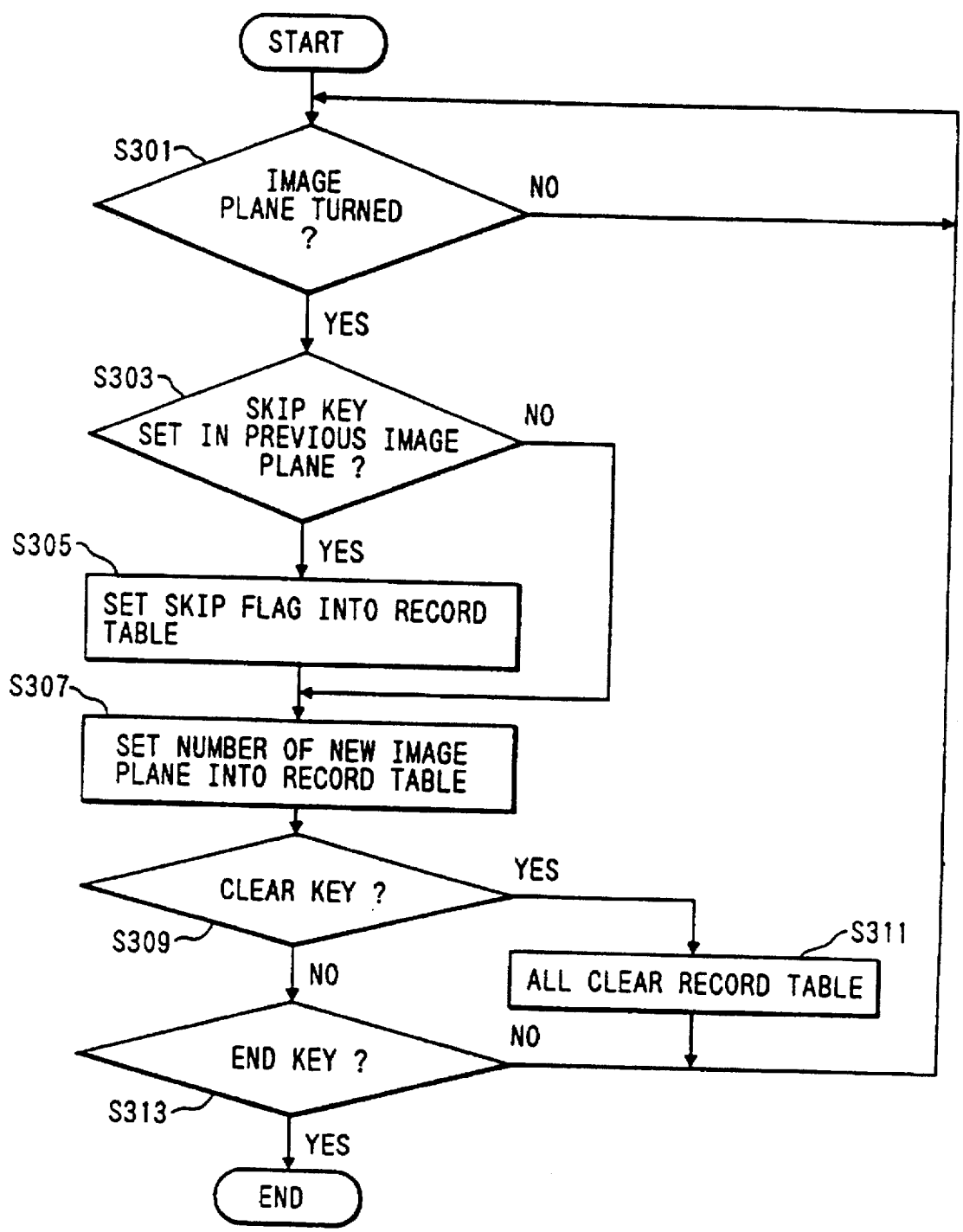
FIG. 69 is a flow chart showing a program memory registration algorithm.
Figure 70:
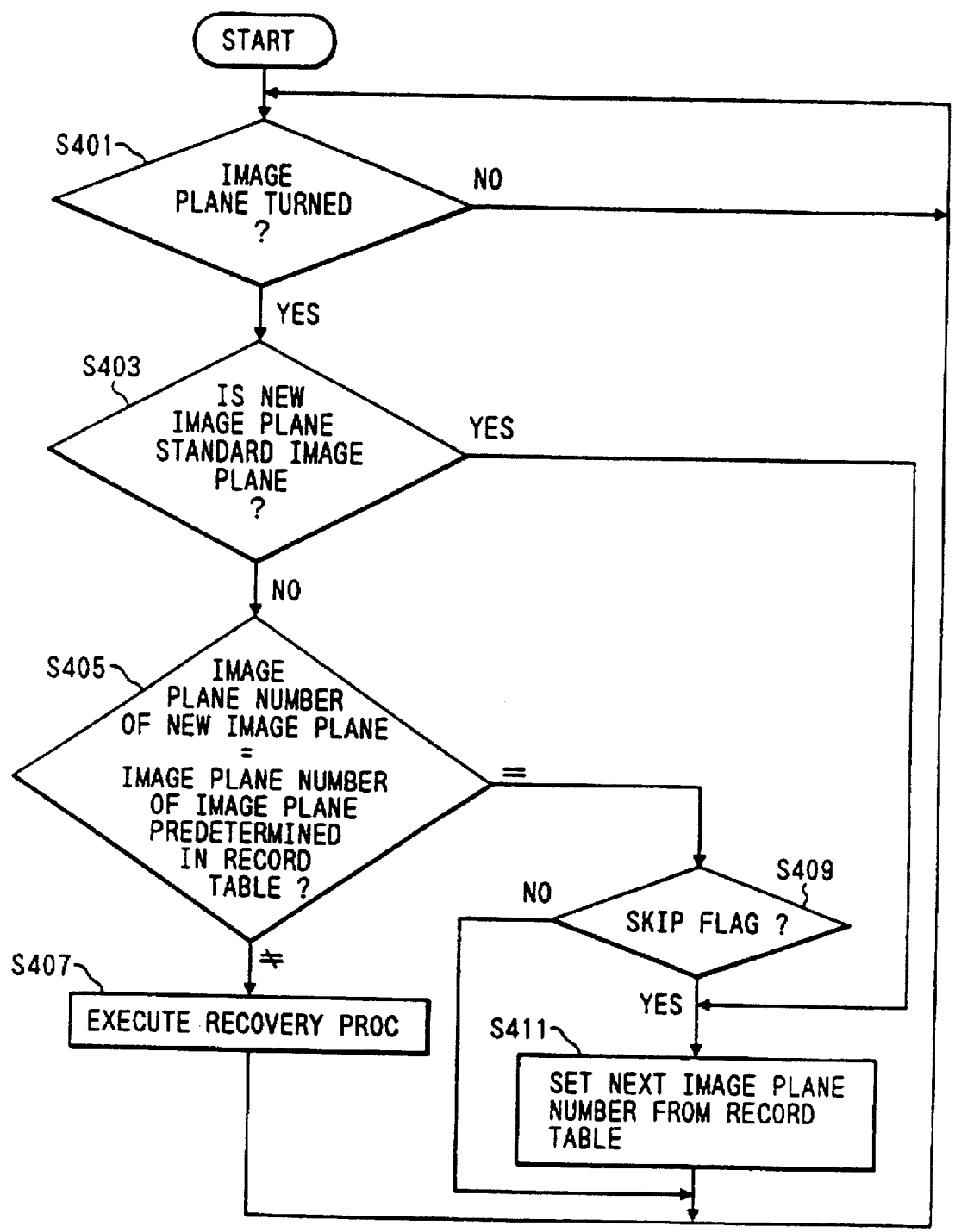
FIG. 70 is a flow chart showing an algorithm of an operation after a program memory is called.
Figure 72A:
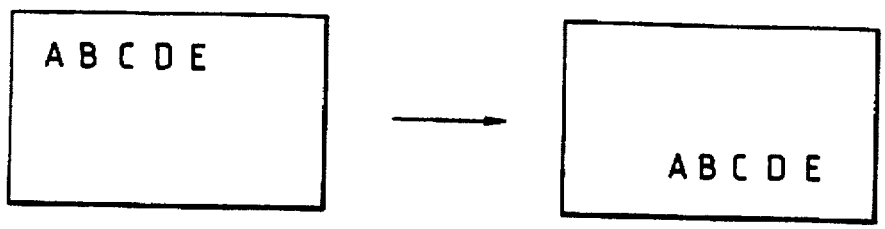
FIGS. 72A to 72D are views showing image process and edit processing.
Figure 72B:
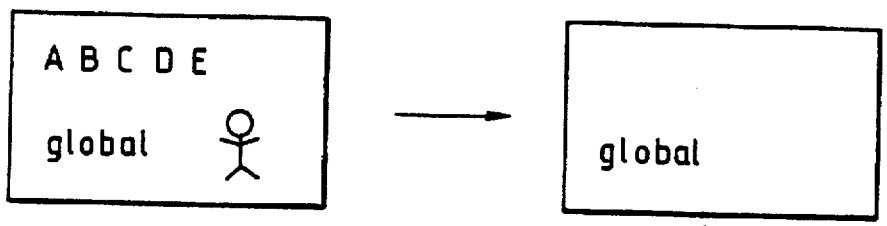
Figure 72C:
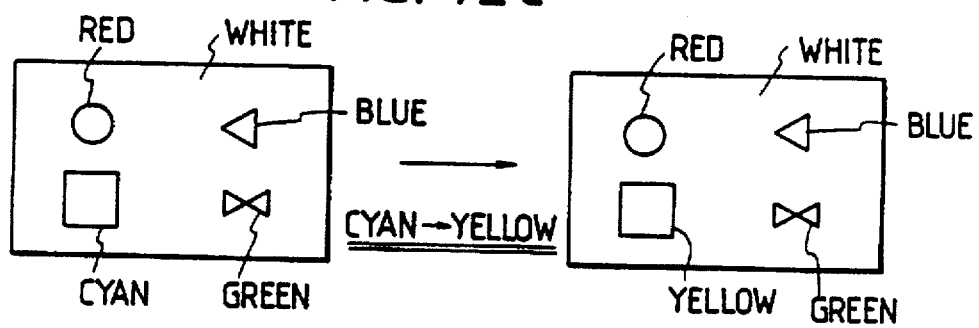
Figure 72D:
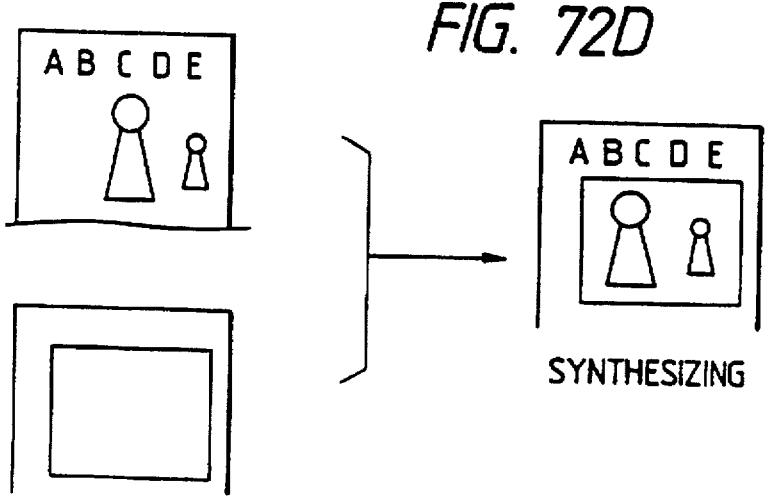

FIG. 69 shows a registration algorithm of the program memory. Turning of a page or image plane in step S301 is to rewrite a display of the liquid crystal display using keys or touch keys. When the touch key 1302 is depressed to skip the presently displayed image plane (S303), skip information is set in a record table when the next image plane is turned (S305). In step S307, the number of a new image plane or a new image plane number is set on the record table. When a clear key is depressed, the record table is entirely cleared (S309, S311); otherwise, the flow returns to step S301 to display the next image plane. FIG. 71 shows a format of a record table. FIG. 70 shows an algorithm of an operation after the program memory is called.

If it is determined in step S401 that an image plane is to be turned, it is checked if a new image plane is a standard image plane (S403). If YES in step S403, the flow advances to step S411, and the next image plane number is set from the record table; otherwise, the new image plane number is compared with an image plane number predetermined in the record table (S405). If a coincidence between the two numbers is detected, the flow advances to step S409. If a skip flag is detected, the flow returns to step S401 while skipping step S411. If a noncoincidence is detected in step S405, recovery processing is executed (S407), and an image plane is then turned.

A means for switching a printing resolution and outputting an image according to the present invention will be described below. This means switches a printing resolution on the basis of the resolution switching signal 140 generated according to character and halftone portions separated by the above-mentioned character/image area separation circuit I, and corresponds to the driver shown in FIG. 2. In this embodiment, a character portion is printed at a high resolution of 400 dpi, and a halftone portion is printed at 200 dpi. This means will be described in detail below. A PWM circuit 778 as a portion of the driver shown in FIG. 2 is included in a printer controller 700 of the printer 2 shown in FIG. 1. The PWM circuit 778 receives the video data 138 as a final output of the overall circuit shown in FIG. 2, and the resolution switching signal 143 to perform ON/OFF control of a semiconductor laser 711L shown in FIG. 76.

The PWM circuit 778, as a portion of the driver shown in FIG. 2, for supplying a signal for outputting a laser beam will be described in detail below.

Figure 73A:
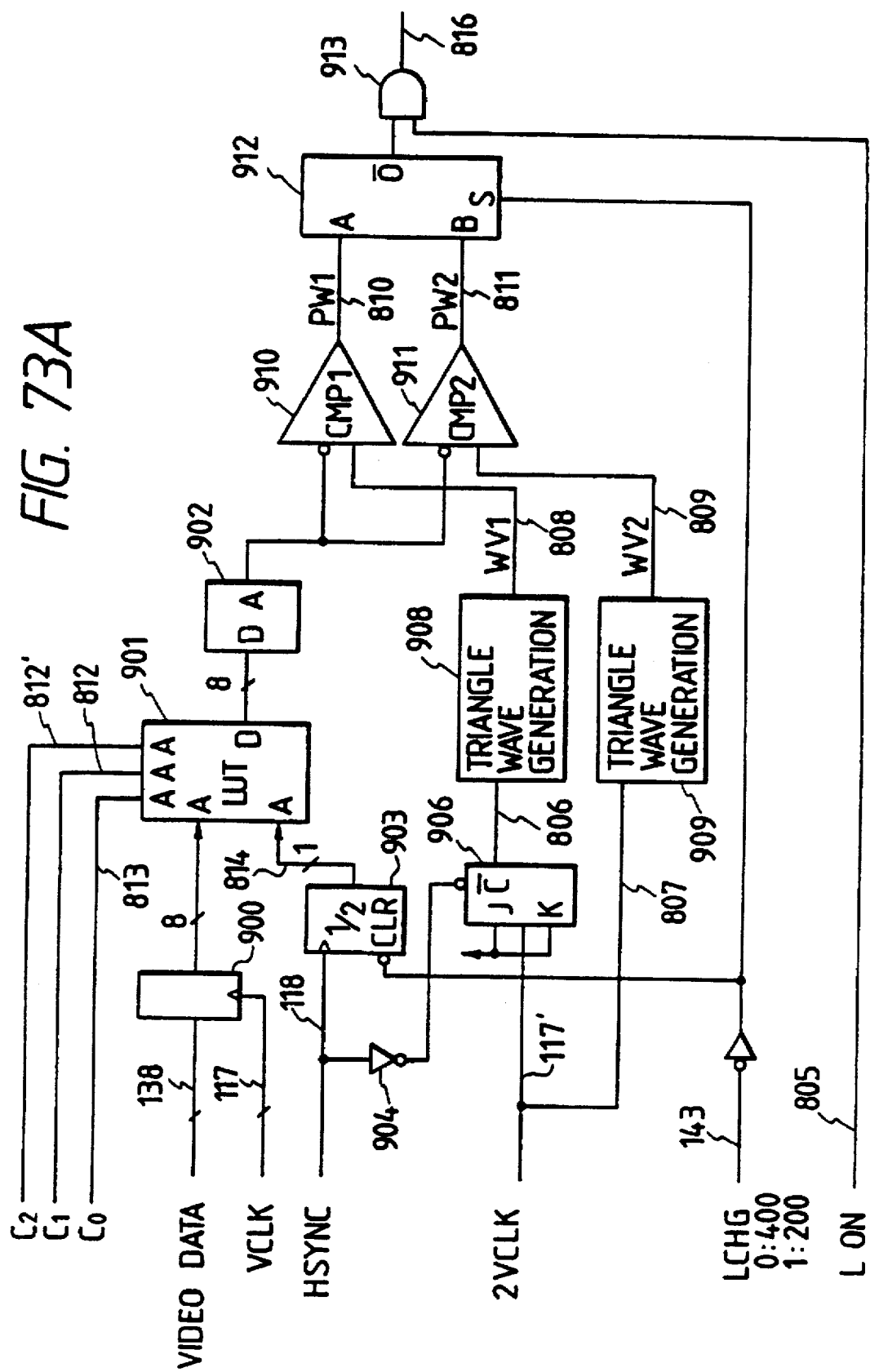
FIGS. 73A to 73C are respectively a partial circuit diagram and timing charts of a driver of a color laser beam printer.
Figure 73B:
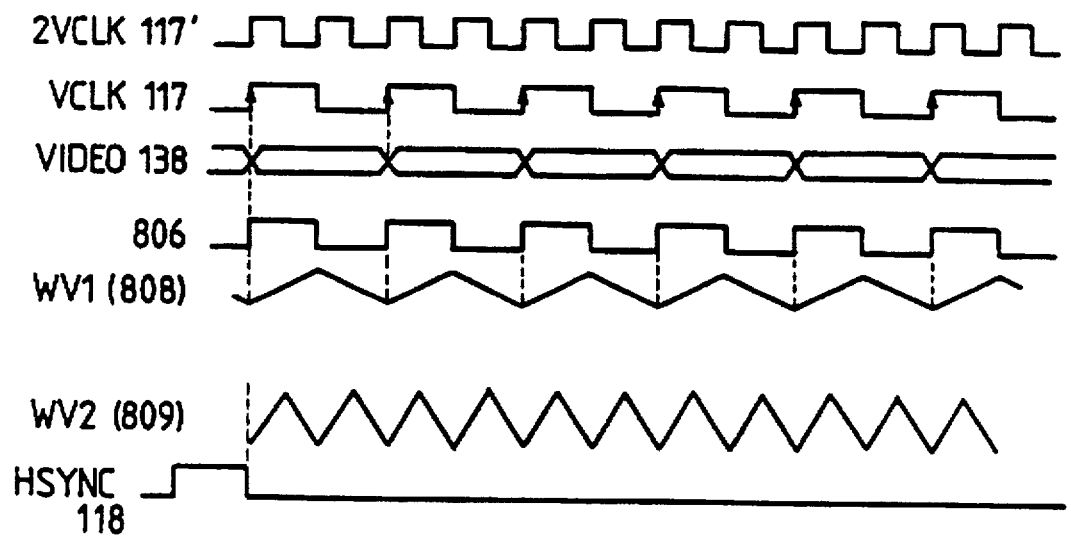

FIG. 73A is a block diagram of the PWM circuit, and FIG. 73B is a timing chart thereof.

Figure 73C:
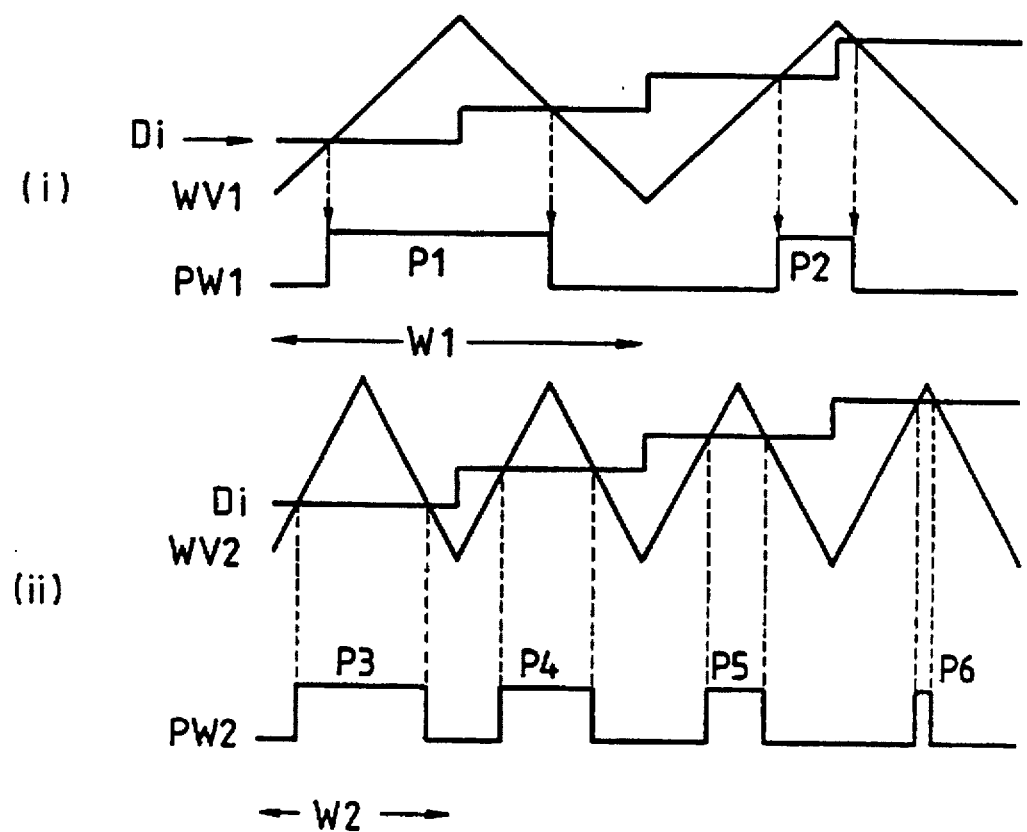

The input video data 138 is latched by a latch 900 in response to a leading edge of a clock VCLK 117 to be synchronized with clocks (800, 801 in FIG. 73B). The video data 138 output from the latch is subjected to gradation-correction by an LUT (look-up table) 901 comprising a ROM or RAM. The corrected image data is D/A-converted into one analog video signal by a D/A (digital-to-analog) converter 902. The generated analog signal is input to the next comparators 910 and 911, and is compared with triangle waves (to be described later). Signals 808 and 809 input to the other input terminal of each comparator are triangle waves (808 and 809 in FIG. 73B) which are synchronized with the clock VCLK and are separately generated. More specifically, one wave is a triangle wave WV1 which is generated by a triangle wave generation circuit 908 in accordance with a triangle wave generation reference signal 806 obtained by ½ frequency-dividing a sync clock 2VCLK 117' having a frequency twice that of the clock VCLK 801 by a J-K flip-flop 906, and the other wave is a triangle wave WV2 generated by a triangle wave generation circuit 909 in accordance with the clock 2VCLK. Note that the clock 2VCLK 117' is generated by a multiplier (not shown) based on the clock VCLK 117. The triangle waves 808 and 809 and the video data 138 are generated in synchronism with the clock VCLK, as shown in FIG. 78B. An inverted HSYNC signal initializes the flip-flop 906 to be synchronous with an HSYNC signal 118 generated synchronous with the clock VCLK. With the above operation, signals having pulse widths shown in FIG. 73C according to the value of the input video data 138 can be obtained as outputs 810 and 811 of the comparators CMP1 910 and CMP2 911. More specifically, in this system, when an output from an AND gate 913 shown In FIG. 73A is "1", a laser is turned on, and prints dots on a print sheet; when the output is "0", the laser is turned off, and prints nothing on the print sheet. Therefore, an OFF state of the laser can be controlled by a control signal LON (805) from the CPU 20. FIG. 73C shows a state wherein the level of an image signal Di changes from "black" to "white" from the left to the right. Since "white" data is input as "FF" and "black" data is input as "00" to the PWM circuit, the output from the D/A converter 902 changes like Di shown in FIG. 73C. In contrast to this, since the triangle waves change, as indicated by WV1 (A) and WV2 (ii), the pulse widths of the outputs of the comparators CMP1 and CMP2 are decreased as the level shifts from "black" to "white"0, as indicated by PW1 and PW2. As can be seen from FIG. 73C, when PW1 is selected, dots are formed on a print sheet to have intervals of $P_1 \rightarrow P_2$, and a change in pulse width has a dynamic range of W1. On the other hand, when PW2 is selected, dots are formed to have intervals of $P_3 \rightarrow P_4 \rightarrow P_5 \rightarrow P_6$, and a dynamic range of a change in pulse width is W2. Thus, the dynamic range of PW2 is ½ that of PW1. For example, a printing density (resolution) is set to be about 200 lines/inch for PW1, and is set to be about 400 lines/inch for PW2. As can be understood from this, when PW1 is selected, gradation can be improved about twice that of PW2, while when PW2 is selected, a resolution can be remarkably improved. Thus, the reader (FIG. 1) supplies the signal LCHG 143 So that when a high resolution is required, PW2 is selected, and when multigradation is required, PW1 is selected. More specifically, a selector 912 shown in FIG. 73A selects the A input, i.e., PW1 when LCHG 143="0". When LCHG="1", PW2 is output from an output terminal $\overline{O}$ of the selector 912. The laser is turned on by a finally obtained pulse width, thereby printing dots.

The LUT 901 is a table conversion ROM for gradation correction. The LUT 901 receives address signals $C_2$ 812', $C_1$ 812, and $C_0$ 813, a table switching signal 814, and a video signal 815, and outputs corrected video data. When the signal LCHG 143 is set to be "0" to select PW1, a binary counter 903 outputs all "0"s, and a PW1 correction table in the LUT 901 can be selected. The signals $C_0$, $C_1$, and $C_2$ are switched according to a color signal to be output. For example, when $C_0$, $C_1$, $C_2$="0, 0, 0", a yellow signal is output; when "0, 1, 0", magenta; when "1, 0, 0", cyan; and when "1, 1, 0", black as in the masking processing. That is, gradation correction characteristics are switched in units of color images to be printed. In this manner, differences in gradation characteristics caused by differences in image reproduction characteristics of the laser beam printer depending on colors can be compensated for. Upon combination of $C_2$, $C_0$, and $C_1$, gradation correction over a wide range can be performed. For example, gradation switching characteristics of each color can be switched according to a kind of input image. When the signal LCHG is set to be "1" to select PW1, the binary counter counts sync signals of a line, and outputs "1"→"2"→"1"→"2"→, ... to the address input 814 of the LUT. Thus, a gradation correction table is switched in units of lines, thus further improving gradation.

Figure 74A:
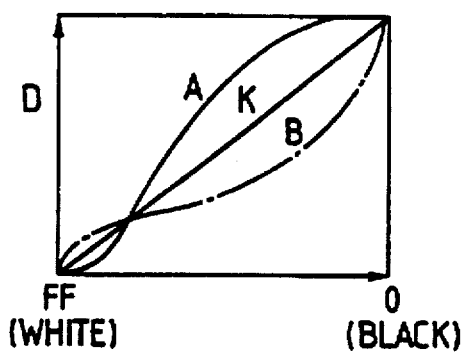
FIGS. 74A and 74B are graphs showing contents of a gradation correction table.
Figure 74B:
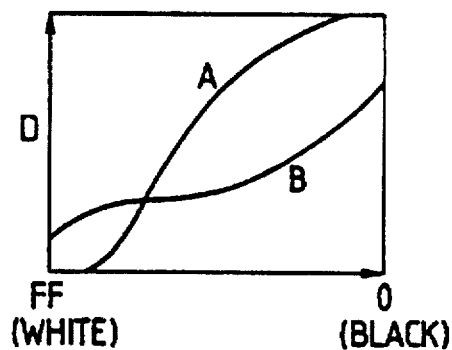

This will be described in more detail with reference to FIGS. 74A and 74B. A curve A shown in FIG. 74A is an input data vs. printing density characteristic curve when input data is changed from "FF", i.e., "white" to "0", i.e., "black". A standard characteristic curve K is preferable, and hence, a gradation correction table is set up with a characteristic curve B as characteristics opposite to the curve A. FIG. 74A shows gradation correction characteristics A and B in units of lines when PW1 is selected. When a pulse width in the main scan direction (laser scan direction) is varied by the above-mentioned triangle wave, two stages of gradation are provided in the sub scan direction (image feed direction), thus further improving gradation characteristics. More specifically, a portion suffering from an abrupt change in density is reproduced based mainly on the characteristic curve A, and flat gradation is reproduced by the characteristic curve B. Therefore, even when PW2 is selected, as described above, a certain gradation level can be assured at a high resolution. When PW1 is selected, very good gradation characteristics can be guaranteed.

The pulse-width modulated video signal is applied to a laser driver 711L through a line 224, thereby modulating a laser beam LB.

Note that the signals $C_0$, $C_1$, $C_2$, and LON in FIG. 74A are output from a control circuit (not shown) in the printer controller 700 shown in FIG. 2.

A case will be examined below wherein a color original including a character area is to be processed. Referring back to the overall circuit diagram of FIG. 2, a processing sequence will be described below. More specifically, after input image data including both character and halftone images passes through an input circuit (A block), one is input to the LOG conversion circuit (C) and the color correction circuit (D) to obtain an appropriate image, and the other is input to a detection circuit (I) for separating a halftone area. Thus, detection signals MjAr (124) to SCRN (127) according to character and halftone areas are output. Of these detection signals, the signal MjAr (124) is a signal representing a character portion. The character/image correction circuit E generates the resolution switching signal LCHG (140 in FIG. 2, 140 in FIG. 21) based on the signal MjAr, as has been described above. As shown in FIG. 2, the signal LCHG 140 is separately sent to the printer to be parallel to multi-value video signals 113, 114, 115, 116, and 138, and serves as a switching signal for outputting a character portion at a high resolution (400 dpi) and outputting a halftone portion with multigradation (200 dpi).

The following processing is performed, as described above.

[Image Forming Operation]

The laser beam LB modulated in correspondence with image output data 816 is horizontally scanned at high speed in an angular interval of arrows A–B by a polygonal mirror 712 which is rotated at high speed, and forms an image on the surface of a photosensitive drum 715 via an f/θ lens 713 and a mirror 714, thus performing dot-exposure corresponding to image data. One horizontal scan period of the laser beam corresponds to that of an original image, and corresponds to a width of 1/16 mm in a feed direction (sub scan direction) in this embodiment.

Figure 75:
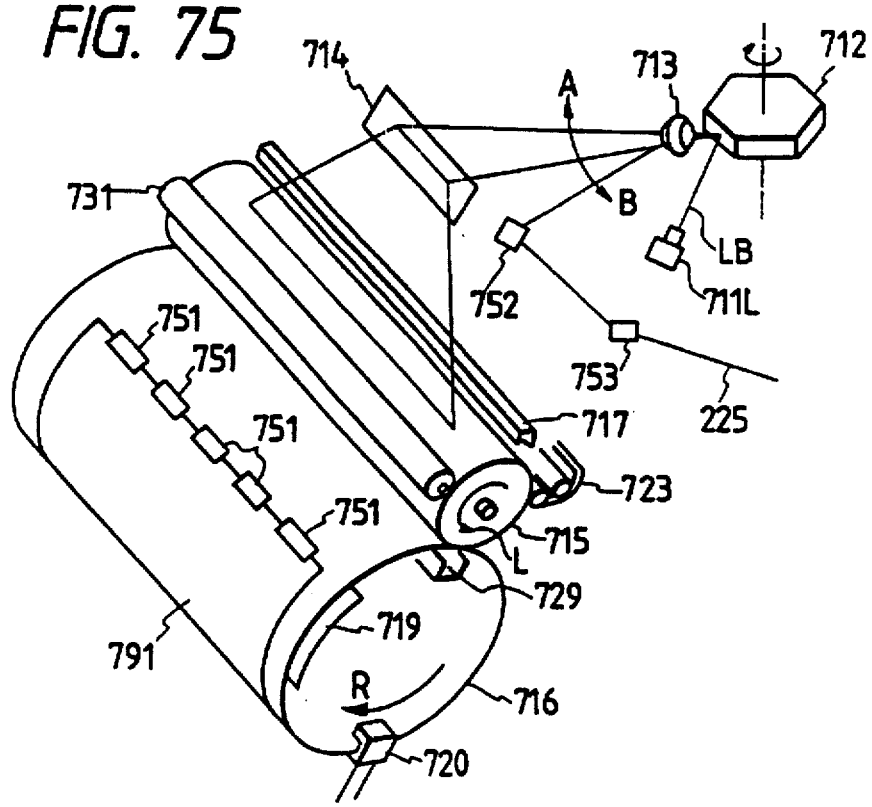
FIG. 75 is a perspective view showing an outer appearance of a laser beam printer.

On the other hand, the photosensitive drum 715 is rotated at a constant speed in a direction of an arrow L shown in FIG. 75. Since scanning of the laser beam is performed in the main scan direction of the drum and the photosensitive drum 715 is rotated at a constant speed in the sub scan direction, an image is sequentially exposed, thus forming a latent image. A toner image is formed by uniform charging by a charger 717 prior to exposure→the above-mentioned exposure→toner developing by a developing sleeve 731. For example, when a latent image is developed by a yellow toner of a developing sleeve 713Y in correspondence with the first original exposure-scanning in the color reader, a toner image corresponding to a yellow component of an original 3 is formed on the photosensitive drum 715.

The yellow toner image is transferred to and formed on a sheet 791 whose leading end is carried by grippers 751 and which is wound around a transfer drum 716 by a transfer charger 729 arranged at a contact point between the photosensitive drum 715 and the transfer drum 716. The same processing is repeated for M (magenta), C (cyan), and Bk (black) images to overlap the corresponding toner images on the sheet 791, thus forming a full-color image using four colors of toners.

Thereafter, the sheet 791 is peeled from the transfer drum 716 by a movable peeling pawl 750 shown in FIG. 1, and is then guided to an image fixing unit 743 by a conveyor belt 742. Thus, the toner images on the sheet 791 are welded and fixed by heat and press rollers 744 and 745 of the fixing unit 743.

In this embodiment, the printing driver drives the color laser beam printer. The present invention can also be applied to color image copying machines such as a thermal transfer color printer, an ink-jet color printer, and the like for obtaining a color image as long as they have a function of switching a resolution according to images.

As described above, according to the present invention, there can be provided an image processing apparatus which can discriminate an image or character portion of input image data by a simple circuit arrangement, and can simultaneously reproduce a smooth image and a sharp character in real time.

What is claimed is:

1. An image processing method comprising:
   an input step of inputting image data;
   a discriminating step of discriminating a type of an image represented by the image data;
   a setting step of setting a discrimination standard of said discriminating step; and
   a display step of displaying a condition in said setting step.

2. A method according to claim 1, wherein said discriminating step discriminates a line image portion of the image based on the image data.

3. A method according to claim 2, wherein said setting step sets a parameter for discriminating, in said discriminating step, the line image portion of the image.

4. A method according to claim 1, wherein the image data input in said input step includes a plurality of color components.

5. A method according to claim 4, further comprising a step of detecting a black portion of the image based on the image data input in said input step.

6. A method according to claim 5, further comprising a step of judging a black character portion of the image data input in said input step when the black portion of the image is detected in said detecting step.

7. A method according to claim 6, further comprising a step of processing the image data input in said input step in accordance with a judging result of said judging step.

8. A method according to claim 7, wherein said setting step controls an intensity of the process which is performed for the black character portion in said processing step.

9. A method according to claim 1, wherein said setting step and said display step utilize a touch panel display.

10. An image processing apparatus comprising:

input means for inputting image data;

discriminating means for discriminating a type of an image represented by the image data;

setting means for setting a discrimination standard of said discriminating means; and display means for displaying a condition of said setting means.

11. An apparatus according to claim 10, wherein said discriminating means discriminates a line image portion of the image based on the image data.

12. An apparatus according to claim 11, wherein said setting means sets a parameter for discriminating the line image portion of the image by said discriminating means.

13. An apparatus according to claim 10, wherein the image data input by said input means includes a plurality of color components.

14. An apparatus according to claim 13, further comprising detecting means for detecting a black portion of the image data input by said input means.

15. An apparatus according to claim 14, further comprising judging means for judging a black character portion of the image data input by said input means when said detecting means detects the black portion of the image.

16. An apparatus according to claim 15, further comprising processing means for processing the image data input by said input means in accordance with a judging result of said judging means.

17. An apparatus according to claim 16, wherein said setting means controls an intensity of the process which is performed for the black character portion by said processing means.

18. An apparatus according to claim 10, wherein said setting means and said display means are composed of a touch panel display.

* * * * *

UNITED STATES PATENT AND TRADEMARK OFFICE
CERTIFICATE OF CORRECTION

PATENT NO. : 5,703,694
DATED : December 30, 1997
INVENTOR(S) : Ikeda et al.

It is certified that error appears in the above-identified patent and that said Letters Patent is hereby corrected as shown below:

SHEET 94 OF DRAWINGS:

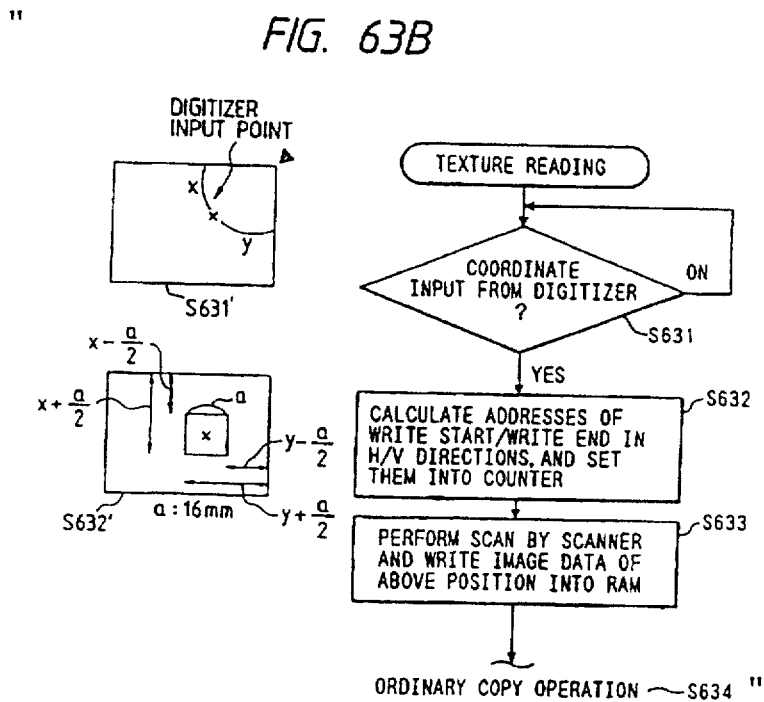

UNITED STATES PATENT AND TRADEMARK OFFICE
CERTIFICATE OF CORRECTION

PATENT NO. : 5,703,694
DATED : December 30, 1997
INVENTOR(S) : Ikeda et al.

It is certified that error appears in the above-identified patent and that said Letters Patent is hereby corrected as shown below:

SHEET 94 OF DRAWINGS (continued):

should read

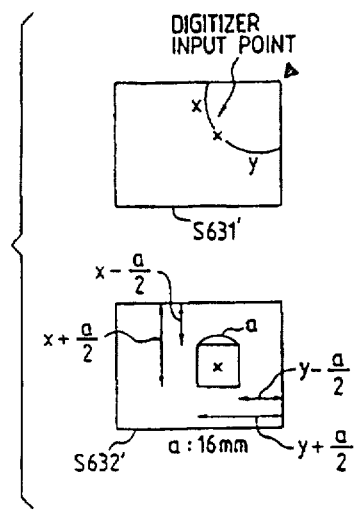
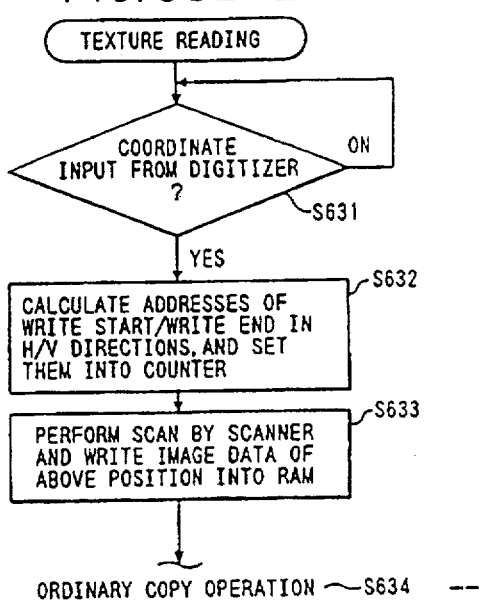

UNITED STATES PATENT AND TRADEMARK OFFICE
CERTIFICATE OF CORRECTION

PATENT NO. : 5,703,694
DATED : December 30, 1997
INVENTOR(S) : Ikeda et al.

It is certified that error appears in the above-identified patent and that said Letters Patent is hereby corrected as shown below:

<u>COLUMN 4</u>:

Line 3, "map;" should read --map memory write access;--.

<u>COLUMN 5</u>:

Line 14, "siganl" should read --signal--.

<u>COLUMN 7</u>:

Line 17, "4,740,796 and 4,740,793." should read --4,723,129 and 4,740,796.--

<u>COLUMN 10</u>:

Line 61, "color-convened" should read --color-converted--.

<u>COLUMN 12</u>:

Line 27, "non-convened" should read --non-converted--.

UNITED STATES PATENT AND TRADEMARK OFFICE
CERTIFICATE OF CORRECTION

PATENT NO. : 5,703,694  
DATED : December 30, 1997  
INVENTOR(S) : Ikeda et al.

Page 4 of 6

It is certified that error appears in the above-identified patent and that said Letters Patent is hereby corrected as shown below:

COLUMN 13:

Line 6, "$112_R$," should read --$112b_R$,--.

COLUMN 15:

Line 13, "87d95d" should read --87d to 95d--.

COLUMN 18:

Line 24, "now rite" should read --no write--; and  
    Line 64, "art" should read --an--.

COLUMN 21:

Line 43, "$\hat{1}$" should read --①--.

COLUMN 24:

Line 11, "?1e" should read --71e--.

COLUMN 25:

Line 26, "not" should read --not limited--; and  
    Line 51, "end" should read --and--.

UNITED STATES PATENT AND TRADEMARK OFFICE
CERTIFICATE OF CORRECTION

PATENT NO. : 5,703,694
DATED : December 30, 1997
INVENTOR(S) : Ikeda et al.

It is certified that error appears in the above-identified patent and that said Letters Patent is hereby corrected as shown below:

COLUMN 31:

Line 55, "403g," should read --403g.--.

COLUMN 32:

Line 14, "processing by an" should be deleted; and
    Line 15, "enlargement processing unit 414g, and" should be deleted.

COLUMN 35:

Line 66, "than" should read --then--.

COLUMN 41:

Line 11, "FIG. 45" should read --FIG. 45A--;
    Line 13, "A of FIG. 45," should read --FIG. 45A,--; and
    Line 48, "in" should read --1n--.

COLUMN 42:

Line 44, "$66_j$," should read --66j--; and
    Line 54, "$60_j$," should read --60j--.

UNITED STATES PATENT AND TRADEMARK OFFICE
CERTIFICATE OF CORRECTION

PATENT NO. : 5,703,694
DATED : December 30, 1997
INVENTOR(S) : Ikeda et al.

It is certified that error appears in the above-identified patent and that said Letters Patent is hereby corrected as shown below:

COLUMN 49:

Line 15, "star," should read --start--.

COLUMN 50:

Line 18, "beth" should read --both--.

COLUMN 52:

Line 40, "WV1(A)" should read --WV(i)--;
Line 42, ""white"0," should read --"white,"--; and
Line 55, "So" should read --so--.

Signed and Sealed this

Fourth Day of August, 1998

Attest:

BRUCE LEHMAN

*Attesting Officer*   *Commissioner of Patents and Trademarks*